(12) United States Patent
Meriaz et al.

(10) Patent No.: US 11,743,302 B2
(45) Date of Patent: Aug. 29, 2023

(54) PROVIDING ENHANCED FUNCTIONALITY IN AN INTERACTIVE ELECTRONIC TECHNICAL MANUAL

(71) Applicant: MBTE HOLDINGS SWEDEN AB, Gothenburg (SE)

(72) Inventors: Ran Meriaz, Atlanta, GA (US); Yoram Meriaz, Tel-Aviv (IL); Alexander Tkachman, Holon (IL)

(73) Assignee: MBTE HOLDINGS SWEDEN AB, Gothenburg (SE)

( * ) Notice: Subject to any disclaimer, the term of this patent is extended or adjusted under 35 U.S.C. 154(b) by 0 days.

(21) Appl. No.: 17/029,324

(22) Filed: Sep. 23, 2020

(65) Prior Publication Data

US 2022/0092539 A1 Mar. 24, 2022

Related U.S. Application Data

(63) Continuation of application No. 17/026,636, filed on Sep. 21, 2020.

(51) Int. Cl.
*H04L 65/1069* (2022.01)
*G06F 3/0483* (2013.01)
(Continued)

(52) U.S. Cl.
CPC ............ *H04L 65/1069* (2013.01); *B64F 5/40* (2017.01); *G06F 3/0481* (2013.01);
(Continued)

(58) Field of Classification Search
CPC .... G06F 3/0483; G06F 3/0485; G06F 16/159; G06F 16/176; G06F 16/2423;
(Continued)

(56) References Cited

U.S. PATENT DOCUMENTS

| 4,899,292 A | 2/1990 | Montagna et al. |
| 4,985,855 A | 1/1991 | Aldrich et al. |

(Continued)

FOREIGN PATENT DOCUMENTS

| CN | 201540571 U | * 8/2010 |
| CN | 106095258 A | 11/2016 |

(Continued)

OTHER PUBLICATIONS

Various Authors, SQL Server Version 15 Documentation: "Connect to Server (Login Page) Database Engine)", https://docs.microsoft.com/en-us/sql/ssms/f1-help/connect-to-server-login-page-database-engine?view=sql-server-ver15, Apr. 7, 2020, pp. 1-4 (Year: 2020).*

(Continued)

*Primary Examiner* — Andrew L Tank
(74) *Attorney, Agent, or Firm* — ALSTON & BIRD LLP

(57) ABSTRACT

Embodiments of the present disclosure provide methods, apparatus, systems, computer program products for performing functionality requiring network connectivity in an interactive electronic technical manual system (IETM) configured to provide electronic and credentialed access to technical documentation for an item. In one embodiment, a method is provided comprising: receiving input comprising informational data; and responsive to receiving the data: generating a graphical security code; receiving input indicating a scanning of the code, wherein the scanning of the code (1) is performed by a user using a remote device connected to a network and (2) causes access to scanning functionality provided by an application installed on the device; and responsive to receiving the input: generating a graphical form code comprising the data; and causing display of a third window comprising the code, wherein the code can be scanned using the application to send the data to a third party over the network.

12 Claims, 108 Drawing Sheets

(51) Int. Cl.
| | |
|---|---|
| *H04L 9/40* | (2022.01) |
| *G06F 3/04842* | (2022.01) |
| *G06F 16/93* | (2019.01) |
| *G06F 3/0482* | (2013.01) |
| *G06F 3/04845* | (2022.01) |
| *G06F 21/62* | (2013.01) |
| *G06F 40/169* | (2020.01) |
| *G06F 3/14* | (2006.01) |
| *G06F 40/106* | (2020.01) |
| *G06F 3/0481* | (2022.01) |
| *G06F 16/953* | (2019.01) |
| *G06F 9/451* | (2018.01) |
| *G09B 5/02* | (2006.01) |
| *G06K 7/14* | (2006.01) |
| *G06Q 10/0875* | (2023.01) |
| *G06Q 10/10* | (2023.01) |
| *G06Q 30/018* | (2023.01) |
| *G06F 40/14* | (2020.01) |
| *G06Q 30/0601* | (2023.01) |
| *G06F 16/11* | (2019.01) |
| *G06F 16/13* | (2019.01) |
| *G06F 40/143* | (2020.01) |
| *G06F 30/12* | (2020.01) |
| *G06F 40/117* | (2020.01) |
| *G06F 16/903* | (2019.01) |
| *G06F 16/908* | (2019.01) |
| *G06F 16/838* | (2019.01) |
| *G06F 16/44* | (2019.01) |
| *G06F 3/04855* | (2022.01) |
| *G06F 40/174* | (2020.01) |
| *G06K 19/06* | (2006.01) |
| *G06Q 10/107* | (2023.01) |
| *G06F 16/9032* | (2019.01) |
| *G06Q 10/0631* | (2023.01) |
| *G06Q 10/20* | (2023.01) |
| *G06F 3/04815* | (2022.01) |
| *G06T 19/00* | (2011.01) |
| *G06T 19/20* | (2011.01) |
| *B64F 5/40* | (2017.01) |
| *H04L 12/46* | (2006.01) |
| *G06F 16/955* | (2019.01) |
| *G06F 21/12* | (2013.01) |
| *G06F 3/0485* | (2022.01) |
| *G06F 21/31* | (2013.01) |
| *G06Q 10/101* | (2023.01) |
| *G06Q 10/105* | (2023.01) |
| *G06Q 50/00* | (2012.01) |
| *G06Q 10/087* | (2023.01) |
| *G09B 19/00* | (2006.01) |

(52) U.S. Cl.
CPC .......... *G06F 3/0482* (2013.01); *G06F 3/0483* (2013.01); *G06F 3/04815* (2013.01); *G06F 3/04842* (2013.01); *G06F 3/04845* (2013.01); *G06F 3/04855* (2013.01); *G06F 3/1454* (2013.01); *G06F 9/451* (2018.02); *G06F 9/452* (2018.02); *G06F 9/453* (2018.02); *G06F 16/116* (2019.01); *G06F 16/13* (2019.01); *G06F 16/44* (2019.01); *G06F 16/838* (2019.01); *G06F 16/908* (2019.01); *G06F 16/90328* (2019.01); *G06F 16/90348* (2019.01); *G06F 16/93* (2019.01); *G06F 16/94* (2019.01); *G06F 16/953* (2019.01); *G06F 16/9554* (2019.01); *G06F 21/6218* (2013.01); *G06F 21/6227* (2013.01); *G06F 30/12* (2020.01); *G06F 40/106* (2020.01); *G06F 40/117* (2020.01); *G06F 40/14* (2020.01); *G06F 40/143* (2020.01); *G06F 40/169* (2020.01); *G06F 40/174* (2020.01); *G06K 7/1417* (2013.01); *G06K 19/06028* (2013.01); *G06K 19/06037* (2013.01); *G06Q 10/06311* (2013.01); *G06Q 10/06316* (2013.01); *G06Q 10/063114* (2013.01); *G06Q 10/0875* (2013.01); *G06Q 10/10* (2013.01); *G06Q 10/103* (2013.01); *G06Q 10/107* (2013.01); *G06Q 10/20* (2013.01); *G06Q 30/0185* (2013.01); *G06Q 30/0635* (2013.01); *G06Q 30/0643* (2013.01); *G06T 19/003* (2013.01); *G06T 19/20* (2013.01); *G09B 5/02* (2013.01); *H04L 12/4641* (2013.01); *H04L 63/08* (2013.01); *H04L 63/102* (2013.01); *G06F 3/0485* (2013.01); *G06F 21/128* (2013.01); *G06F 21/31* (2013.01); *G06F 2203/04802* (2013.01); *G06F 2203/04803* (2013.01); *G06F 2203/04806* (2013.01); *G06F 2221/2141* (2013.01); *G06Q 10/087* (2013.01); *G06Q 10/101* (2013.01); *G06Q 10/105* (2013.01); *G06Q 50/01* (2013.01); *G06T 2219/004* (2013.01); *G06T 2219/2012* (2013.01); *G06T 2219/2016* (2013.01); *G09B 19/0069* (2013.01); *H04L 63/04* (2013.01)

(58) Field of Classification Search
CPC .............. G06F 16/2428; G06F 16/335; G06F 16/90328; G06F 16/90348; G06F 16/9035; G06F 16/9038; G06F 16/908; G06F 16/93; G06F 16/94; G06F 16/953; G06F 16/9535; G06F 21/31; G06F 21/36; G06F 21/40; G06F 21/6218; G06F 21/6227; G06F 40/106; G06F 3/0482; G06F 3/04842; G06F 3/04847; G06F 2221/2141; G06F 9/451; G06F 16/44; G06F 16/116; G06F 16/838; G06F 16/9554; G06F 21/128; G06F 40/14; G06F 40/143; G06F 40/174; G06K 7/1413; G06K 7/1417; G06K 7/143; G06K 7/1434; G06K 19/06028; G06K 19/06037; G06Q 30/0185; G06Q 30/0625; G06Q 10/0875; G06Q 10/101; G06Q 10/103; G06Q 10/107; G06Q 10/20; G06Q 10/06316; G06Q 10/063114; G06Q 30/0635; G06Q 50/01; H04L 63/102; H04L 63/105; H04L 63/04; H04L 63/08; H04L 41/22; H04L 63/0272; H04L 12/4641; H04L 63/272; H04L 65/1069; G09B 19/0069; G09B 5/02; B64F 5/40
See application file for complete search history.

(56) References Cited

U.S. PATENT DOCUMENTS

| | | |
|---|---|---|
| 5,043,936 A | 8/1991 | Majima |
| 5,428,733 A | 6/1995 | Carr |
| 5,428,782 A * | 6/1995 | White ................. G06F 8/38 |
| | | 718/101 |
| 5,454,074 A | 9/1995 | Hartel et al. |
| 5,742,768 A | 4/1998 | Gennaro et al. |
| 6,262,720 B1 | 7/2001 | Jeffrey et al. |
| 6,313,854 B1 * | 11/2001 | Gibson ................. G09G 5/14 |
| | | 715/788 |
| 6,430,556 B1 * | 8/2002 | Goldberg ............. G06F 16/24 |

(56) References Cited

U.S. PATENT DOCUMENTS

| | | |
|---|---|---|
| 6,496,872 B1 | 12/2002 | Katz et al. |
| 6,542,796 B1 | 4/2003 | Gibbs et al. |
| 6,557,015 B1 | 4/2003 | Bates et al. |
| 6,606,731 B1 | 8/2003 | Baum et al. |
| 6,879,997 B1 | 4/2005 | Ketola et al. |
| 6,961,897 B1 | 11/2005 | Peel et al. |
| 7,162,426 B1 | 1/2007 | Schultz |
| 7,444,216 B2 | 10/2008 | Rogers et al. |
| 7,613,638 B2 | 11/2009 | Chakraborty et al. |
| 7,647,628 B2 | 1/2010 | Kebinger et al. |
| 7,810,027 B2 | 10/2010 | Bendik |
| 7,890,336 B2 | 2/2011 | Birnbaum et al. |
| 8,010,910 B2 | 8/2011 | Wright et al. |
| 8,086,970 B2 * | 12/2011 | Achtermann ....... H04L 61/2061 715/833 |
| 8,112,715 B2 | 2/2012 | Cragun et al. |
| 8,214,789 B2 | 7/2012 | Boose |
| 8,381,164 B2 | 2/2013 | Baum et al. |
| 8,402,359 B1 | 3/2013 | Pogodin et al. |
| 8,479,091 B2 | 7/2013 | Buck et al. |
| 8,522,345 B2 | 8/2013 | Sharma et al. |
| 8,527,893 B2 | 9/2013 | Agrawal et al. |
| 8,539,330 B2 | 9/2013 | Dovin et al. |
| 8,655,869 B2 | 2/2014 | Ferrari et al. |
| 8,775,552 B1 | 7/2014 | Kessel et al. |
| 9,009,074 B2 | 4/2015 | Chakraborty et al. |
| 9,100,822 B2 * | 8/2015 | Doss ..................... H04W 12/04 |
| 9,105,120 B2 | 8/2015 | Shimoyama et al. |
| 9,135,372 B2 | 9/2015 | Delarue et al. |
| 9,197,718 B2 * | 11/2015 | Kiang ................... G06Q 10/10 |
| 9,225,704 B1 | 12/2015 | Johansson et al. |
| 9,230,034 B2 | 1/2016 | Priestly et al. |
| 9,280,646 B1 * | 3/2016 | Nandyalam ......... G06F 21/6218 |
| 9,411,899 B2 | 8/2016 | Godsey et al. |
| 9,619,770 B2 * | 4/2017 | Bisroev ............... H04L 63/0442 |
| 9,887,992 B1 * | 2/2018 | Venkat .................... G06F 21/35 |
| 9,967,524 B2 * | 5/2018 | Brunet ................... G06F 3/0481 |
| 10,050,787 B1 | 8/2018 | Johansson et al. |
| 10,209,867 B1 | 2/2019 | Becker |
| 10,303,892 B1 | 5/2019 | Lim et al. |
| 10,373,342 B1 | 8/2019 | Perez et al. |
| 10,394,936 B2 | 8/2019 | Bergman et al. |
| 10,394,938 B2 | 8/2019 | Meriaz et al. |
| 10,452,755 B2 | 10/2019 | Rajvanshi et al. |
| 10,474,973 B2 | 11/2019 | Tucker et al. |
| 10,481,765 B2 | 11/2019 | Nadella et al. |
| 10,484,358 B2 | 11/2019 | Venkata et al. |
| 10,606,927 B2 | 3/2020 | Bergman et al. |
| 10,691,164 B2 | 6/2020 | Meriaz et al. |
| 10,713,699 B1 | 7/2020 | Lien et al. |
| 10,803,044 B1 | 10/2020 | Junod et al. |
| 10,891,798 B2 | 1/2021 | Guerin |
| 2001/0030611 A1 | 10/2001 | O'Rourke |
| 2001/0056384 A1 | 12/2001 | Matsumura |
| 2002/0038262 A1 | 3/2002 | Fukuda et al. |
| 2002/0052880 A1 | 5/2002 | Fruensgaard et al. |
| 2002/0184111 A1 | 12/2002 | Swanson |
| 2003/0025682 A1 | 2/2003 | Dame |
| 2003/0046663 A1 | 3/2003 | Rogers et al. |
| 2003/0115210 A1 | 6/2003 | Leonard et al. |
| 2003/0126129 A1 | 7/2003 | Watson |
| 2003/0168259 A1 * | 9/2003 | Miller ..................... G07G 1/12 177/25.15 |
| 2004/0034498 A1 | 2/2004 | Shah et al. |
| 2004/0073794 A1 * | 4/2004 | Nip ......................... G06F 21/31 713/168 |
| 2004/0138899 A1 | 7/2004 | Birnbaum et al. |
| 2004/0181711 A1 | 9/2004 | Johnson et al. |
| 2004/0226048 A1 * | 11/2004 | Alpert ............. H04N 21/25891 725/109 |
| 2004/0249727 A1 | 12/2004 | Cook et al. |
| 2004/0260594 A1 | 12/2004 | Maddox |
| 2005/0027578 A1 | 2/2005 | Chambers et al. |
| 2005/0080502 A1 | 4/2005 | Chernyak et al. |
| 2005/0138544 A1 | 6/2005 | Beck et al. |
| 2005/0182650 A1 | 8/2005 | Maddox et al. |
| 2005/0216861 A1 * | 9/2005 | Hurewitz ............... G06F 40/134 715/822 |
| 2006/0009943 A1 * | 1/2006 | Keck ....................... G06Q 50/04 702/122 |
| 2006/0123361 A1 | 6/2006 | Sorin et al. |
| 2006/0167711 A1 | 7/2006 | Chakraborty et al. |
| 2006/0167760 A1 | 7/2006 | Chakraborty et al. |
| 2006/0212826 A1 | 9/2006 | Nuno |
| 2007/0106658 A1 | 5/2007 | Ferrari et al. |
| 2007/0124672 A1 | 5/2007 | Cragun et al. |
| 2007/0136300 A1 * | 6/2007 | Chien .................... G06F 16/90 |
| 2007/0156748 A1 | 7/2007 | Emam et al. |
| 2007/0180361 A1 | 8/2007 | Dovin et al. |
| 2007/0192618 A1 * | 8/2007 | Ellmore ............... G06Q 20/108 713/183 |
| 2007/0208452 A1 | 9/2007 | Lukis et al. |
| 2007/0283317 A1 * | 12/2007 | Sadler .................... G06F 9/541 717/103 |
| 2008/0120282 A1 * | 5/2008 | Liberty ................. G06F 16/958 |
| 2008/0177579 A1 | 7/2008 | DeHaan |
| 2008/0281860 A1 | 11/2008 | Elias et al. |
| 2008/0297847 A1 | 12/2008 | Yamazaki et al. |
| 2009/0049077 A1 * | 2/2009 | Lawlor ................ G06F 16/4393 |
| 2009/0063547 A1 | 3/2009 | Wright et al. |
| 2009/0260060 A1 | 10/2009 | Smith et al. |
| 2009/0319955 A1 | 12/2009 | Malek et al. |
| 2010/0042283 A1 * | 2/2010 | Kell ....................... G06Q 10/06 701/29.3 |
| 2010/0063860 A1 | 3/2010 | Gallion et al. |
| 2010/0077320 A1 | 3/2010 | Lepore et al. |
| 2010/0088746 A1 | 4/2010 | Kota et al. |
| 2010/0191659 A1 * | 7/2010 | Hebron .................. G06Q 30/06 705/306 |
| 2010/0272193 A1 * | 10/2010 | Khan .................... H04L 1/1812 375/259 |
| 2010/0312595 A1 * | 12/2010 | Lynn ..................... G06Q 50/01 705/7.23 |
| 2010/0315329 A1 | 12/2010 | Previc et al. |
| 2011/0004369 A1 | 1/2011 | Fournier et al. |
| 2011/0047503 A1 | 2/2011 | Allen et al. |
| 2011/0214065 A1 | 9/2011 | Sharma et al. |
| 2011/0214091 A1 | 9/2011 | Nicol et al. |
| 2011/0218886 A1 | 9/2011 | Matsuoka et al. |
| 2011/0313899 A1 | 12/2011 | Drey |
| 2012/0005624 A1 | 1/2012 | Vesely |
| 2012/0084108 A1 | 4/2012 | Bohannon et al. |
| 2012/0095991 A1 | 4/2012 | Ferrari et al. |
| 2012/0144464 A1 * | 6/2012 | Fakhrai ................ H04L 63/083 726/6 |
| 2012/0221433 A1 | 8/2012 | Plattsmier et al. |
| 2012/0254745 A1 | 10/2012 | Sangiovanni et al. |
| 2012/0254808 A1 | 10/2012 | Gildfind |
| 2012/0304105 A1 | 11/2012 | Rosman et al. |
| 2013/0019210 A1 | 1/2013 | Priestly et al. |
| 2013/0080881 A1 | 3/2013 | Goodspeed et al. |
| 2013/0179309 A1 | 7/2013 | Heil et al. |
| 2013/0212507 A1 | 8/2013 | Fedoseyeva et al. |
| 2013/0283211 A1 | 10/2013 | Malkin et al. |
| 2013/0325567 A1 * | 12/2013 | Bradley .............. G06Q 30/0207 705/14.1 |
| 2014/0025582 A1 * | 1/2014 | Maevsky ........... G06Q 30/0226 705/65 |
| 2014/0101534 A1 | 4/2014 | Choi |
| 2014/0121801 A1 | 5/2014 | Taguchi et al. |
| 2014/0129918 A1 | 5/2014 | Bergman et al. |
| 2014/0129921 A1 | 5/2014 | Bergman et al. |
| 2014/0172204 A1 | 6/2014 | Coulmeau et al. |
| 2014/0181699 A1 | 6/2014 | Godsey et al. |
| 2014/0210860 A1 | 7/2014 | Caissy |
| 2014/0281933 A1 | 9/2014 | Mellor |
| 2014/0282257 A1 | 9/2014 | Nixon et al. |
| 2014/0298184 A1 | 10/2014 | Bailin |
| 2014/0310613 A1 | 10/2014 | Megiddo et al. |
| 2014/0312114 A1 * | 10/2014 | Floyd .................. G06F 16/9554 235/376 |
| 2014/0324779 A1 | 10/2014 | Forbes et al. |
| 2014/0359457 A1 | 12/2014 | Bellan et al. |

(56) References Cited

U.S. PATENT DOCUMENTS

| | | |
|---|---|---|
| 2015/0007096 A1 | 1/2015 | Hansen |
| 2015/0032548 A1 | 1/2015 | Shapiro et al. |
| 2015/0052427 A1 | 2/2015 | Vagell et al. |
| 2015/0088674 A1* | 3/2015 | Flurscheim ...... G06K 19/06037 705/17 |
| 2015/0106723 A1 | 4/2015 | Bertelsen |
| 2015/0172418 A1 | 6/2015 | Davis et al. |
| 2015/0206099 A1* | 7/2015 | Bockx .................. G06Q 10/101 705/343 |
| 2015/0234786 A1 | 8/2015 | Landau |
| 2015/0242495 A1 | 8/2015 | Goldstein et al. |
| 2015/0286619 A1 | 10/2015 | Chakra et al. |
| 2016/0092563 A1 | 3/2016 | Luo et al. |
| 2016/0110369 A1 | 4/2016 | Cervelli et al. |
| 2016/0180015 A1 | 6/2016 | An et al. |
| 2016/0210268 A1 | 7/2016 | Sales |
| 2016/0259413 A1 | 9/2016 | Anzures et al. |
| 2016/0267063 A1 | 9/2016 | Rajvanshi et al. |
| 2016/0357376 A1 | 12/2016 | Carrigan et al. |
| 2017/0024808 A1 | 1/2017 | Plattsmier et al. |
| 2017/0026321 A1* | 1/2017 | Ciavatta .................. H04L 51/08 |
| 2017/0031652 A1 | 2/2017 | Kam et al. |
| 2017/0102839 A1 | 4/2017 | Nadella et al. |
| 2017/0103358 A1* | 4/2017 | Crook .............. G06Q 10/06393 |
| 2017/0220546 A1 | 8/2017 | Codrington et al. |
| 2017/0315697 A1 | 11/2017 | Jacobson et al. |
| 2017/0357432 A1 | 12/2017 | King et al. |
| 2018/0032618 A1* | 2/2018 | Greenberg ............ G06F 16/972 |
| 2018/0122138 A1 | 5/2018 | Piya et al. |
| 2018/0129656 A1 | 5/2018 | Crawford et al. |
| 2018/0181264 A1 | 6/2018 | Jhawar et al. |
| 2018/0225408 A1 | 8/2018 | Ziolo et al. |
| 2019/0034855 A1 | 1/2019 | Halioris et al. |
| 2019/0042988 A1* | 2/2019 | Brown ................ G06F 16/9535 |
| 2019/0114387 A1 | 4/2019 | Wolfe et al. |
| 2019/0121842 A1 | 4/2019 | Catalano et al. |
| 2019/0122426 A1 | 4/2019 | Ullom |
| 2019/0230165 A1* | 7/2019 | Wang .................. H04L 63/0846 |
| 2019/0340221 A1 | 11/2019 | Meriaz et al. |
| 2019/0384364 A1 | 12/2019 | Meriaz et al. |
| 2020/0042584 A1 | 2/2020 | Vennix et al. |
| 2020/0065360 A1 | 2/2020 | Cheung et al. |
| 2020/0073516 A1 | 3/2020 | Gold et al. |
| 2020/0098192 A1* | 3/2020 | Guerin .................... G06T 19/00 |
| 2020/0122855 A1 | 4/2020 | Conaway |
| 2020/0174630 A1 | 6/2020 | Rosenberg |
| 2020/0251111 A1 | 8/2020 | Temkin et al. |
| 2020/0277083 A1 | 9/2020 | Conaway |
| 2020/0294497 A1 | 9/2020 | Kirazci et al. |
| 2021/0126805 A1 | 4/2021 | Archer et al. |
| 2021/0126983 A1 | 4/2021 | Bellet et al. |
| 2021/0181853 A1 | 6/2021 | Hassan |
| 2021/0312125 A1 | 10/2021 | Zhang et al. |
| 2022/0092555 A1 | 3/2022 | Meriaz et al. |
| 2022/0261124 A1 | 8/2022 | Meriaz et al. |
| 2022/0261125 A1 | 8/2022 | Meriaz et al. |
| 2022/0261530 A1 | 8/2022 | Meriaz et al. |
| 2022/0262358 A1 | 8/2022 | Meriaz et al. |
| 2022/0317979 A1 | 10/2022 | Araujo et al. |

FOREIGN PATENT DOCUMENTS

| | | |
|---|---|---|
| CN | 108268635 A | 7/2018 |
| FR | 2999700 A1 | 6/2014 |
| JP | 2020-067860 A | 4/2020 |

OTHER PUBLICATIONS

SD1000D, "International specification for technical publications using a common source database", Issue No. 5.0, copyright 2019 Aerospace and Defence Industries Association of Europe (ASD), copyright 2019 Ministries of Defence of the member countries of ASD, Chapter 6, 2019 (Year: 2019).*

U.S. Appl. No. 17/026,636, filed Sep. 21, 2020, Pending.

Junod, John L. et al. "Web-Based Interactive Electronic Technical Manual (IETM) Common User Interface Style Guide," Naval Surface Warfare Center, Carderock Division, Version 2.0, Jul. 2003, NSWCCD-20-TR-2003/05, (112 pages), (Year: 2003).

NonFinal Office Action for U.S. Appl. No. 17/029,307, dated Sep. 9, 2021, (30 pages), United States Patent and Trademark Office, USA.

NonFinal Office Action for U.S. Appl. No. 17/029,311, dated Jun. 23, 2021, (26 pages), United States Patent and Trademark Office, USA.

Performance Specification for "Manuals, Interactive Electronic Technical—General Content, Style, Format, and User-Interaction Requirements," MIL-PRF-87268A, Oct. 1, 1995, (56 pages), (Year: 1995).

NonFinal Office Action for U.S. Appl. No. 17/028,159, dated Mar. 9, 2021, (30 pages), United States Patent and Trademark Office, USA.

NonFinal Office Action for U.S. Appl. No. 17/032,043, dated Jan. 7, 2021, (13 pages), United States Patent and Trademark Office, USA.

NonFinal Office Action for U.S. Appl. No. 17/032,058, dated Dec. 24, 2020, (13 pages), United States Patent and Trademark Office, USA.

U.S. Appl. No. 16/992,495, "Augmented Reality Environment For Technical Data," Unpublished, (filed Aug. 13, 2020), (Inventors: Ran Meriaz, Yoram Meriaz, Alexander Tkachman), (Assignee: MBTE Holdings Sweden AB).

NonFinal Office Action for U.S. Appl. No. 17/030,474, dated May 25, 2021, (33 pages), United States Patent and Trademark Office, USA.

Final Office Action for U.S. Appl. No. 17/029,307, dated Apr. 22, 2022, (40 pages), United States Patent and Trademark Office, US.

Final Office Action for U.S. Appl. No. 17/029,314, dated May 11, 2022, (27 pages), United States Patent and Trademark Office, US.

NonFinal Office Action for U.S. Appl. No. 17/303,048, dated Jun. 13, 2022, (43 pages), United States Patent and Trademark Office, US.

W3schools. "HTML <a> target Attribute", (3 pages), (Year: 2022), [Retrieved from the Internet Apr. 19, 2022] <https://www/w3schools.com/tags/att_a_target.asp>.

Deutsch Industrial, "DT Series Technical Manual," pp. 1-13, (Year: 2020), [Retrieved from the Internet Feb. 22, 2020] <URL: https://www.farnell.com/daasheets/628276.pdf>.

Final Office Action for U.S. Appl. No. 17/029,311, dated Jan. 25, 2022, (30 pages), United States Patent and Trademark Office, USA.

NonFinal Office Action for U.S. Appl. No. 17/030,457, dated Feb. 16, 2022, (39 pages), United States Patent and Trademark Office, USA.

NonFinal Office Action for U.S. Appl. No. 17/030,463, dated Mar. 15, 2022, (40 pages), United States Patent and Trademark Office, USA.

NonFinal Office Action for U.S. Appl. No. 17/030,471, dated Mar. 15, 2022, (40 pages), United States Patent and Trademark Office, USA.

NonFinal Office Action for U.S. Appl. No. 17/032,052, dated Mar. 15, 2022, (39 pages), United States Patent and Trademark Office, USA.

NonFinal Office Action for U.S. Appl. No. 17/032,055, dated Mar. 15, 2022, (40 pages), United States Patent and Trademark Office, USA.

NonFinal Office Action for U.S. Appl. No. 17/032,060, dated Mar. 16, 2022, (44 pages), United States Patent and Trademark Office, USA.

NonFinal Office Action for U.S. Appl. No. 17/249,050, dated Mar. 30, 2022, (51 pages), United States Patent and Trademark Office, USA.

NonFinal Office Action for U.S. Appl. No. 17/249,051, dated Mar. 31, 2022, (56 pages), United States Patent and Trademark Office, USA.

Final Office Action for U.S. Appl. No. 17/028,159, dated Oct. 14, 2021, (45 pages), United States Patent and Trademark Office, USA.

(56) References Cited

OTHER PUBLICATIONS

Final Office Action for U.S. Appl. No. 17/030,474, dated Dec. 22, 2021, (35 pages), United States Patent and Trademark Office, USA.
Final Office Action for U.S. Appl. No. 17/032,043, dated Oct. 22, 2021, (23 pages), United States Patent and Trademark Office, USA.
Final Office Action for U.S. Appl. No. 17/032,058, dated Oct. 8, 2021, (24 pages), United States Patent and Trademark Office, USA.
Ivideos, "iPhone 11 How to Create Folders (iOS 13)", published at https://www.youtube.com/watch?v=gKWw9VfQN-4 as of Nov. 11, 2019 (Year: 2019).
NonFinal Office Action for U.S. Appl. No. 17/026,636, dated Oct. 6, 2021, (14 pages), United States Patent and Trademark Office, USA.
NonFinal Office Action for U.S. Appl. No. 17/028,111, dated Oct. 27, 2021, (32 pages), United States Patent and Trademark Office, USA.
NonFinal Office Action for U.S. Appl. No. 17/028,123, dated Oct. 15, 2021, (34 pages), United States Patent and Trademark Office, USA.
NonFinal Office Action for U.S. Appl. No. 17/028,131, dated Oct. 6, 2021, (13 pages), United States Patent and Trademark Office, USA.
NonFinal Office Action for U.S. Appl. No. 17/028,144, dated Nov. 12, 2021, (31 pages), United States Patent and Trademark Office, USA.
NonFinal Office Action for U.S. Appl. No. 17/028,151, dated Dec. 7, 2021, (33 pages), United States Patent and Trademark Office, USA.
NonFinal Office Action for U.S. Appl. No. 17/029,298, dated Dec. 23, 2021, (32 pages), United States Patent and Trademark Office, USA.
NonFinal Office Action for U.S. Appl. No. 17/029,304, dated Dec. 24, 2021, (34 pages), United States Patent and Trademark Office, USA.
NonFinal Office Action for U.S. Appl. No. 17/029,314, dated Oct. 6, 2021, (12 pages), United States Patent and Trademark Office, USA.
NonFinal Office Action for U.S. Appl. No. 17/030,455, dated Dec. 24, 2021, (31 pages), United States Patent and Trademark Office, USA.
NonFinal Office Action for U.S. Appl. No. 17/030,460, dated Dec. 24, 2021, (33 pages), United States Patent and Trademark Office, USA.
NonFinal Office Action for U.S. Appl. No. 17/032,048, dated Oct. 6, 2021, (31 pages), United States Patent and Trademark Office, USA.
NonFinal Office Action for U.S. Appl. No. 17/249,039, dated Nov. 24, 2021, (52 pages), United States of America, USA.
NonFinal Office Action for U.S. Appl. No. 17/249,052, dated Nov. 10, 2021, (39 pages), United States Patent and Trademark Office, USA.
Office Pros, "How to Use the Highlighter Pen in Microsoft Word", published at https://www.youtube.com/watch?v=ph49plDKNO8 as of Mar. 15, 2016 (Year: 2016).
PartsCatalogGeneratr (YouTube video "2—Interactive Spare Parts Catalogs with PCG—Basic Operation" published at https://www.youtube.com/watch?v=6gsmjWxmWfs as of Sep. 27, 2012) (Year: 2012).
Various Authors, SQL Server Version 15 Documentation: "Connect To Server (Login Page) Database Engine", pp. 1-4, Apr. 7, 2020, pp. 1-4, (Year: 2020), [Retrieved from the Internet Sep. 30, 2021] <URL: https://docs.microsoft.com/en-us/sql.ssms/f1-help/connect-to-server-login-page-database-engine?view=sql-server-ver15>.
Final Office Action for U.S. Appl. No. 17/028,123, dated Dec. 9, 2022, (16 pages), United States Patent and Trademark Office, US.
Final Office Action for U.S. Appl. No. 17/028,151, dated Dec. 9, 2022, (13 pages), United States Patent and Trademark Office, US.
Final Office Action for U.S. Appl. No. 17/030,463, dated Dec. 9, 2022, (10 pages), United States Patent and Trademark Office, US.
Final Office Action for U.S. Appl. No. 17/030,471, dated Dec. 9, 2022, (13 pages), United States Patent and Trademark Office, US.
Final Office Action for U.S. Appl. No. 17/032,052, dated Dec. 9, 2022, (10 pages), United States Patent and Trademark Office, US.
Final Office Action for U.S. Appl. No. 17/032,055, dated Dec. 9, 2022, (13 pages), United States Patent and Trademark Office, US.
Final Office Action for U.S. Appl. No. 17/032,060, dated Dec. 9, 2022, (15 pages), United States Patent and Trademark Office, US.
Final Office Action for U.S. Appl. No. 17/249,051, dated Oct. 25, 2022, (50 pages), United States Patent and Trademark Office, US.
Final Office Action for U.S. Appl. No. 17/029,304, dated Oct. 20, 2022, (14 pages), United States Patent and Trademark Office, US.
Final Office Action for U.S. Appl. No. 17/030,455, dated Oct. 14, 2022, (8 pages), United States Patent and Trademark Office, US.
Final Office Action for U.S. Appl. No. 17/030,460, dated Oct. 20, 2022, (14 pages), United States Patent and Trademark Office, US.
Jambak, Muhammad Ikhwan et al. "Search Results Side Note: Creating Information Search Context In Creative Design Process," 2016 11th International Conference On Knowledge, Information and Creativity Support Systems (KICSS), Nov. 10, 2016, pp. 1-5, doi: 10.1109/KICSS.2016.7951446. (Year: 2016).
NonFinal Office Action for U.S. Appl. No. 17/028,131, dated Oct. 27, 2022, (13 pages), United States Patent and Trademark Office, US.
NonFinal Office Action for U.S. Appl. No. 17/029,307, dated Nov. 15, 2022, (23 pages), United States Patent and Trademark Office, US.
Aery, Sean C. "Breadcrumb Navigation Deployment in Retail Web Sites," A Master's Paper, University of North Carolina at Chapel Hill, (60 pages), Jul. 2007.
Final Office Action for U.S. Appl. No. 17/026,636, dated Aug. 8, 2022, (33 pages), United States Patent and Trademark Office, US.
Final Office Action for U.S. Appl. No. 17/028,111, dated Aug. 22, 2022, (32 pages), United States Patent and Trademark Office, US.
Final Office Action for U.S. Appl. No. 17/028,144, dated Sep. 7, 2022, (31 pages), United States Patent and Trademark Office, US.
Final Office Action for U.S. Appl. No. 17/032,048, dated Aug. 8, 2022, (30 pages), United States Patent and Trademark Office, US.
Final Office Action for U.S. Appl. No. 17/249,052, dated Jul. 25, 2022, (52 pages), United States Patent and Trademark Office, US.
NonFinal Office Action for U.S. Appl. No. 17/028,159, dated Jul. 29, 2022, (76 pages), United States Patent and Trademark Office, US.
NonFinal Office Action for U.S. Appl. No. 17/030,474, dated Jul. 21, 2022, (53 pages), United States Patent and Trademark Office, US.
NonFinal Office Action for U.S. Appl. No. 17/501,258, dated Sep. 16, 2022, (38 pages), United States Patent and Trademark Office, US.
Wikipedia, "Interactive Electronic Technical Manual," (4 pages), Jul. 7, 2022, (Year: 2022), [Retrieved from the Internet Jul. 28, 2022] available at: <URL: https://en.wikipedia.org/wiki/Interactive_electronic_technical_manual>.
Wikipedia, "Breadcrumb Navigation," Archived Sep. 22, 2020, (4 pages), (Year: 2020), [Retrieved from the Internet Jul. 26, 2022] available at: <URL: https://web.archive.org/web/20200922195818/https://en.wikipedia.org/wiki/Breadcrumb_navigation>.
Woo, Insoo et al. "SDViz: A Context-Preserving Interactive Visualization System for Technical Diagrams," Computer Graphics Forum, vol. 28, No. 3, pp. 943-950, (Year: 2009), available at: <URL: https://doi.org/10.1111/j.1467-8659.2009.01454.x>.
Final Office Action for U.S. Appl. No. 17/501,258, dated Mar. 24, 2023, (13 pages), United States Patent and Trademark Office, US.
NonFinal Office Action for U.S. Appl. No. 17/303,046, dated Jan. 6, 2023, (18 pages), United States Patent and Trademark Office, US.
Buecker, Axel et al. "Enterprise Single Sign-On Design Guide Using IBM Security Access Manager for Enterprise Single Sign-On 8.2," Published by IBM Redbooks, Sep. 2012, ISBN 9780738437033, pp. 259-265 (Year: 2012).
Halderman, J. Alex et al. "A Convenient Method For Securely Managing Passwords," In Proceedings of the 14th International Conference on World Wide Web (WWW '05), May 10, 2005, pp.

(56) References Cited

OTHER PUBLICATIONS 471-479. Association for Computing Machinery, New York, NY, USA, pp. 471-479. https://doi.org/10.1145/1060745.1060815, (Year: 2005).

NonFinal Office Action for U.S. Appl. No. 17/026,636, dated May 10, 2023, (12 pages), United States Patent and Trademark Office, US.

NonFinal Office Action for U.S. Appl. No. 17/028,111, dated May 10, 2023, (18 pages), United States Patent and Trademark Office, US.

NonFinal Office Action for U.S. Appl. No. 17/028,151, dated May 10, 2023, (11 pages), United States Patent and Trademark Office, US.

NonFinal Office Action for U.S. Appl. No. 17/030,463, dated May 10, 2023, (10 pages), United States Patent and Trademark Office, US.

NonFinal Office Action for U.S. Appl. No. 17/032,048, dated May 10, 2023, (12 pages), United States Patent and Trademark Office, US.

\* cited by examiner

Daily Report

Daily Report: Ran Meriaz on 7/8/2020

List jobs that took at least: All

Date: 7/8/2020

A/C# 88-26111

| Module Name | JCN | Start | End | Time Spent |
|---|---|---|---|---|
| DMC | | | | |
| Pylon Installation, Main Rotor | 4564564 | 1:30:33 PM | 1:46:32 PM | 0:15:58 |
| Drive System | 4564564 | 1:53:07 PM | 2:01:09 PM | 0:08:02 |
| | 4564564 | 2:02:13 PM | 2:09:43 PM | 0:07:29 |
| Support Equipment and List of Consumables | 4564564 | 2:01:09 PM | 2:02:13 PM | 0:01:04 |
| Aircraft Towing - Towing Procedures | 4564564 | 2:14:05 PM | 2:14:29 PM | 0:00:23 |

Total Time: 0:32:56

Order Cart Modified

| Part Number Nomenclature | Change | Time Changed |
|---|---|---|
| WASHER,FLAT | orderNow | Jul 8, 2020 1:30:40 PM |

| | DESCRIPTION | UNITS PER ASSY | USABLE ON CODE | SMR CODE |
|---|---|---|---|---|
| | 1 2 3 4 5 6 7 ▼ — 1835 | | | |
| | ☑ 1  End item, component, major assembly  Detail parts for end item, component, major assembly — 1840 | | | |
| | ☑ 2  . Assembly  . Attaching parts for assembly (AP)  . Details parts for assembly — 1845 | | | |
| | ☐ 3  . . Subassemblies  . . Attaching parts for subassemblies (AP) | | | |
| | ☐ All | | | |
| | VALVE SPRING | 8 | | |
| | VALVE SPRING RETAINER  (ALTERNATIVE TO P/N 854186) | 8 | | |

FIG. 18B

| INDEX NO. | PART NUMBER | CAGE | DESCRIPTION |
|---|---|---|---|
| | | | 1 2 3 4 5 6 7 ▼ |
| 50 | MS9554-05 | 96906 | SCREW, DBL HEX HEAD<br>ILS#: A0105 00 |
| 60 | NAS620C6 | 80205 | WASHER, FLAT - REDUCED<br>ILS#: A010B 00 |
| 70 | CA88522-001 | OZWK8 | SPRING, MANUAL RELEASE |
| 80 | | | ANUAL RELEAS |
| 90 | | | AL RELEASE |

CAGE: OZWK8
MOOG INC.
1218 W JON ST TORRANCE CA90502-1208
UNITED STATES 3106183212

1850

Add to Cart

FIG. 18C

| 10 | AN3-3A | PS28A | . BOLT |
| 11 | SI0102N | PS28A | . ROD ASSY |
| 12 | AN3-15A | PS28A | . BOLT |
| 13 | AN4-10A | PS28A | . BOLT |
| 14 | AN365-1032 | PS28A | . NUT |
| 15 | AN365-428 | PS28A | . NUT |

1855 — Also used on
- IAI-HMCT

Order Now | Add to Cart

FIG. 18D

| INDEX NO. | PART NUMBER | CAGE | DESCRIPTION [1 2 3 4 5 6 7 ▼] | UNITS PER ASSY | USABLE ON CODE | SMR CODE |
|---|---|---|---|---|---|---|
| 5 | 929845 | | . PIN D8X20 | 1 | | |
| 6 | 840191 | | . STUD M8X105. TORQUE: 8NM | 1 | | |
| 9 | 850902 | | . O-RING 9X2   [PQDR Form] [WebFLIS Data]  [≡ Order Now] [🛒 Add to Cart] | 2   7 | | |
| 10 | 944131 | | . WASHER 8 | 2 | | |
| 11 | 840061 | | . ALLEN SCREW M8X80 TORQUE:30NM | 2 | | |
| 12 | 840091 | | . HEX. COLLAR SCREW M8X140 TORQUE 15NM + 270 DEGREE | 1 | | |

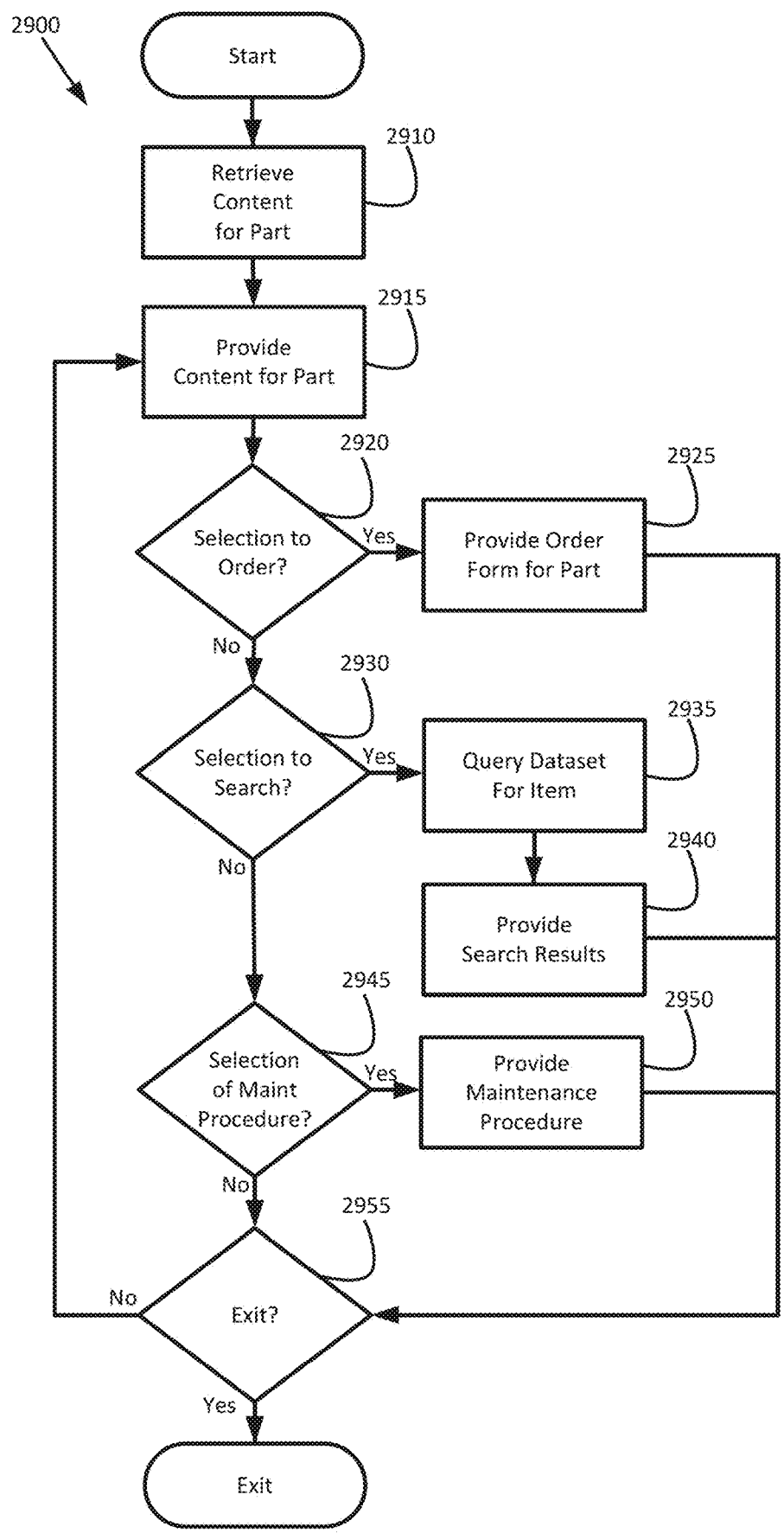

| AVGAS 100LL users) | | | | | |
|---|---|---|---|---|---|
| Fuel | RON 95 Octane or RON 98 Octane | | | | AR |
| Engine oil | Mobil 1, 5W-50 | | | AZ or | AR |
| Coolant | 2/3 ethylene glycol super antifreeze CASTROL Hea... | P/N MS20995C20  [≡ Order Now] | | | AR |
| Safety wire | MS20995C20 | LOCKING WIRE P/N MS20995C20 ← Click to Search Related maintenance (36): ☐ AIR BOX – REMOVAL - AIR BOX ☐ AIR BOX – REMOVAL - AIR BOX ☐ AIR BOX – INSTALLATION - AIR BOX ☐ AIR BOX – INSTALLATION - AIR BOX ☐ AIR BOX – INSTALLATION - AIR BOX [Show More] | | | AR |
| Spares | | See also List of Parts | | | |
| Name | | Identificat... | | | antity |
| None | | | | | |

LIST OF ANNOTATIONS

Search [_____]  1 results

System (ALL) [v]  SubSystems (ALL) [v]  SubSubSystems (ALL) [v]  Info Code (All) [v]  Users ALL [v]  « First | Prev | [1 v] | Next | 1 / Last »

Annotation Type [ALL v]

× Delete Selected | ⊘ Reset | 🖨 Print

| DM Code | DM Title | Users | Count | Selected |
|---|---|---|---|---|
| HMCT-A-80-10-01-06A-720A-C | SPRAG CLUTCH AND INTERMEDIATE (REDUCTION) GEAR FOR STARTER INSTALLATION - INTERMEDIATE (REDUCTION) GEAR FOR STARTER | Ran Merlaz For Research / Training (IAI-HMCT) (3) | 3 | ☐ |

☐ Select All

3655

END OF MODULE

FIG. 36E

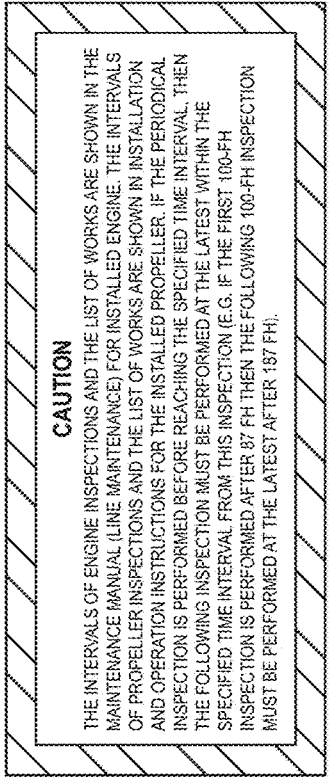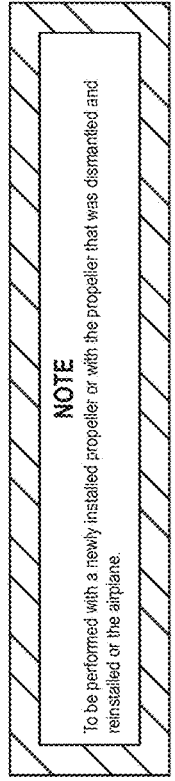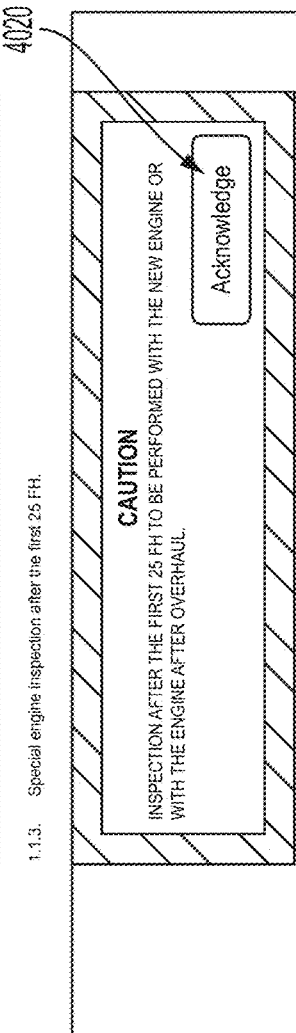
FIG. 40B

FIG. 45

| Ref Des 3922PP140 Electrical Plug | | | | | | | | | | | | | |
|---|---|---|---|---|---|---|---|---|---|---|---|---|---|
| P/N MS3475W22-55SY | CONNECTOR, PLUG, ELECTRICAL - L UPR AVIONICS RACK SHELF 3 | | | | | | | | | | | | Zone |
| Wiring Diagram | Data Module | | | | | | | | | | | | |
| 11-30-31-12 | UPPER LEFT ANGLE OF ATTACK HEATING | | | | | | | | | | | | |

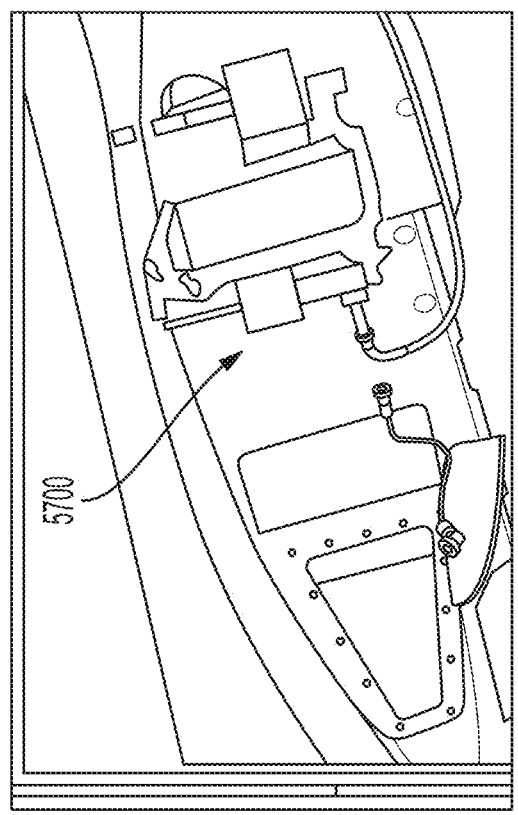
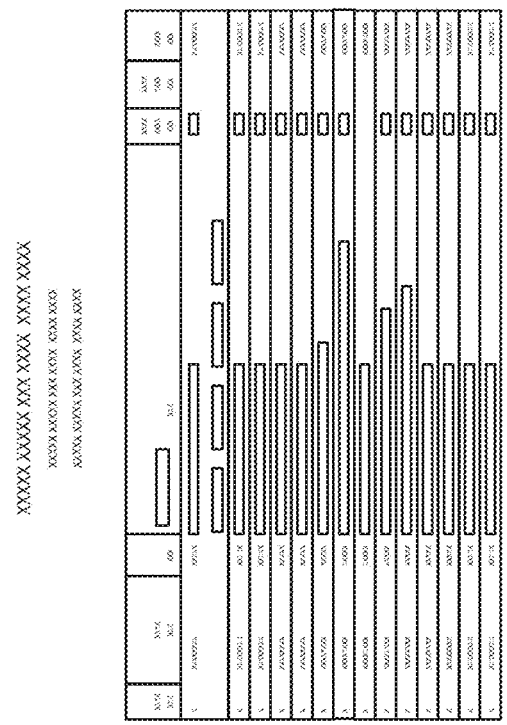
FIG. 57B

FIG. 59B

PROVIDING ENHANCED FUNCTIONALITY IN AN INTERACTIVE ELECTRONIC TECHNICAL MANUAL

CROSS-REFERENCE TO RELATED APPLICATIONS

The present application is a continuation of U.S. patent application Ser. No. 17/026,636, filed Sep. 21, 2020, the contents of which are incorporated by reference in their entirety into the present application.

TECHNOLOGICAL FIELD

Embodiments of the present disclosure generally relate to providing enhanced functionality in an interactive electronic technical manual (IETM). The inventors have developed solutions that increase the efficiency, functionality, speed, capabilities, and user friendliness over conventional IETMs.

BACKGROUND

IETMs and other technical data generally hold large amounts of information that can include multiple volumes and hundreds or thousands of data modules when in electronic format. When users of IETMs, or other technical data that are provided electronically, need to look for a specific subject, they need to go over a lengthy electronic table of contents, similar to a paper book, but using links, which can include nested subsystems (and sub-subsystems) within systems. This requires the users to know not only the exact nomenclature of the item they seek (many times this is unknown), but how to navigate through the seemingly endless array of nested data. This results in a lot of time spent by users, trying to look in many different places (and sometimes, out of exasperation, just look from A to Z) to find the information, which results in inefficiency, loss of time, and waste of expensive resources.

Furthermore, although many conventional IETMs provide some type of interactive functionality with respect to the technical data that allow users to interactively view the data, such functionality is typically limited to capabilities and do not address many of the technical issues encountered when providing an electronic interface for a large amount of information, as well as technical improvements that provide features beyond just simply allowing the user to view such information. For example, the technical data may involve information that is highly confidential such as information on military equipment. Many conventional IETMs fail to provide functionality to control secure access to the technical data, as well as control user functionality within the IETMs in viewing and using the technical data in a secure manner.

Thus, a need exists in the industry to address technical problems related to efficiently providing technical data to users in a user-friendly manner. Further, a need exists in the industry to provide technical improvements to allow for enhanced functionality with respect to the technical data. It is with respect to these considerations and others that the disclosure herein is presented.

BRIEF SUMMARY

Embodiments of the present disclosure provide methods, apparatus, systems, computer program products and/or the like for performing functionality requiring network connectivity in an interactive electronic technical manual system (IETM) configured to provide electronic and credentialed access via an IETM viewer to technical documentation for an item. In accordance with one aspect of the present disclosure, a method for performing functionality requiring network connectivity in an interactive electronic technical manual system (IETM) configured to provide electronic and credentialed access via an IETM viewer to technical documentation for an item is provided. In various embodiments, the method comprises: causing display of a first window comprising an electronic form via the IETM viewer executing on a user computing entity being used by a user signed into the IETM, wherein the user computing entity has no network connectivity; receiving input comprising informational data, wherein the information data is provided by the user on the form via the IETM viewer; and responsive to receiving the informational data: generating a graphical security code via the IETM, wherein the graphical security code comprises data identifying the user; causing display of a second window comprising the graphical security code via the IETM viewer; receiving input indicating that a scanning of the graphical security code has been performed, wherein the scanning of the graphical security code (1) is performed by the user using a remote device connected to a network and (2) causes access to scanning functionality provided by a software application installed on the remote device; and responsive to receiving the input indicating the scanning of the graphical security code: generating a graphical form code via the IETM, wherein the graphical form code comprises the informational data; and causing display of a third window comprising the graphical form code via the IETM viewer, wherein the graphical form code is configured to be scanned using the software application installed on the remote device to cause the informational data to be sent to a third party over the network.

In accordance with another aspect of the present disclosure, an apparatus is provided. In various embodiments, the apparatus comprises at least one processor and at least one memory comprising computer program code. The at least one memory and the program code are configured to, with the at least one processor, cause the apparatus to: cause display of a first window comprising an electronic form via the IETM viewer executing on a user computing entity being used by a user signed into the IETM, wherein the user computing entity has no network connectivity; receive input comprising informational data, wherein the information data is provided by the user on the form via the IETM viewer; and responsive to receiving the informational data: generate a graphical security code via the IETM, wherein the graphical security code comprises data identifying the user; cause display of a second window comprising the graphical security code via the IETM viewer; receive input indicating that a scanning of the graphical security code has been performed, wherein the scanning of the graphical security code (1) is performed by the user using a remote device connected to a network and (2) causes access to scanning functionality provided by a software application installed on the remote device; and responsive to receiving the input indicating the scanning of the graphical security code: generate a graphical form code via the IETM, wherein the graphical form code comprises the informational data; and cause display of a third window comprising the graphical form code via the IETM viewer, wherein the graphical form code is configured to be scanned using the software application installed on the remote device to cause the informational data to be sent to a third party over the network.

In accordance with yet another aspect of the present disclosure, a non-transitory computer storage medium is provided. In various embodiments, the non-transitory computer storage medium comprises instructions stored thereon. The instructions being configured to cause one or more processors to at least perform operations configured to: cause display of a first window comprising an electronic form via the IETM viewer executing on a user computing entity being used by a user signed into the IETM, wherein the user computing entity has no network connectivity; receive input comprising informational data, wherein the information data is provided by the user on the form via the IETM viewer; and responsive to receiving the informational data: generate a graphical security code via the IETM, wherein the graphical security code comprises data identifying the user; cause display of a second window comprising the graphical security code via the IETM viewer; receive input indicating that a scanning of the graphical security code has been performed, wherein the scanning of the graphical security code (1) is performed by the user using a remote device connected to a network and (2) causes access to scanning functionality provided by a software application installed on the remote device; and responsive to receiving the input indicating the scanning of the graphical security code: generate a graphical form code via the IETM, wherein the graphical form code comprises the informational data; and cause display of a third window comprising the graphical form code via the IETM viewer, wherein the graphical form code is configured to be scanned using the software application installed on the remote device to cause the informational data to be sent to a third party over the network.

Depending on the embodiment, each of the graphical security code and the graphical form code may be, for example, a quick response code, a one-dimensional graphical code, a universal product code, or a data matric graphical code. In addition, in some embodiments, the network comprises at least one of an internet protocol based network and a cellular network. In addition, in some embodiments, the second window and the third window are superimposed over at least a portion of the first window. Further, in some embodiments, the remote device may be a mobile device, a tablet, or a laptop computing entity. Finally, in some embodiments, a stock identifier is queried based at least in part on a part identifier for a part, data is queried for the part from a remote system based at least in part on the stock identifier, the electronic form based at least in part on the item; and auto-populating the electronic form with the data for the part, wherein the informational data includes the data for the part and the informational data is used in ordering the part.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 5A:
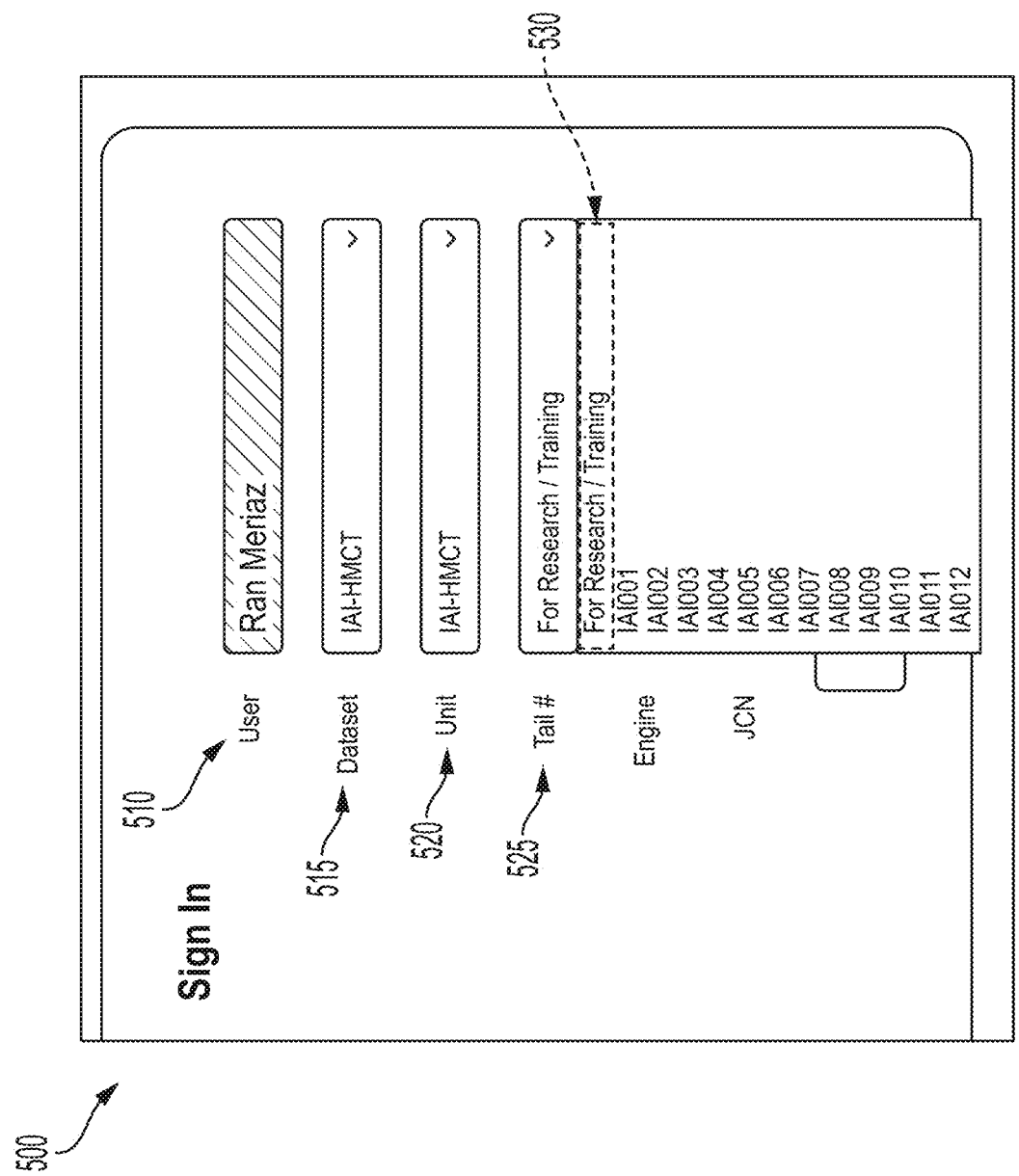
Figure 5B:
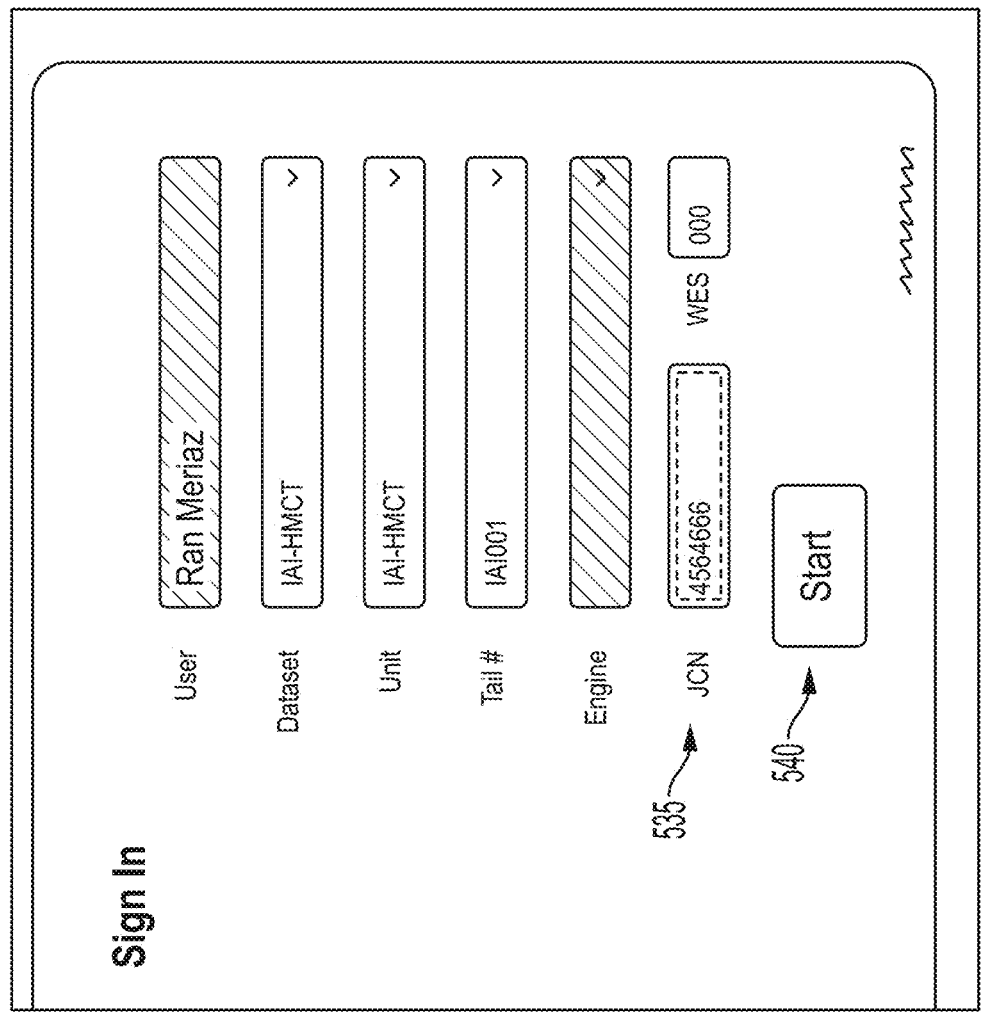
Figure 5C:
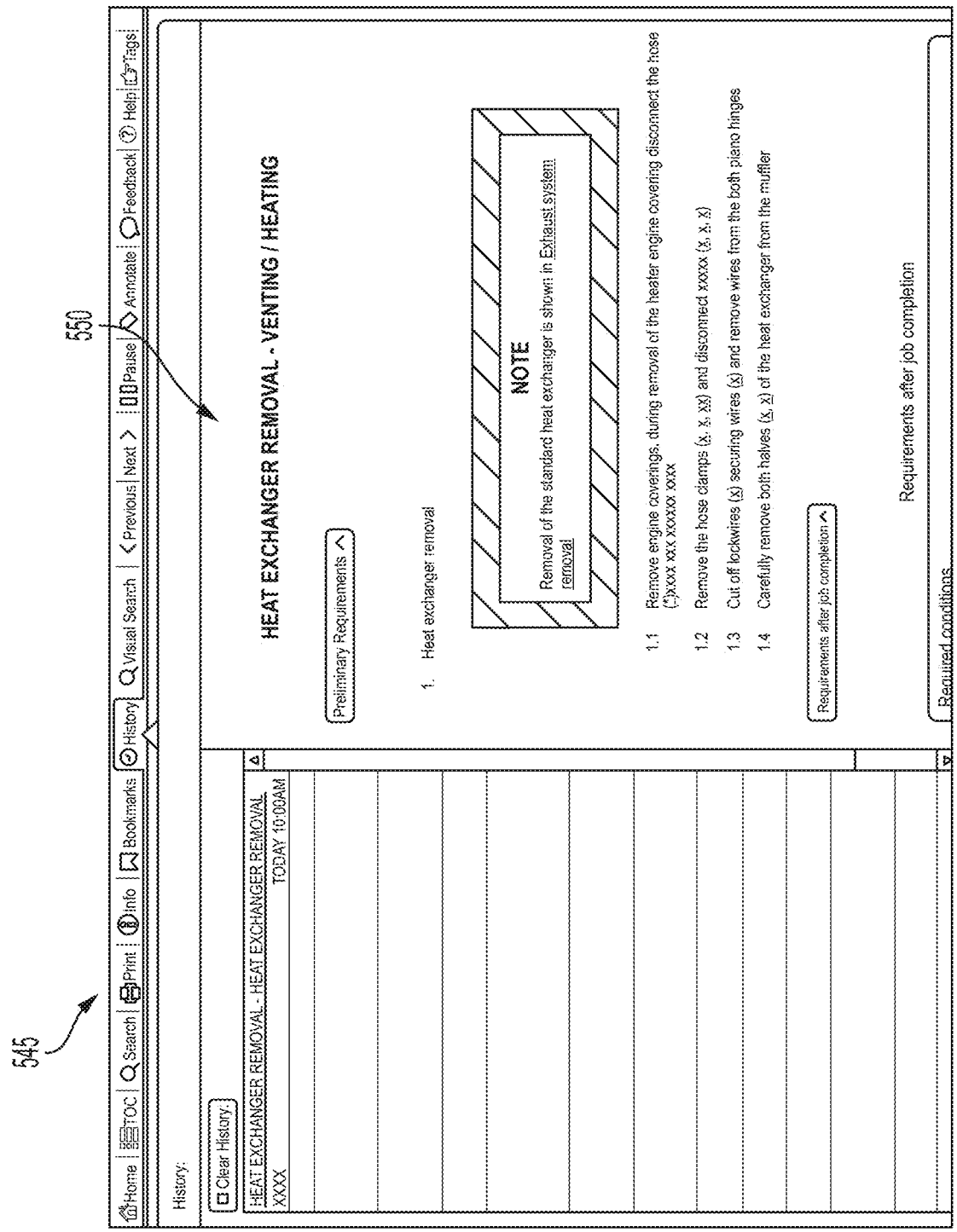
Figure 6:
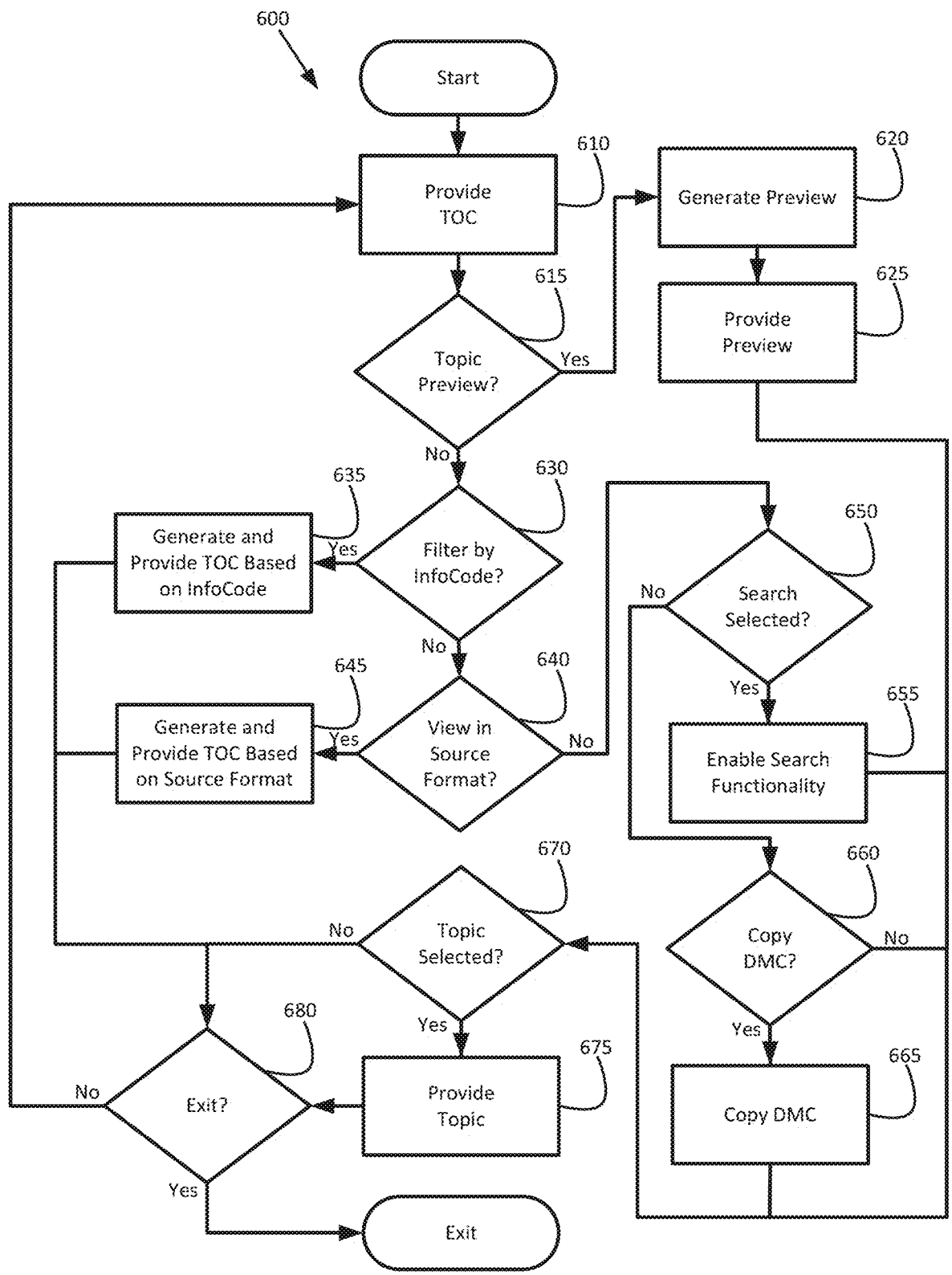
Figure 7:
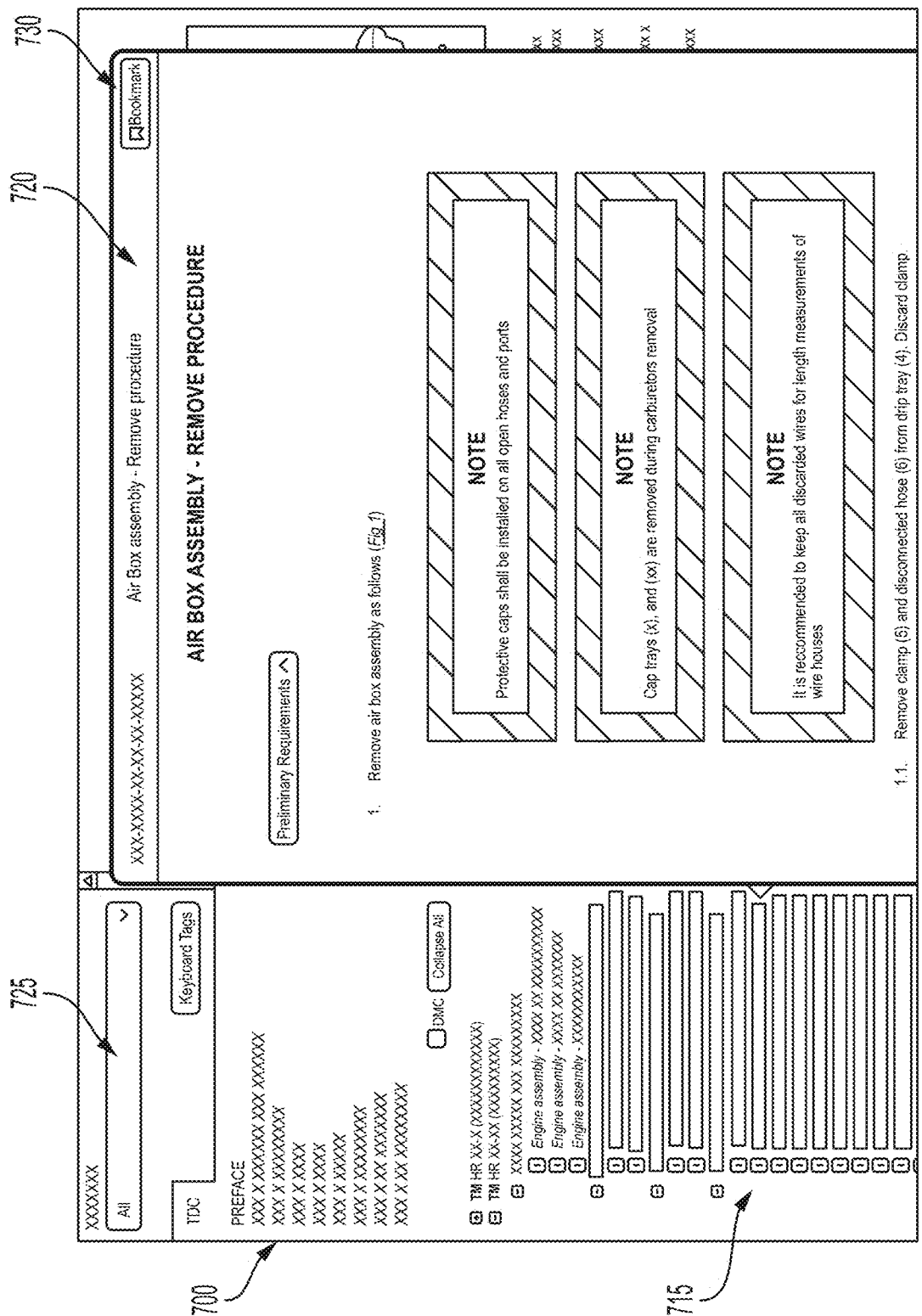
Figure 8:
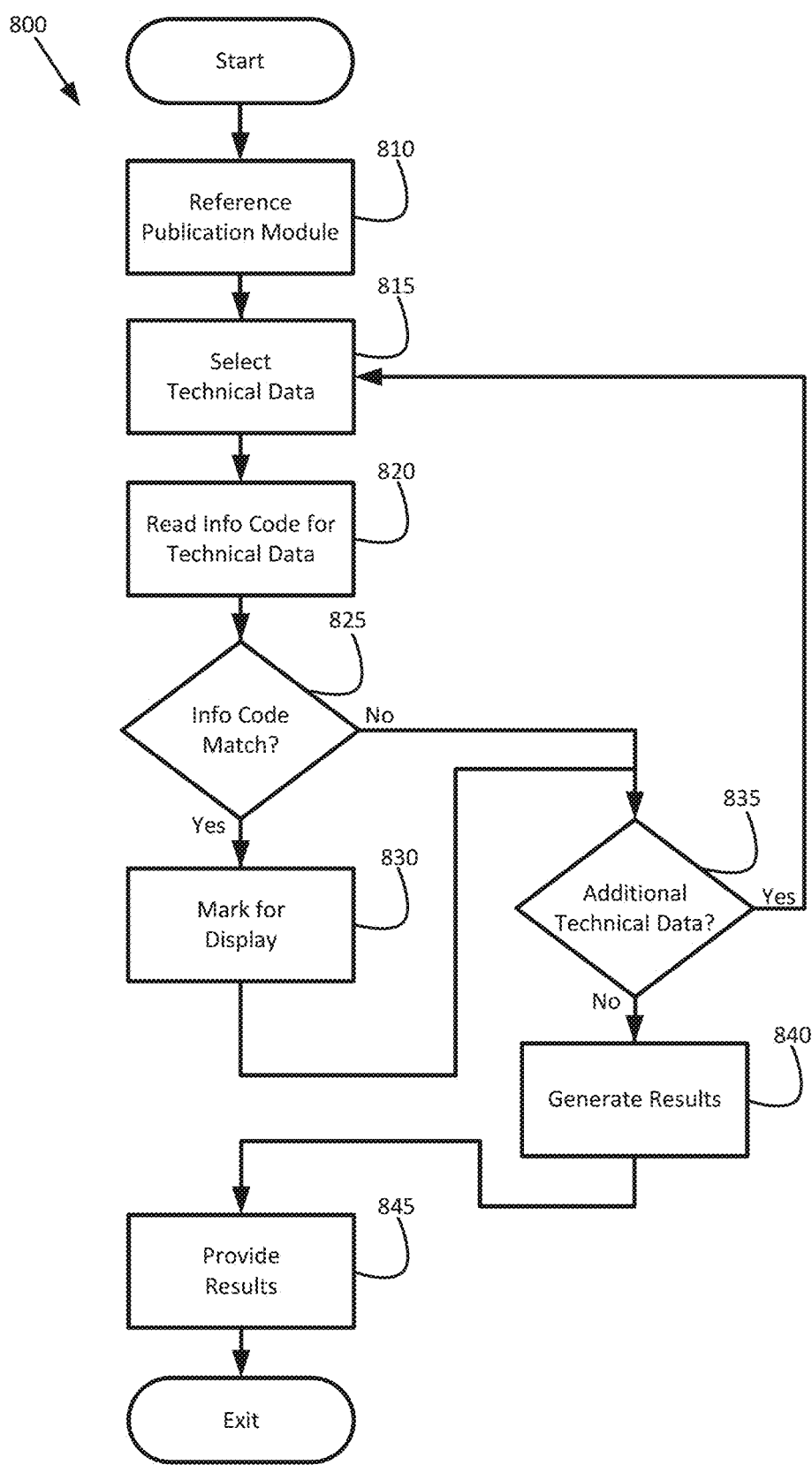
Figure 9:
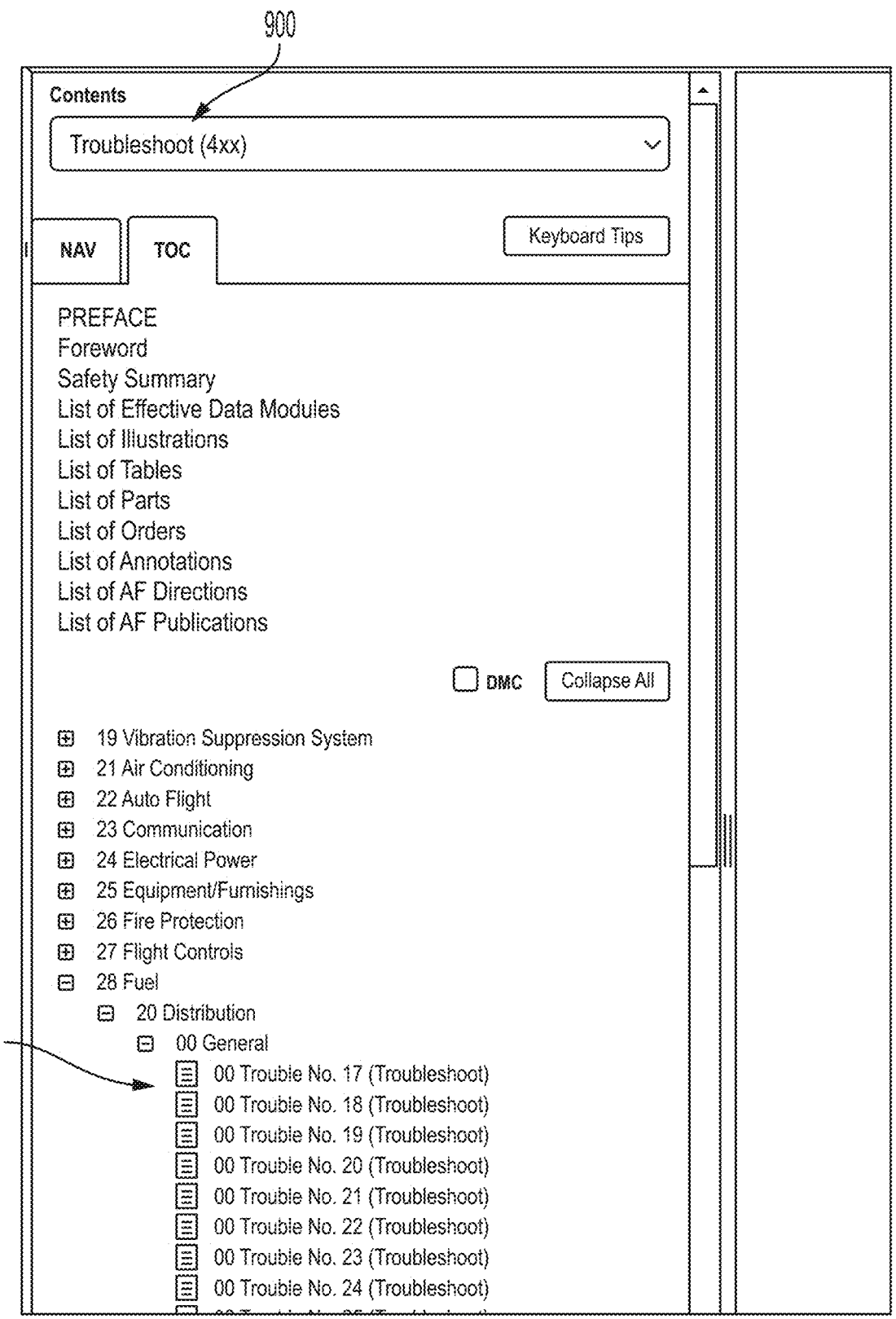
Figure 10:
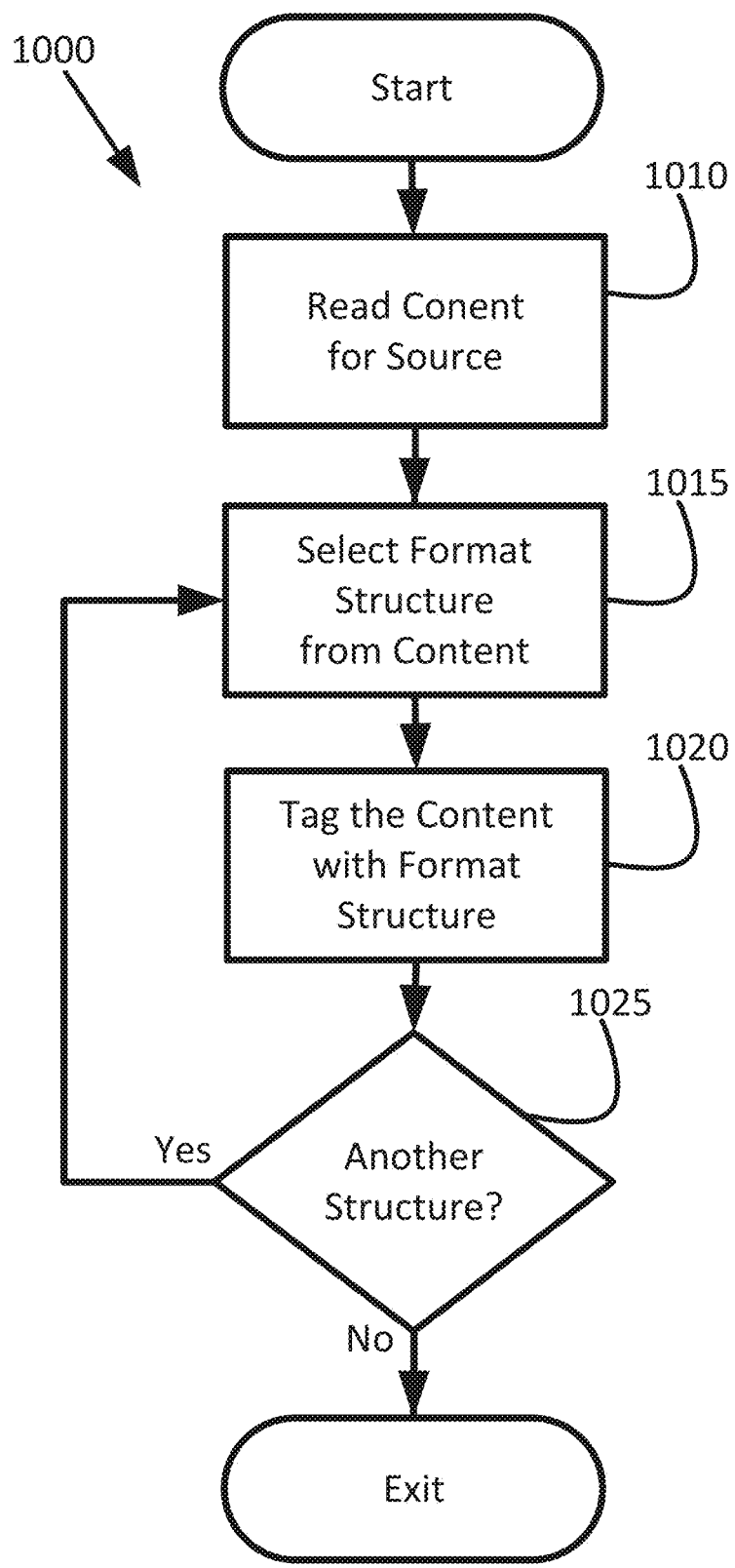
Figure 11:
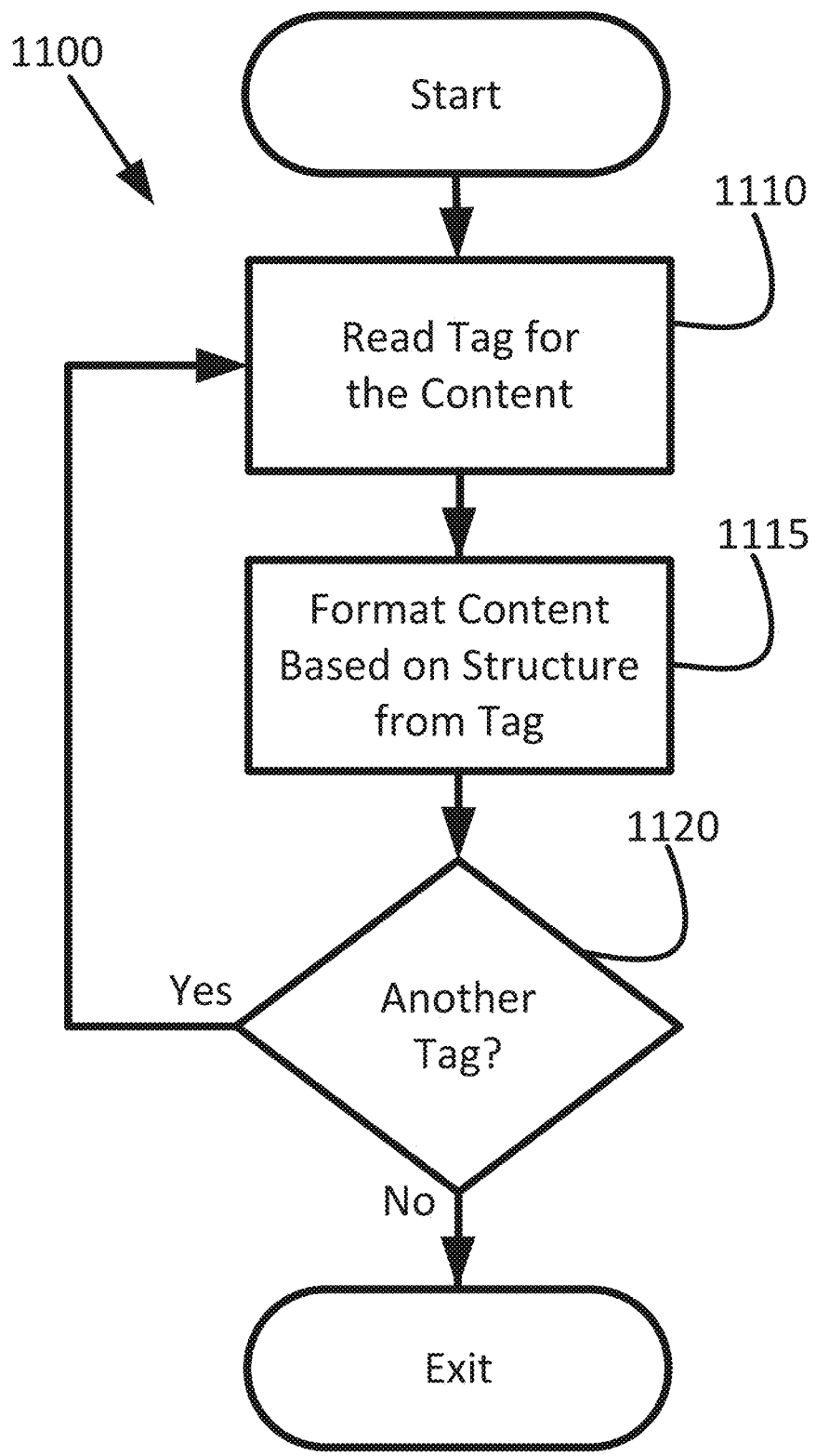
Figure 12A:
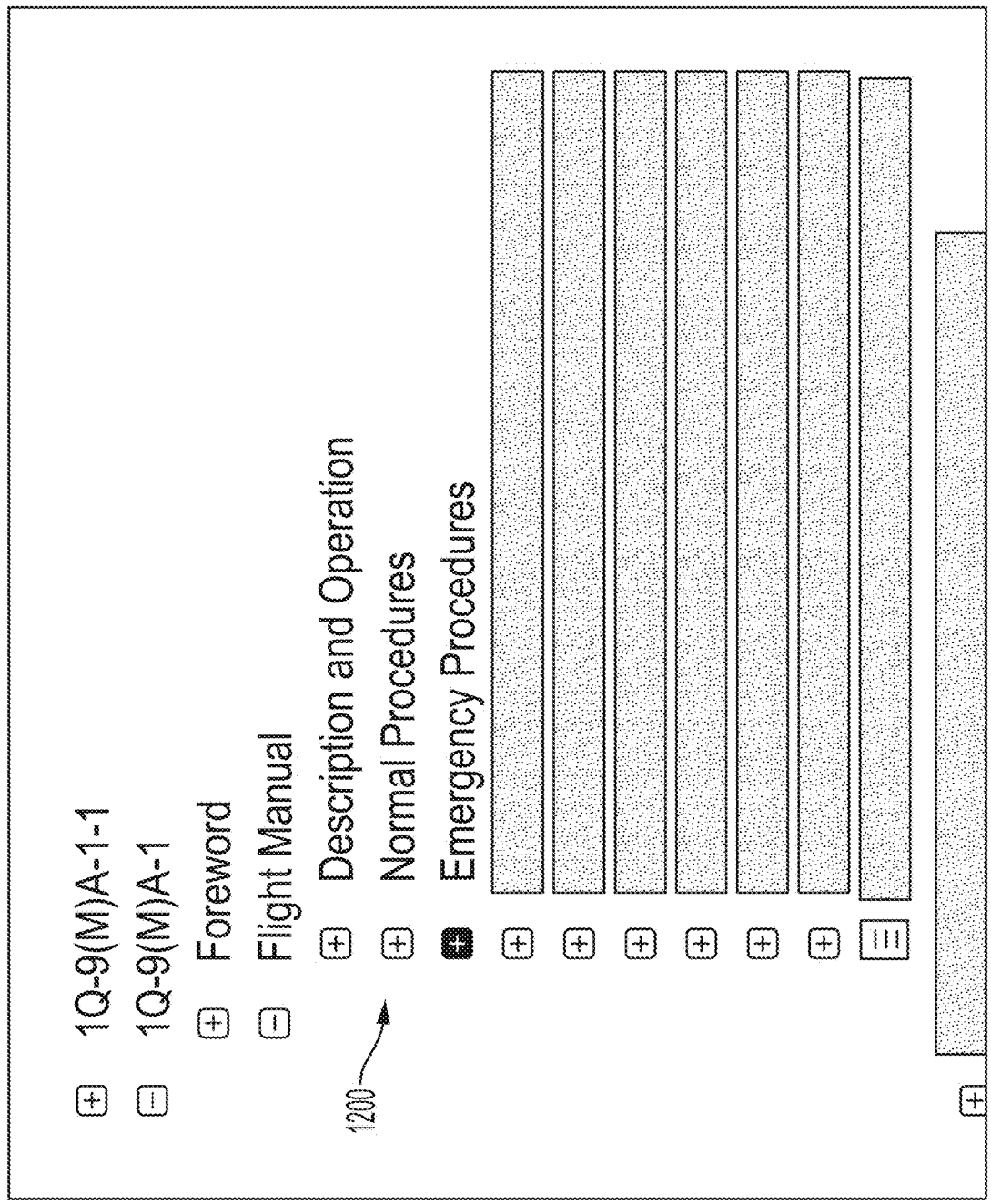
Figure 12B:
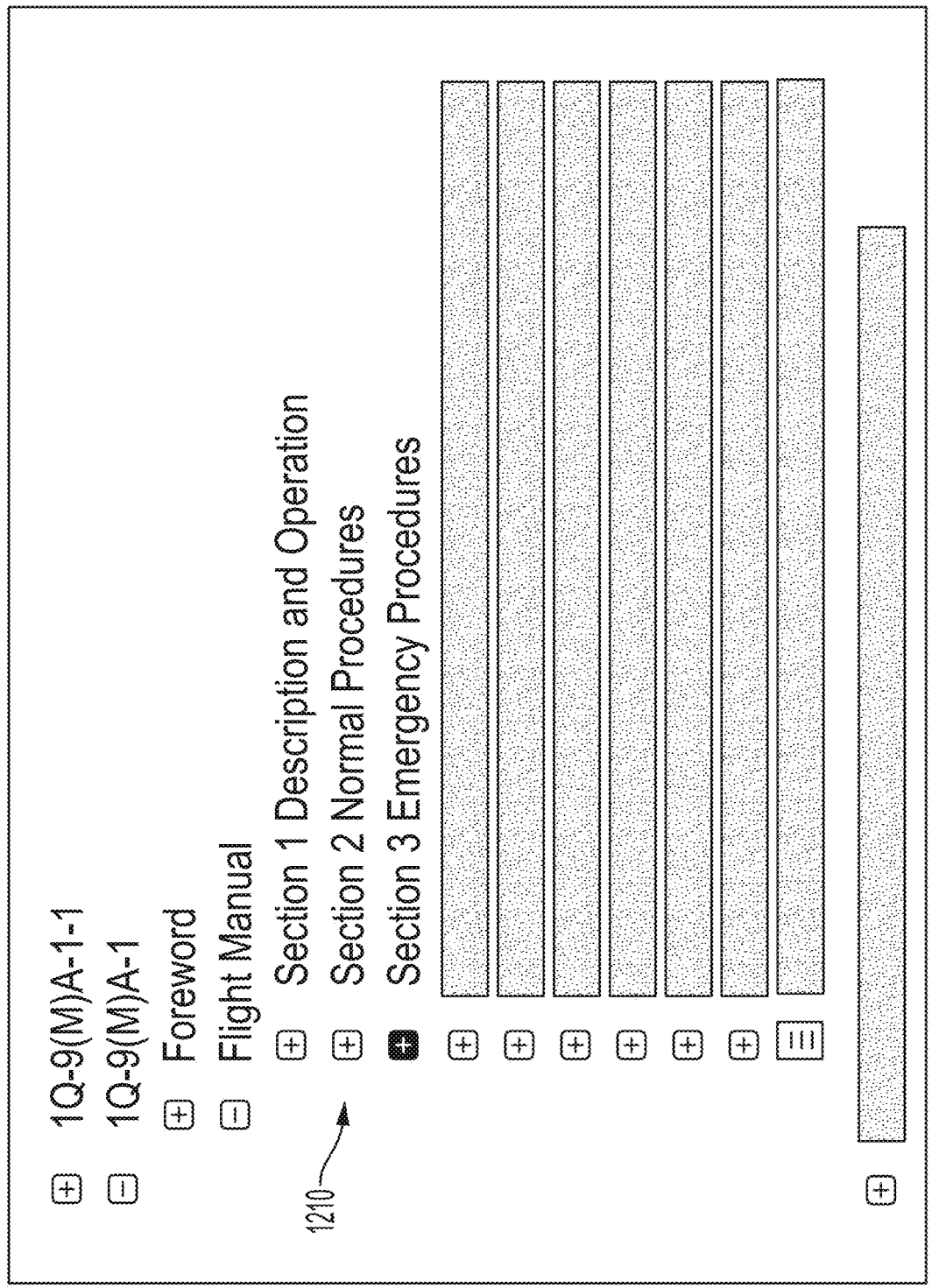
Figure 12C:
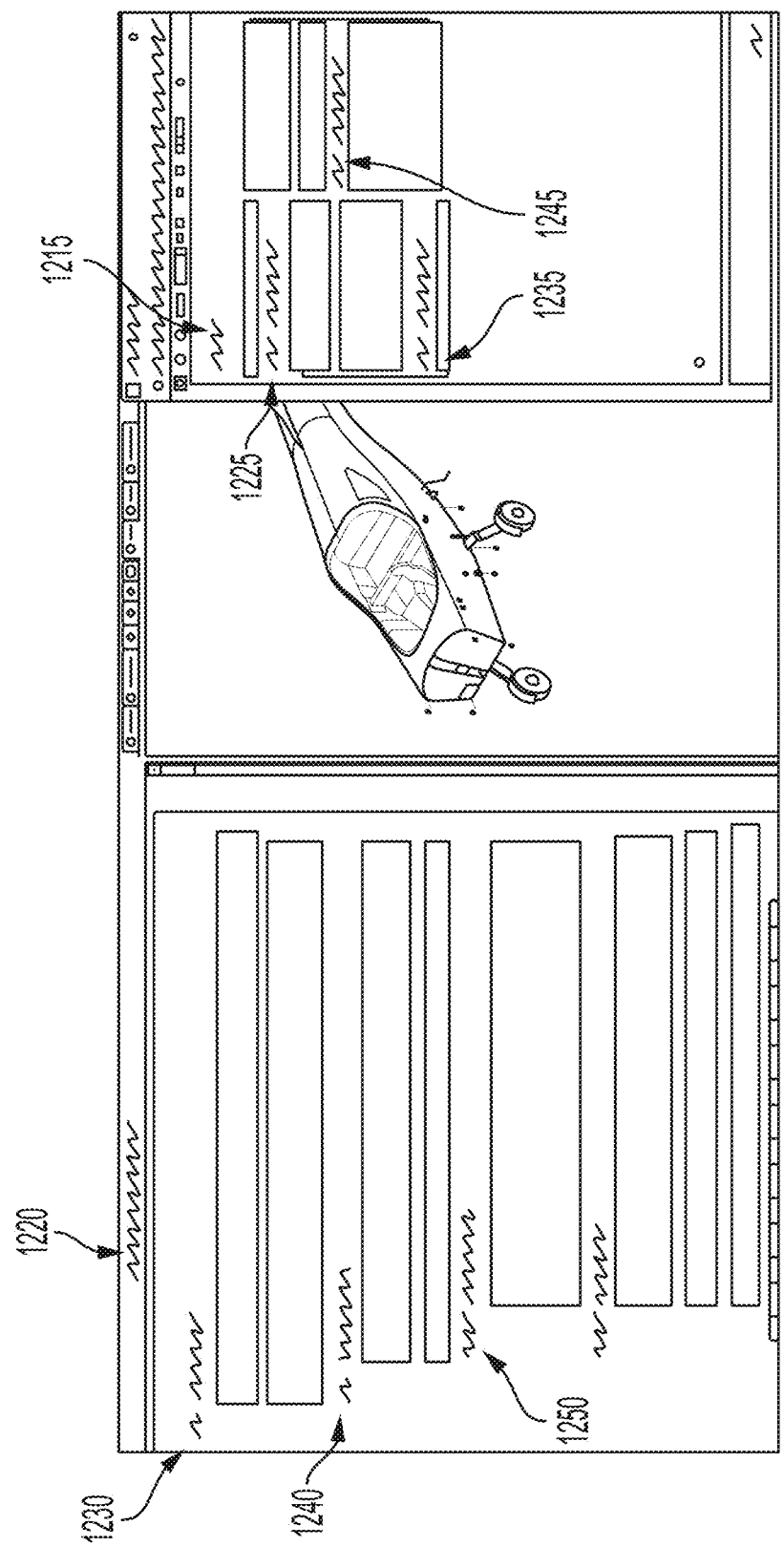
Figure 13:
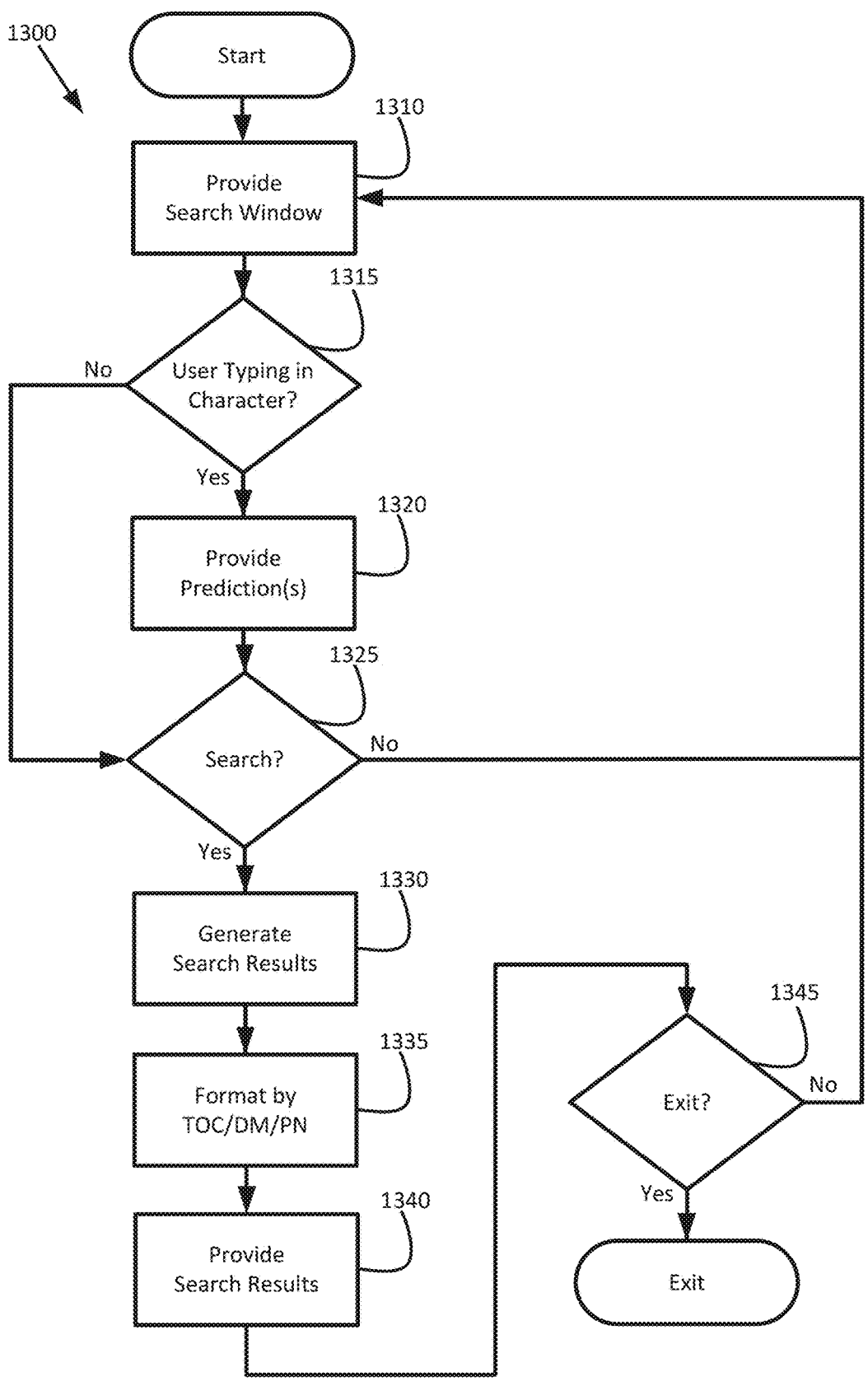
Figure 14:
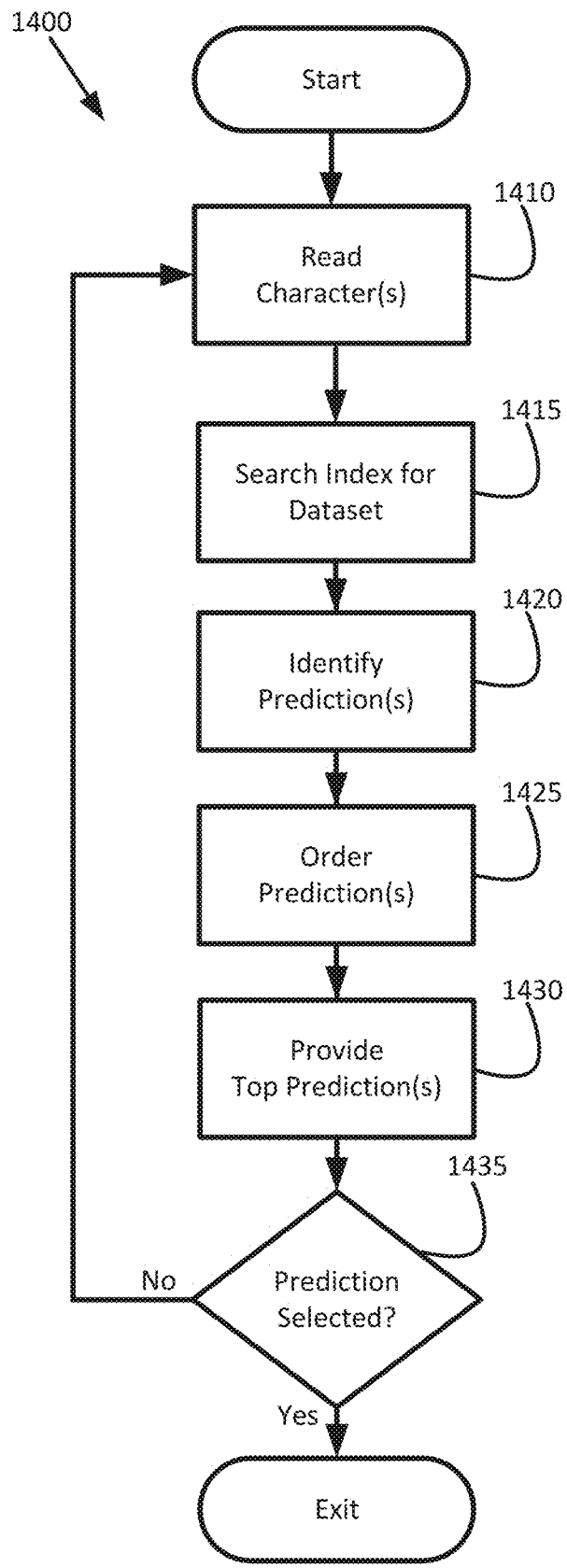
Figure 15A:
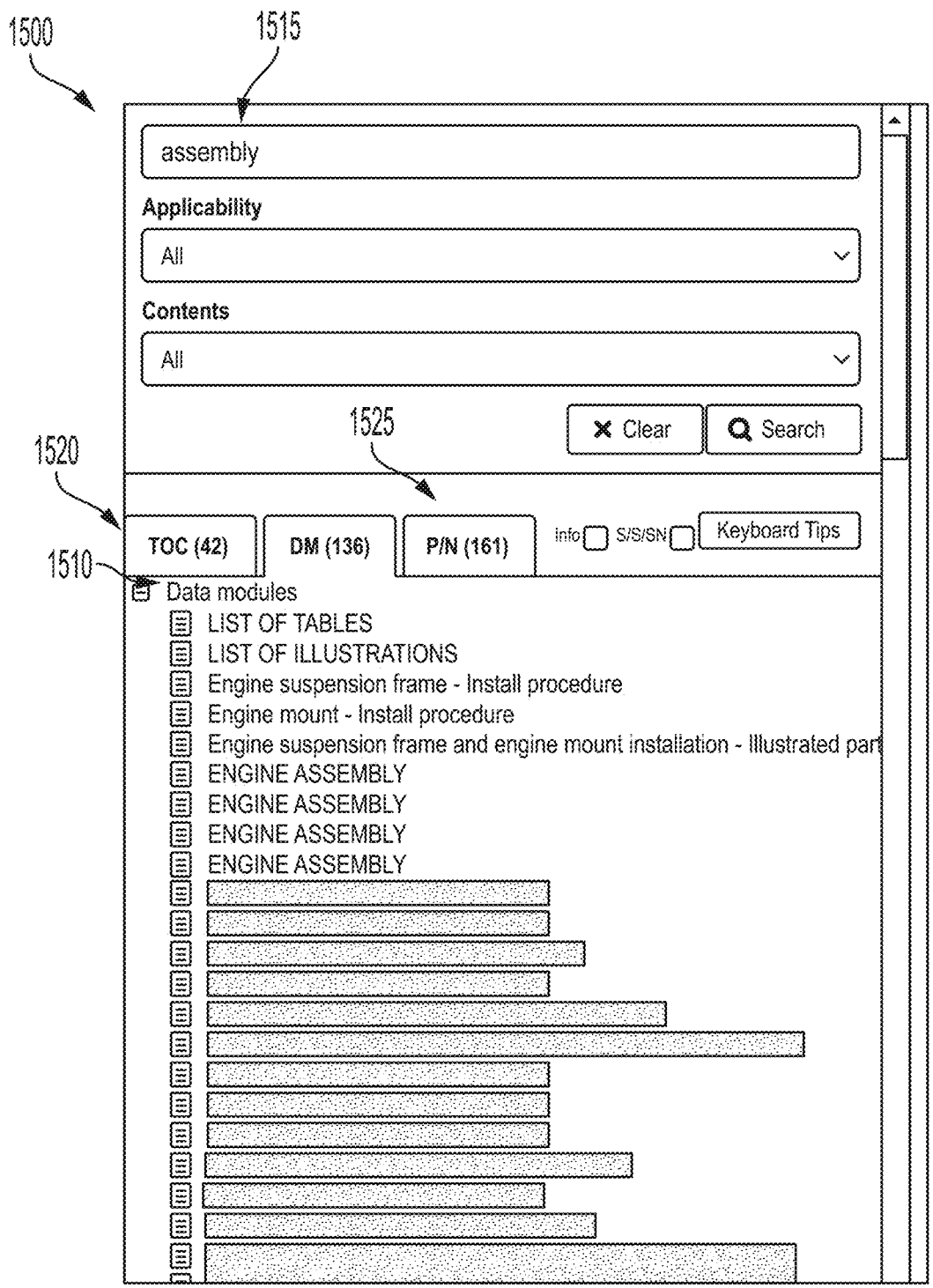
Figure 15B:
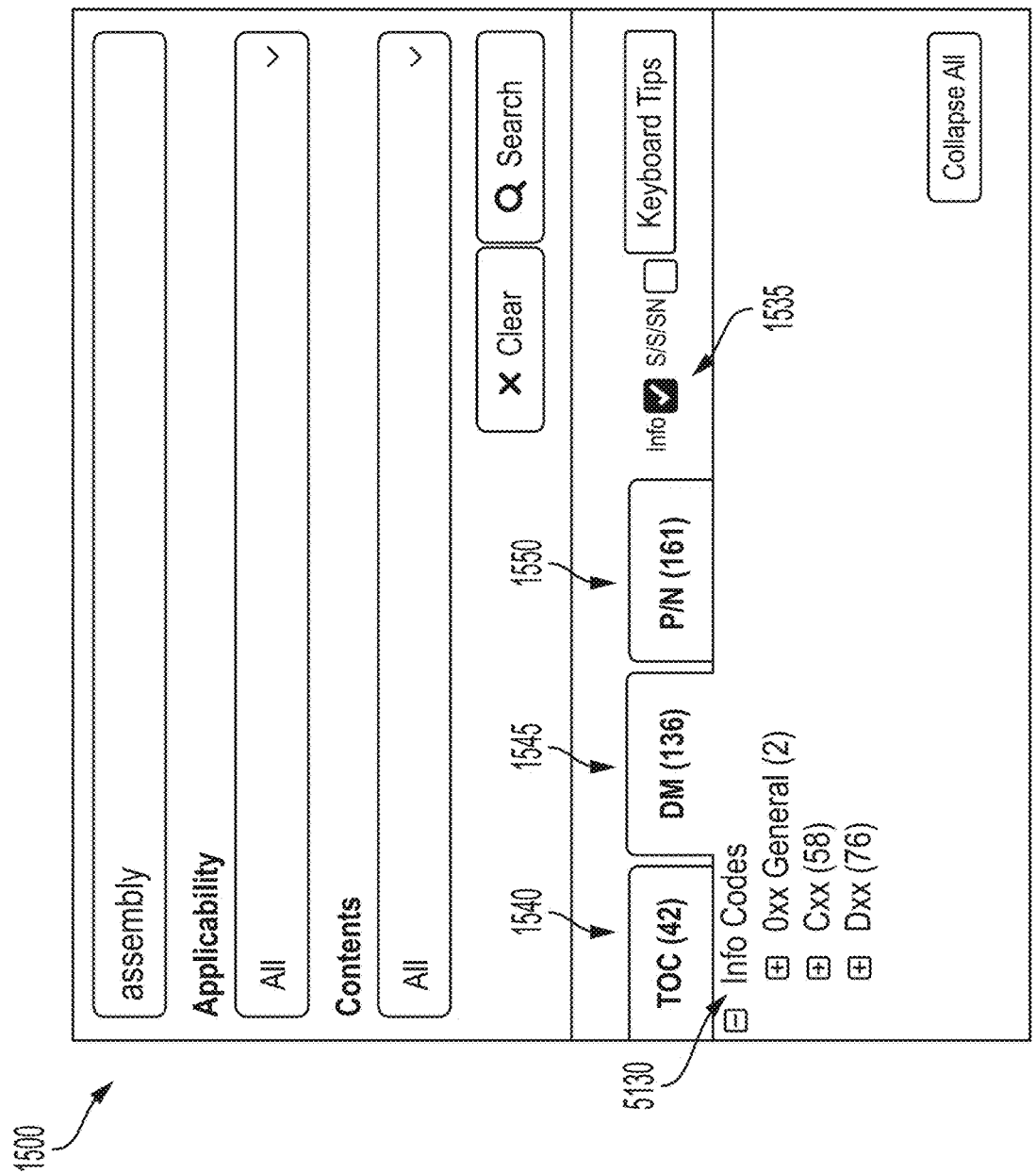
Figure 16:
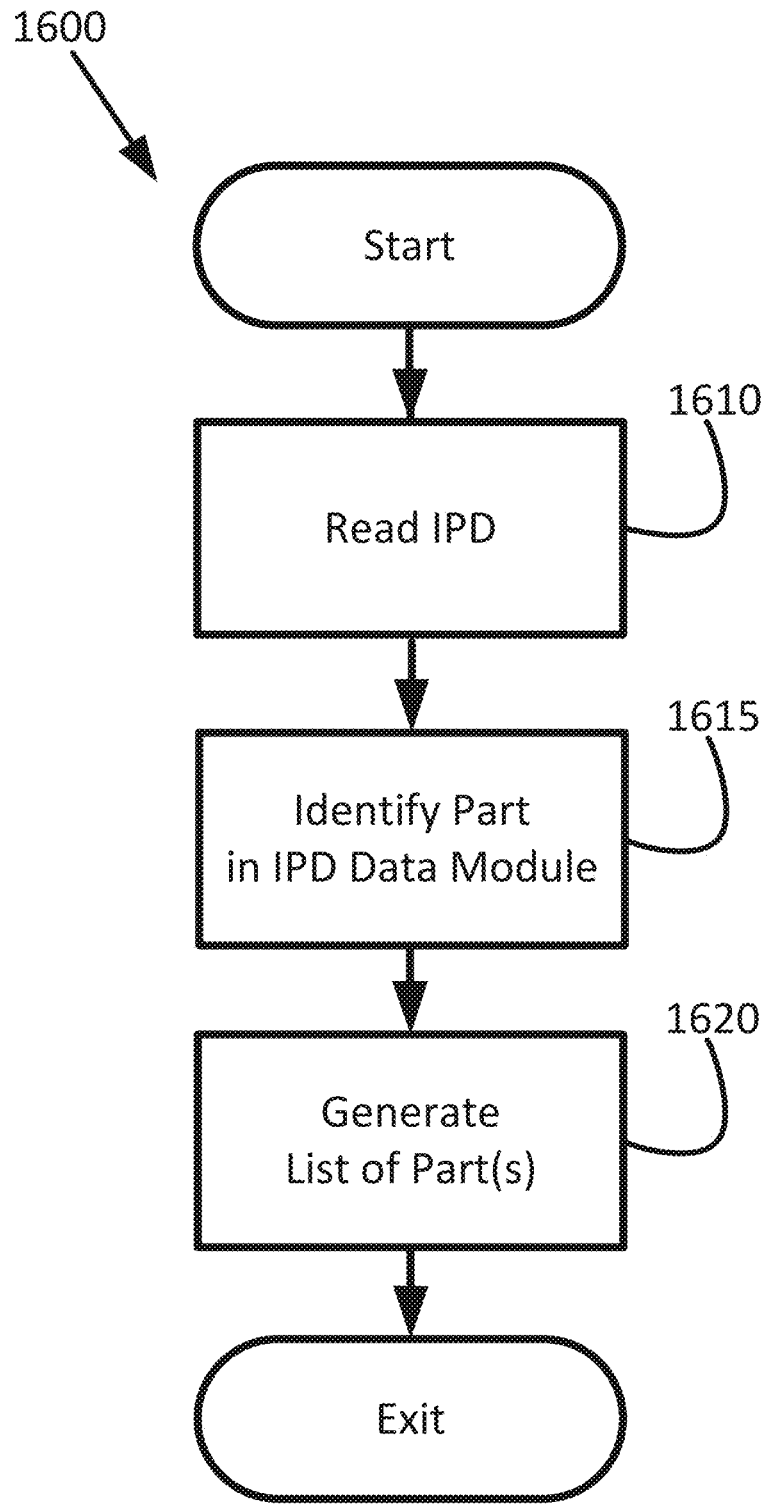
Figure 17:
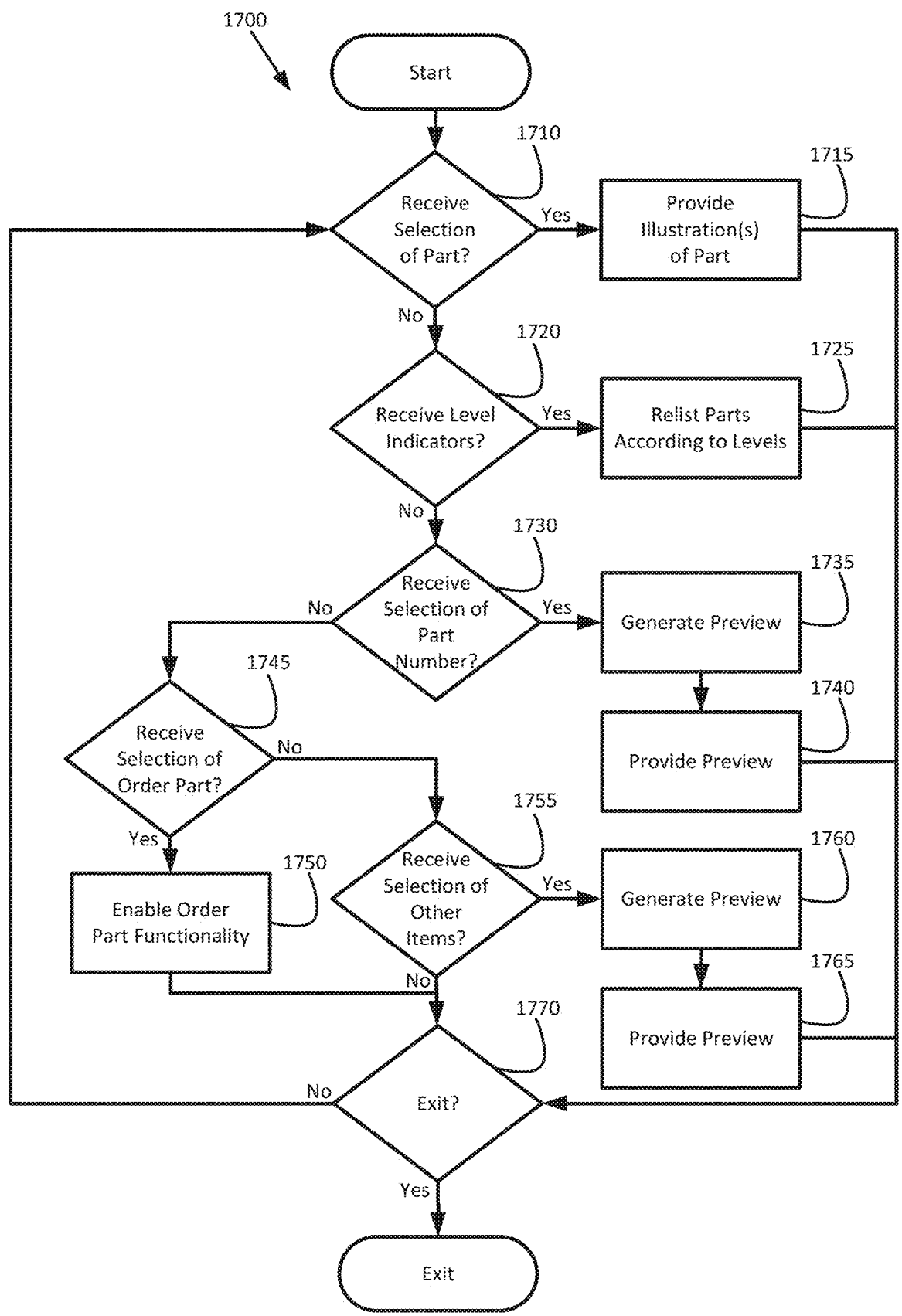
Figure 18A:
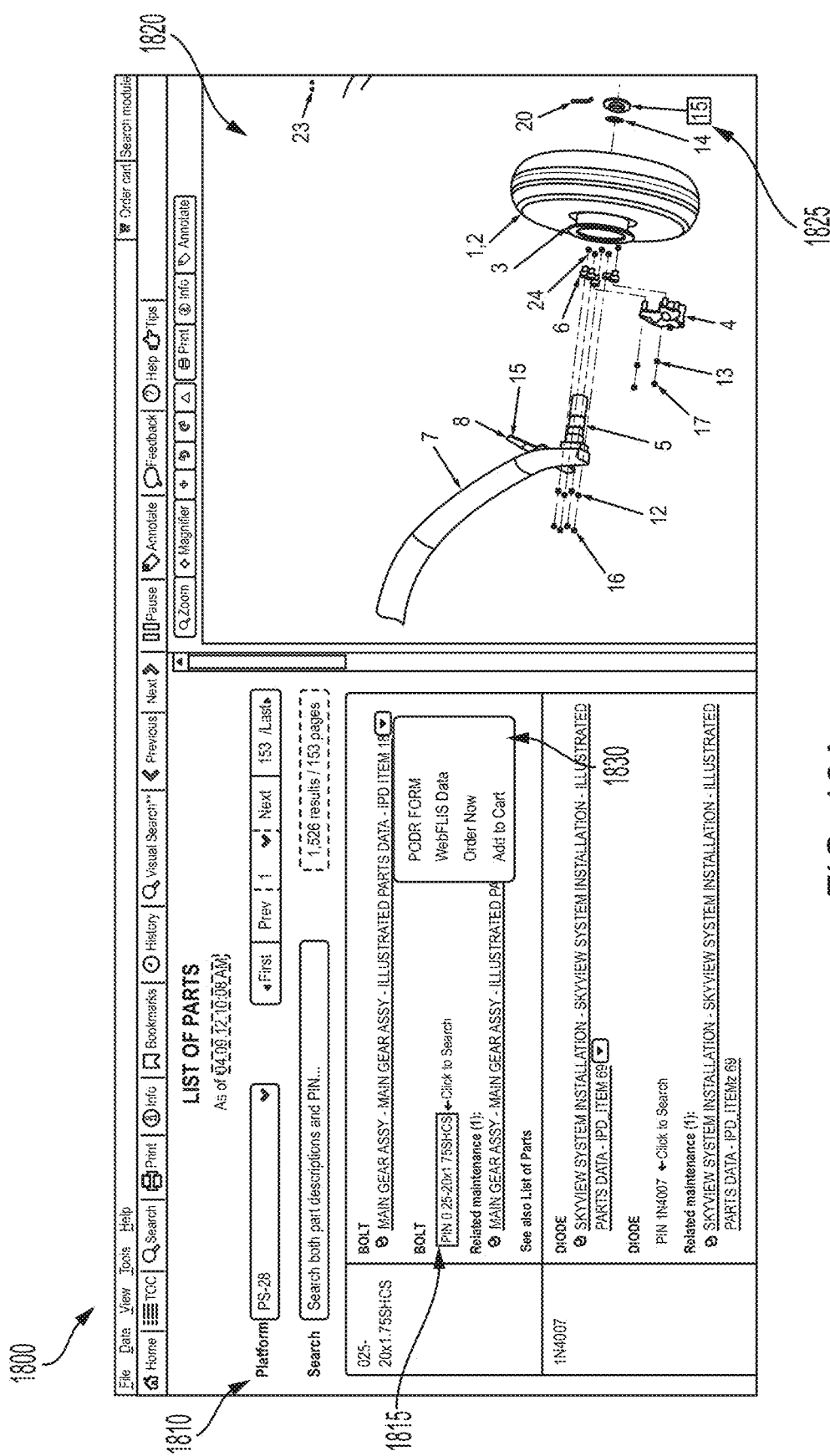
Figure 19:
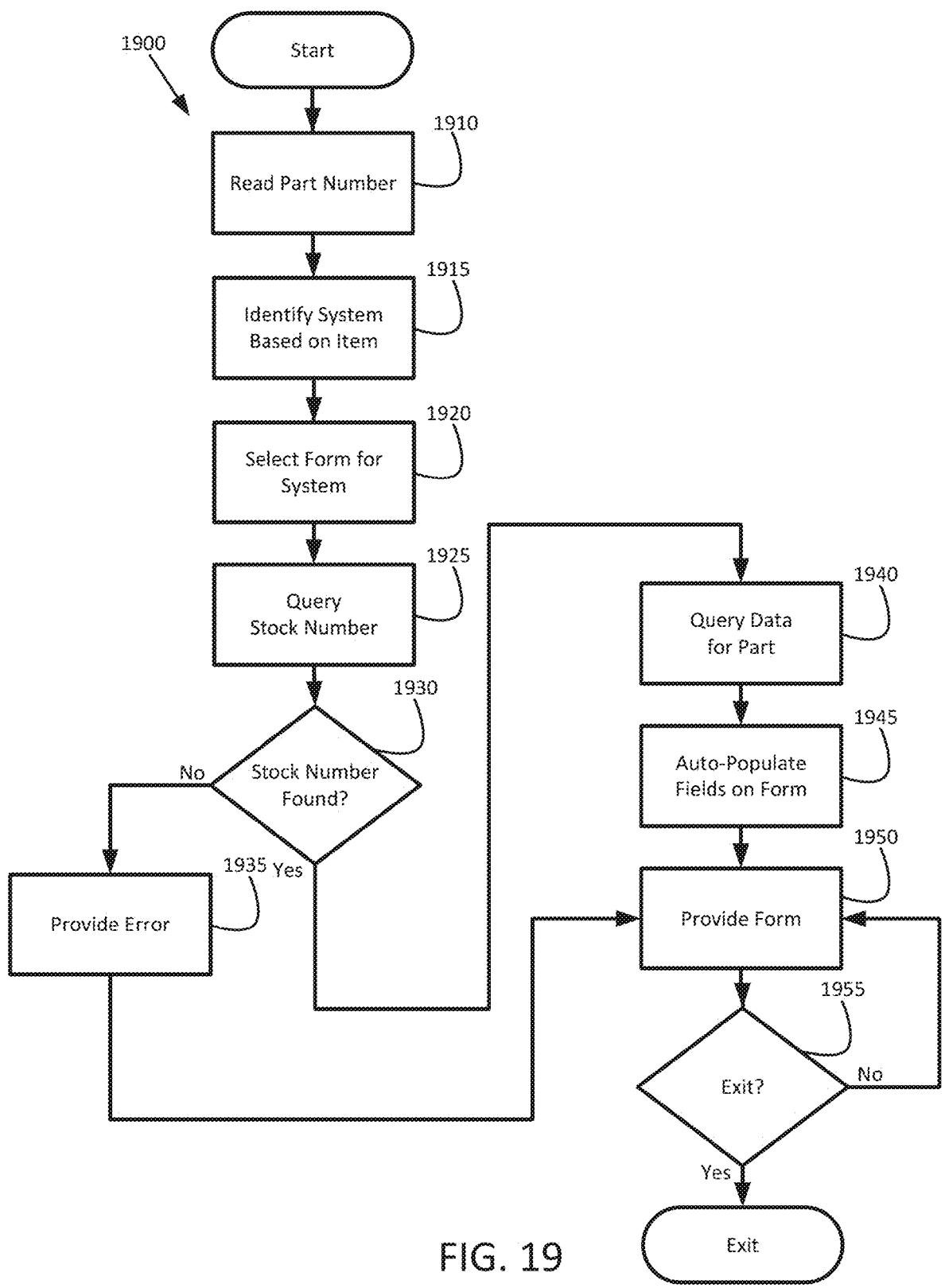
Figure 20:
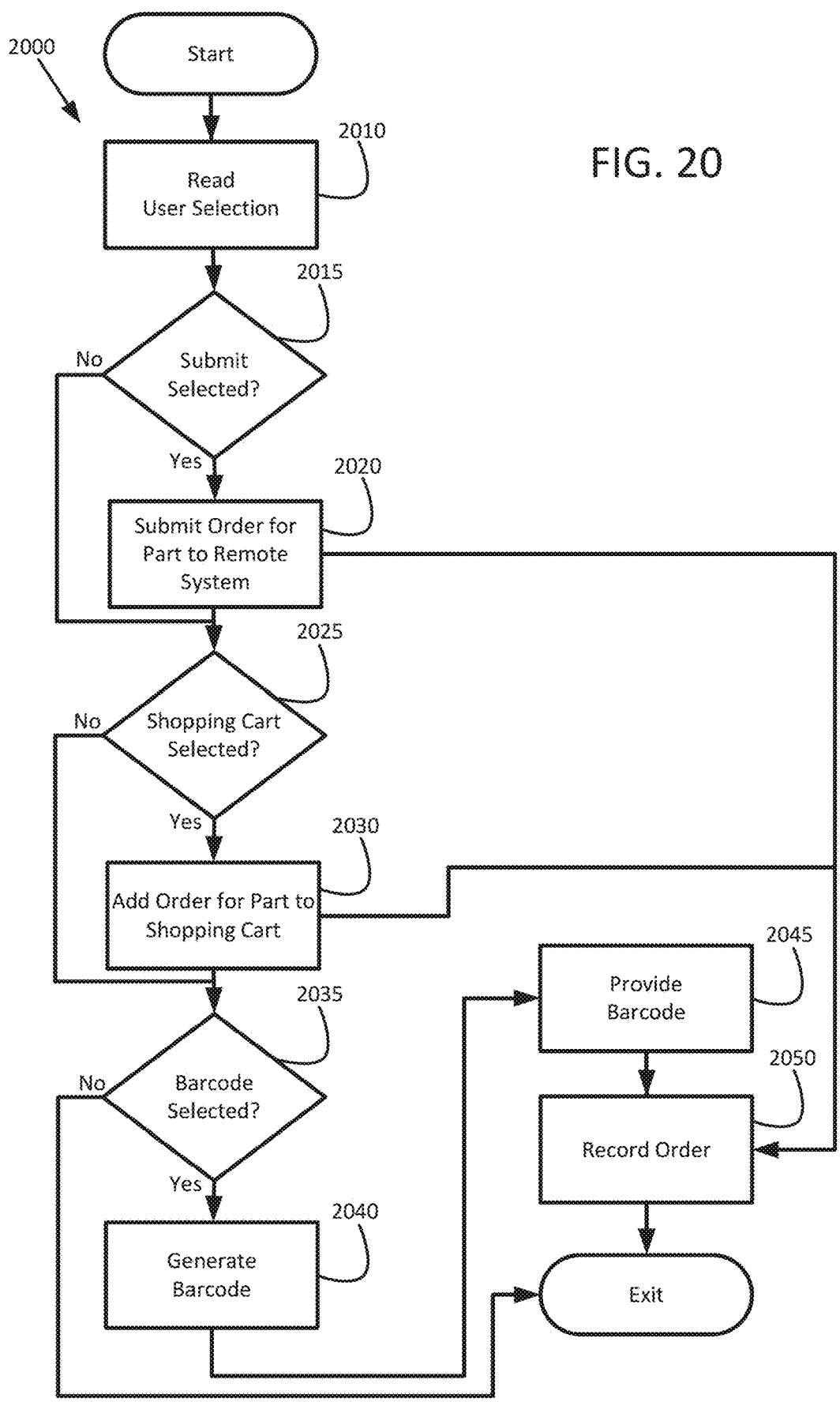
Figure 21C:
Figure 22:
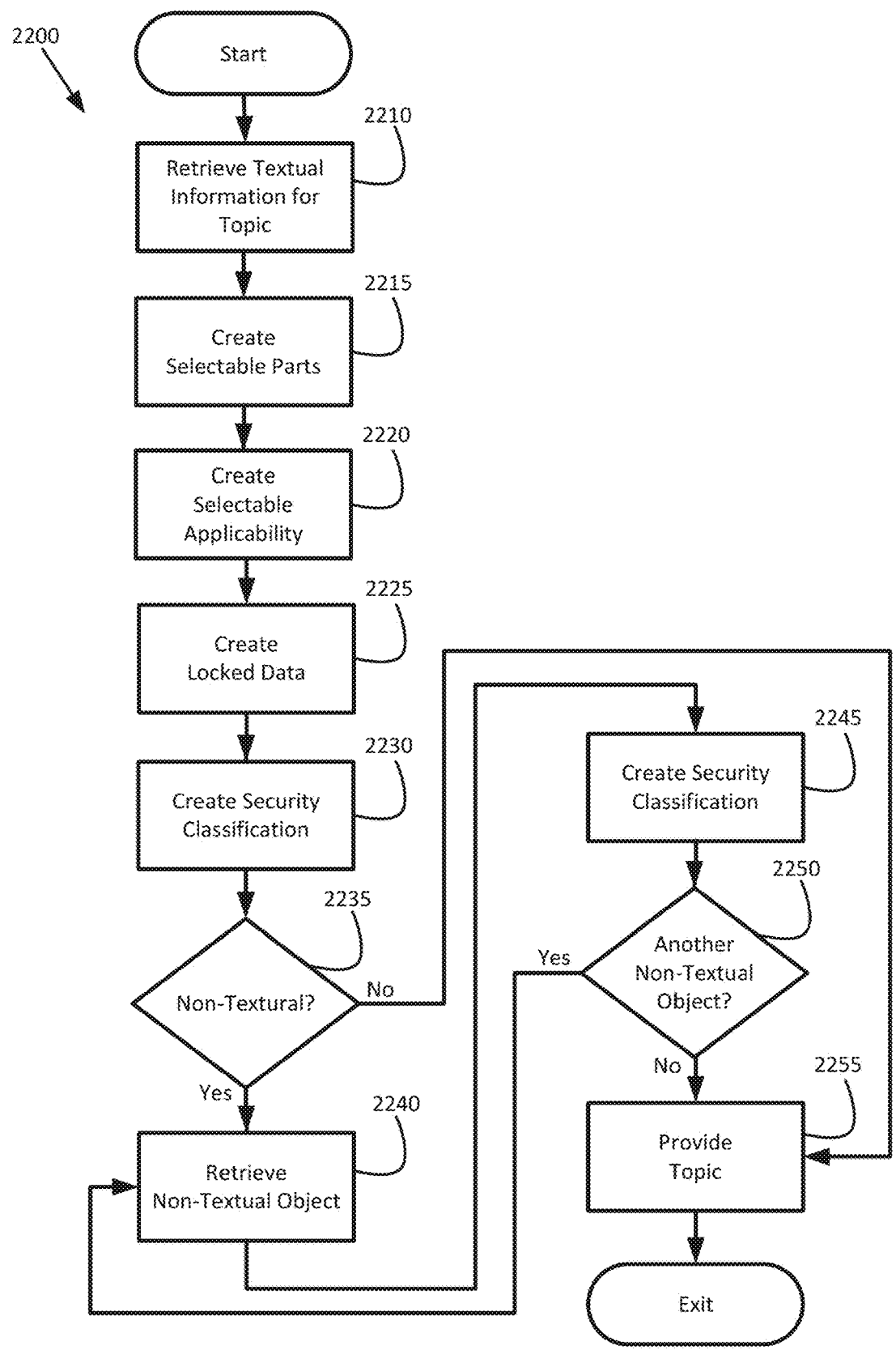
Figure 23:
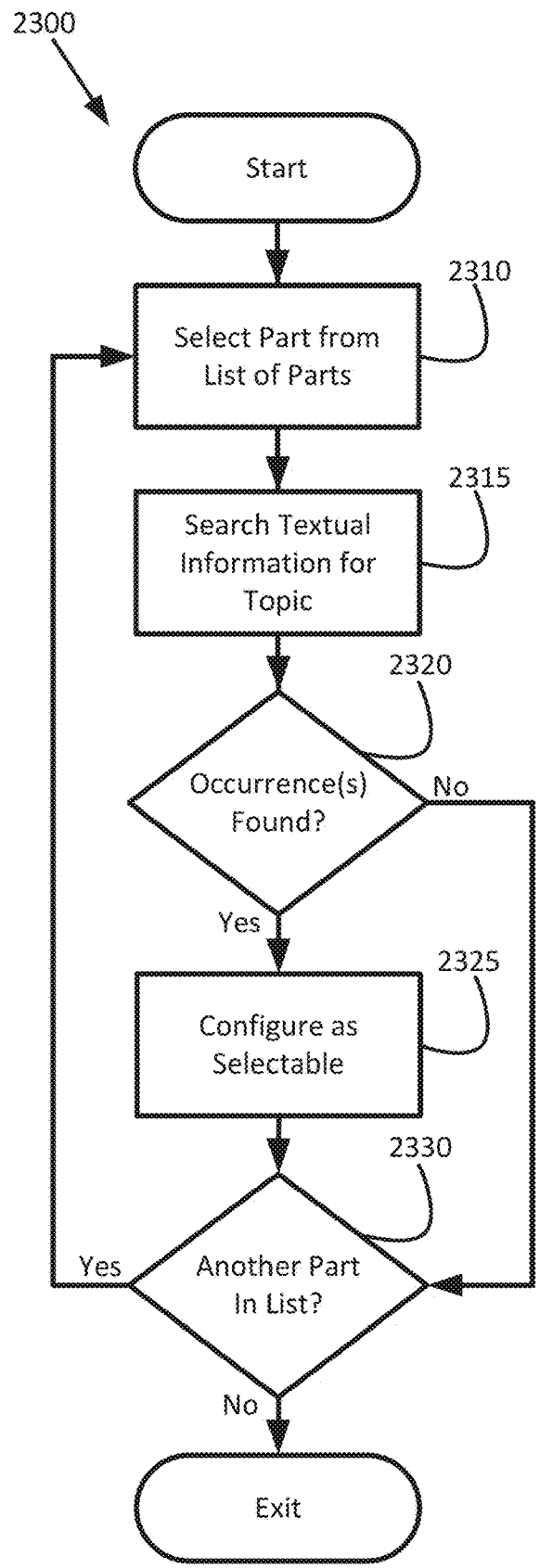
Figure 24:
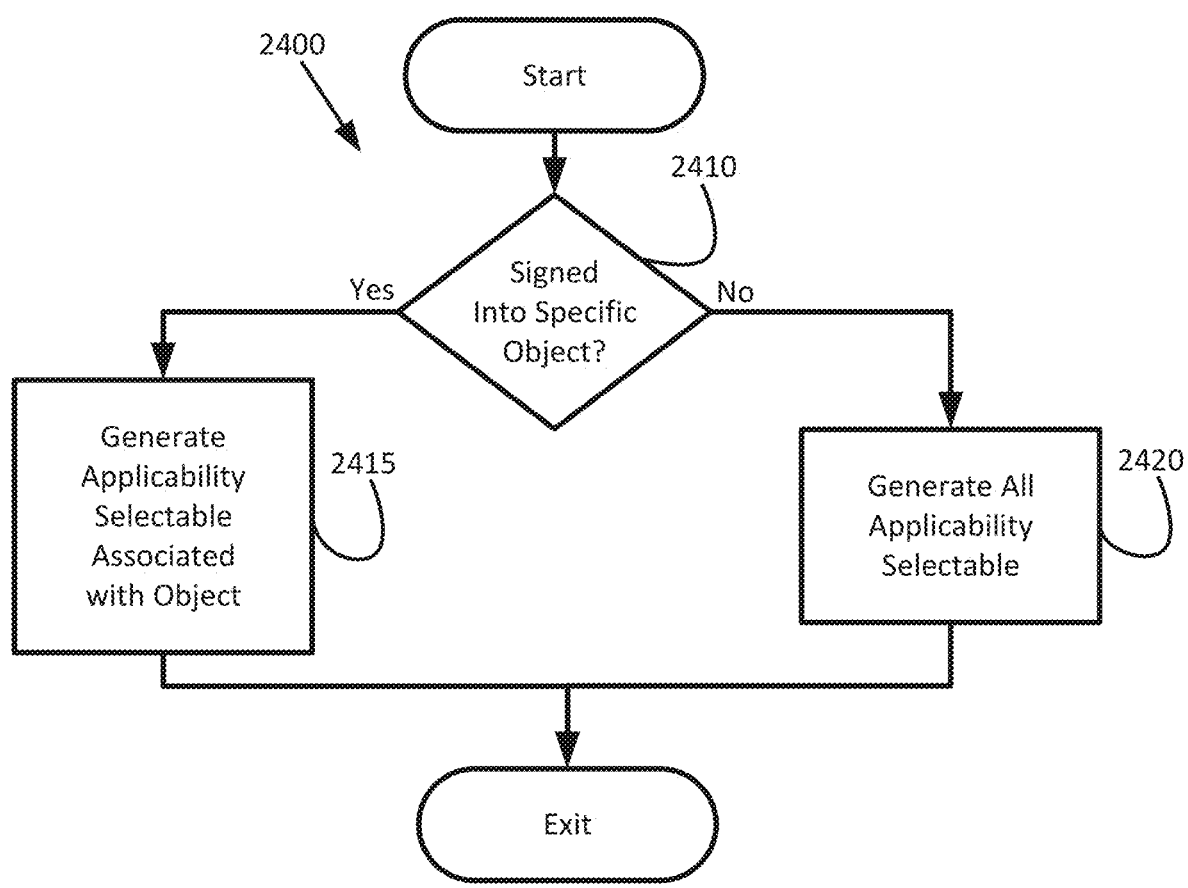
Figure 25:
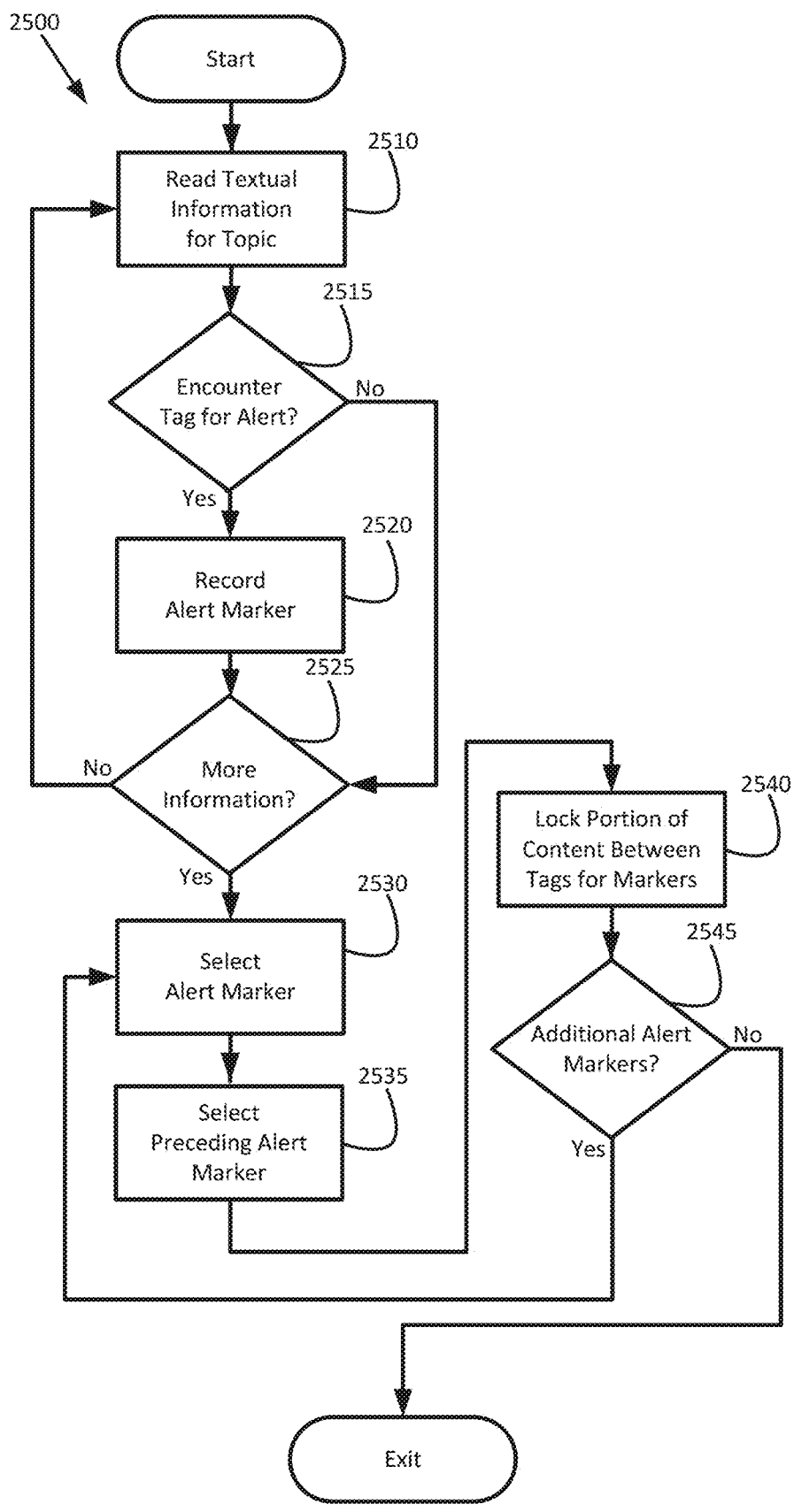
Figure 26:
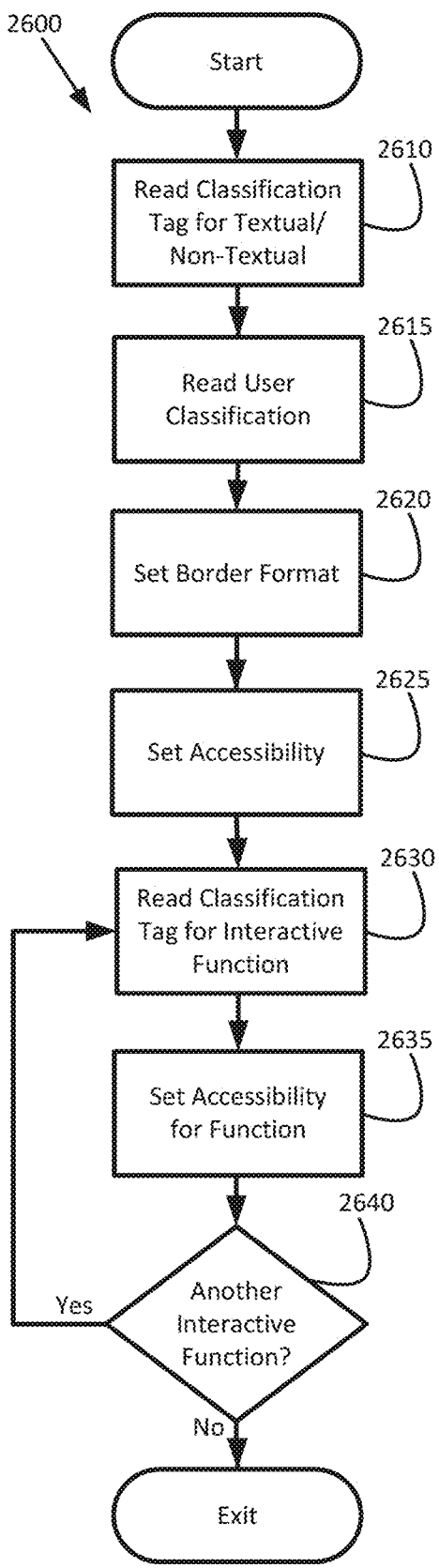
Figure 27:
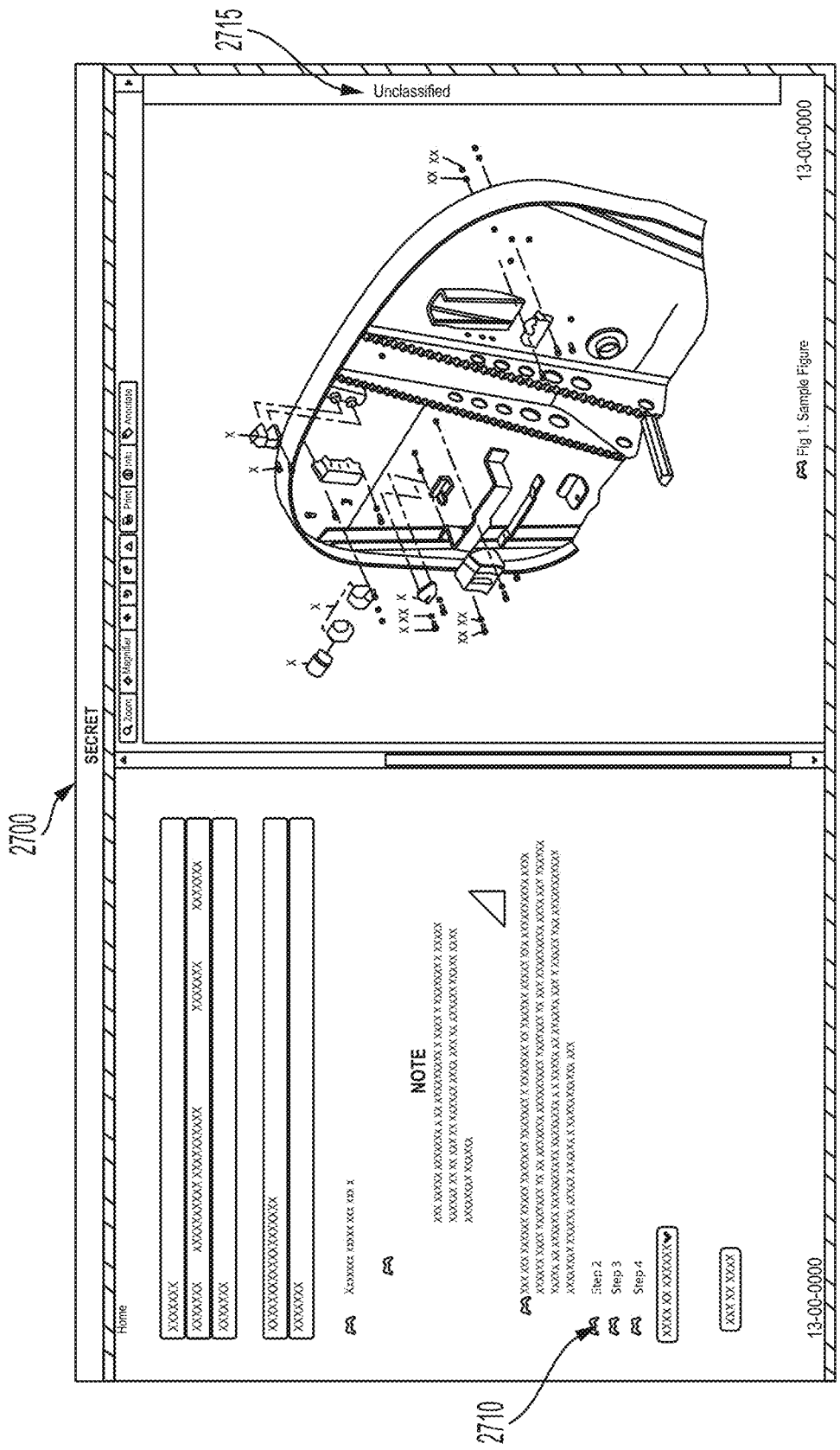
Figure 28A:
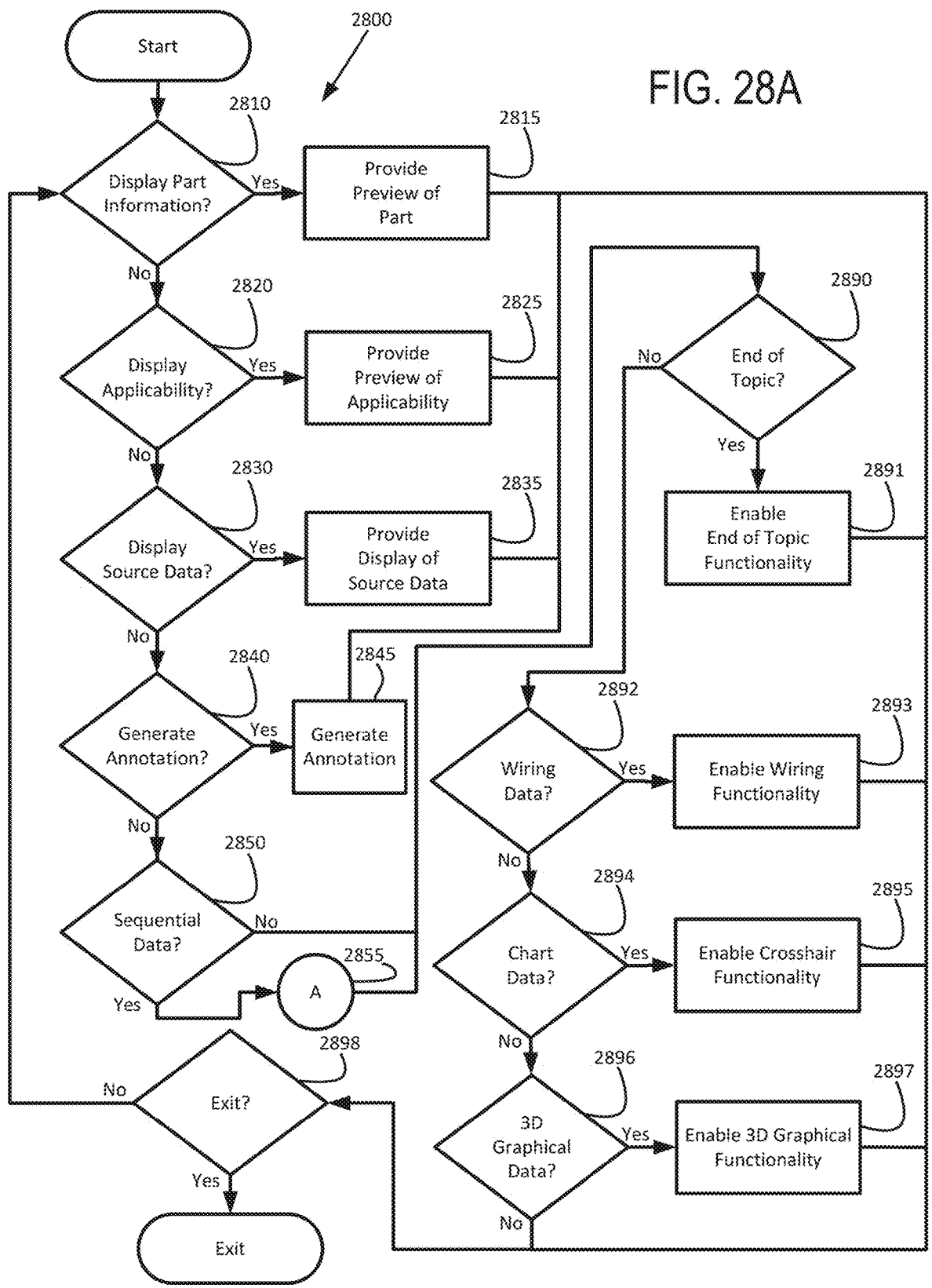
Figure 28B:
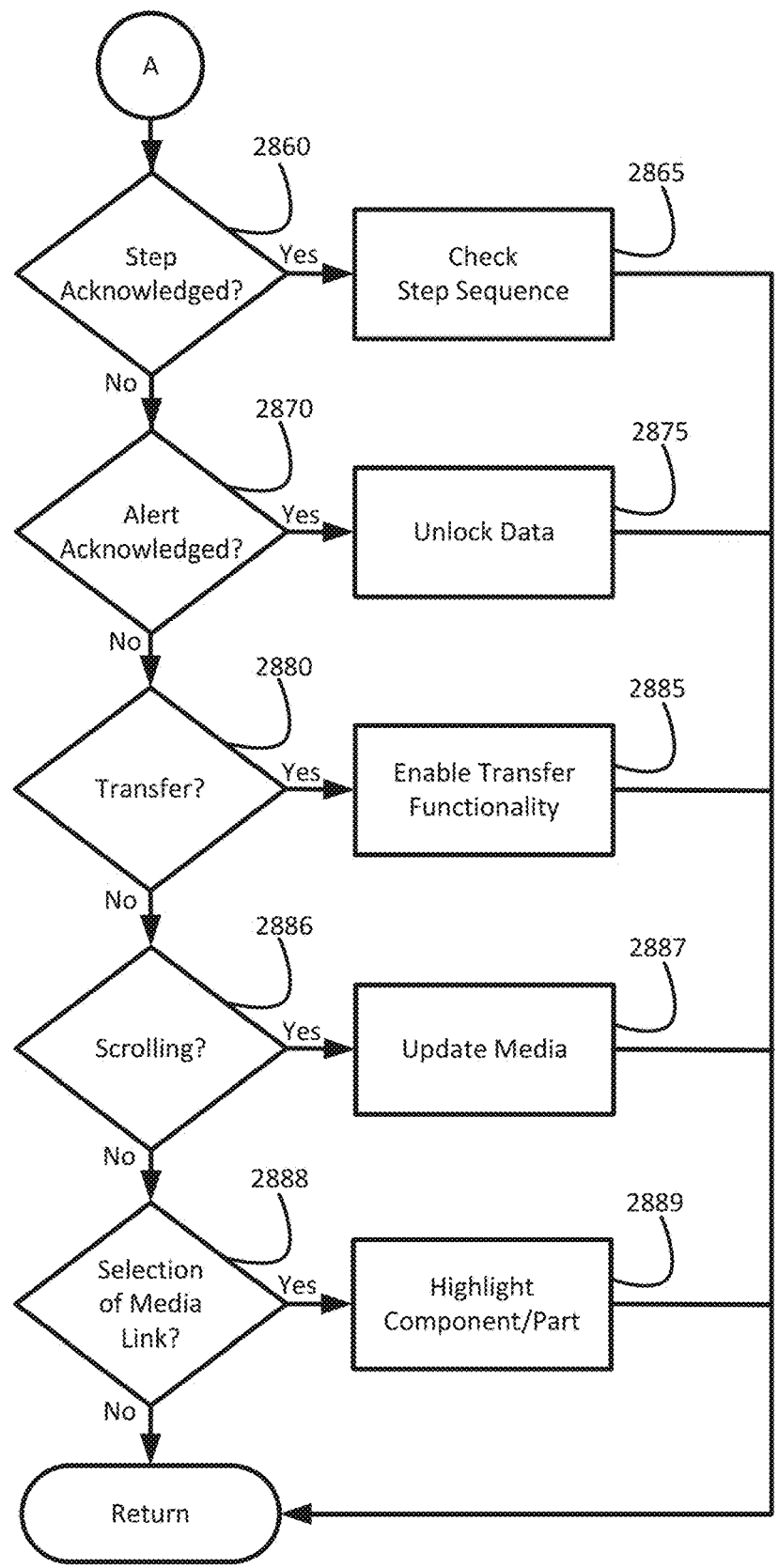
Figure 31:
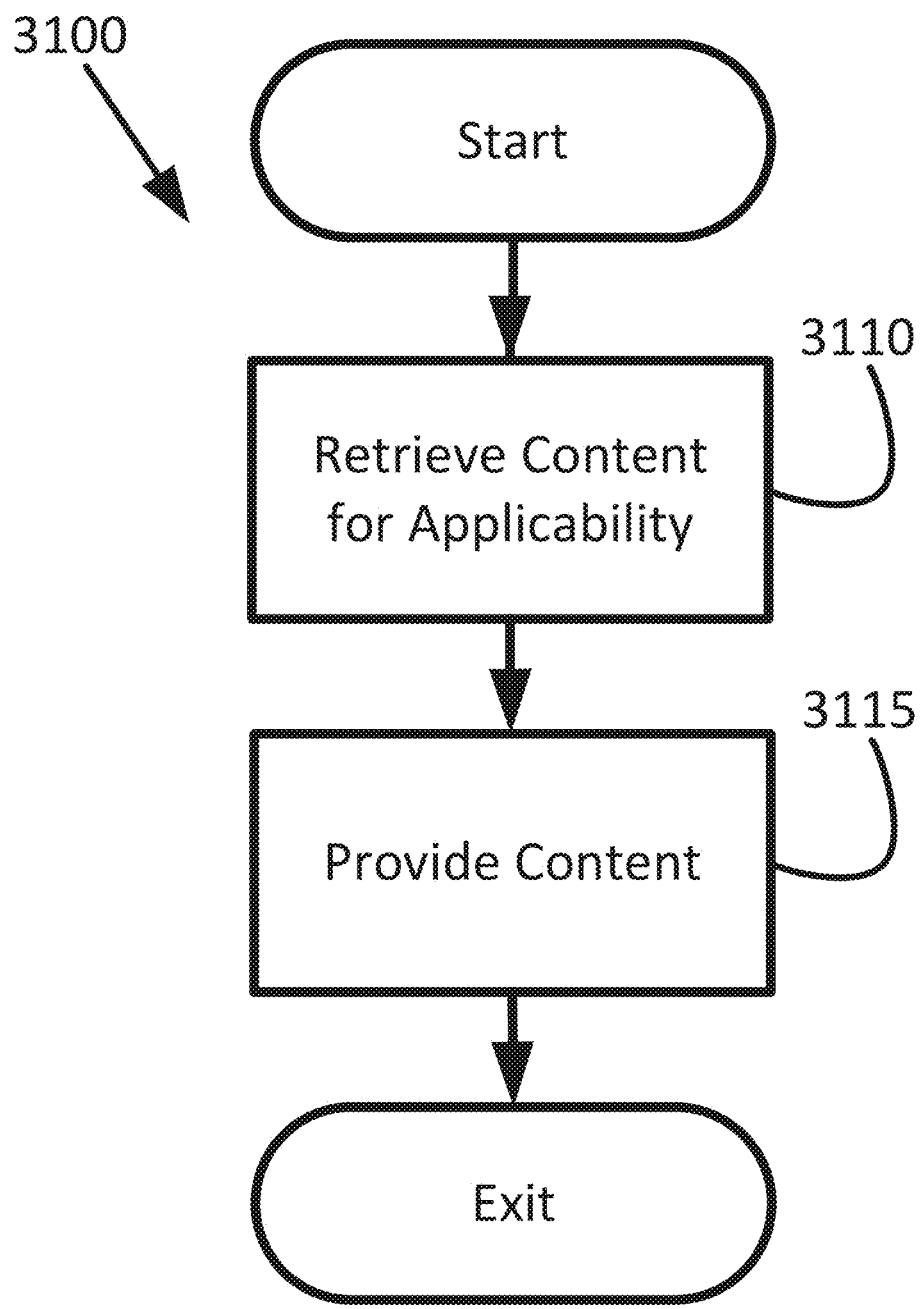
Figure 32:
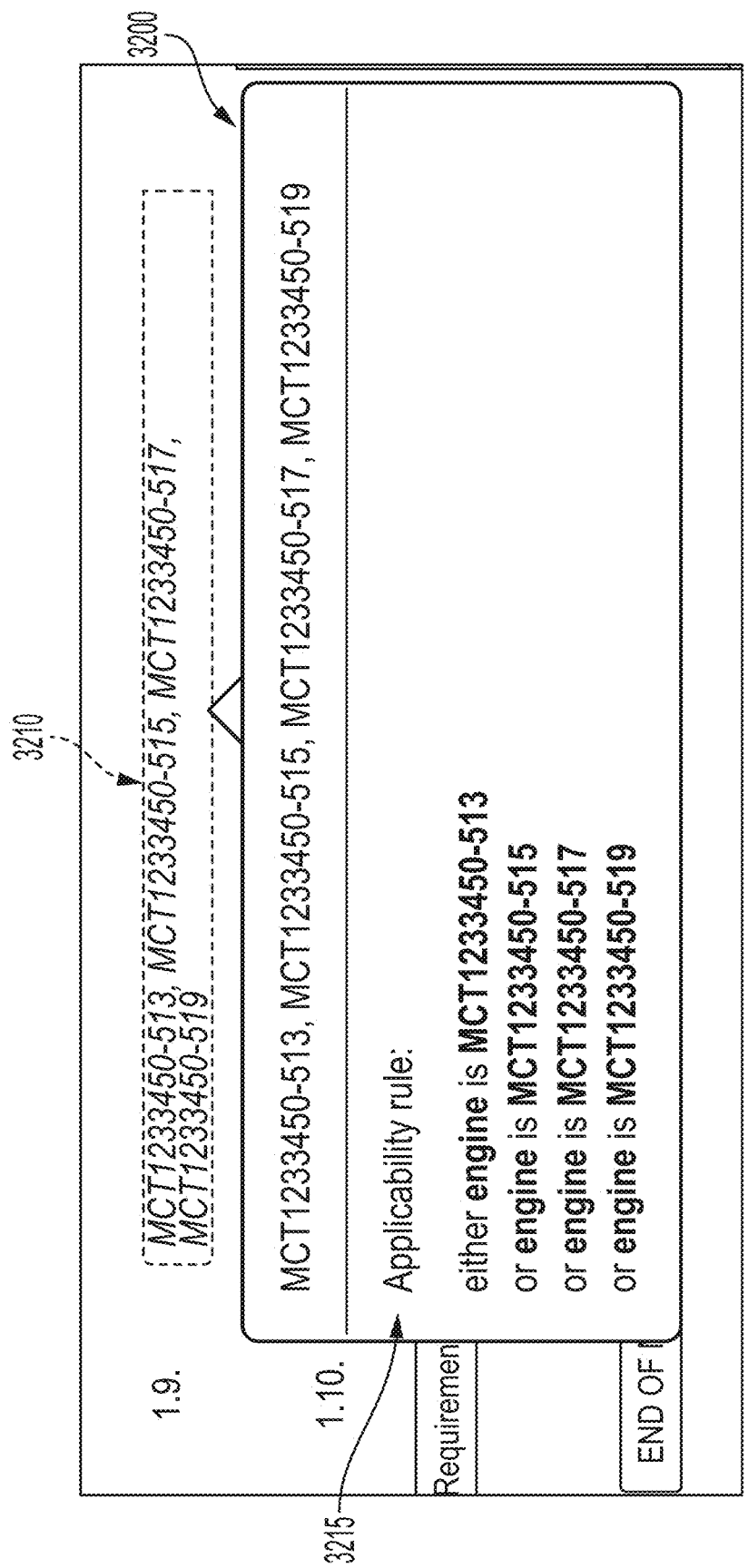
Figure 33:
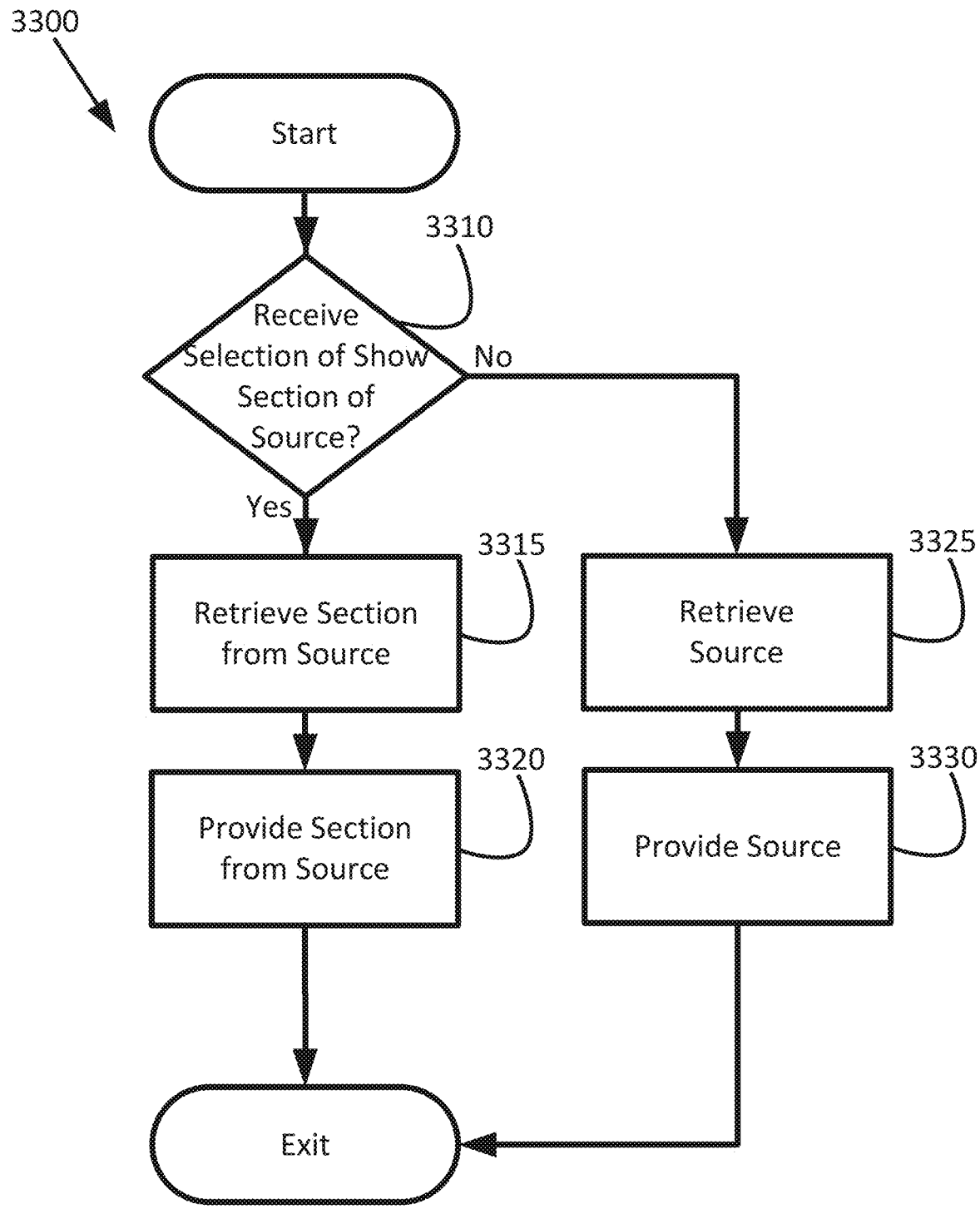
Figure 34A:
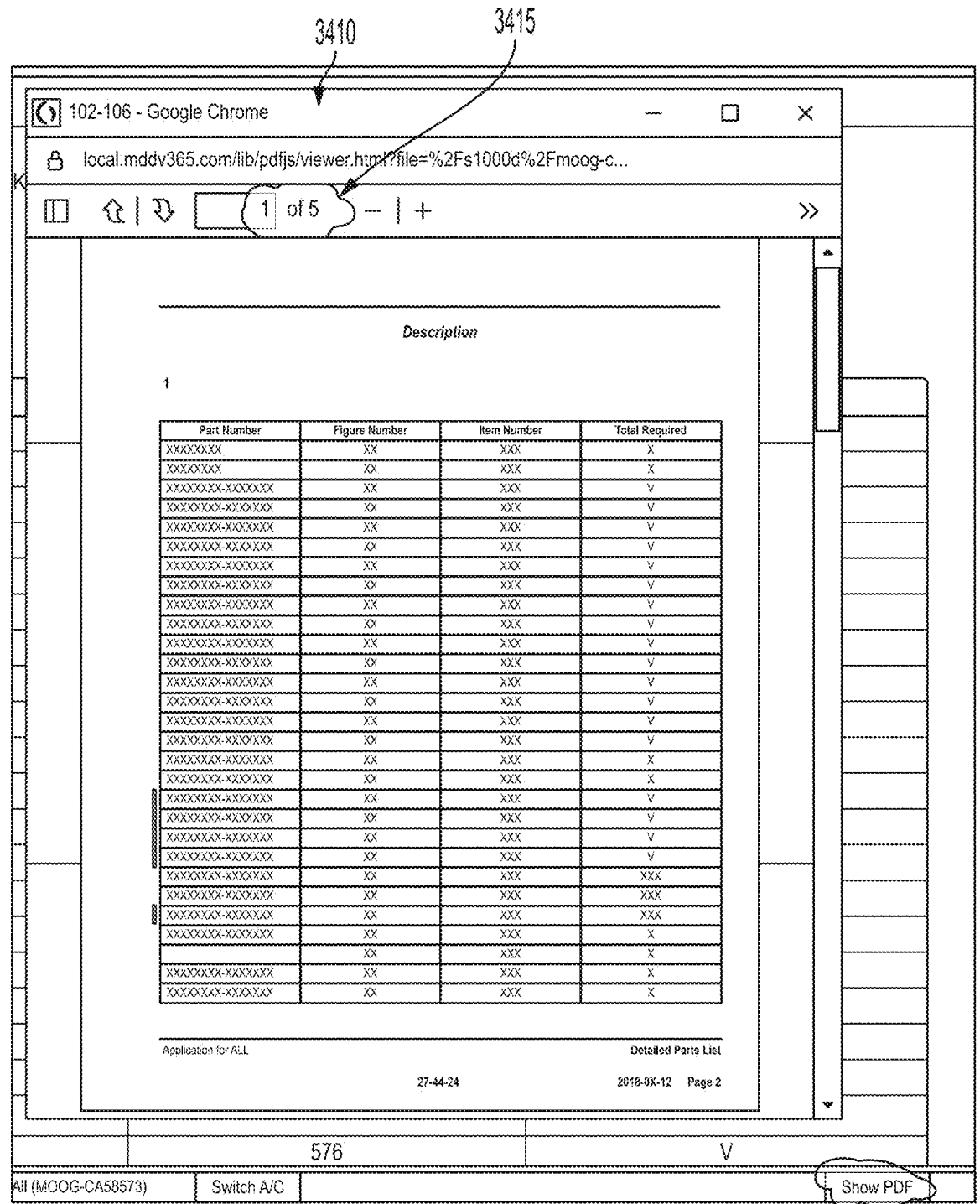
Figure 34B:
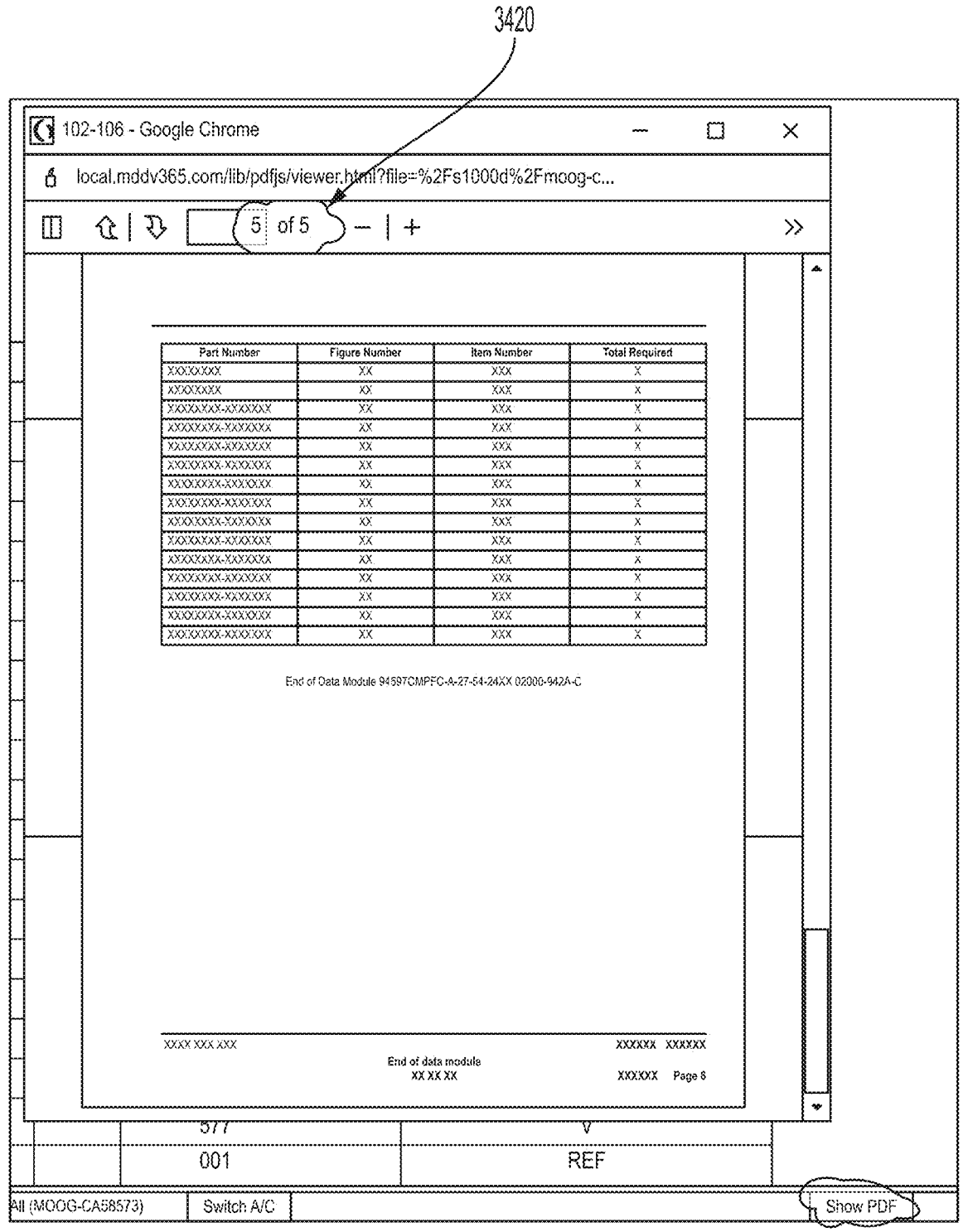
Figure 35:
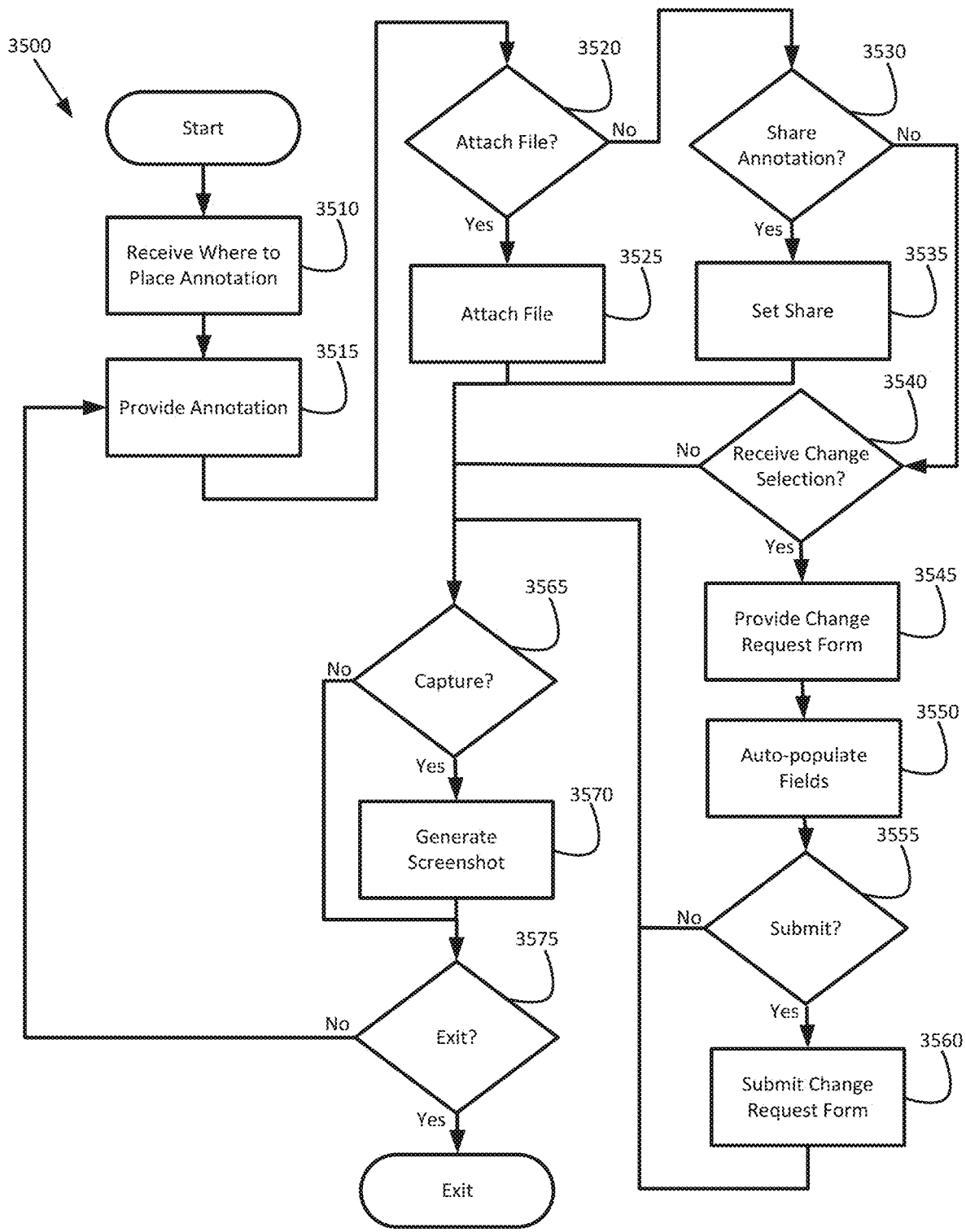
Figure 36A:
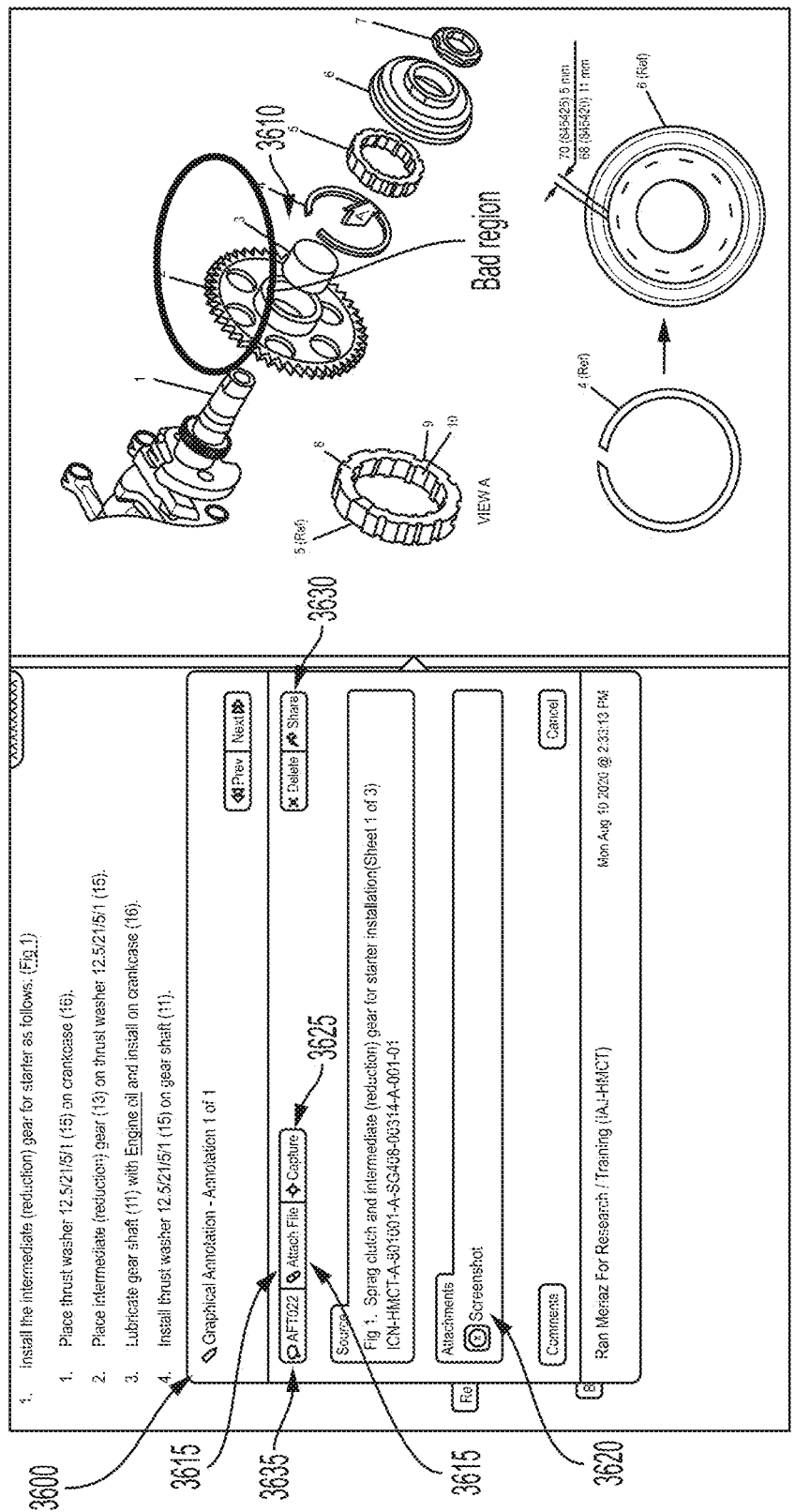
Figure 36B:
Figure 36C:
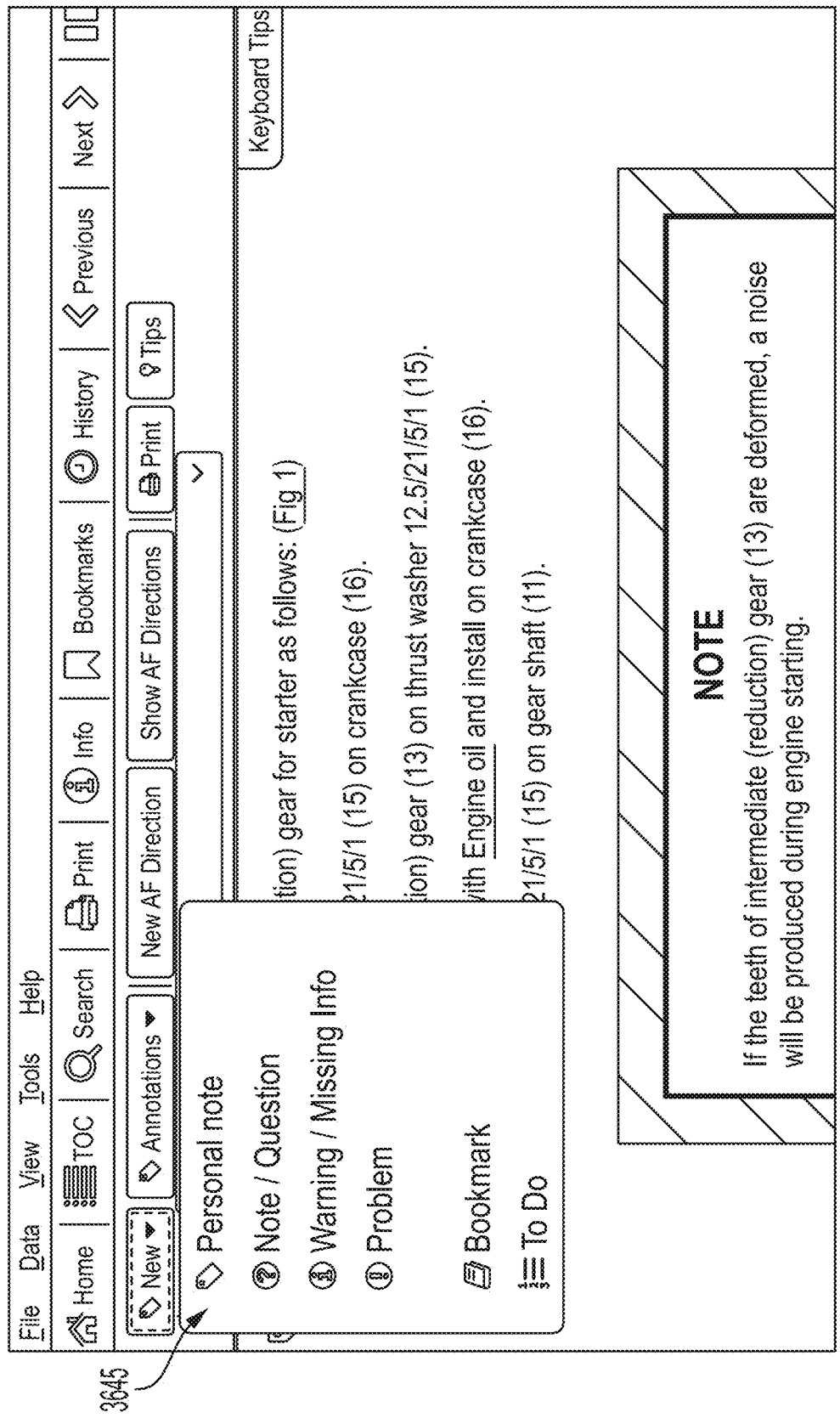
Figure 37:
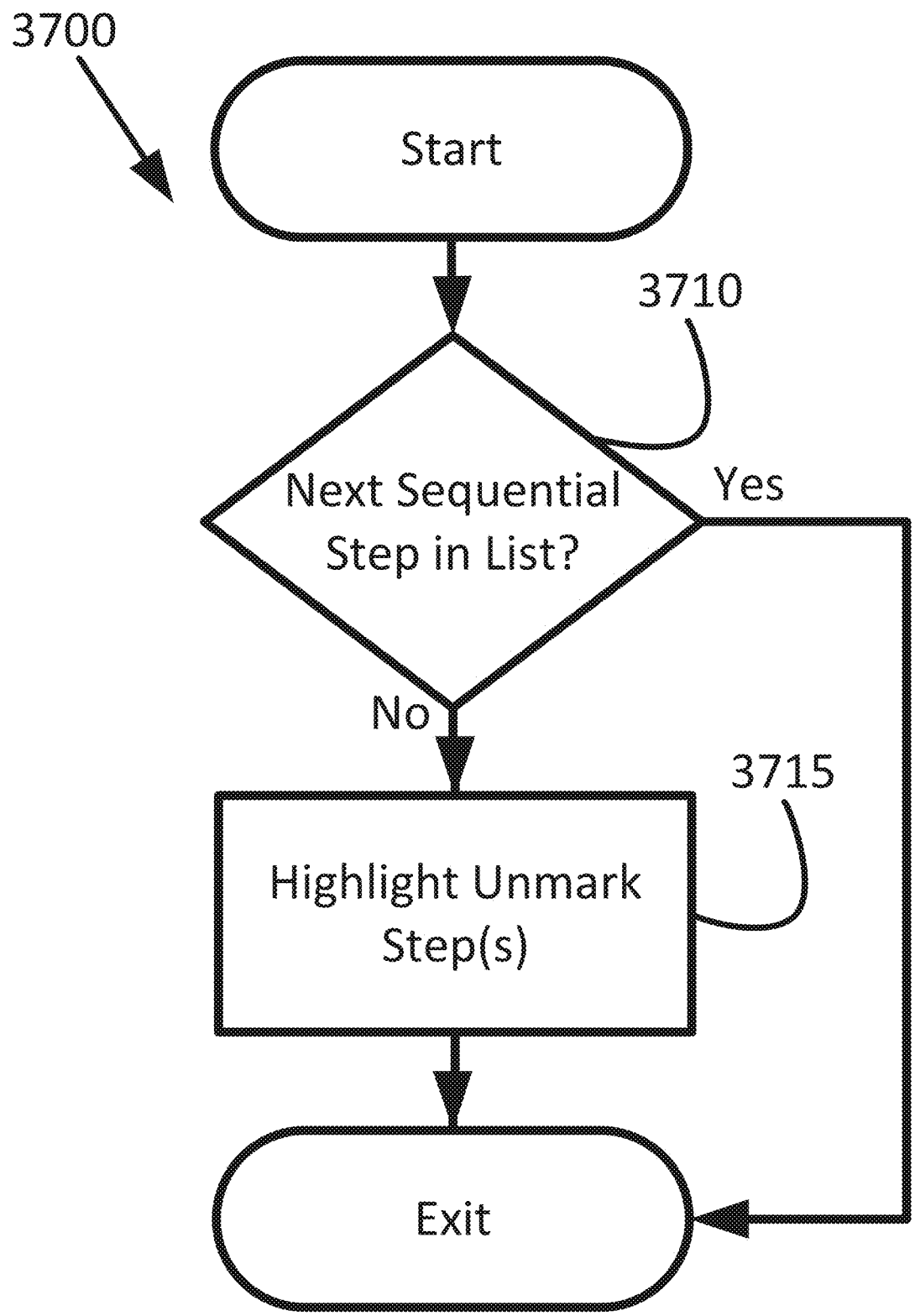
Figure 38:
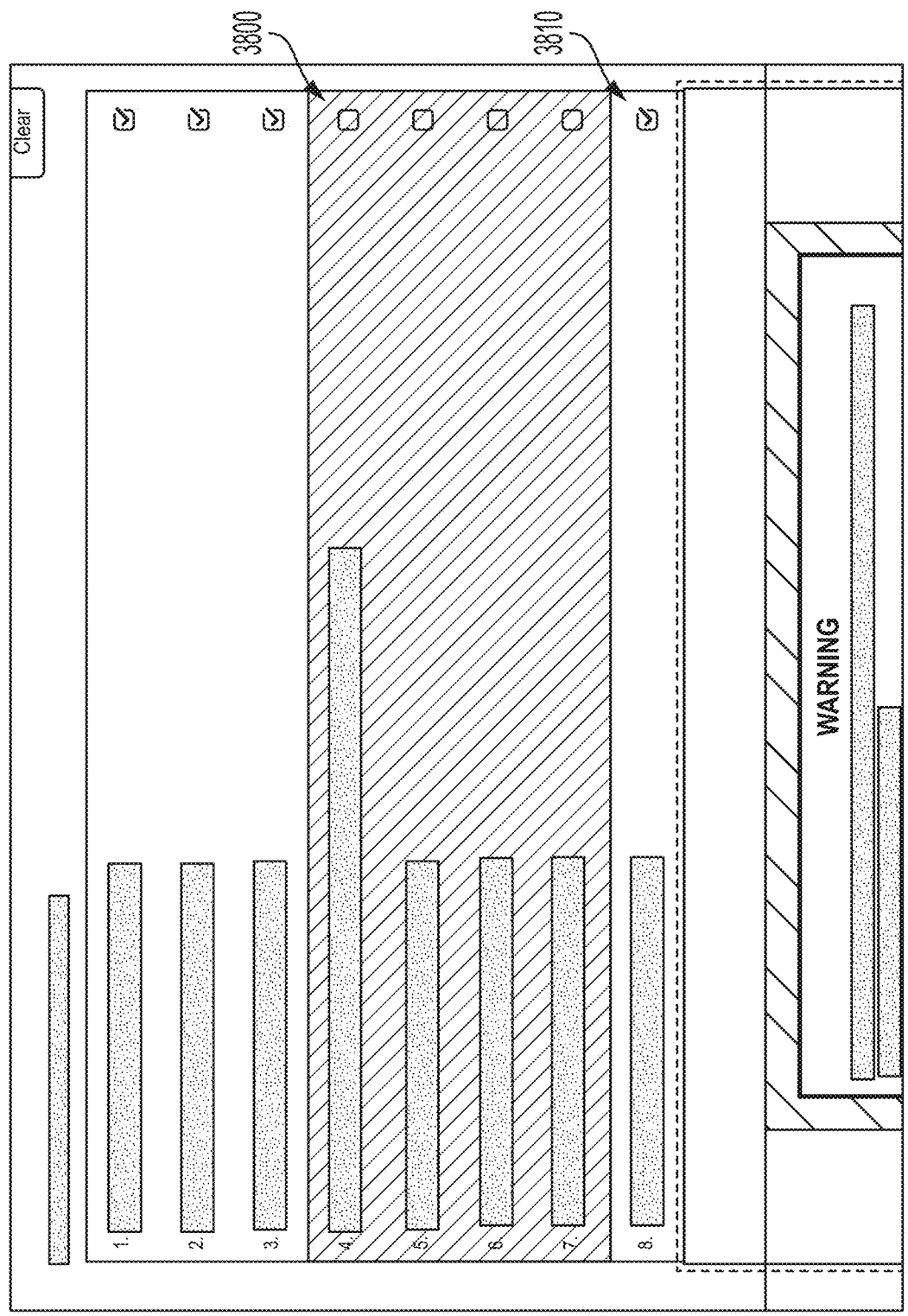
Figure 39:
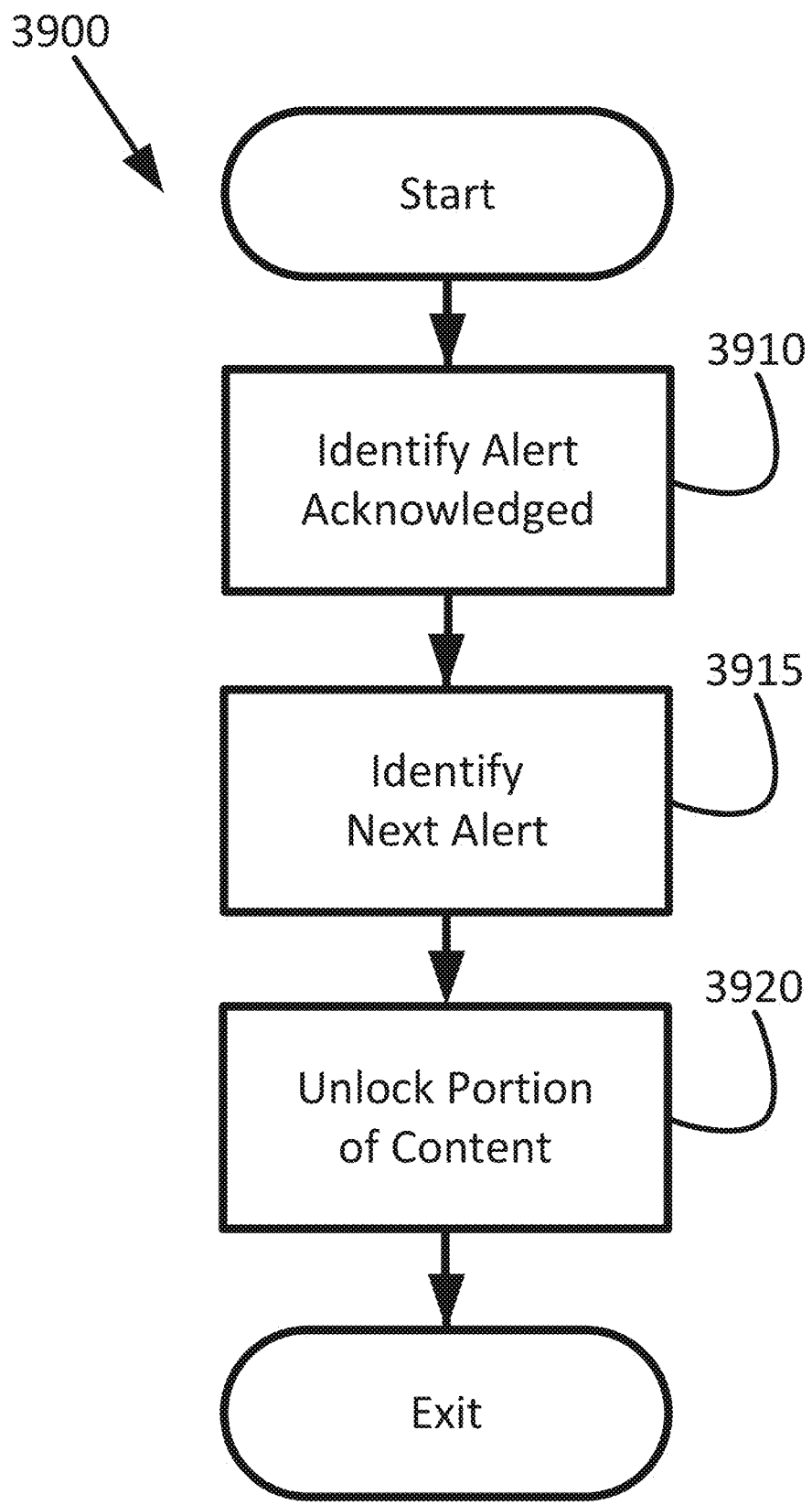
Figure 40A:
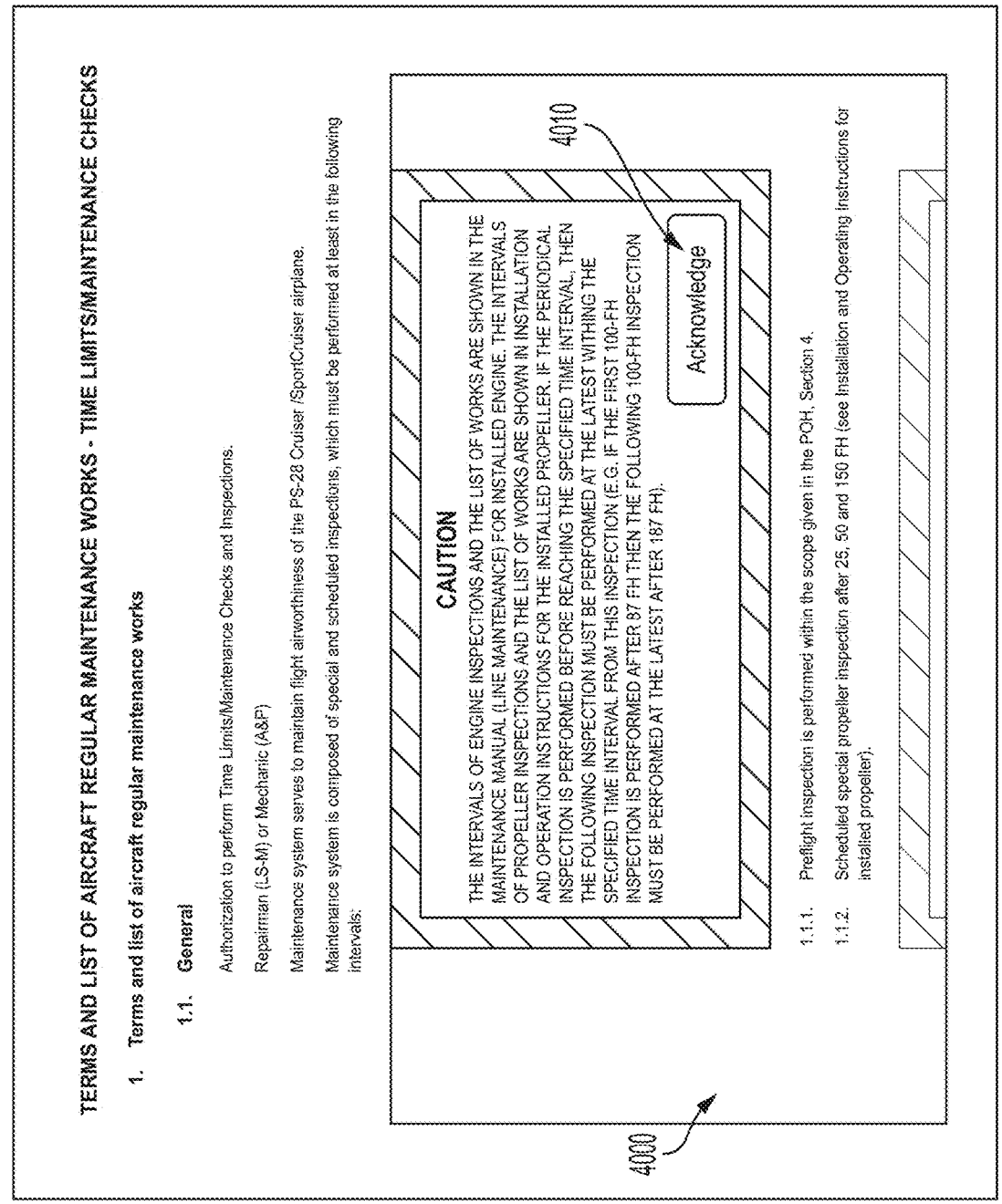
Figure 41:
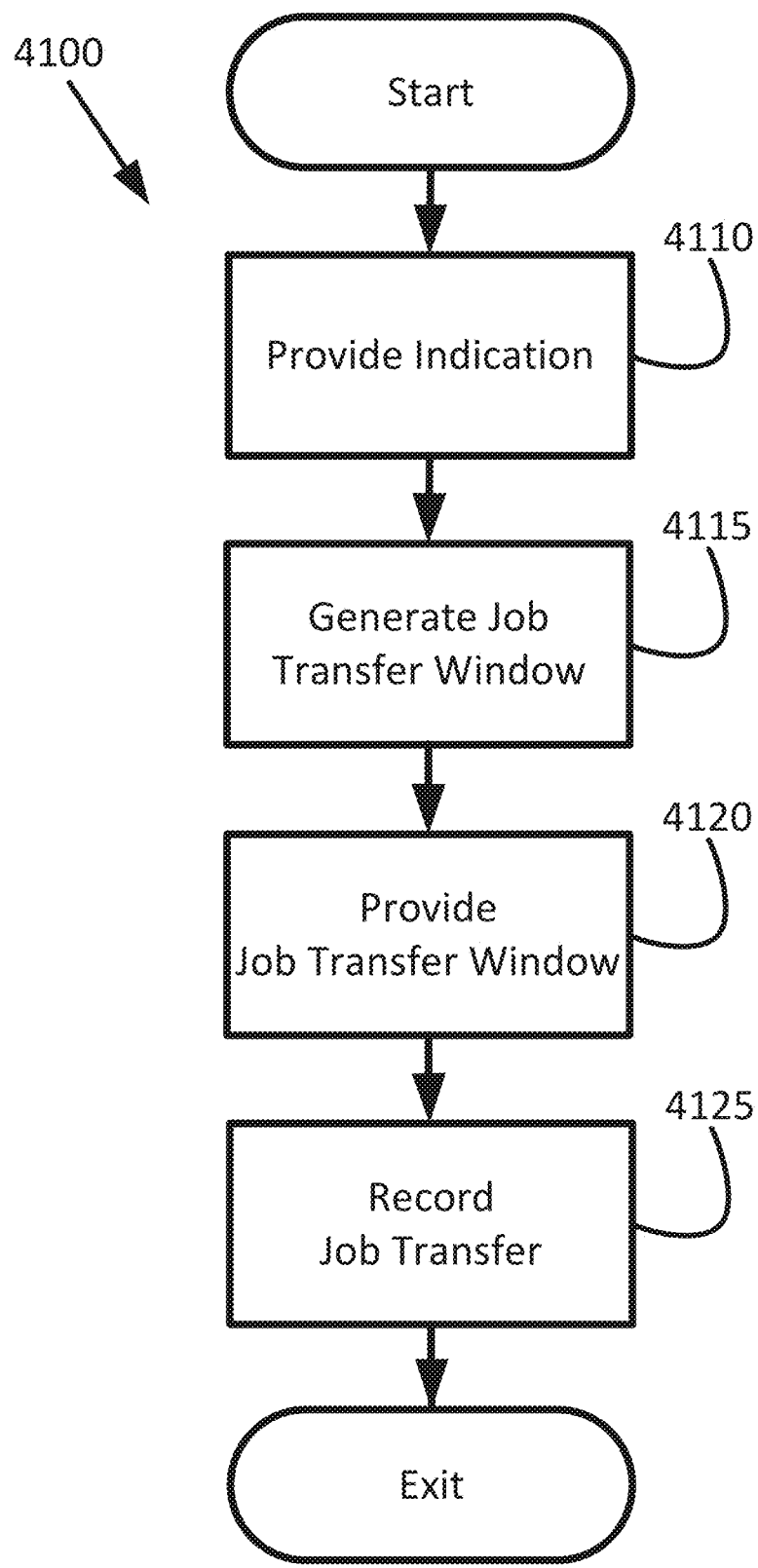
Figure 42:
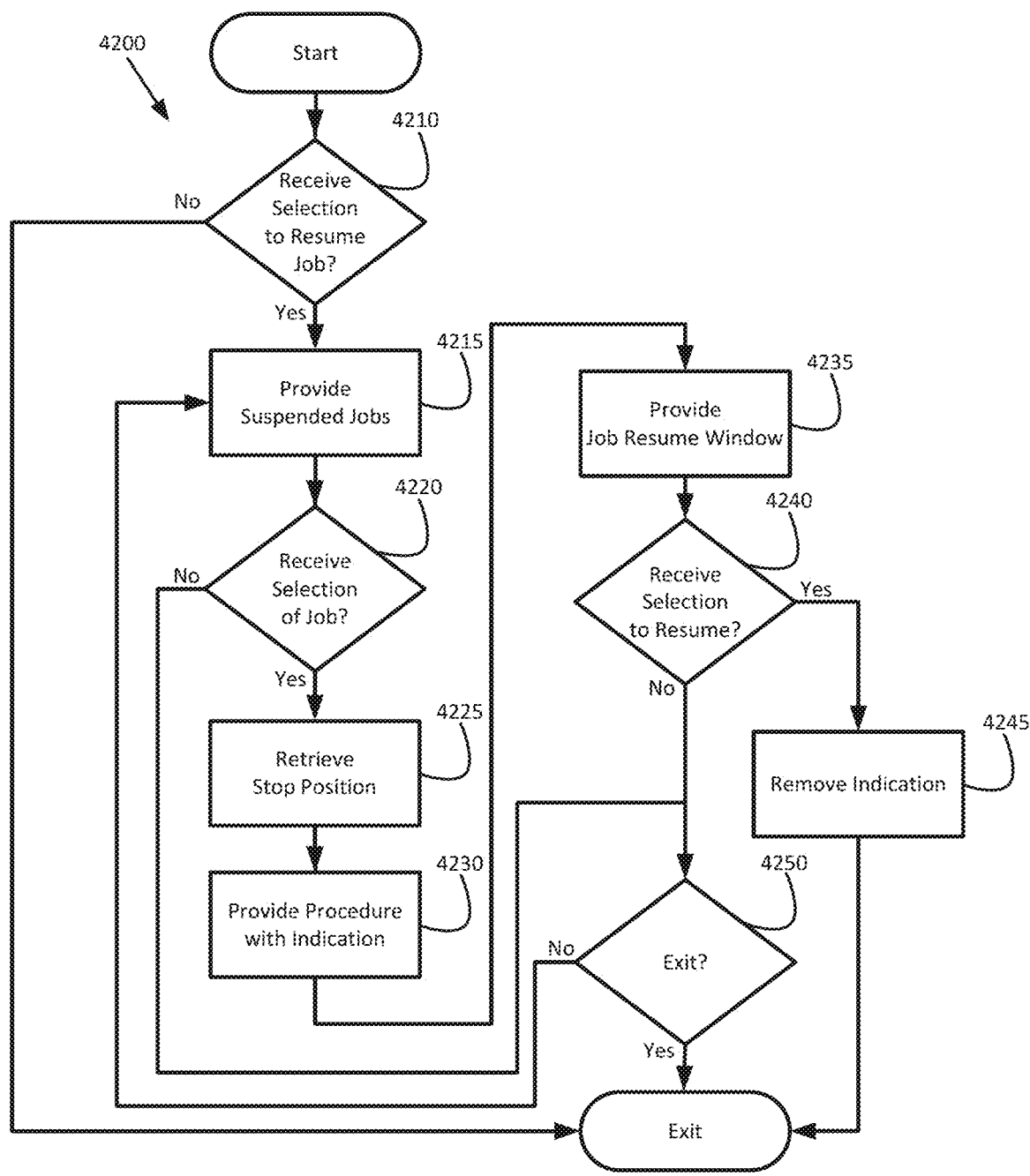
Figure 43A:
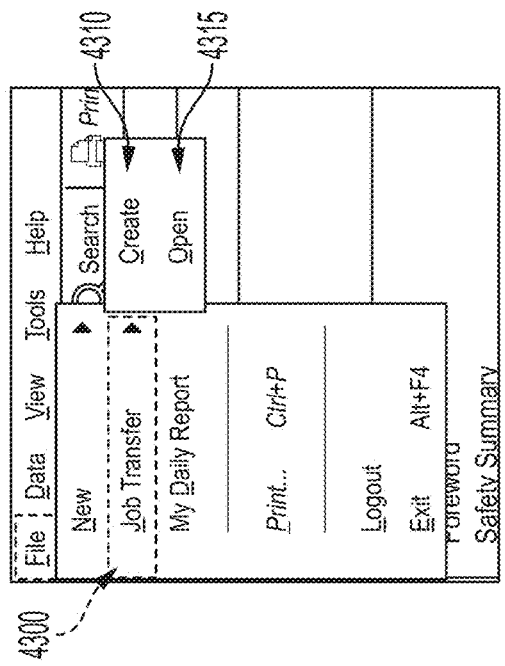
Figure 43B:
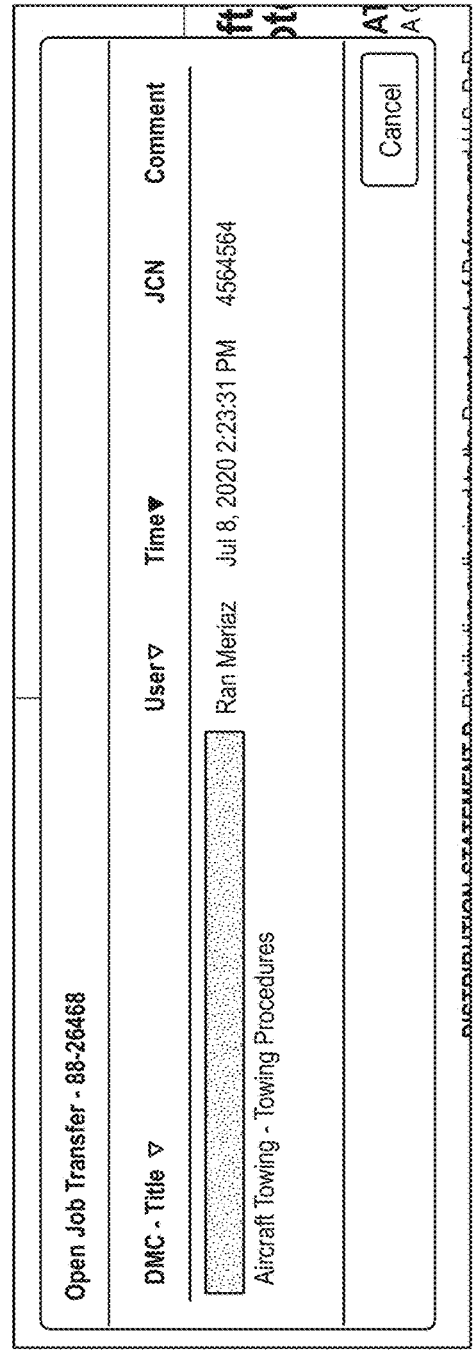
Figure 43C:
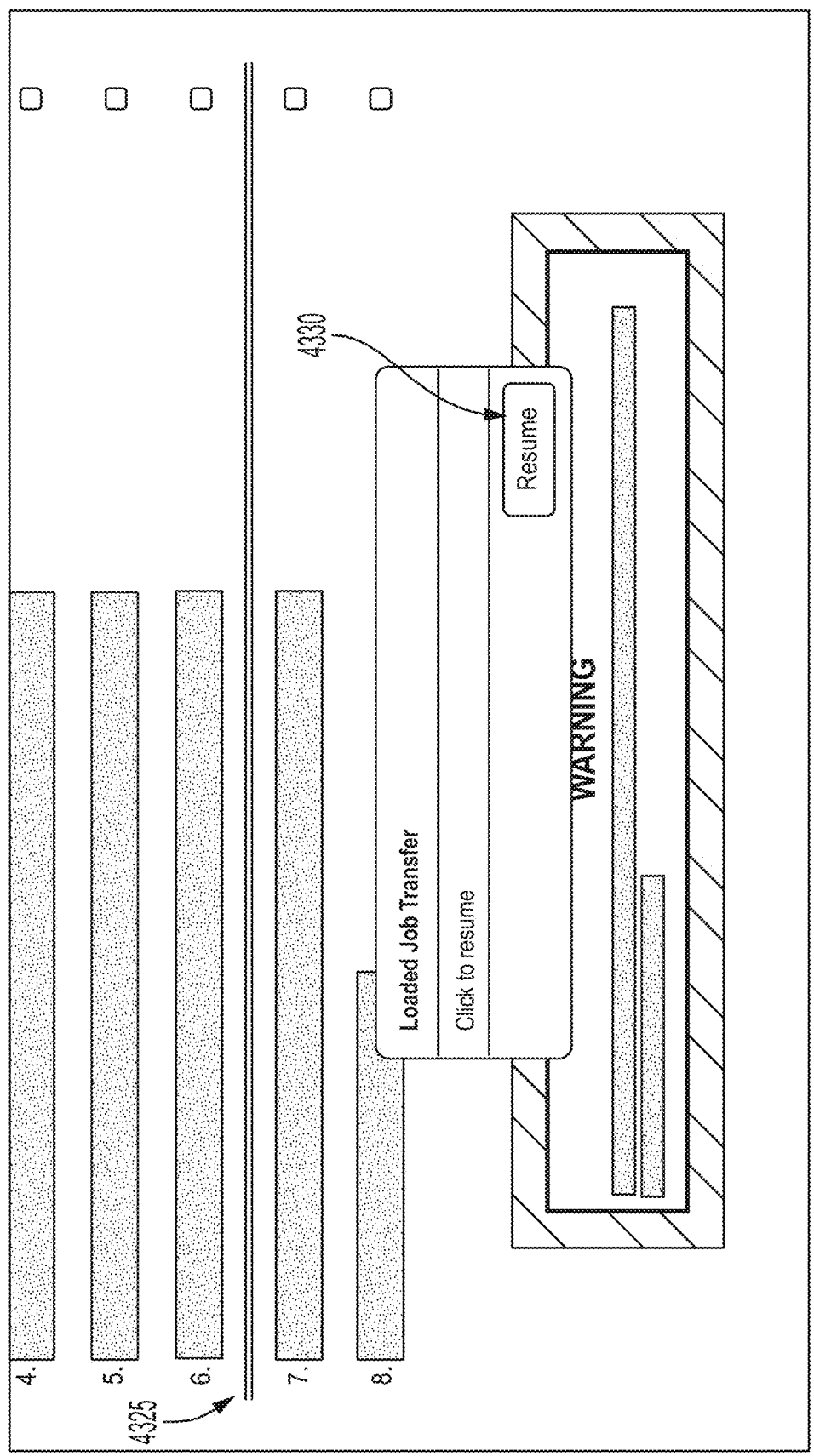
Figure 43D:
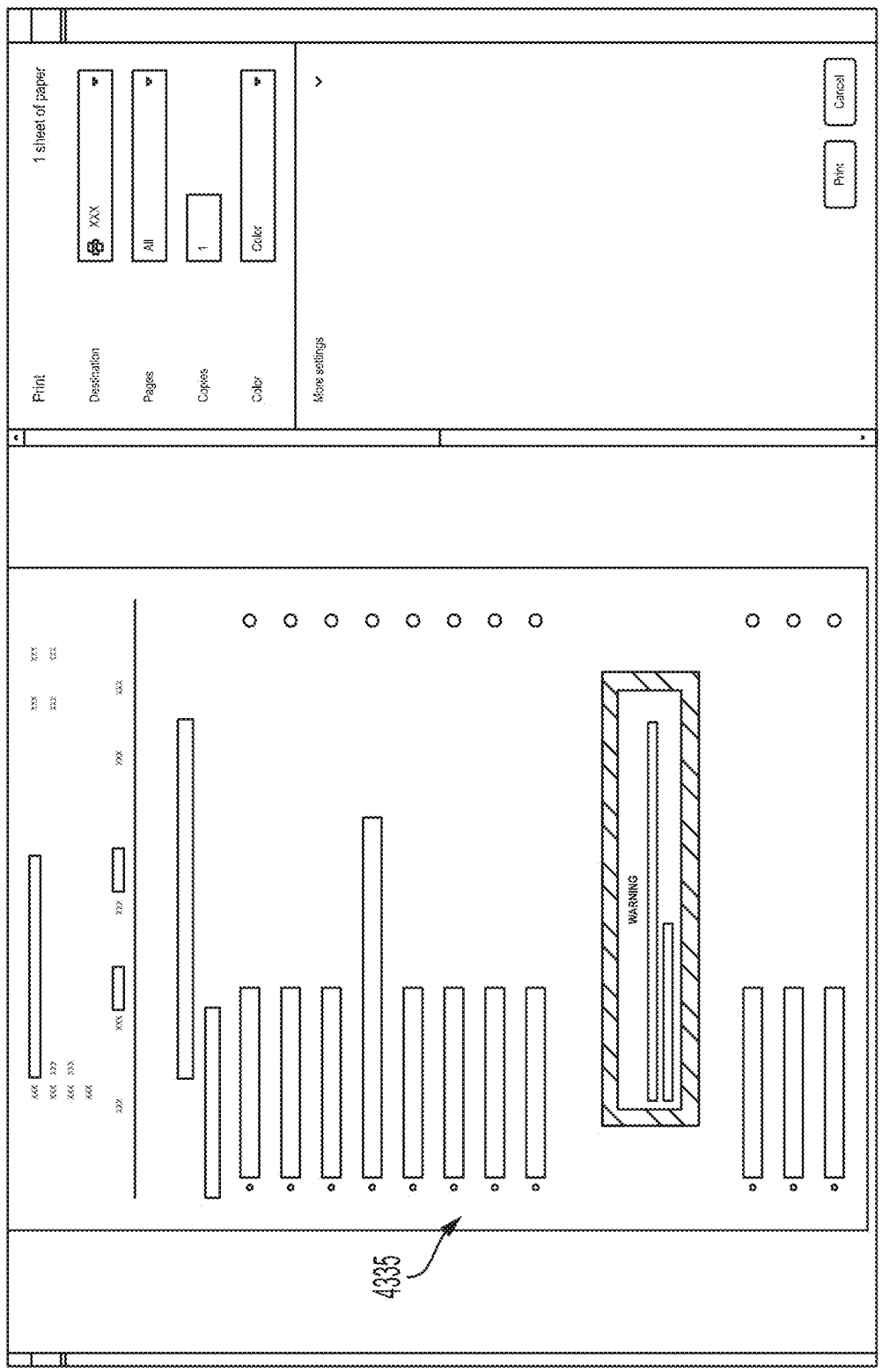
Figure 44:
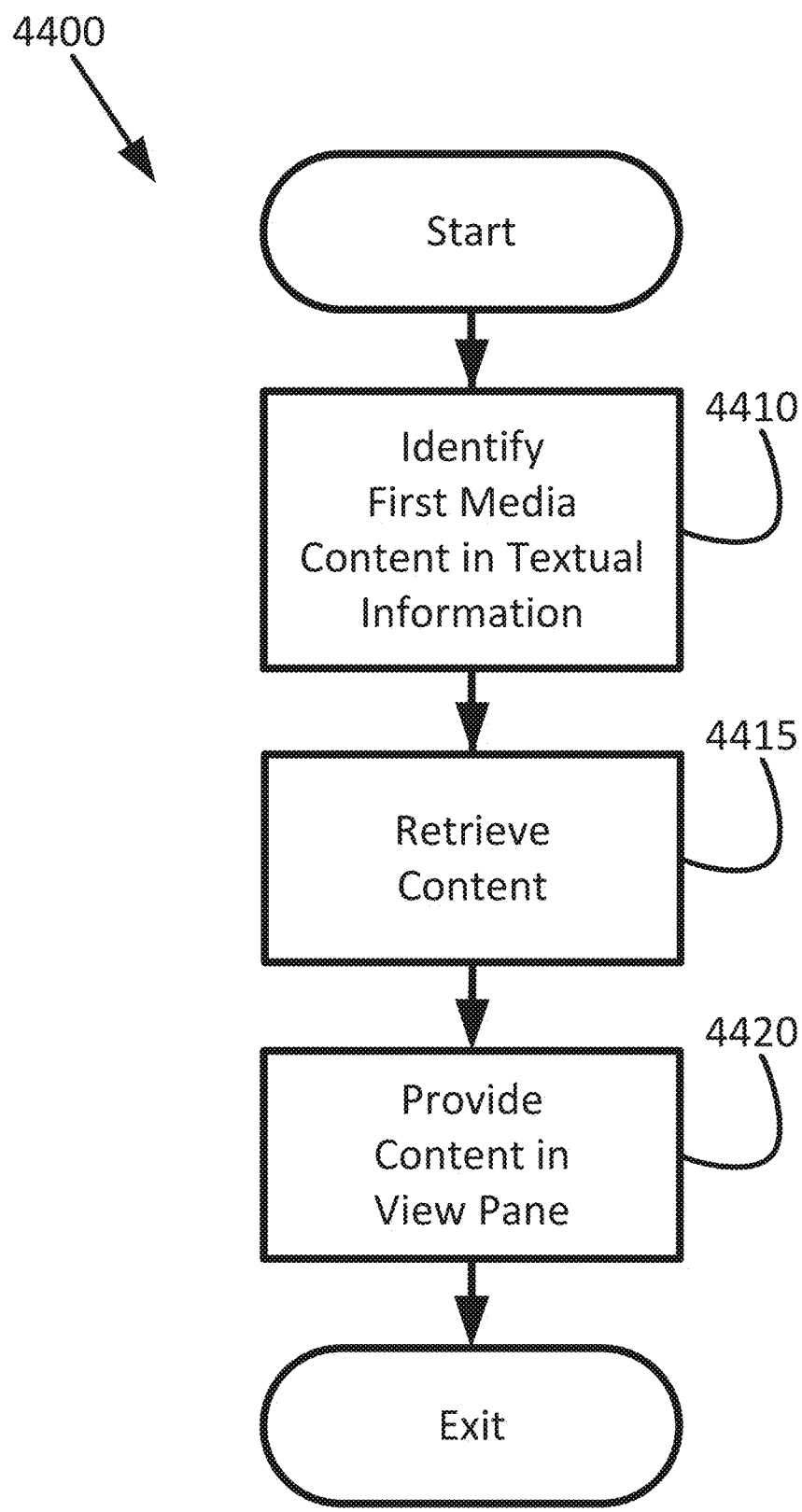
Figure 46:
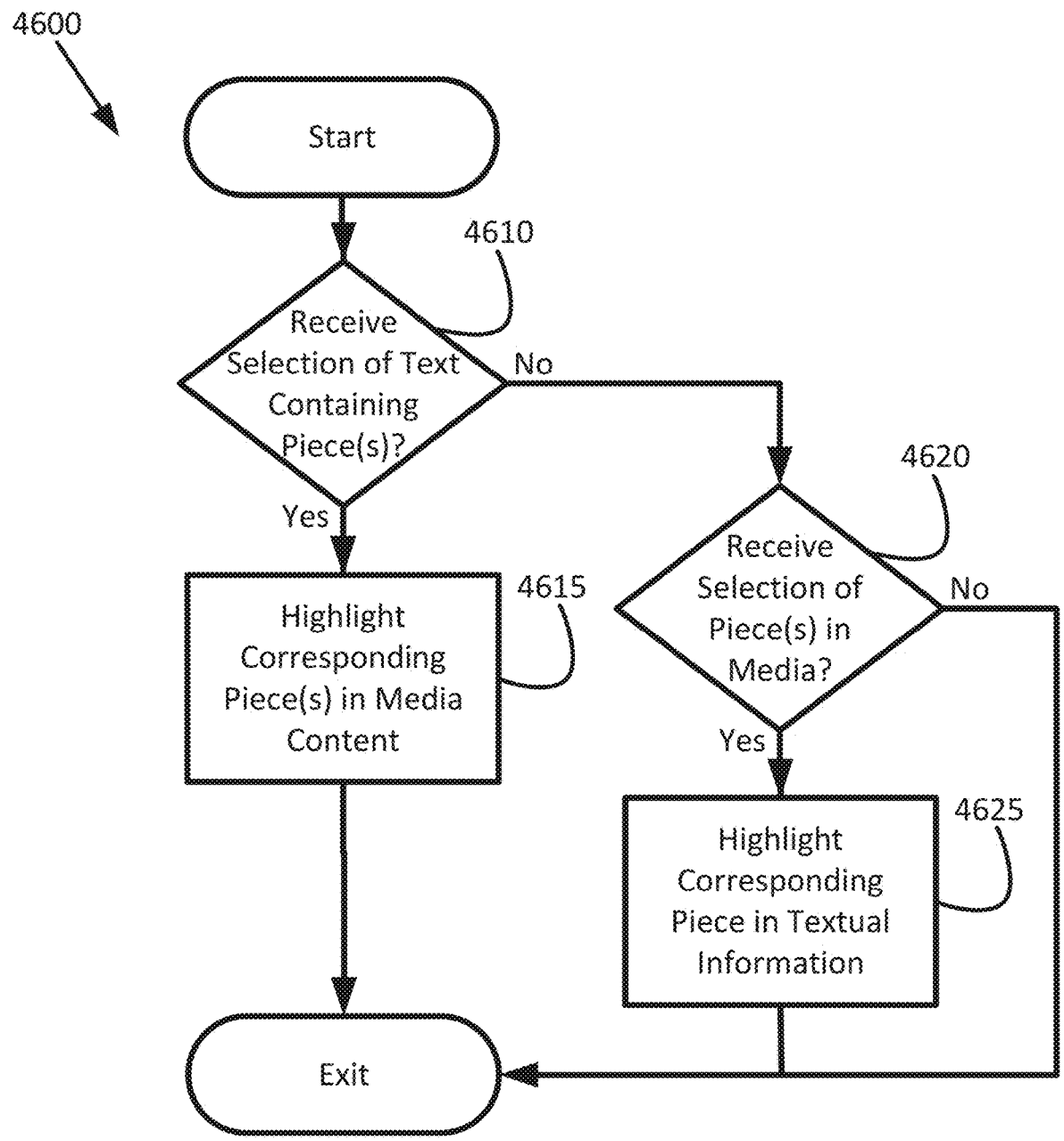
Figure 47A:
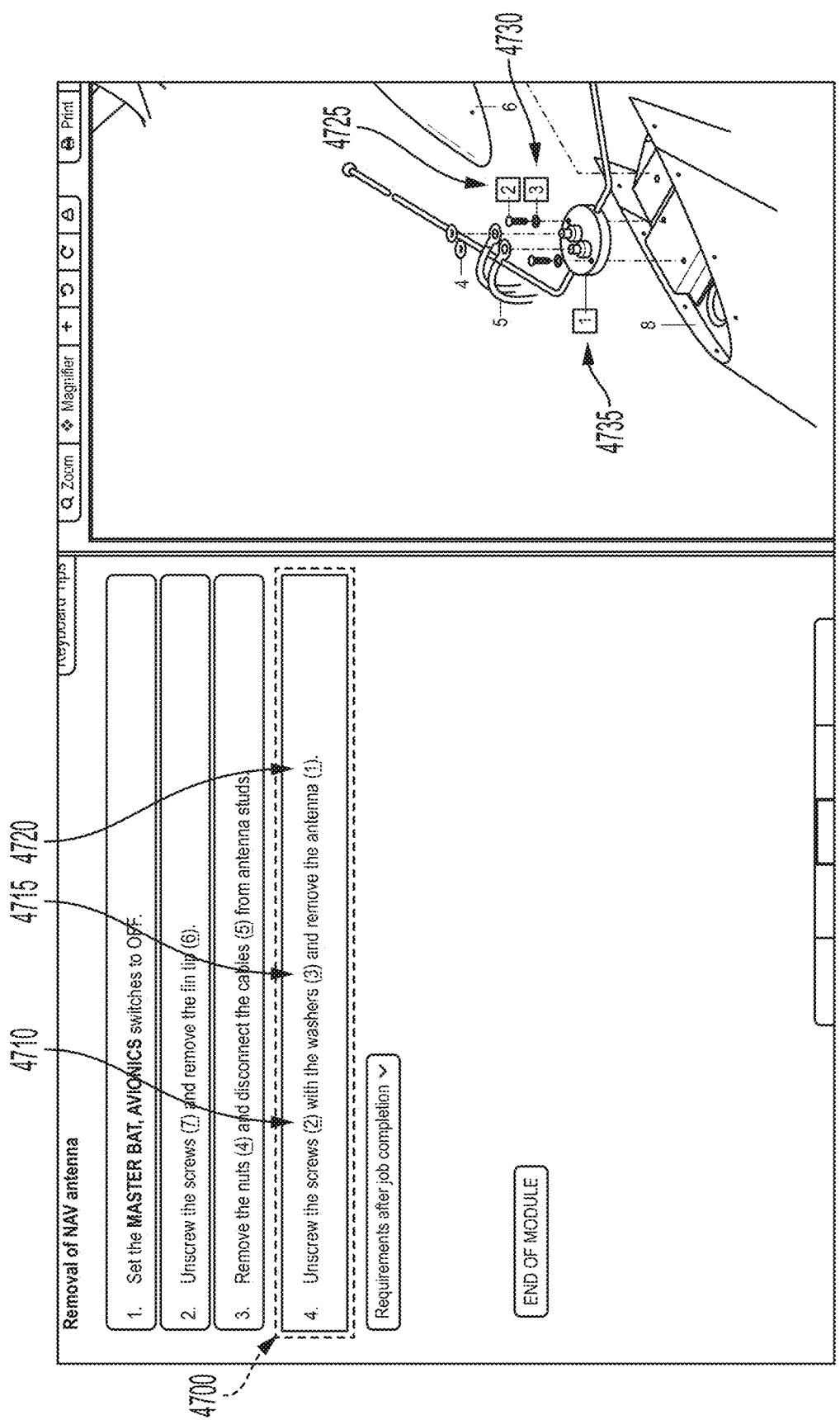
Figure 47B:
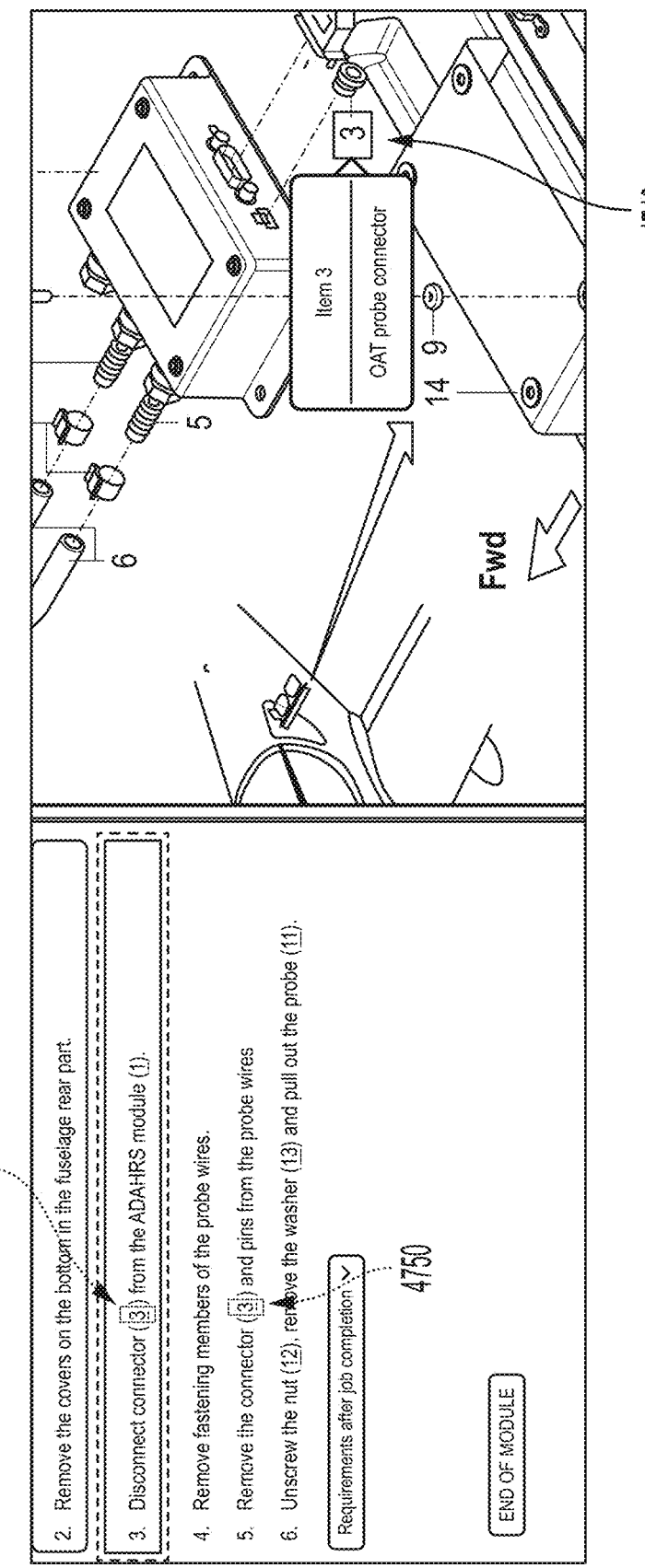
Figure 48:
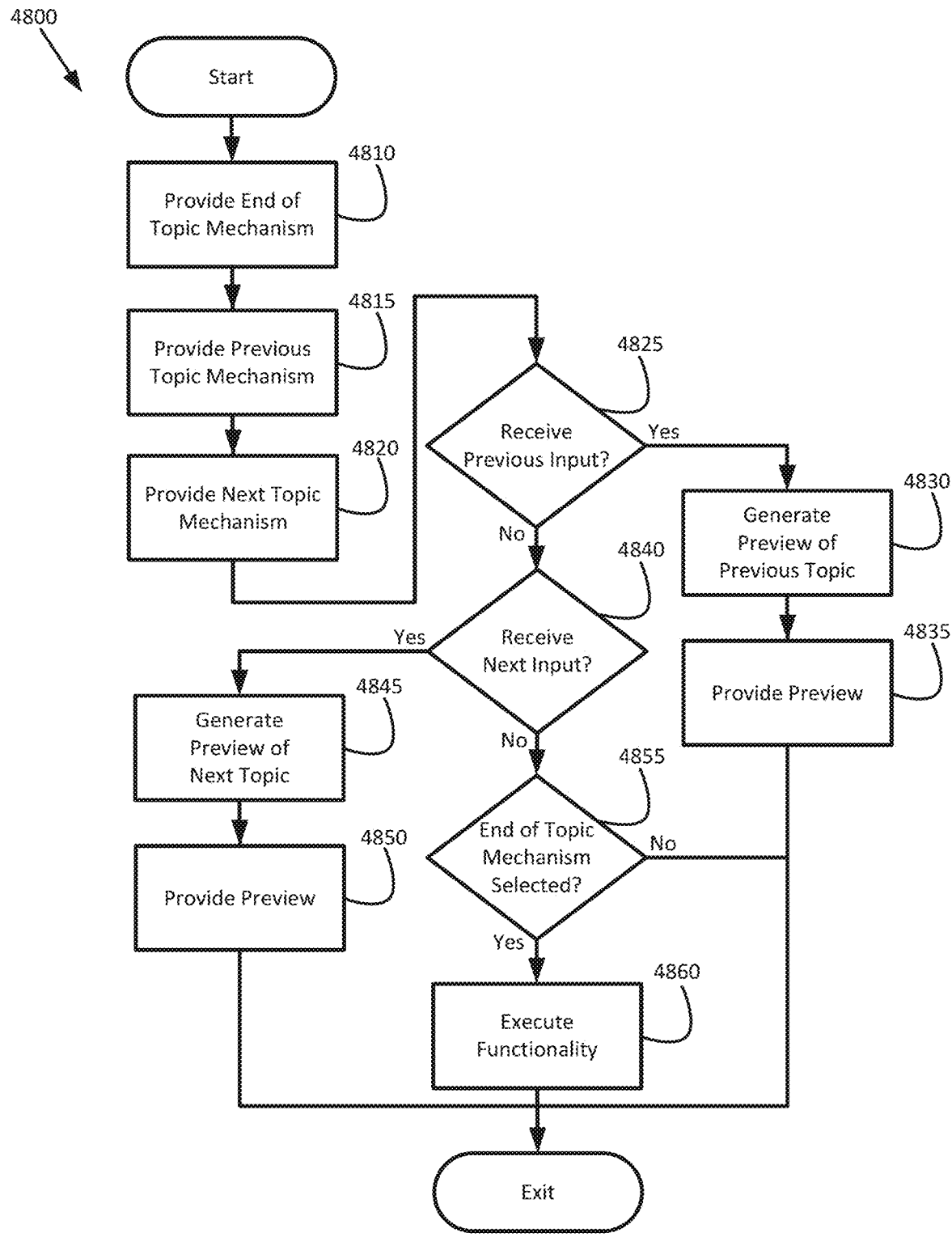
Figure 49A:
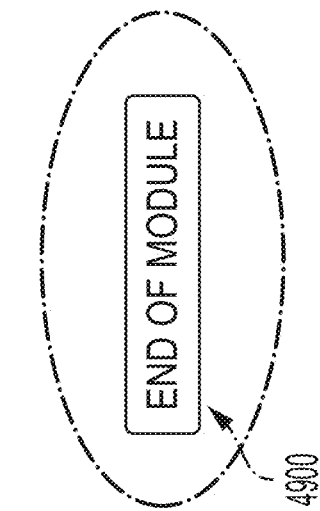
Figure 49B:
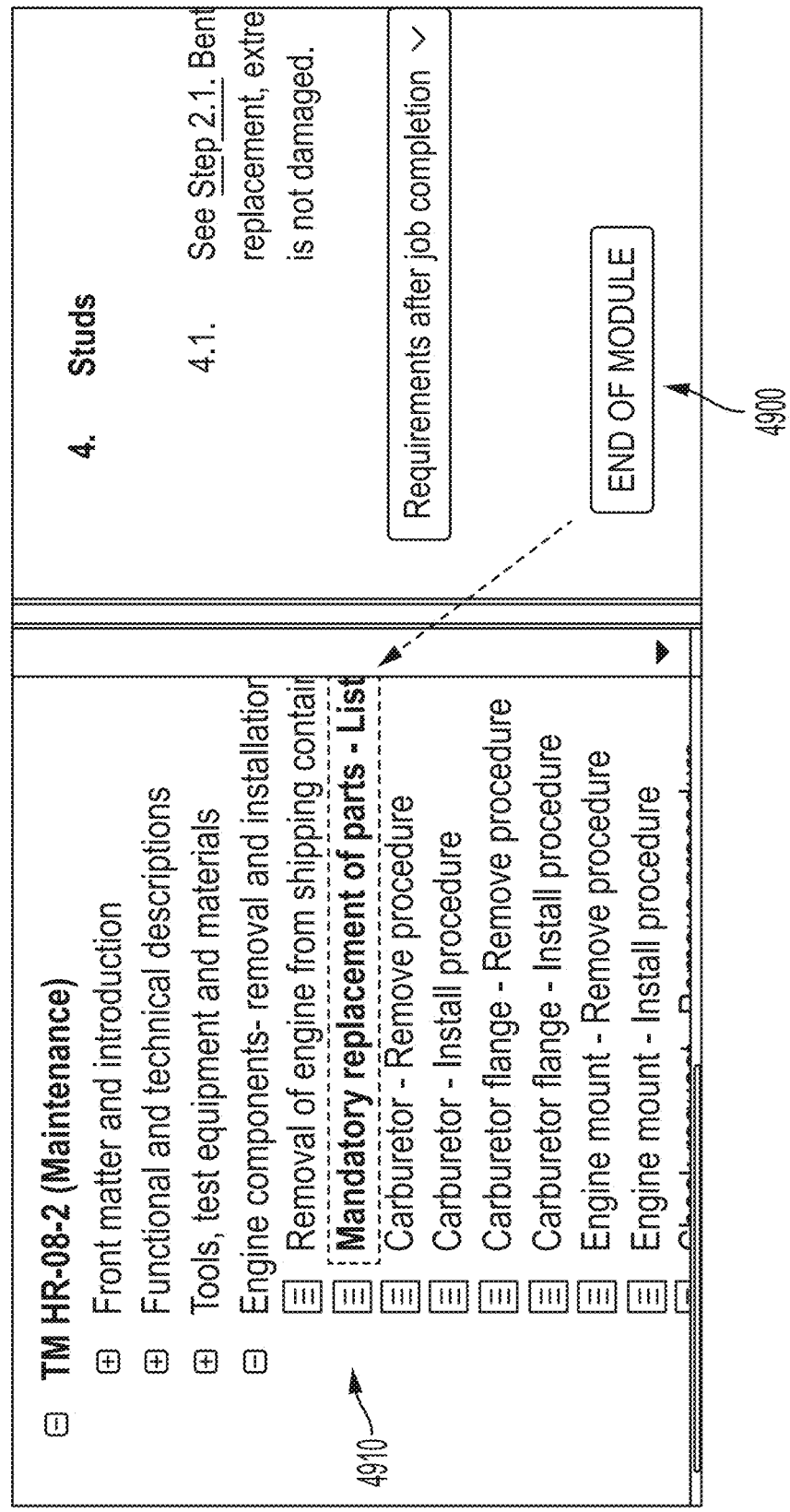
Figure 50:
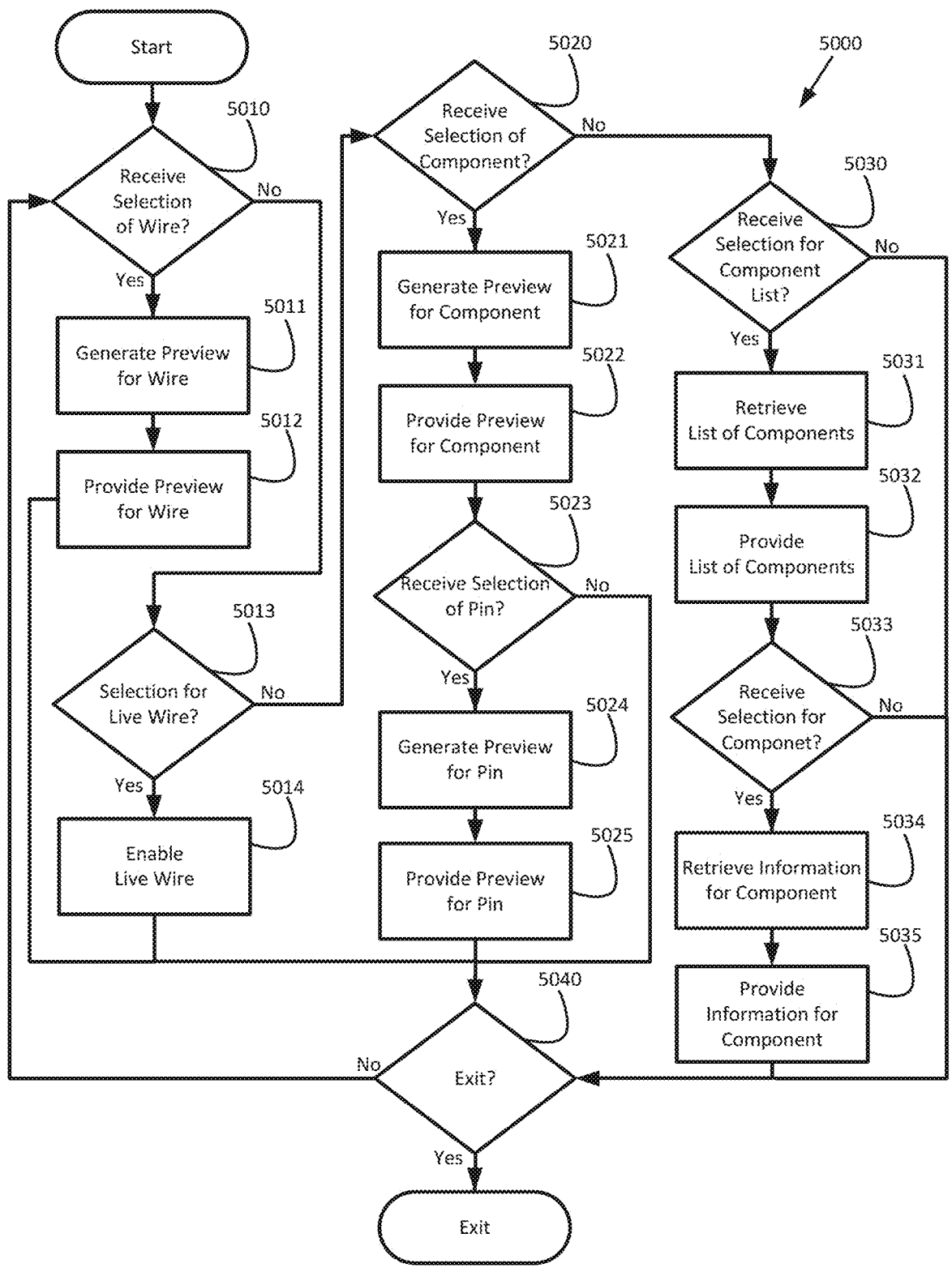
Figure 51A:
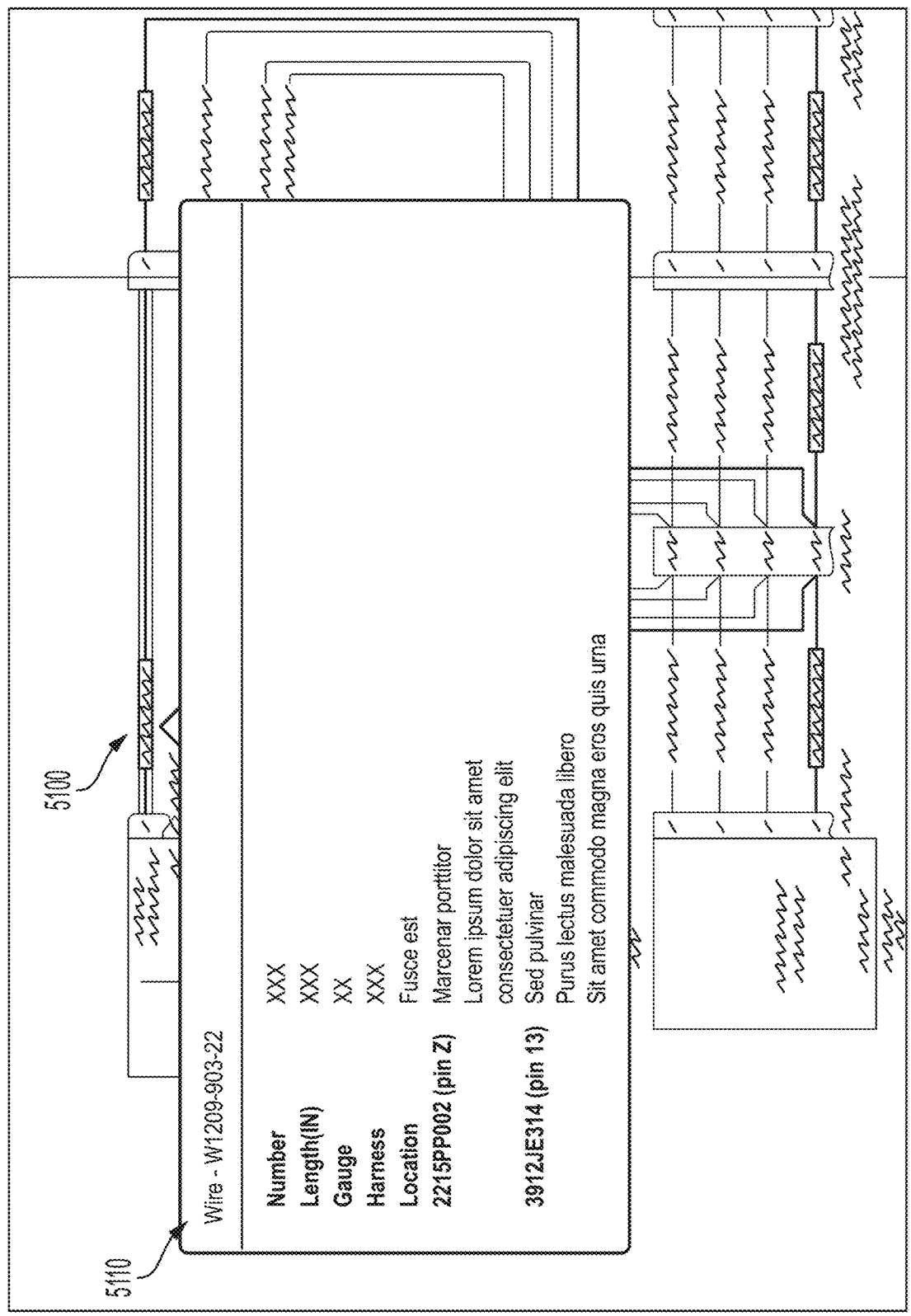
Figure 51B:
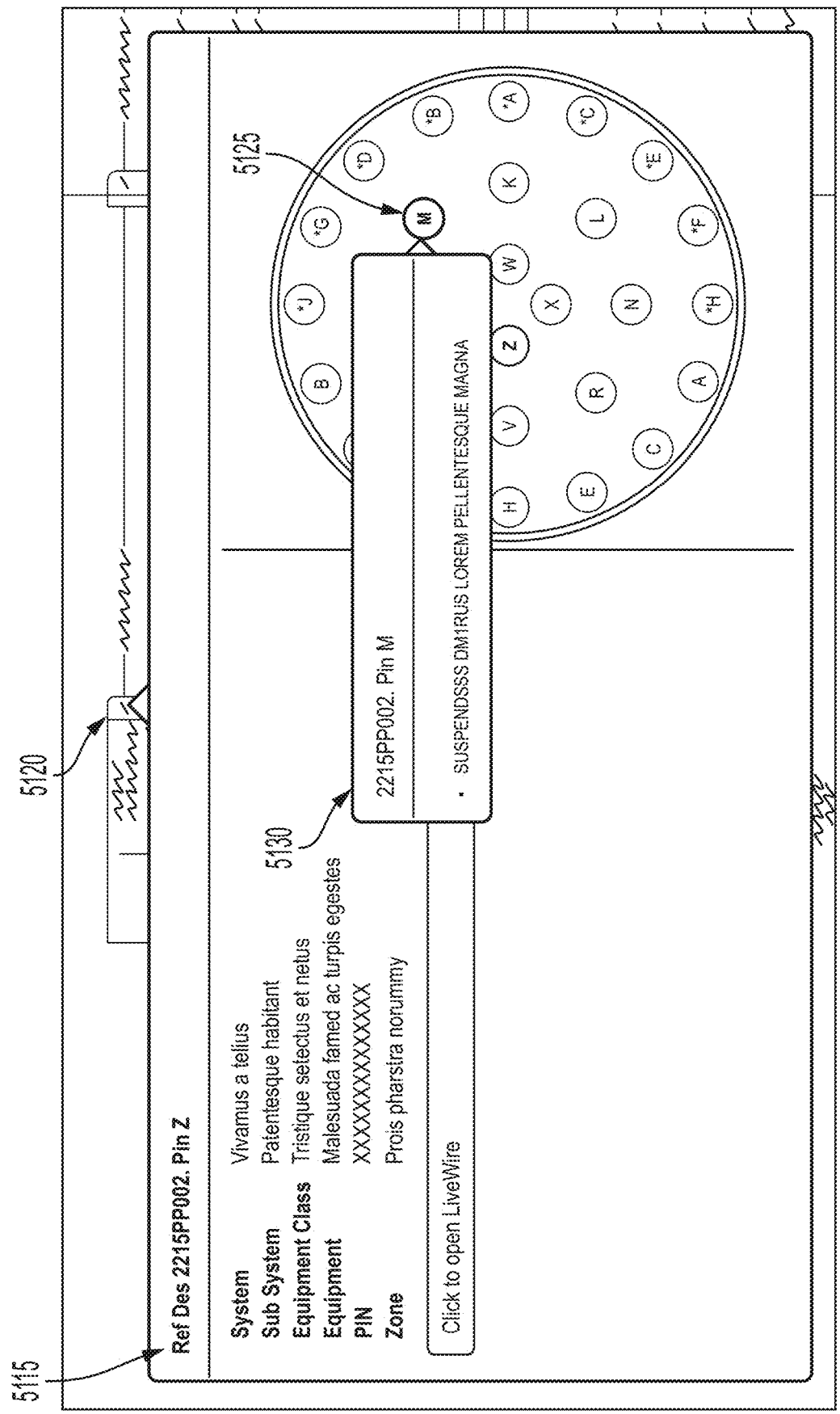
Figure 51C:
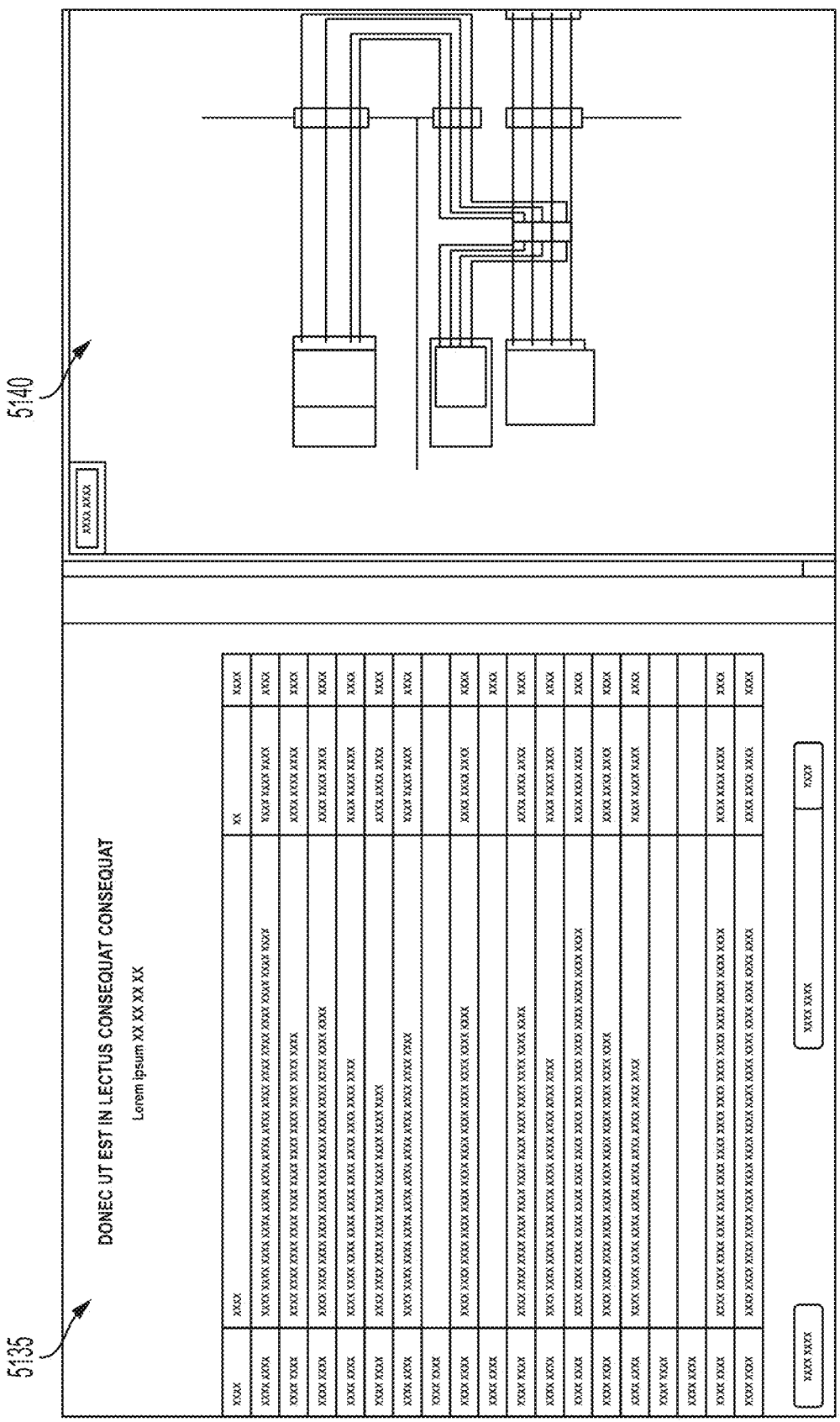
Figure 52:
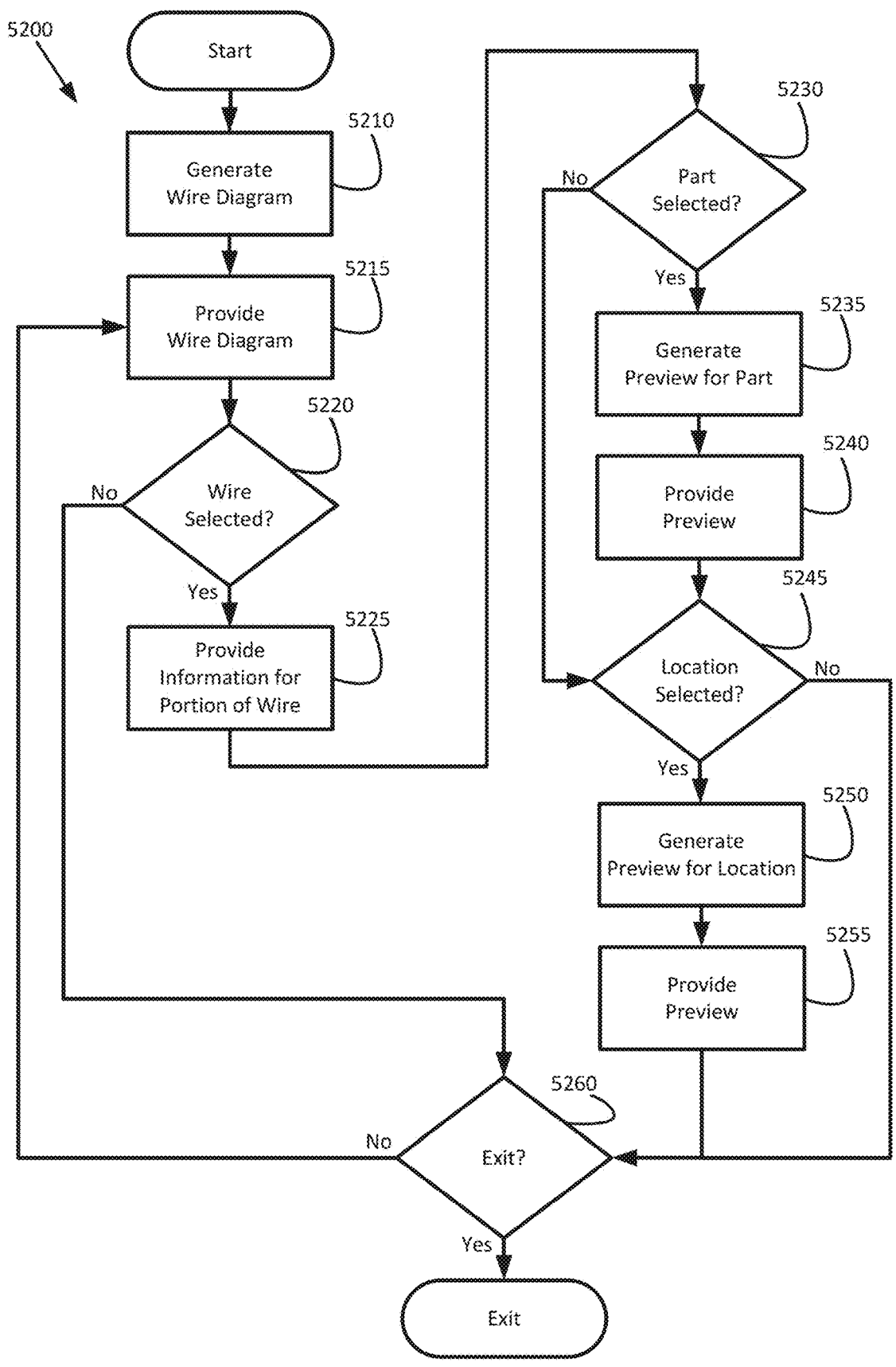
Figure 53:
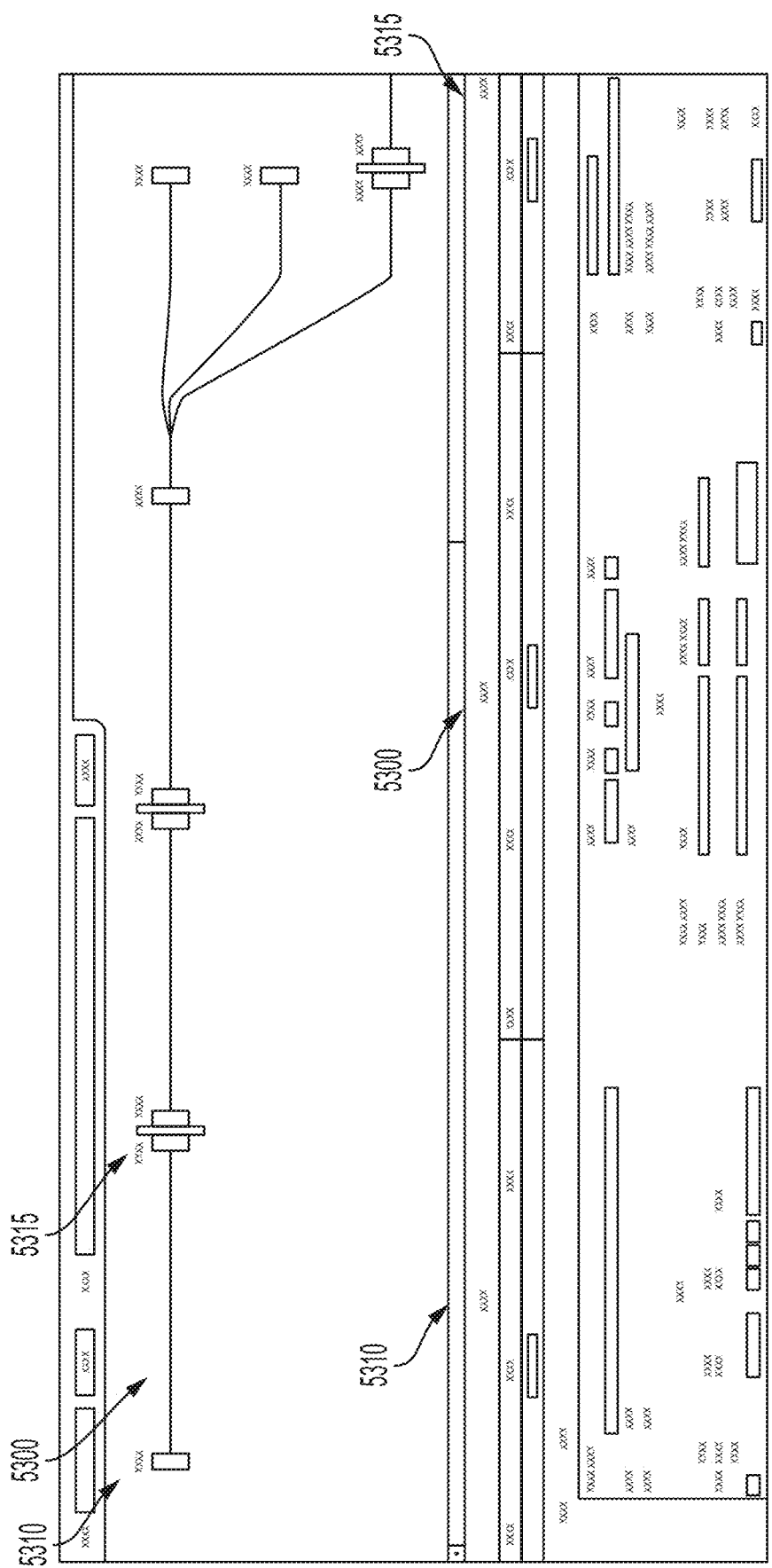
Figure 54:
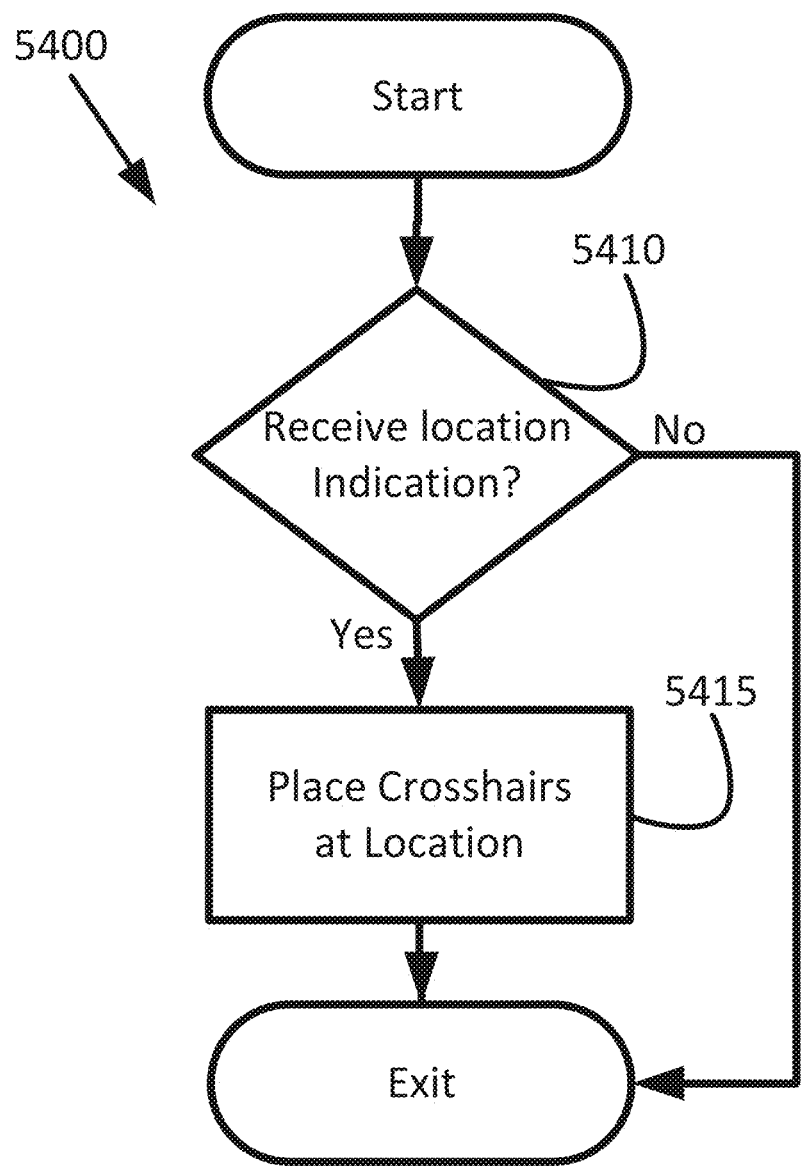
Figure 55:
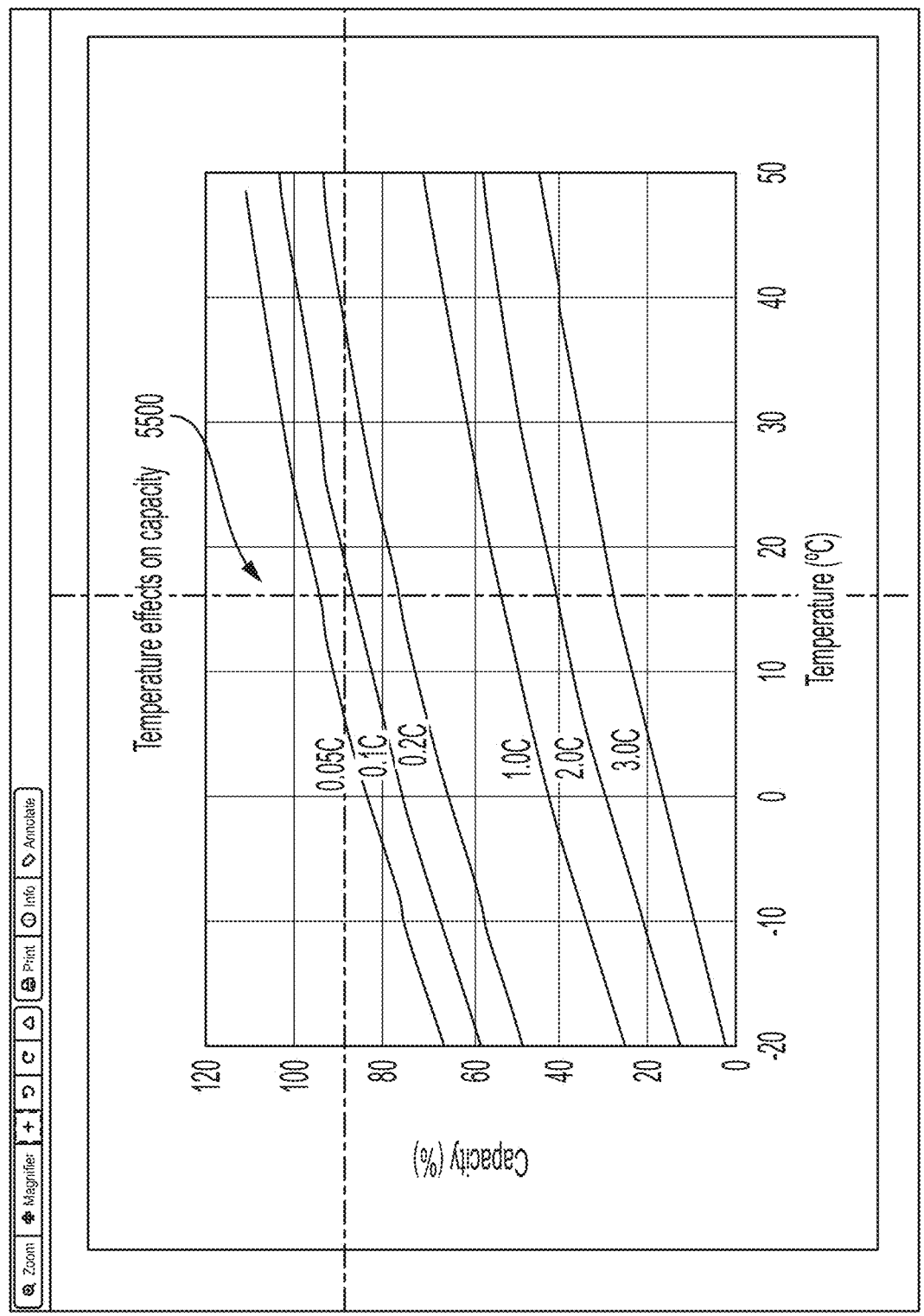
Figure 56:
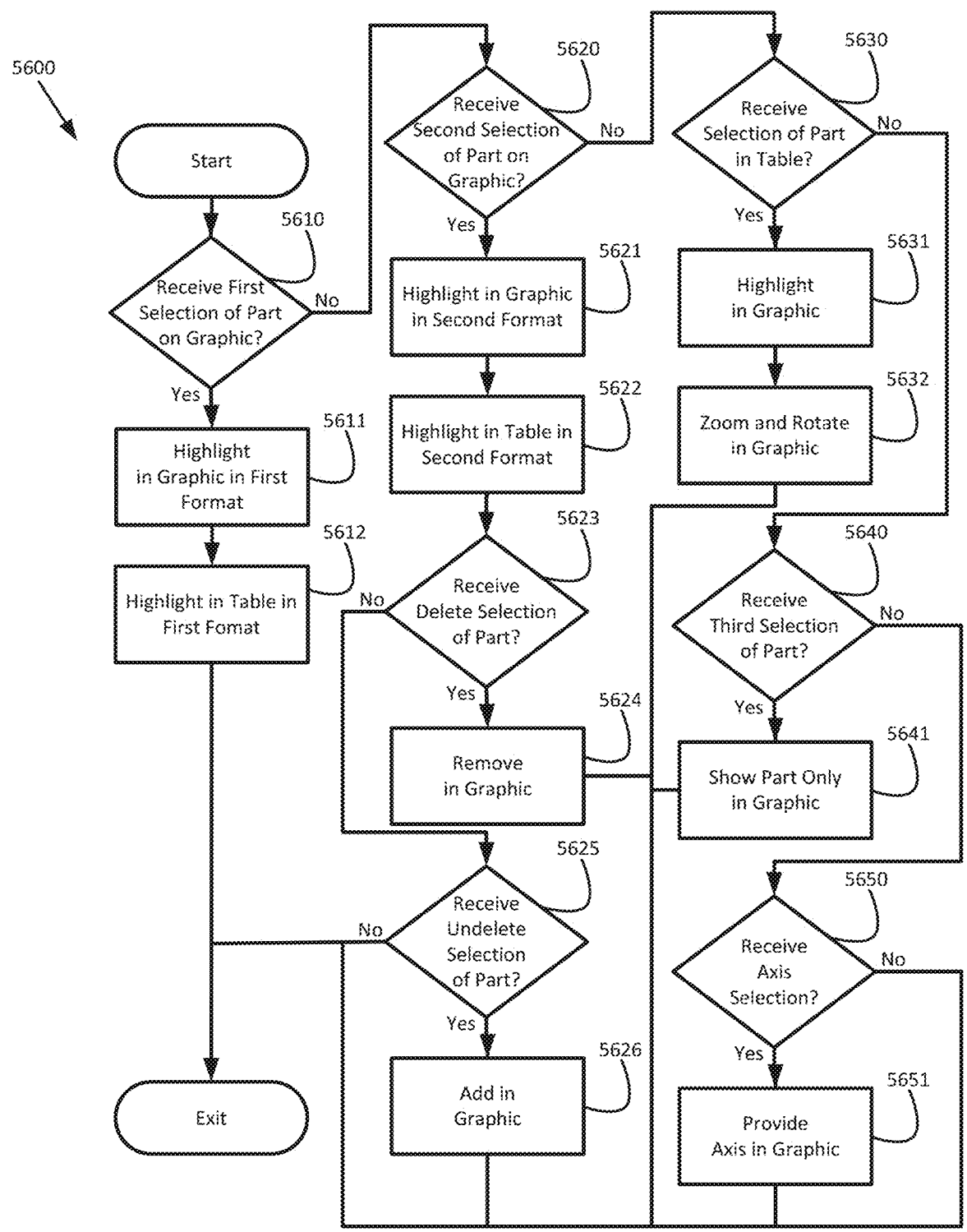
Figure 57A:
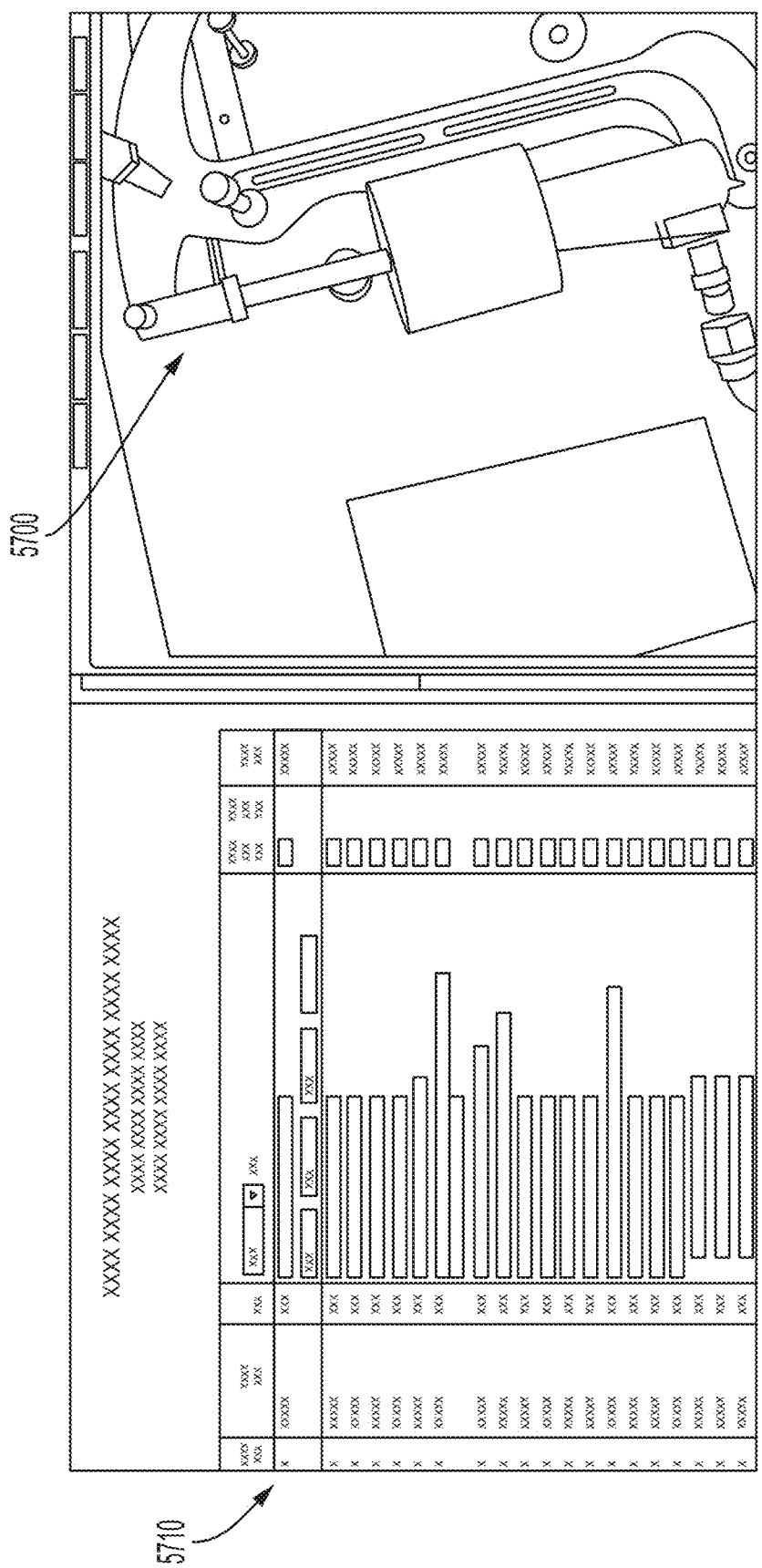
Figure 57C:
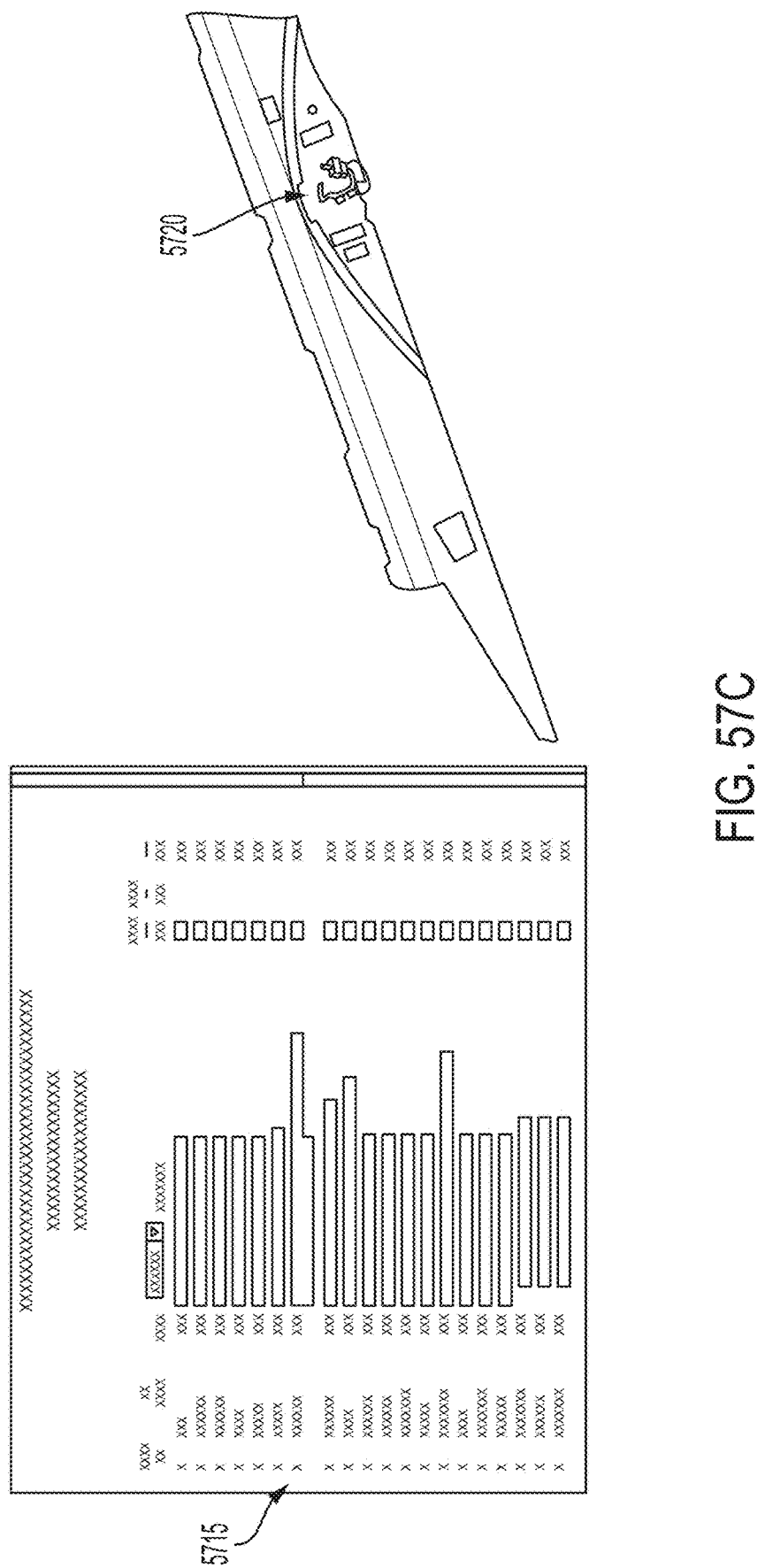
Figure 57D:
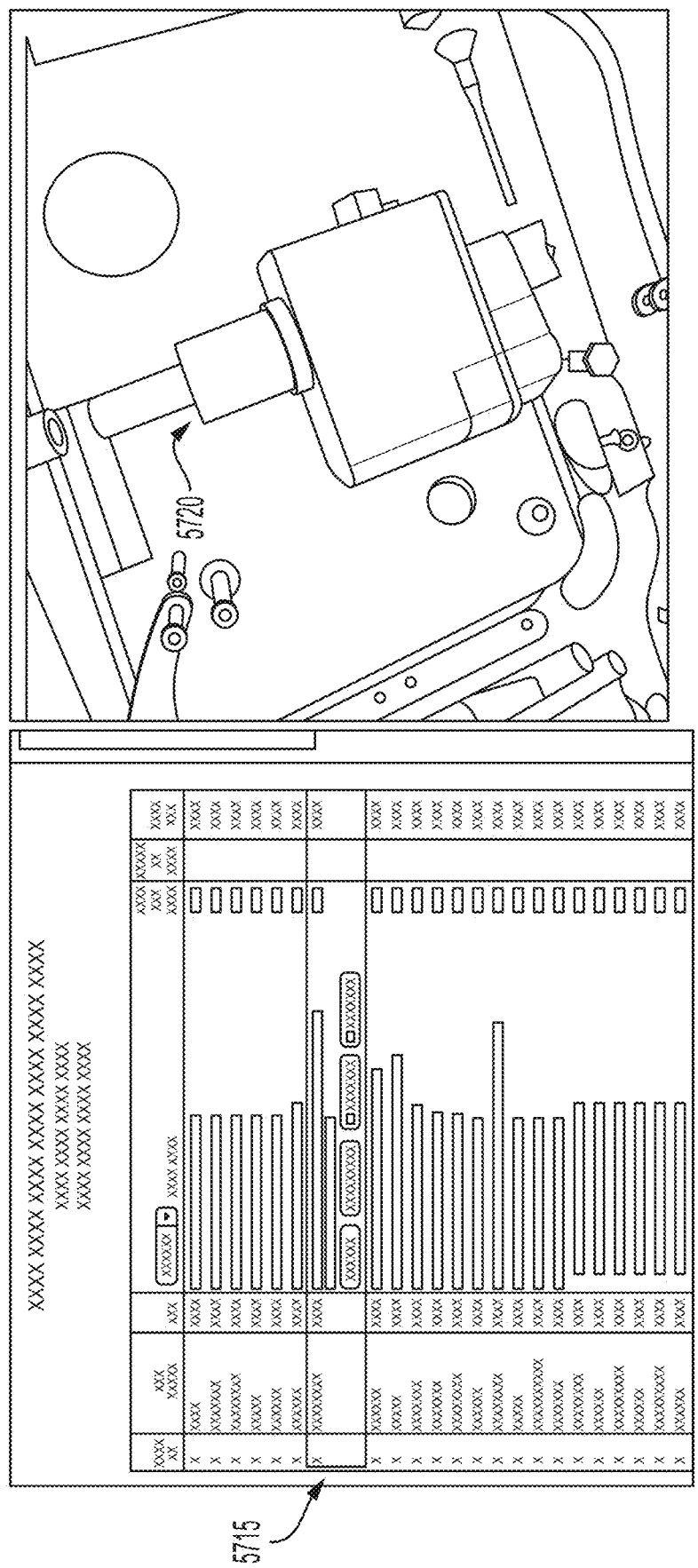
Figure 57E:
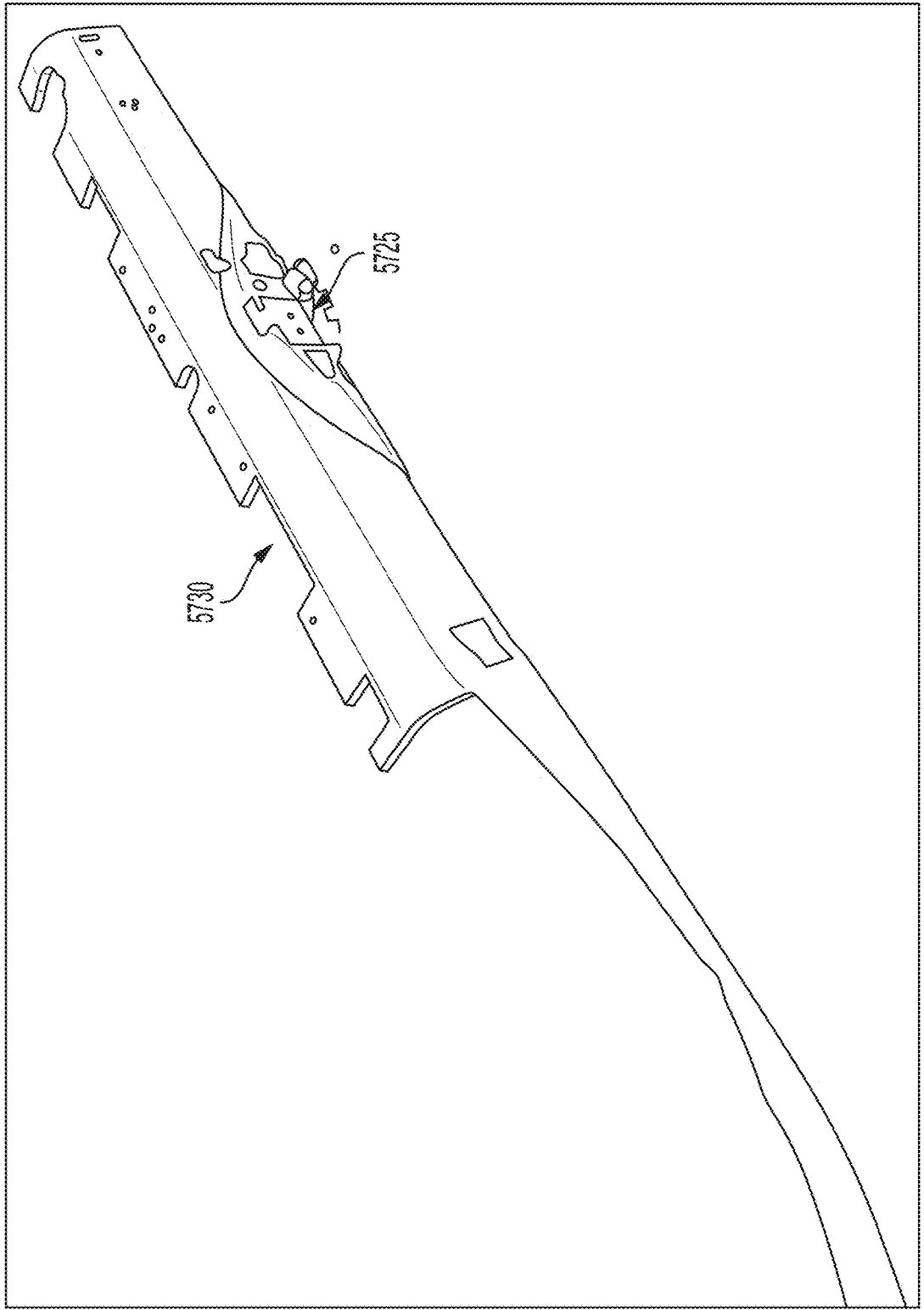
Figure 57F:
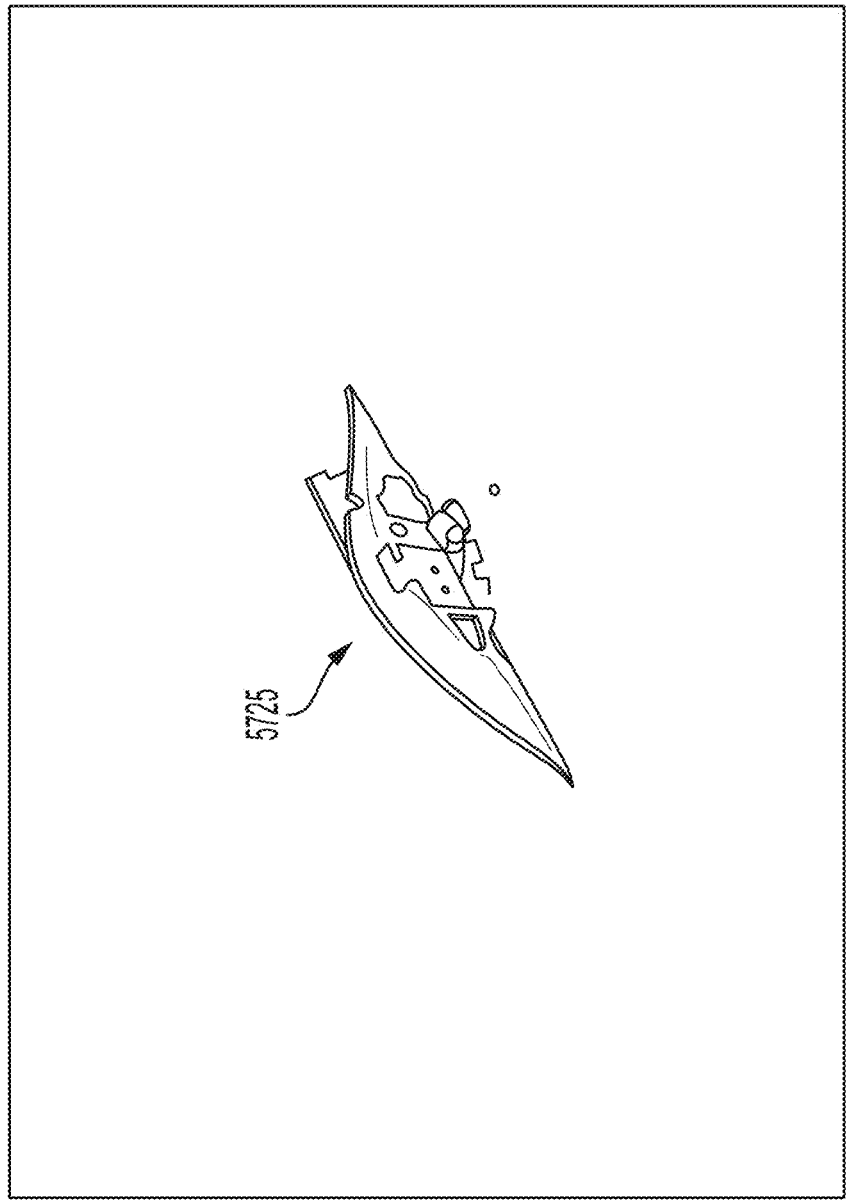
Figure 57G:
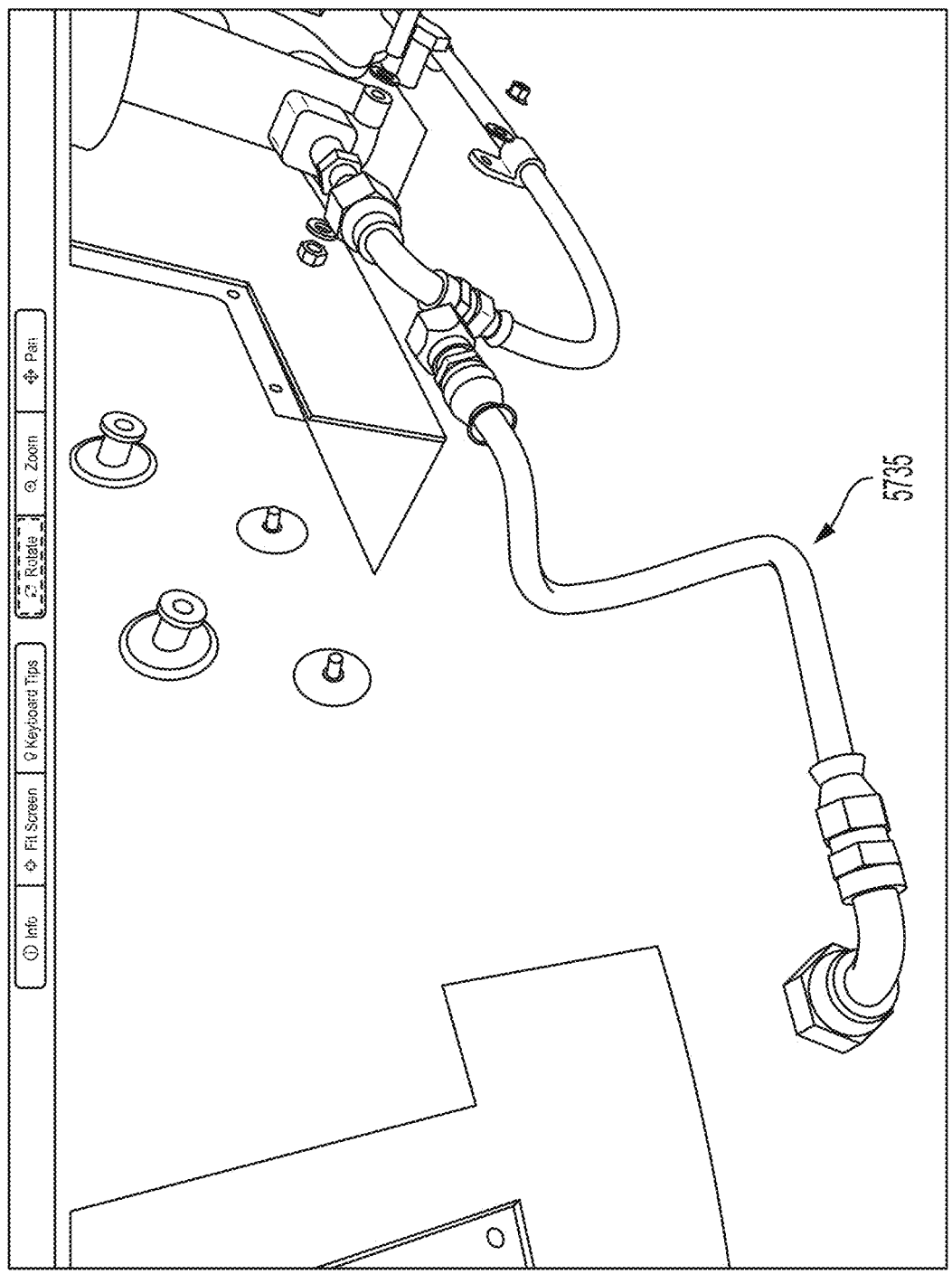
Figure 57H:
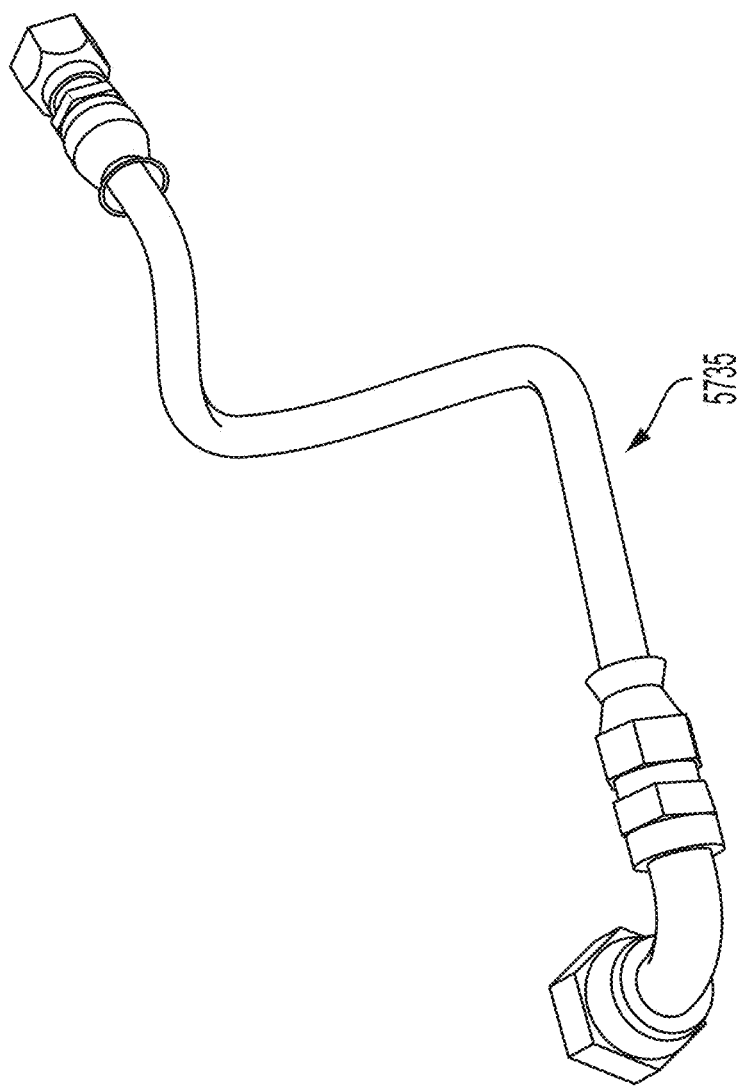
Figure 57I:
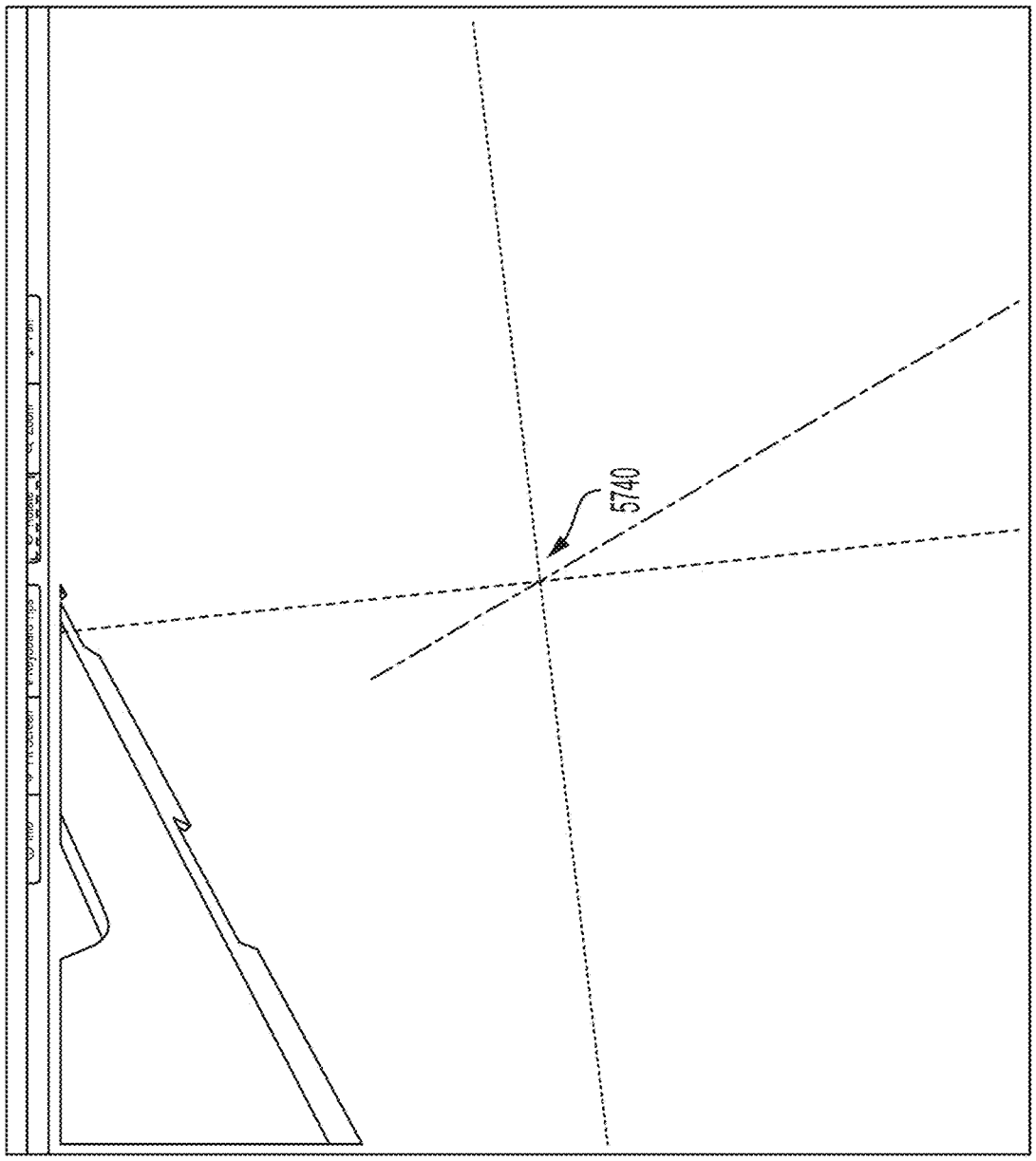
Figure 58:
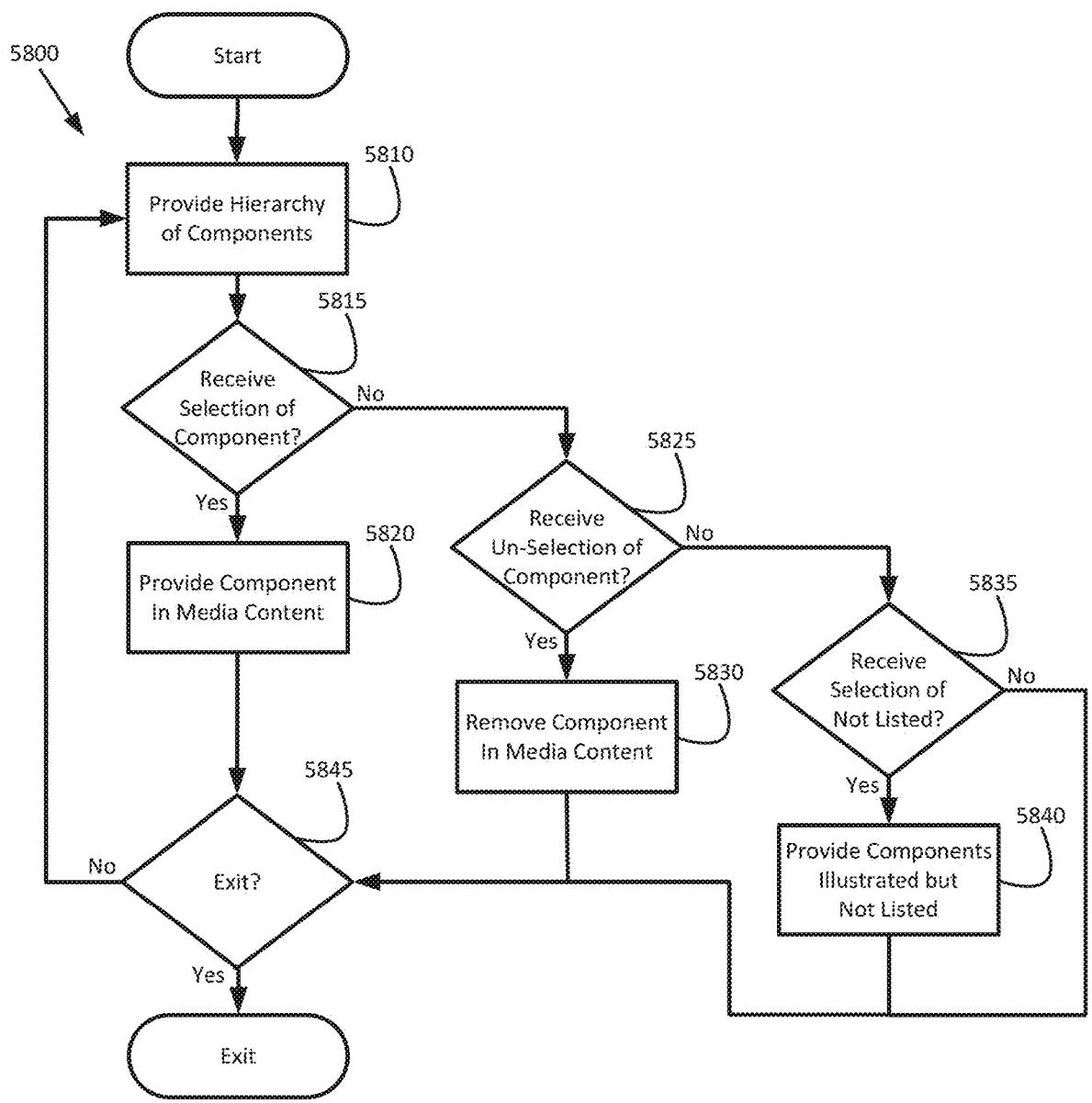
Figure 59A:
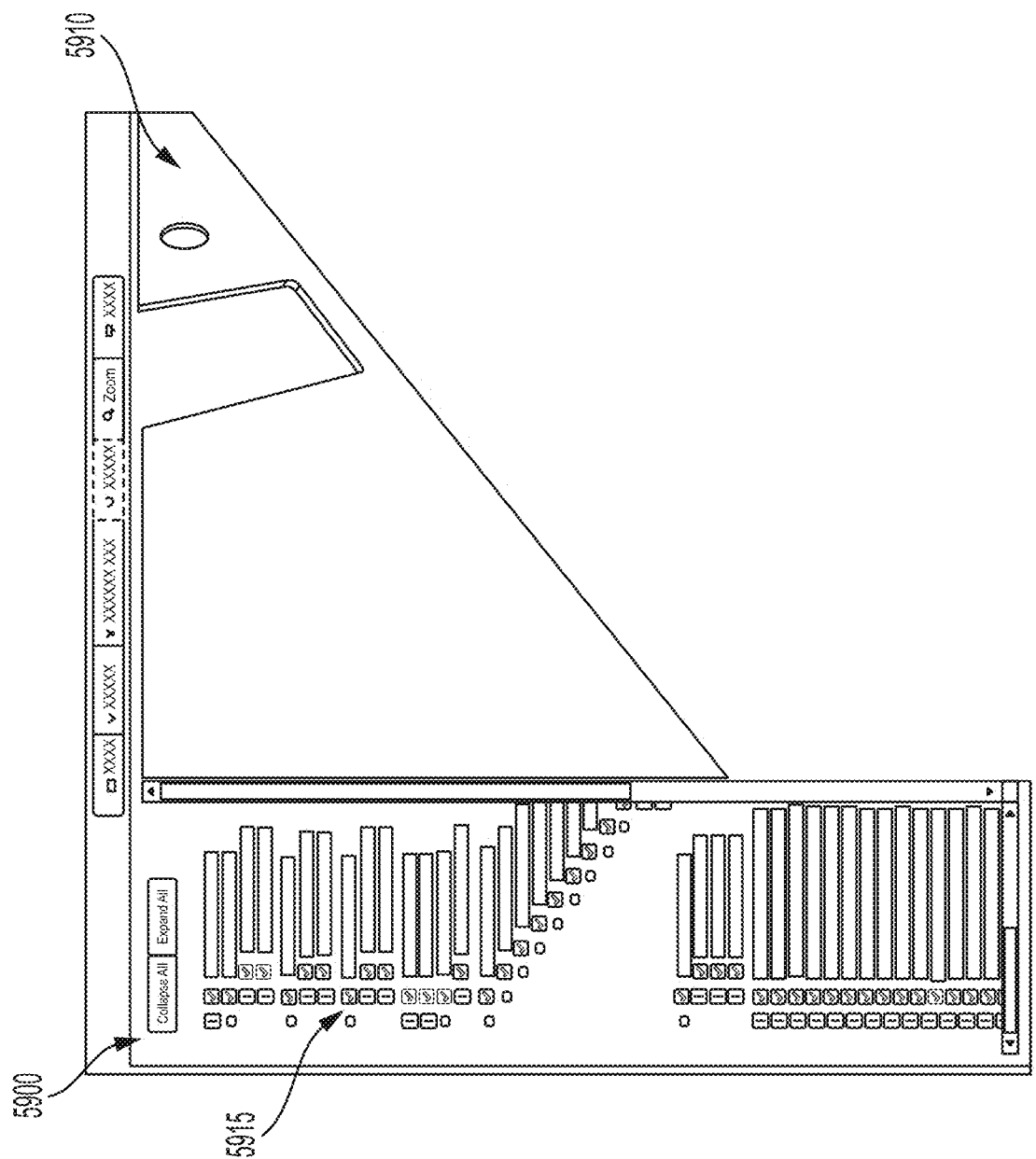
Figure 60:
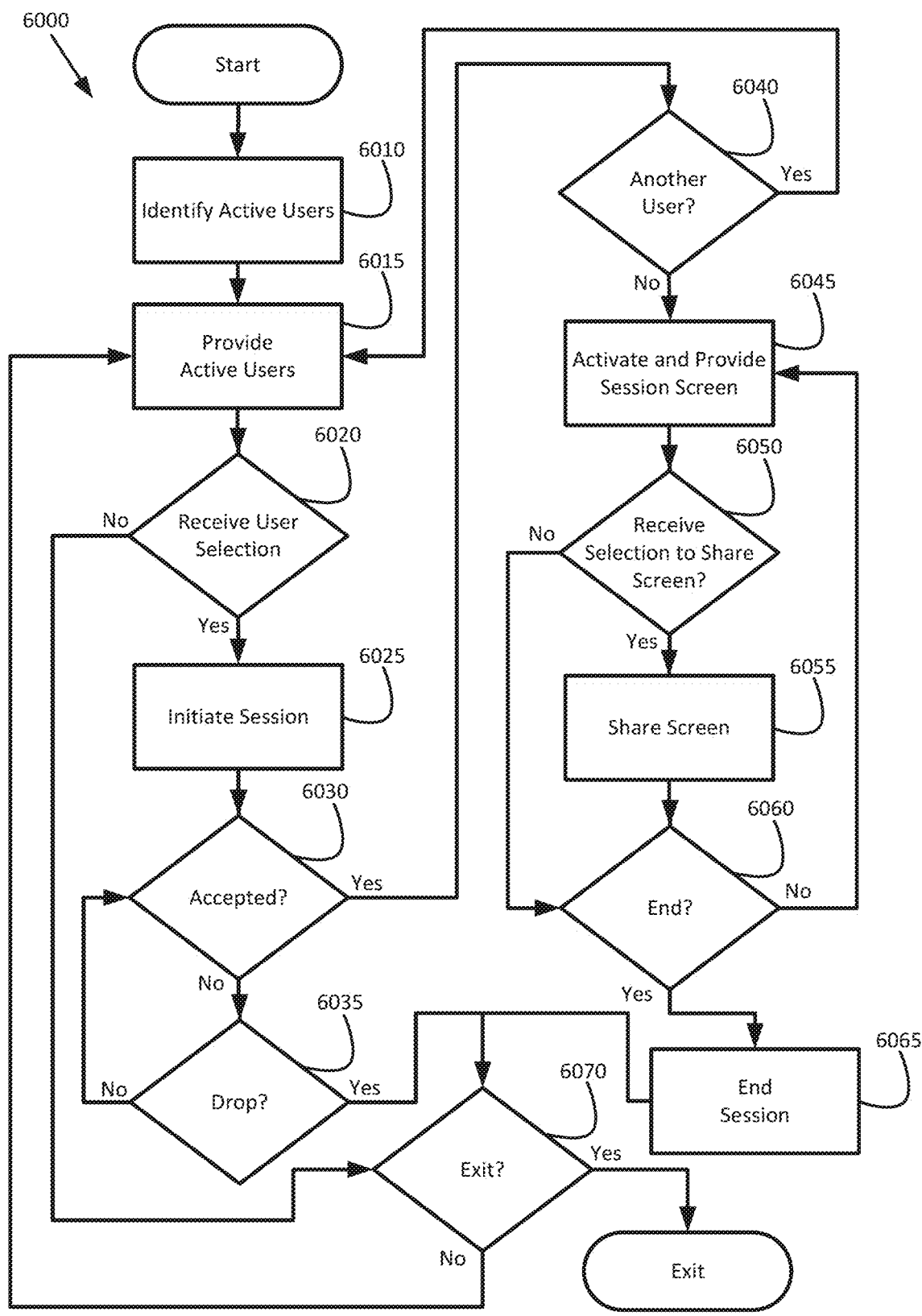
Figure 61A:
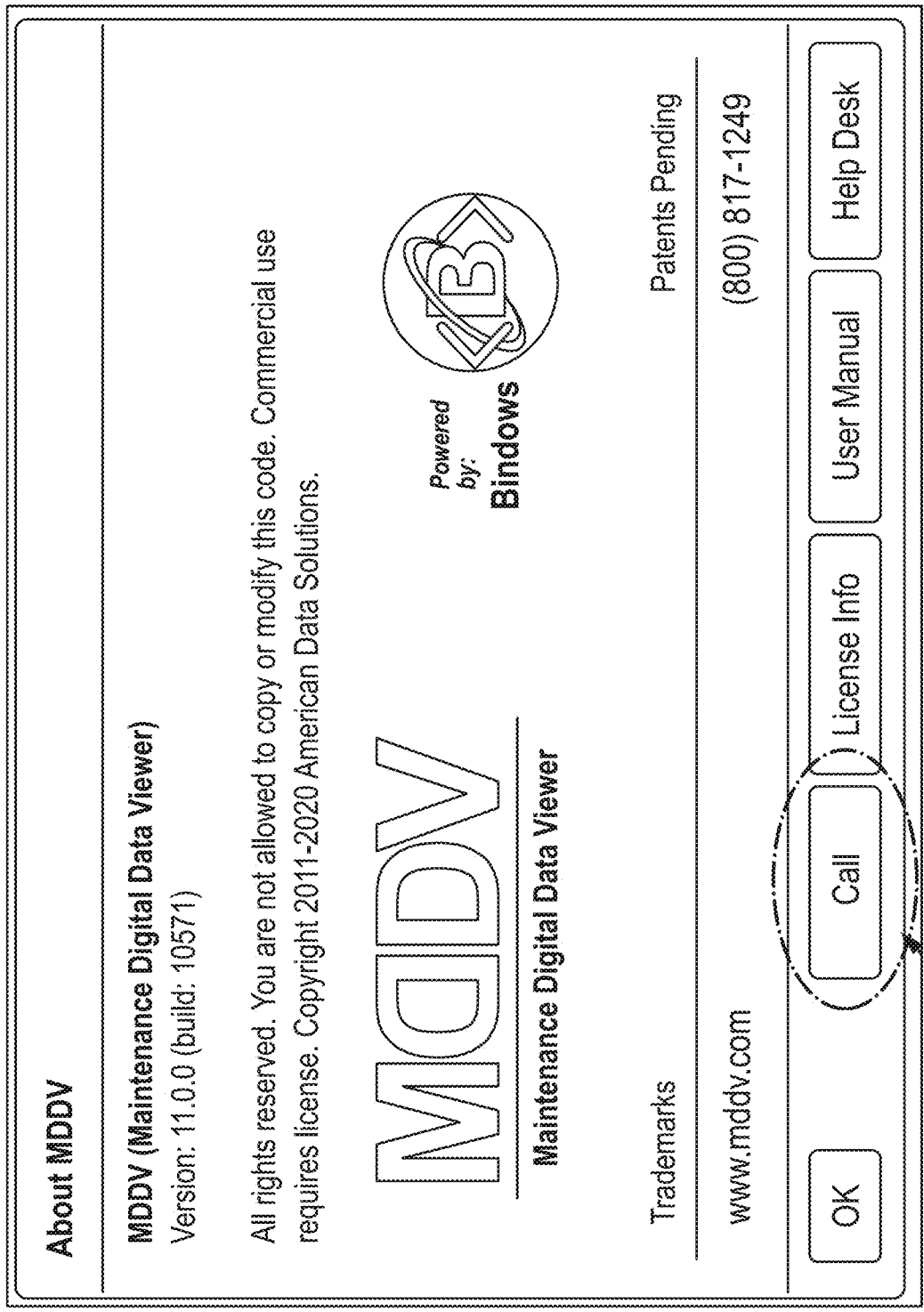
Figure 61B:
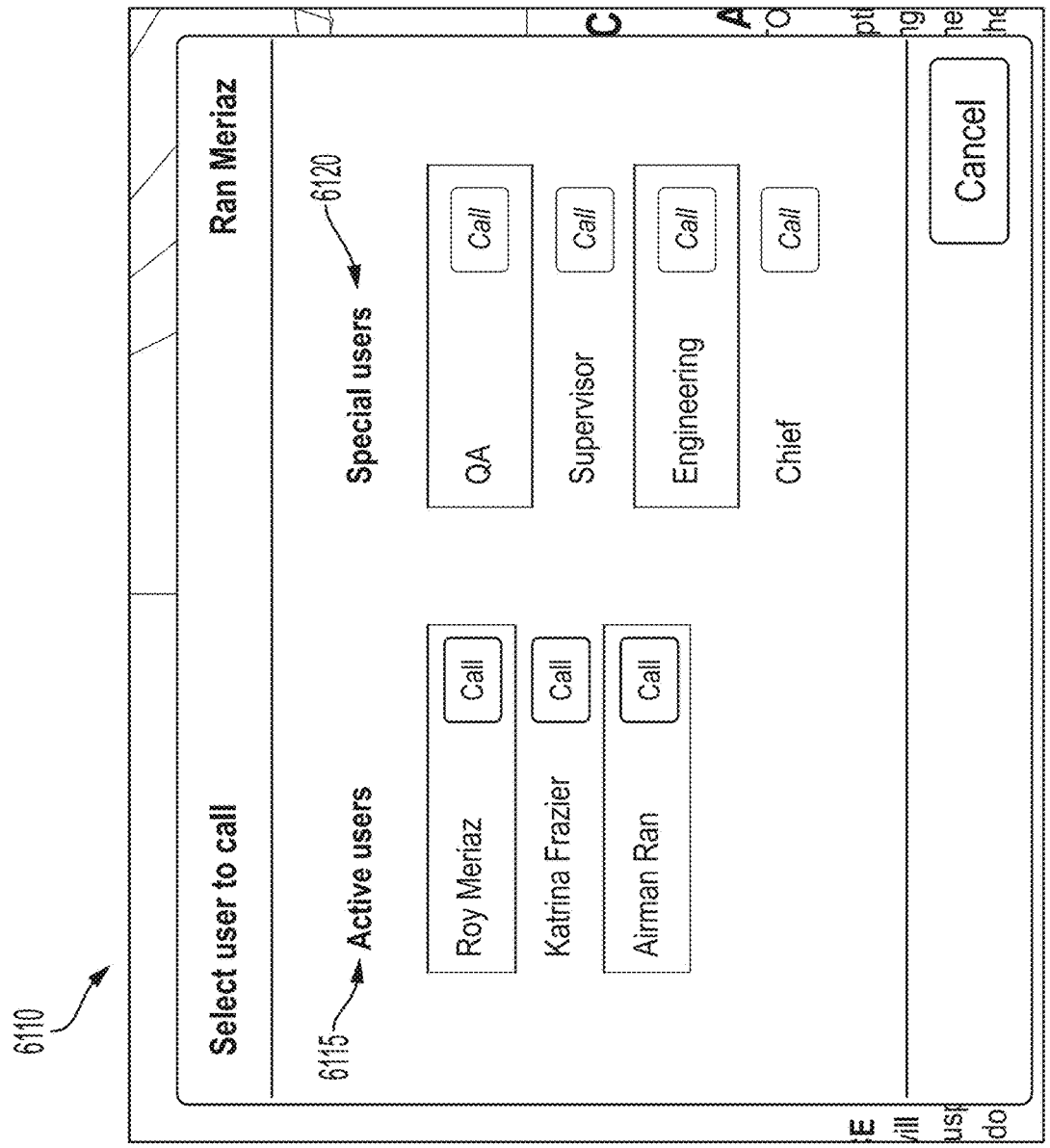
Figure 61C:
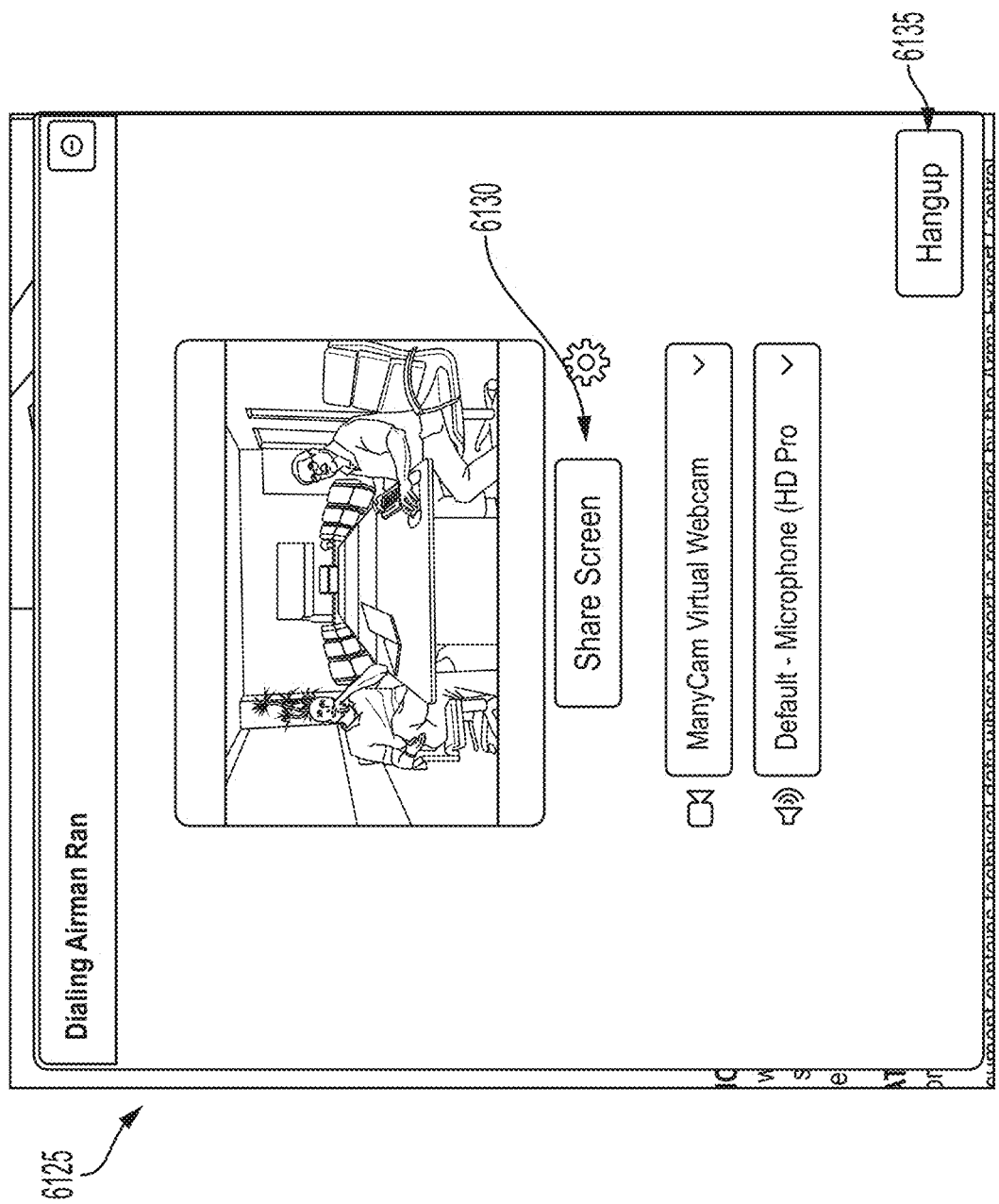
Figure 61D:
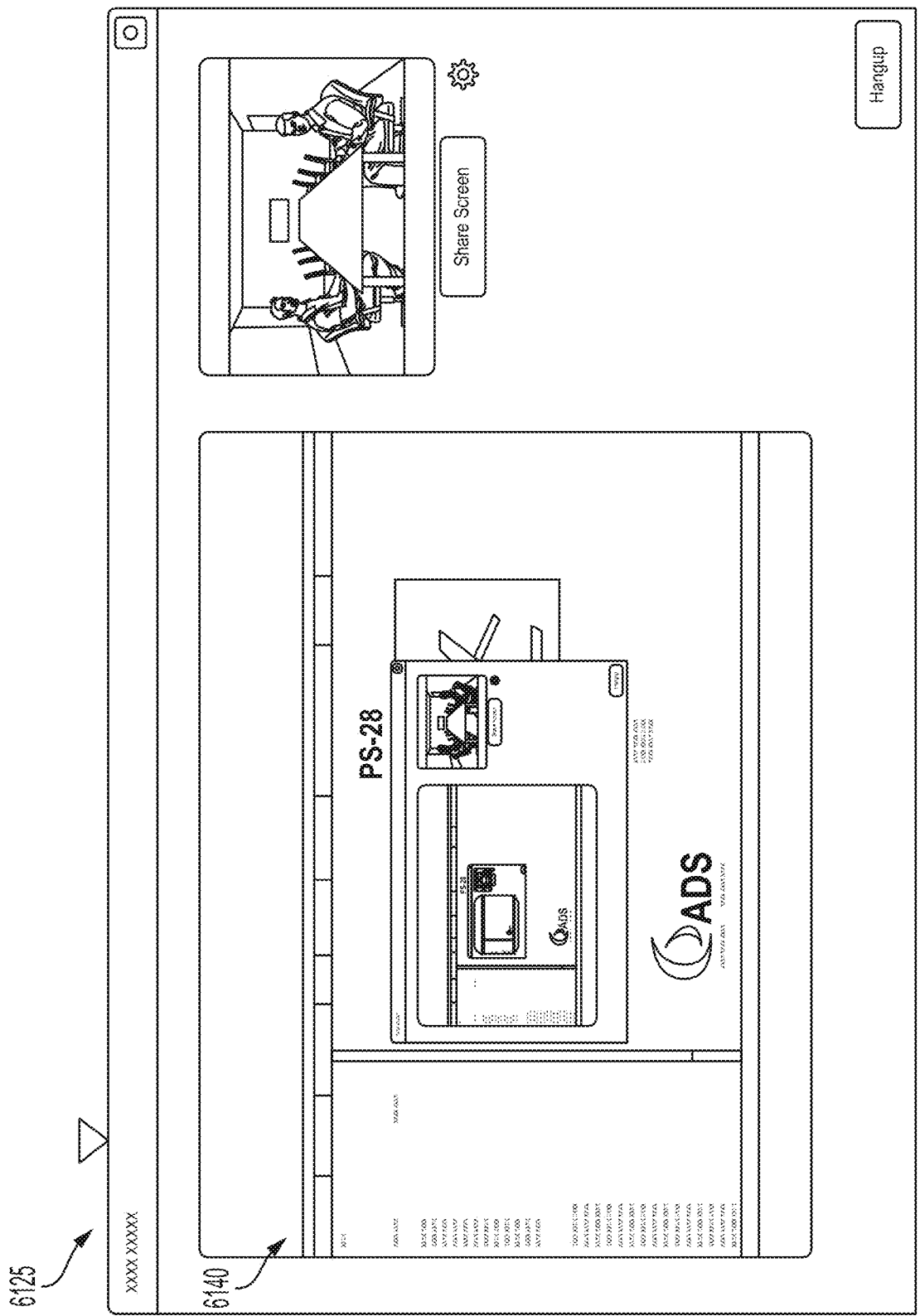
Figure 62:
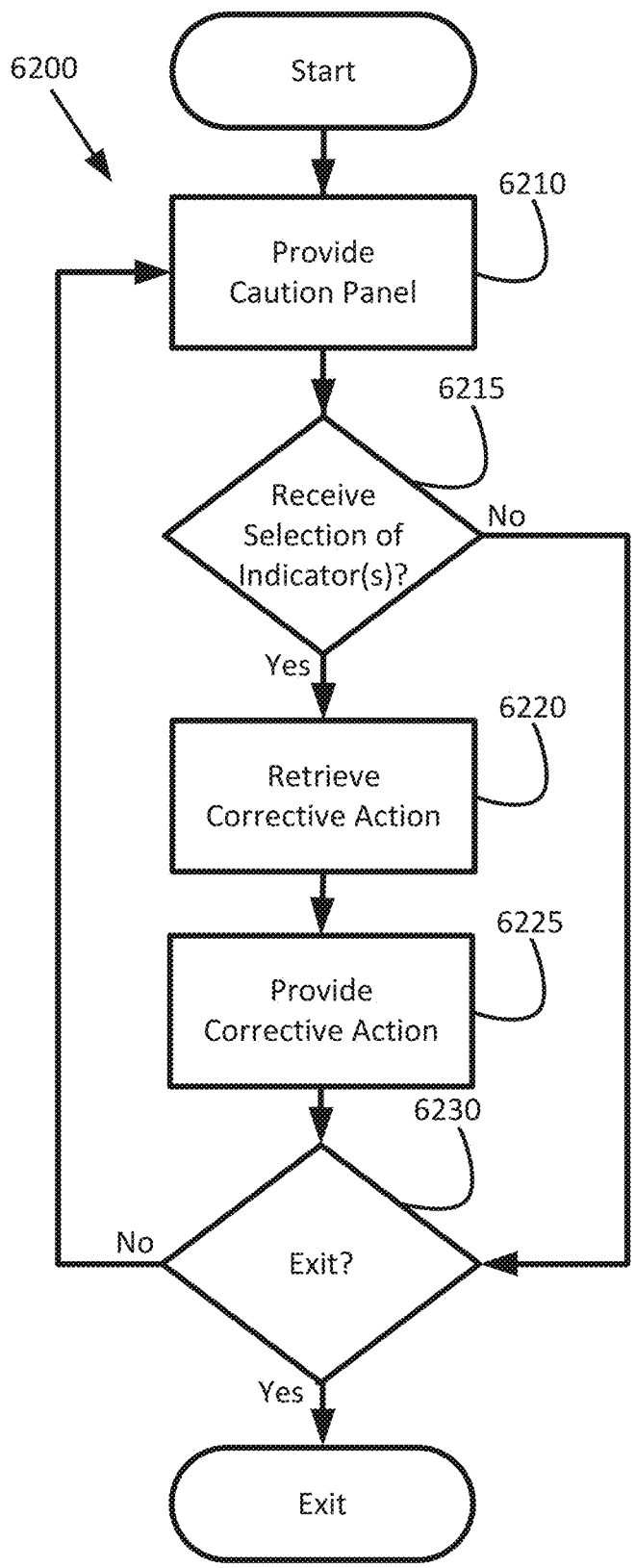
Figure 63A:
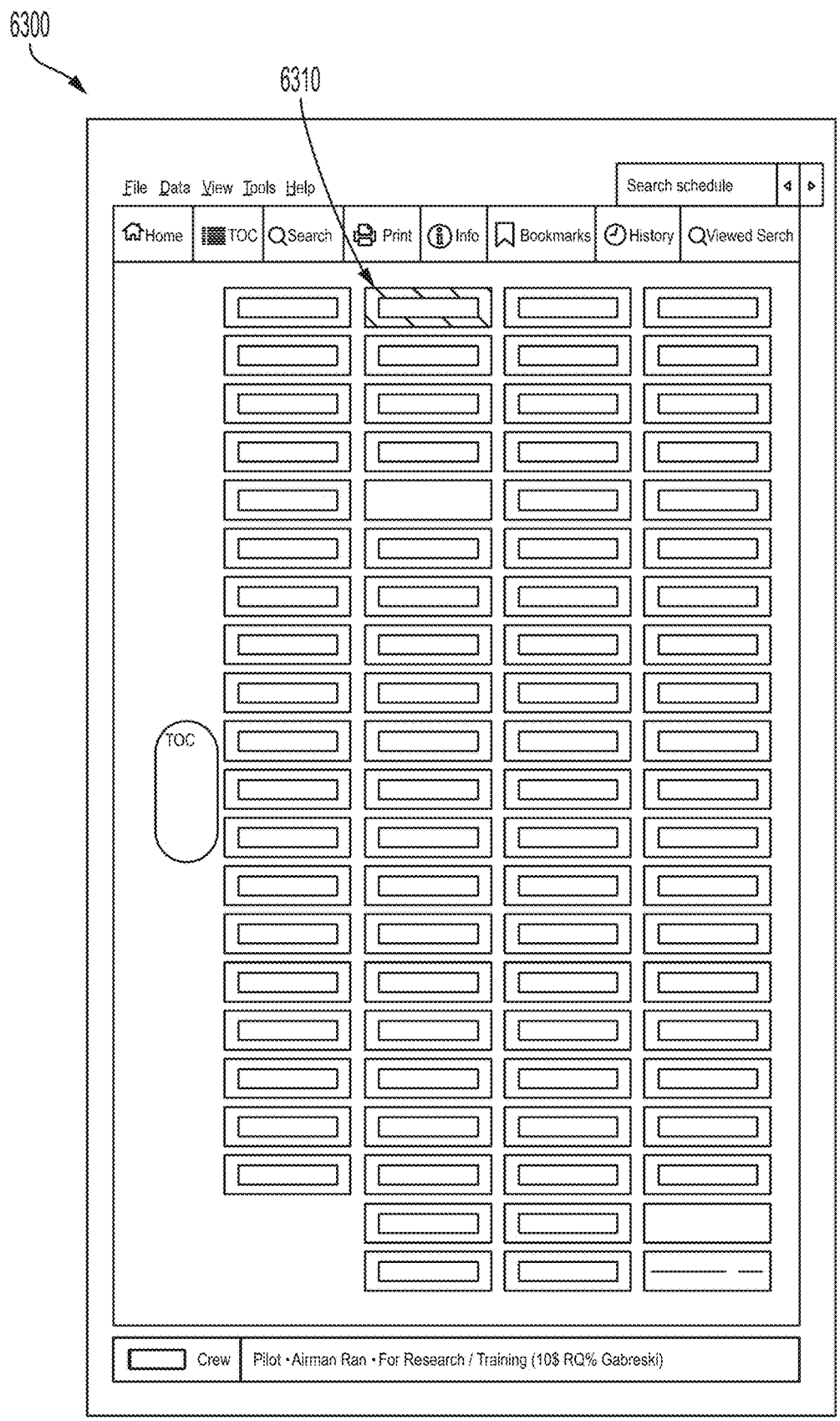
Figure 63B:
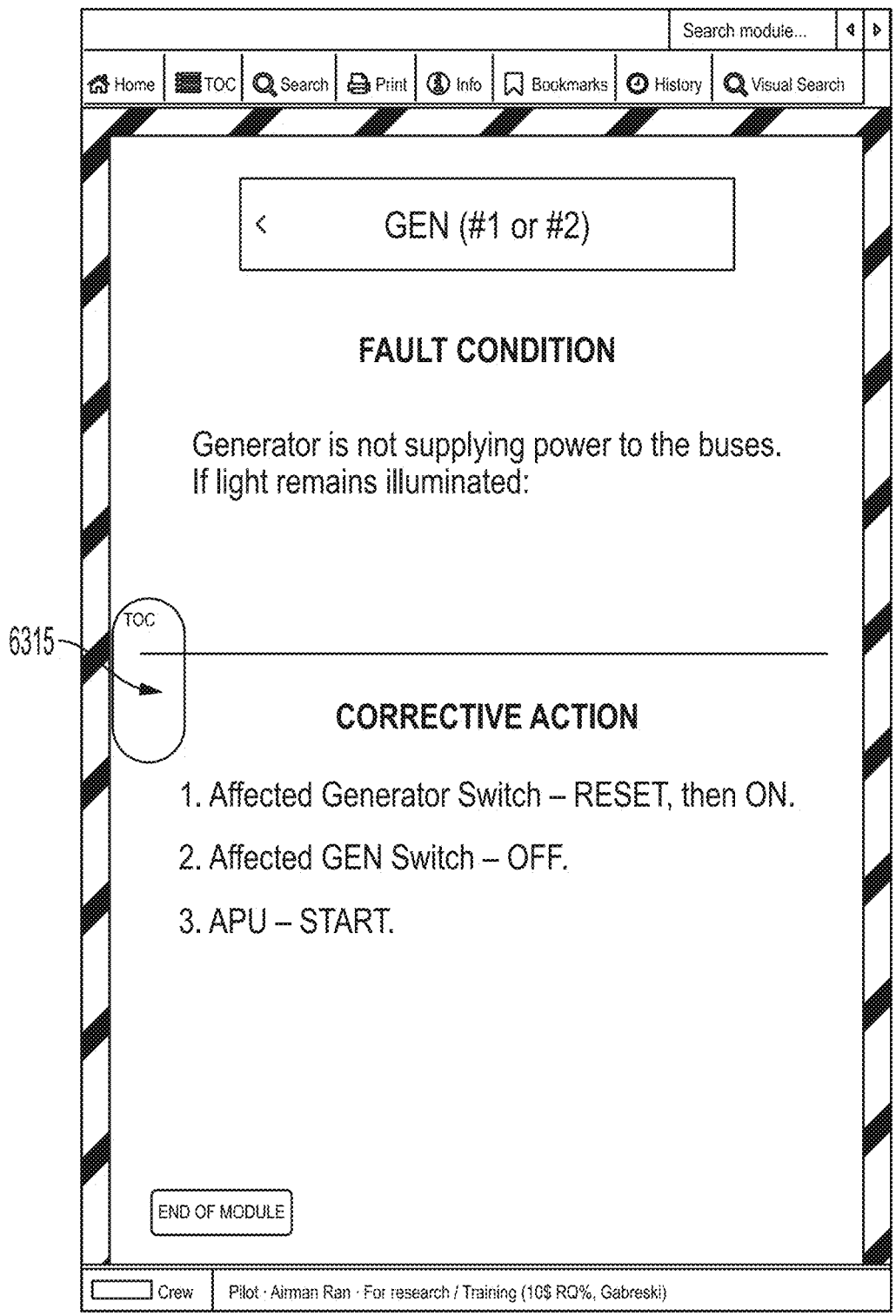
Figure 64:
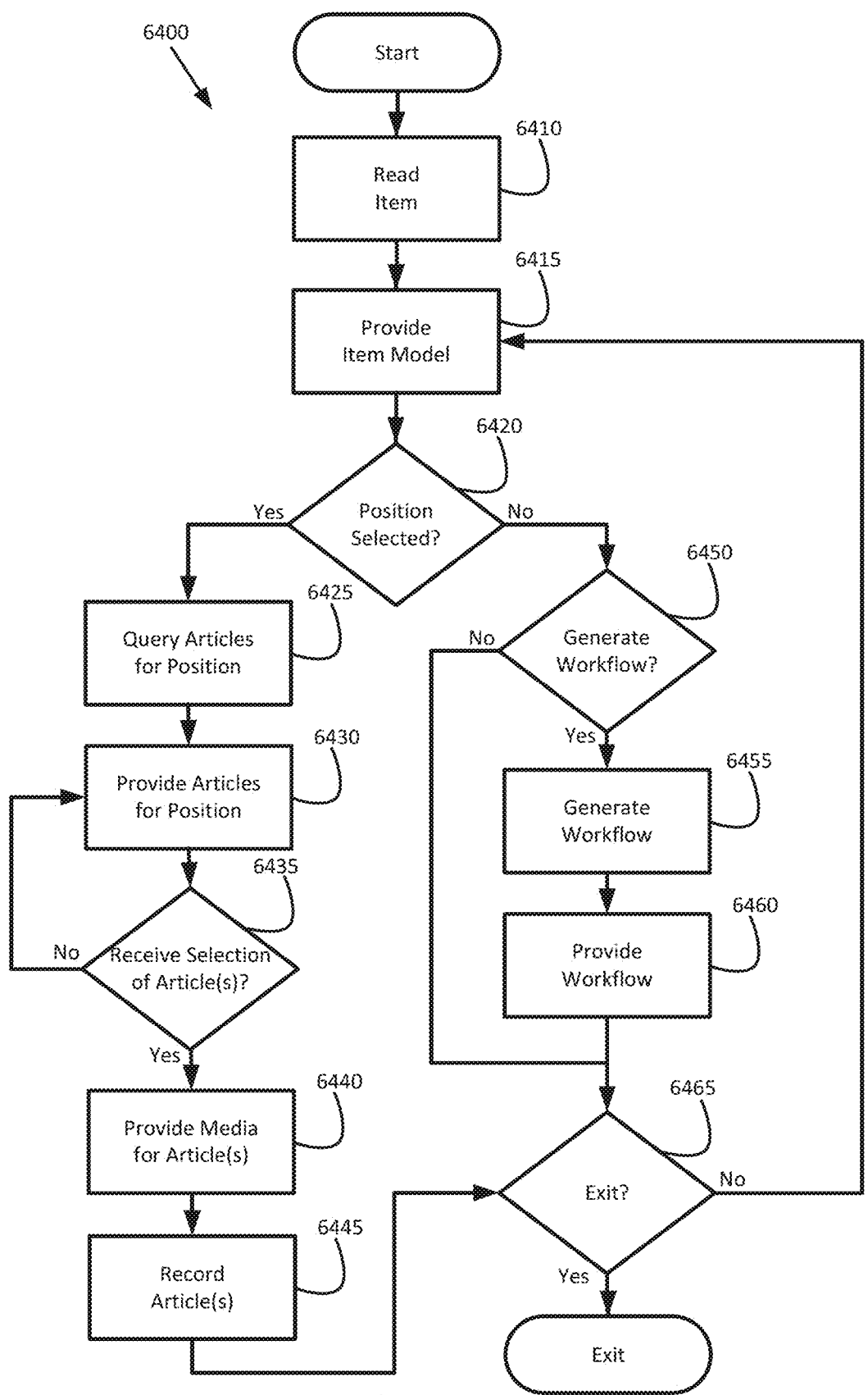
Figure 65A:
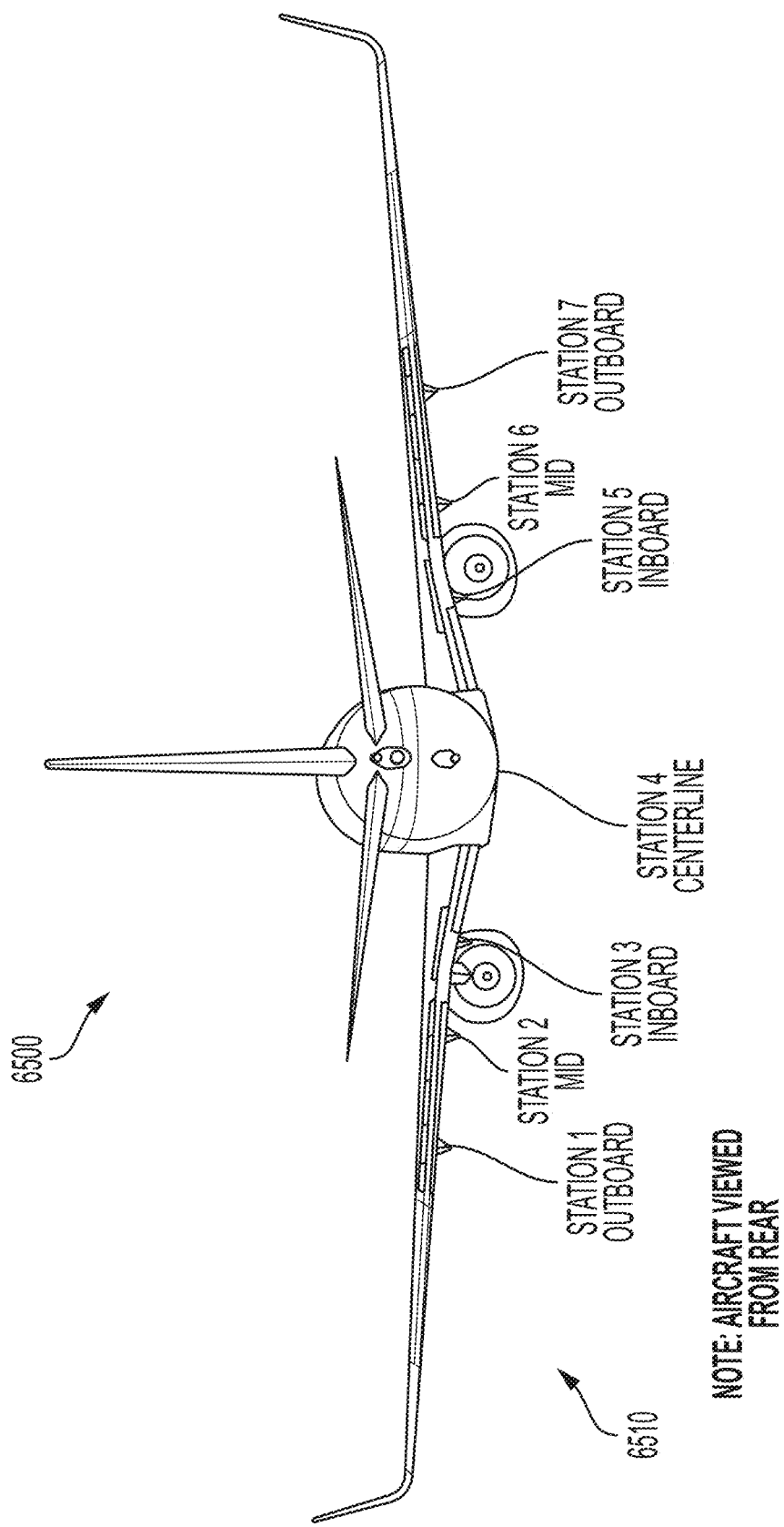
Figure 65B:
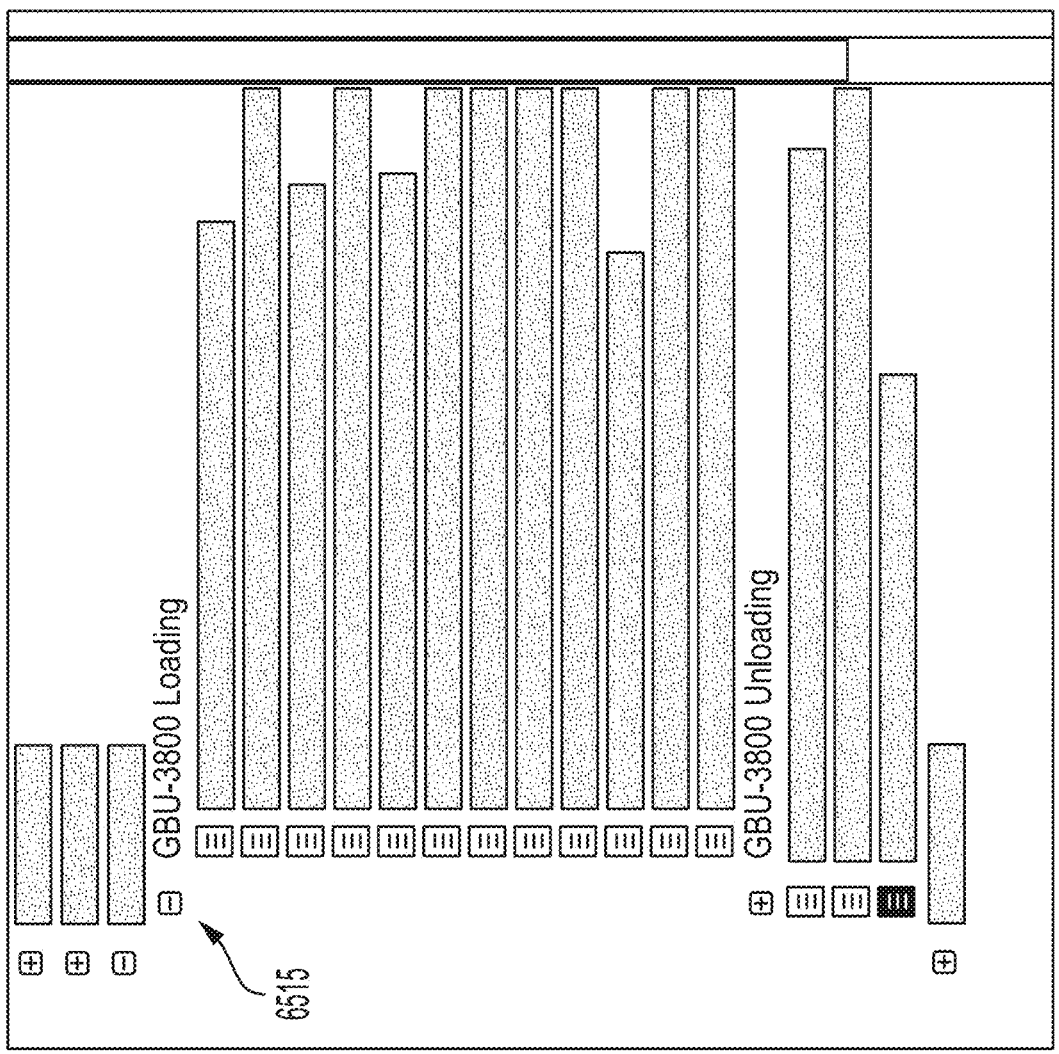
Figure 66:
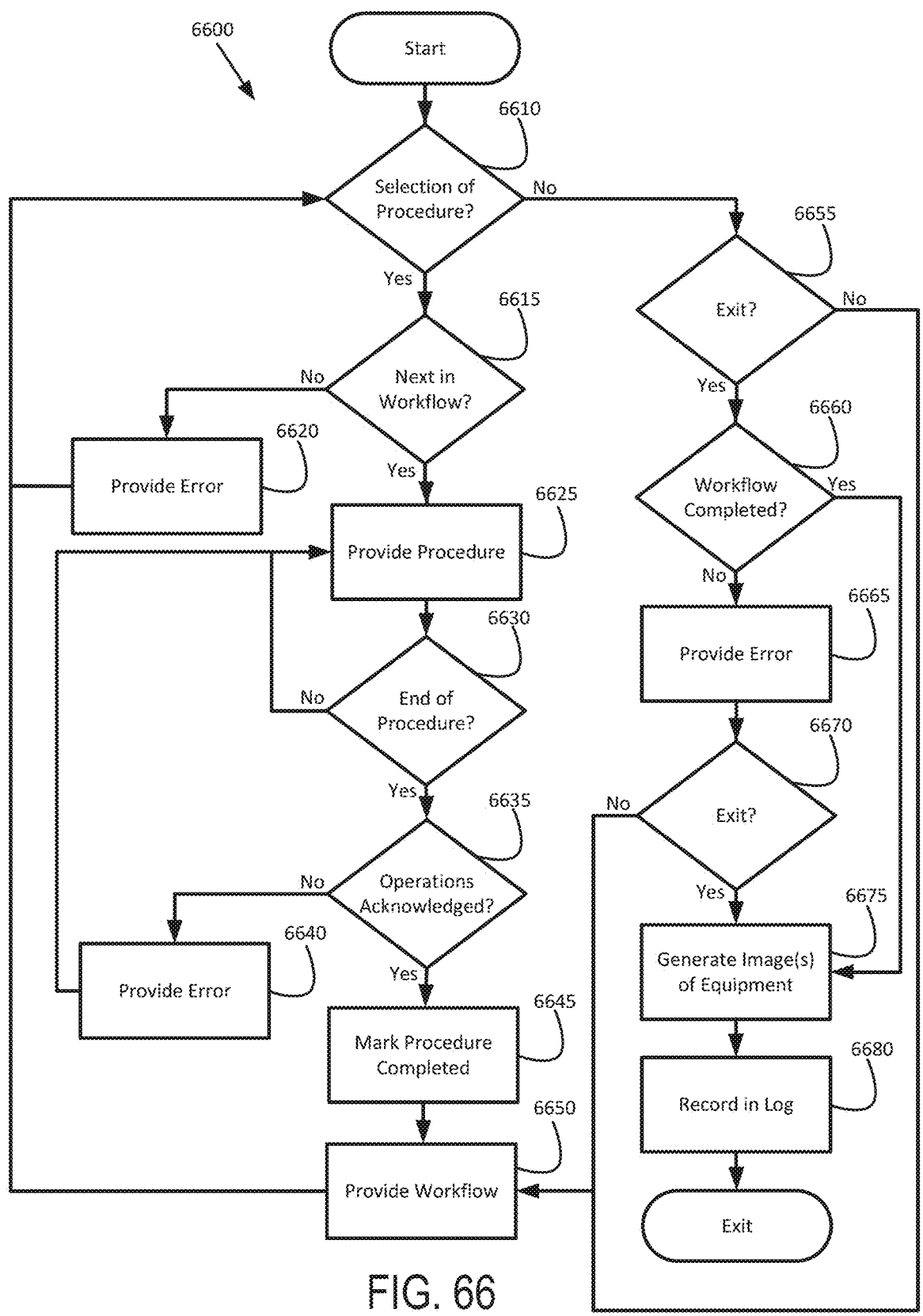
Figure 67:
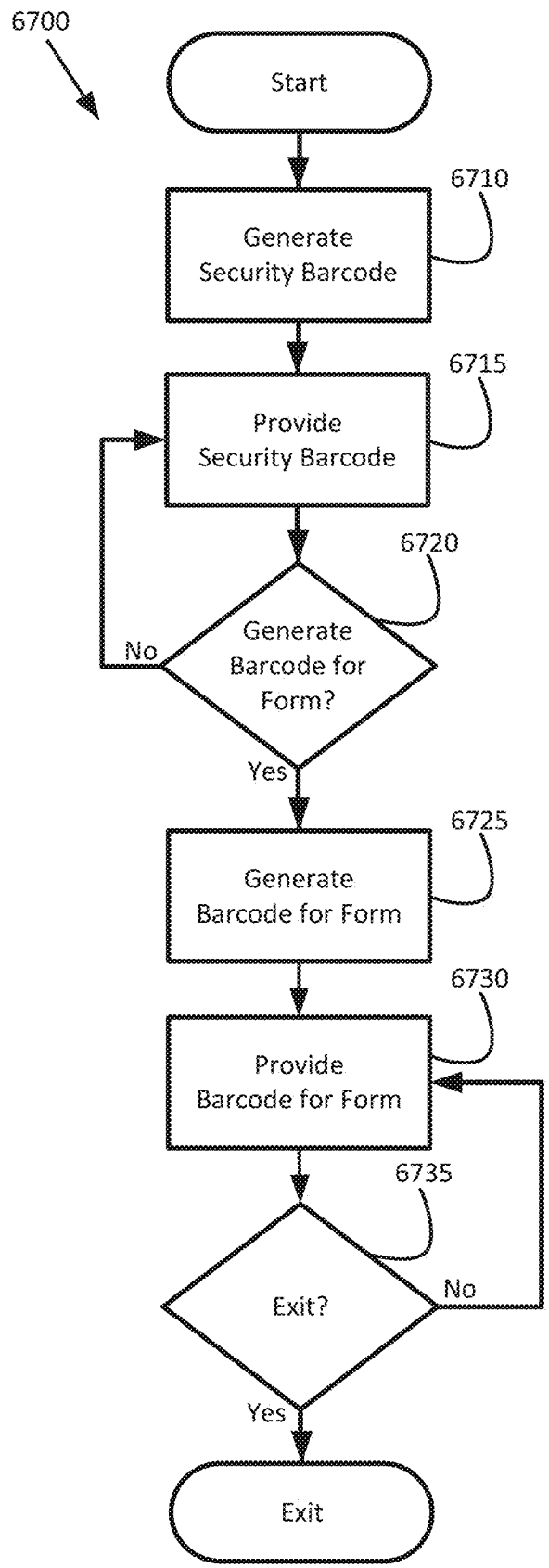
Figure 68:
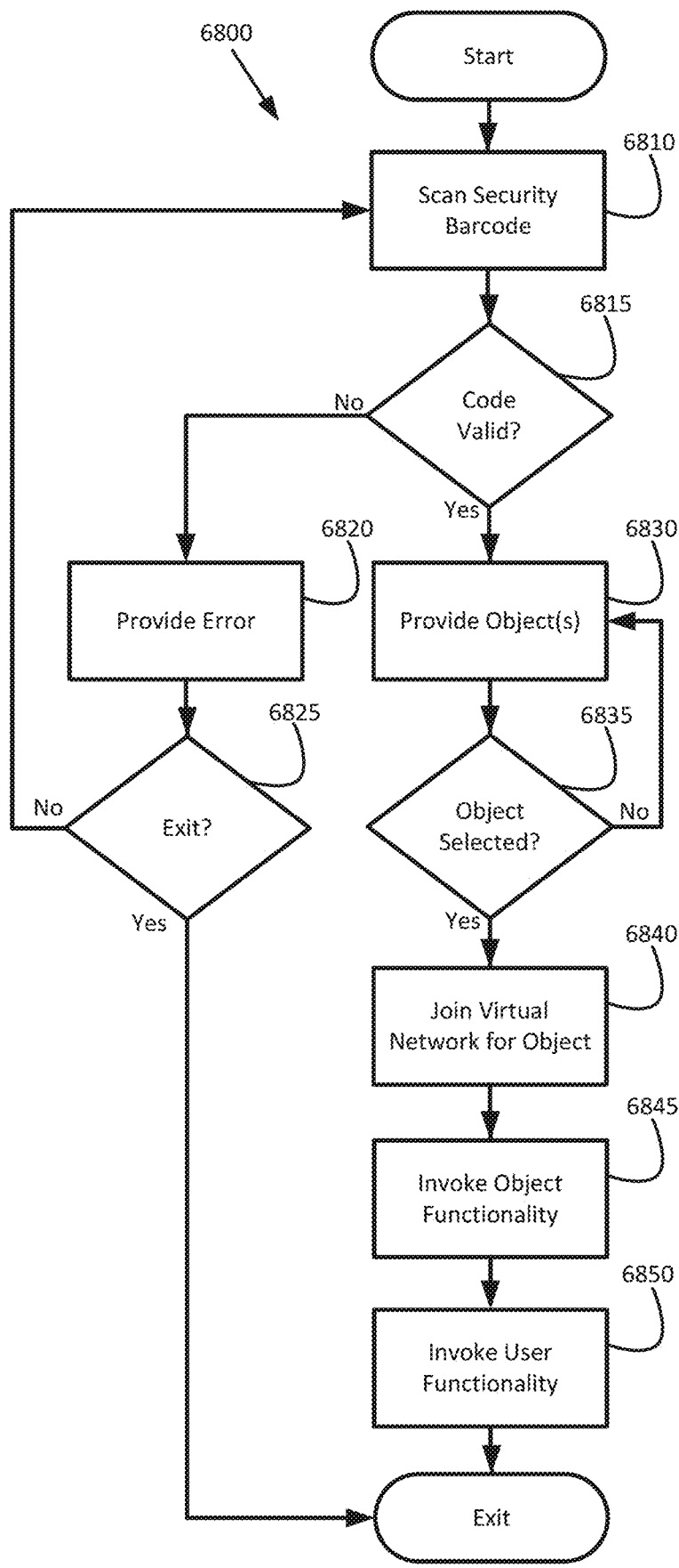
Figure 69:
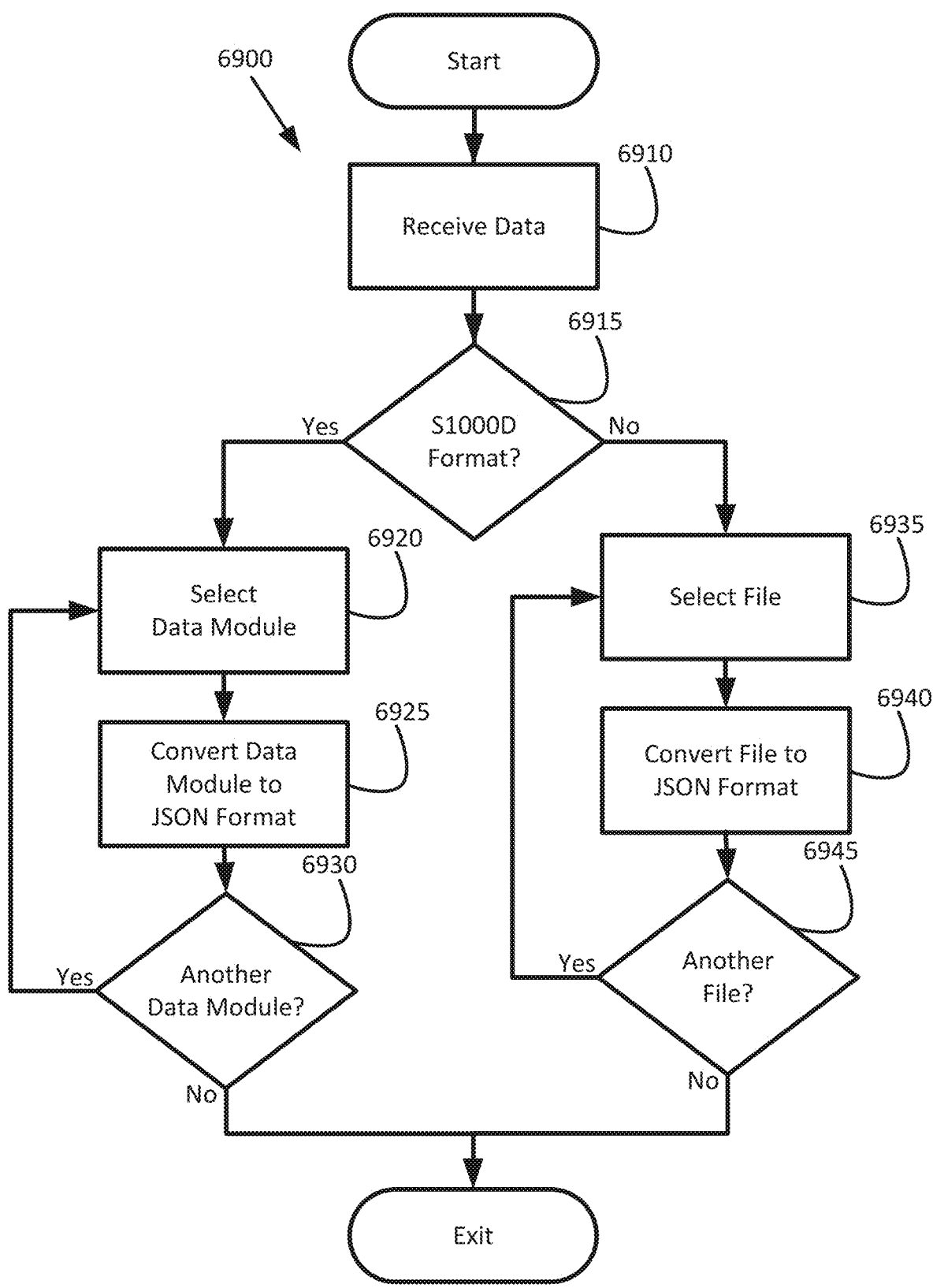

FIGS. 5A and 5B provide examples of a sign-in window that may be used in accordance with various embodiments of the present disclosure;

FIG. 5C provides an example of a user's history report and FIG. 5D provides an example of a daily report that may be used in accordance with various embodiments of the present disclosure;

FIG. 6 is a process flow for viewing and interacting with a table of contents provided by an IETM in accordance with various embodiments of the present disclosure;

FIG. 7 provides an example of a window displaying a table of contents in accordance with various embodiments of the present disclosure;

FIG. 8 is a process flow for filtering a table of contents in accordance with various embodiments of the present disclosure;

FIG. 9 provides an example of a window displaying a table of contents that has been filtered in accordance with various embodiments of the present disclosure;

FIG. 10 is a process flow for tagging content with formatting found in a source of the content in accordance with various embodiments of the present disclosure;

FIG. 11 is a process flow for formatting content based at least in part on a format structure found in a source of the content in accordance with various embodiments of the present disclosure;

FIG. 12A provides an example of a table of contents formatted according to S1000D standards;

FIG. 12B provides an example of a table of contents formatted according to a format structure found in one or more sources of the contents;

FIG. 12C provides an example of content from a source formatted according to a format structure found in the source;

FIG. 13 is a process flow for searching a table of contents in accordance with various embodiments of the present disclosure;

FIG. 14 is a process flow for providing one or more predictions based at least in part on search term(s) in accordance with various embodiments of the present disclosure;

FIGS. 15A and 15B provide examples of a search window in accordance with various embodiments of the present disclosure;

FIG. 16 is a process flow for generating a list of parts in accordance with various embodiments of the present disclosure;

FIG. 17 is a process flow for displaying a list of parts in accordance with various embodiments of the present disclosure;

FIG. 18A provides an example of a window displaying a list of parts in accordance with various embodiments of the present disclosure;

FIG. 18B provides an example of a mechanism for identifying levels for relisting a list of parts in accordance with various embodiments of the present disclosure;

FIG. 18C provides an example of a preview displaying information for a supplier in accordance with various embodiments of the present disclosure;

FIG. 18D provides an example of a preview displaying a list of other items that use a part in accordance with various embodiments of the present disclosure;

FIG. 19 is a process flow for allowing a user to order a part via an IETM in accordance with various embodiments of the present disclosure;

FIG. 20 is a process flow for submitting an order for a part via an IETM in accordance with various embodiments of the present disclosure;

Figure 21B:
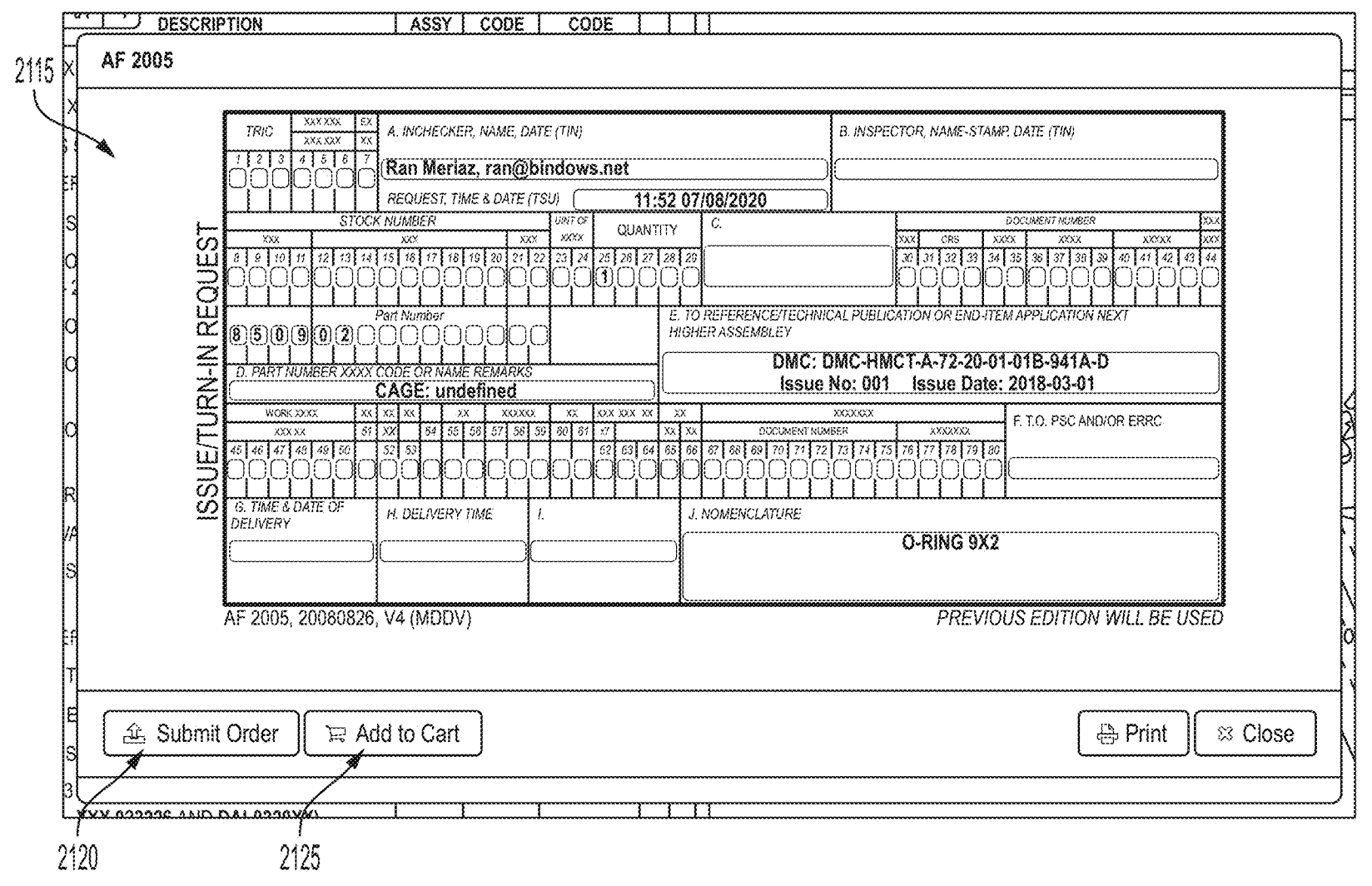

FIG. 21A provides an example of a window in which an option to order a part is provided in accordance with various embodiments of the present disclosure;

FIG. 21B provides an example of an electronic order form that can be used to order a part in accordance with various embodiments of the present disclosure;

FIG. 21C provides an example of a graphical code that can be scanned to order a part in accordance with various embodiments of the present disclosure;

FIG. 22 is a process flow for displaying content for a topic found in technical documentation for an item in accordance with various embodiments of the present disclosure;

FIG. 23 is a process flow for causing parts found in textual information to be displayed as selectable in accordance with various embodiments of the present disclosure;

FIG. 24 is a process flow for causing applicability found in textual information to be displayed as selectable in accordance with various embodiments of the present disclosure;

FIG. 25 is a process flow for locked content in accordance with various embodiments of the present disclosure;

FIG. 26 is a process flow for setting a security classification for specific content in accordance with various embodiments of the present disclosure;

FIG. 27 provides an example of security classification formatting and functionality set for the display of content in accordance with various embodiments of the present disclosure;

FIGS. 28A and 28B is a process flow for invoking functionality provided for a topic in accordance with various embodiments of the present disclosure;

FIG. 29 is a process flow for displaying related information for a part in accordance with various embodiments of the present disclosure;

FIG. 30 provides an example of related information displayed for a part in accordance with various embodiments of the present disclosure;

FIG. 31 is a process flow for displaying information on the meaning of an occurrence of applicability in accordance with various embodiments of the present disclosure;

FIG. 32 provides an example of displaying information on the meaning of an occurrence of applicability in accordance with various embodiments of the present disclosure;

FIG. 33 is a process flow for displaying a data source for a topic in accordance with various embodiments of the present disclosure;

FIG. 34A provides an example of a section of a data source displayed in accordance with various embodiments of the present disclosure;

FIG. 34B provides an example of an entire data source displayed in accordance with various embodiments of the present disclosure;

FIG. 35 is a process flow for generating an annotation in accordance with various embodiments of the present disclosure;

Figure 36D:
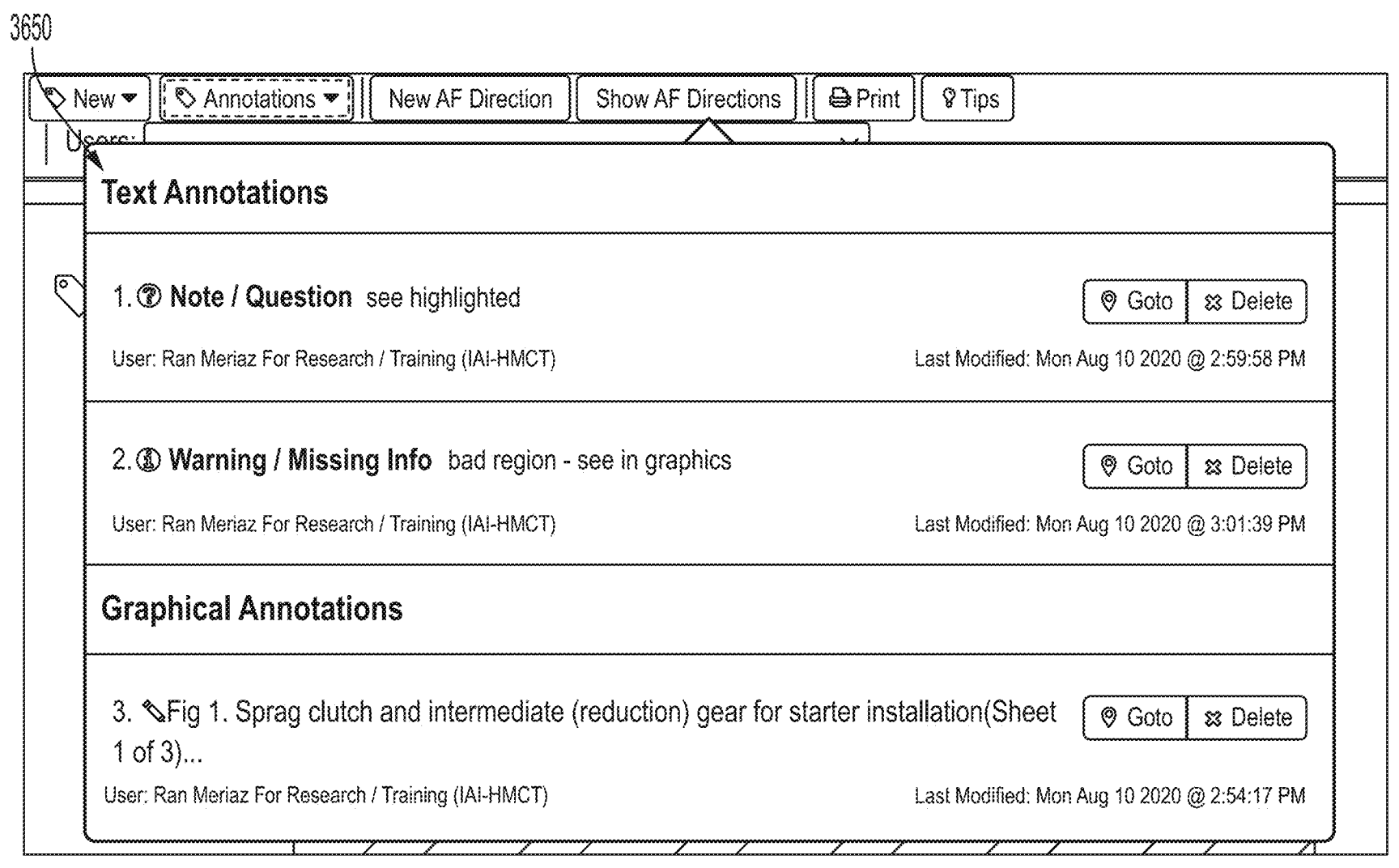

FIG. 36A provides an example of a generated annotation in accordance with various embodiments of the present disclosure;

FIG. 36B provides an example a change request form in accordance with various embodiments of the present disclosure;

FIG. 36C provides an example of a selection mechanism to generate an annotation in accordance with various embodiments of the present disclosure;

FIG. 36D provides an example of a report of change requests submitted by a user in accordance with various embodiments of the present disclosure;

FIG. 36E provides an example of a list of annotations generated by a user in accordance with various embodiments of the present disclosure;

FIG. 37 is a process flow for checking the steps found in a sequence in accordance with various embodiments of the present disclosure;

FIG. 38 provides an example of sequential information in which steps that have been skipped are displayed as highlighted in accordance with various embodiments of the present disclosure;

FIG. 39 is a process flow for unlocking content as a result of a user acknowledging an alert in accordance with various embodiments of the present disclosure;

FIG. 40A provides an example of a portion of content that has been locked in accordance with various embodiments of the present disclosure;

FIG. 40B provides an example of a portion of content that has been unlocked in accordance with various embodiments of the present disclosure;

FIG. 41 is a process flow for facilitating a user transferring a job in accordance with various embodiments of the present disclosure;

FIG. 42 is a process flow for facilitating a user resuming a suspended job in accordance with various embodiments of the present disclosure;

FIG. 43A is an example of a mechanism to enable a user to transfer or resume a job in accordance with various embodiments of the present disclosure;

FIG. 43B is an example of a job transfer window in accordance with various embodiments of the present disclosure;

FIG. 43C is an example of a procedure that has been suspended in accordance with various embodiments of the present disclosure;

FIG. 43D is an example of a procedure that has been resumed in accordance with various embodiments of the present disclosure;

FIG. 44 is a process flow for causing media content that is displayed to be updated based at least in part on a user scrolling through textual information in accordance with various embodiments of the present disclosure;

Figure 45:
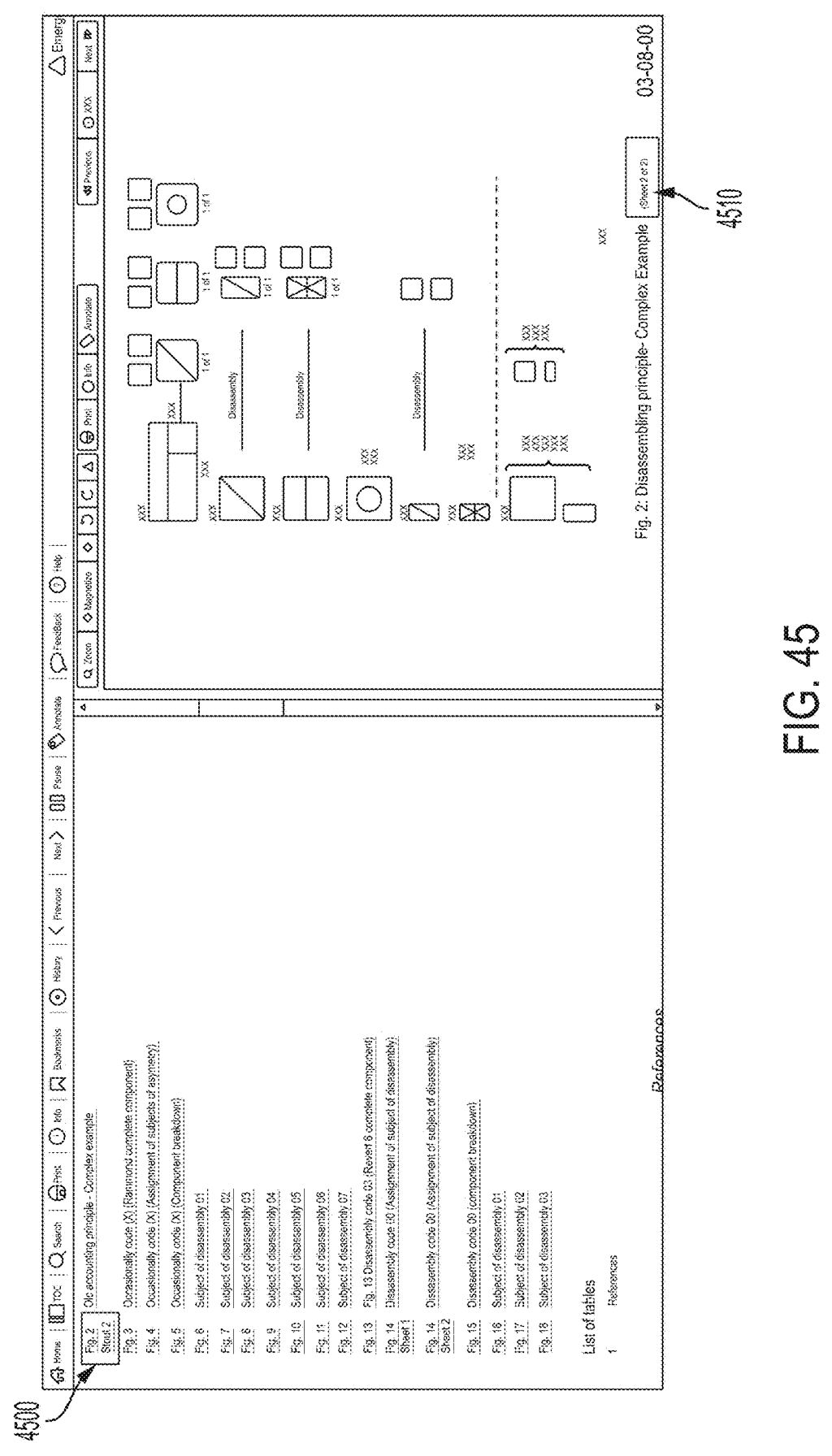

FIG. 45 provides an example of media content being updated as a user scrolls through textual information in accordance with various embodiments of the present disclosure;

FIG. 46 is a process flow for causing display of a unit as highlighted in media content or referenced in textual information in accordance with various embodiments of the present disclosure;

FIG. 47A provides an example of a unit highlighted in an illustration in accordance with various embodiments of the present disclosure;

FIG. 47B provides an example of units highlighted in textual information in accordance with various embodiments of the present disclosure;

FIG. 48 is a process flow for providing functionality when a user reaches the end of content for a topic in accordance with various embodiments of the present disclosure;

FIG. 49A provides an example of an end of topic mechanism in accordance with various embodiments of the present disclosure;

FIG. 49B provides an example of a table of contents displayed as a result of invoking end of module functionality in accordance with various embodiments of the present disclosure;

FIG. 50 is a process flow for providing functionality for wiring data in accordance with various embodiments of the present disclosure;

FIG. 51A provides an example of an electrical schematic displayed in accordance with various embodiments of the present disclosure;

FIG. 51B provides an example of a preview of a connector in accordance with various embodiments of the present disclosure;

FIG. 51C provides an example of a list of components displayed in an electrical schematic in accordance with various embodiments of the present disclosure;

FIG. 51D provides an example of a list of other electrical schematics that display a selected component in accordance with various embodiments of the present disclosure;

FIG. 52 is a process flow for providing live wire functionality for a selected wire in accordance with various embodiments of the present disclosure;

FIG. 53 is an example of a wire diagram in accordance with various embodiments of the present disclosure;

FIG. 54 is a process flow for providing crosshairs on a graph in accordance with various embodiments of the present disclosure;

FIG. 55 is an example of crosshairs placed on a graph in accordance with various embodiments of the present disclosure;

FIG. 56 is a process flow for providing functionality for media content involving 3D graphics in accordance with various embodiments of the present disclosure;

FIGS. 57A-D provide examples of a table of parts and a 3D graphic displayed in accordance with various embodiments of the present disclosure;

FIGS. 57E and 57F provide examples of a part removed from a 3D graphic in accordance with various embodiments of the present disclosure;

FIGS. 57G and 57H provide examples of a part solely displayed in a 3D graphic in accordance with various embodiments of the present disclosure;

FIG. 57I provides an example of axes on a 3D graphic displayed in accordance with various embodiments of the present disclosure;

FIG. 58 is a process flow for providing components in media content as identified in a hierarchy in accordance with various embodiments of the present disclosure;

Figure 59B:
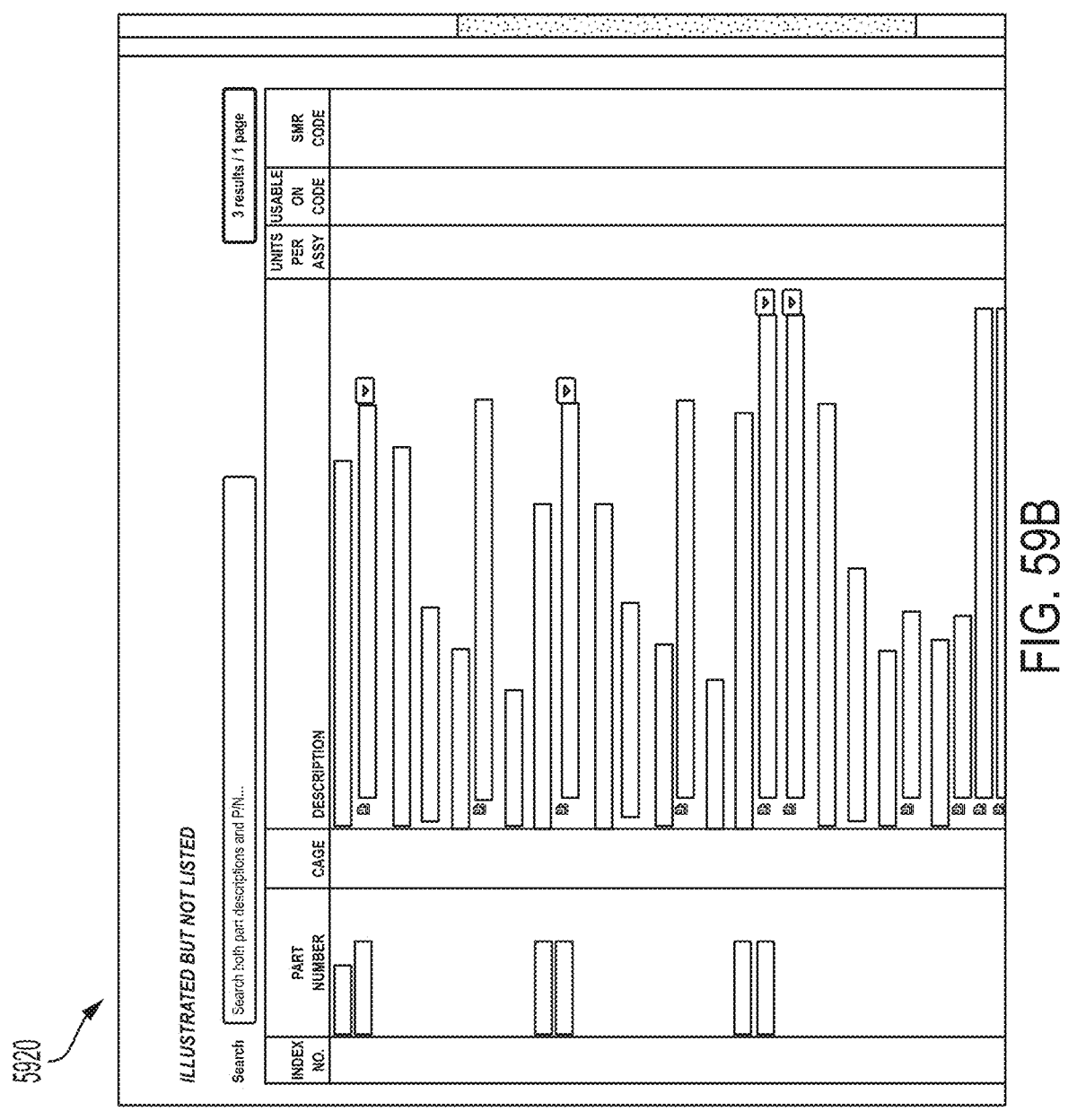

FIG. 59A provides an example of a hierarchy of components displayed for components found in media content in accordance with various embodiments of the present disclosure;

FIG. 59B provides an example of a report displayed of components illustrated in media content but not listed in accordance with various embodiments of the present disclosure;

FIG. 60 is a process flow for allowing a user to initiate communication sessions within an IETM environment in accordance with various embodiments of the present disclosure;

FIG. 61A is an example of a selection mechanism to enable a user to access communication session functionality in accordance with various embodiments of the present disclosure;

FIG. 61B is an example of a display to enable a user to initiate a communication session within an IETM in accordance with various embodiments of the present disclosure;

FIG. 61C is an example of a communication window that is displayed once a communication session is established in accordance with various embodiments of the present disclosure;

FIG. 61D is an example of a communication window in which a user has shared his or her window to other users involved in a communication session in accordance with various embodiments of the present disclosure;

FIG. 62 is a process flow for addressing warnings and/or cautions shown on a caution panel found on an item in accordance with various embodiments of the present disclosure;

FIG. 63A provides an example of a virtual caution panel in accordance with various embodiments of the present disclosure;

FIG. 63B provides an example of a corrective action provided for one or more warnings and/or cautions in accordance with various embodiments of the present disclosure;

FIG. 64 is a process flow for generating a workflow for loading articles onto and/or into an object of an item in accordance with various embodiments of the present disclosure;

FIG. 65A provides an example of a display of a digital model of an aircraft to be loaded with articles in accordance with various embodiments of the present disclosure;

FIG. 65B provides an example of display of a digital workflow in the form of a table of contents in accordance with various embodiments of the present disclosure;

FIG. 66 is a process flow for managing a workflow for loading articles onto and/or into an object for an item in accordance with various embodiments of the present disclosure;

FIG. 67 is a process flow for securely integrating the use of a network connected with a remote device with an IETM environment in accordance with various embodiments of the present disclosure;

FIG. 68 is a process flow for providing a virtual network within an IETM environment in accordance with various embodiments of the present disclosure; and FIG. 69 is a process flow for importing data for the technical documentation for an item into an IETM in accordance with various embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Exemplary Technical Contributions

Various embodiments of the present disclosure address technical problems related to providing technical documentation within an IETM environment. Although conventional IETMs oftentimes provide interactive functionality to users who are viewing technical documentation via the IETMs, such functionality is normally limited to simply viewing the documentation in different formats. For example, a conventional IETM may provide a digital model of an apparatus, machine, vehicle, equipment, and/or the like (e.g., illustrations) that allows the user to select a component for the apparatus, machine, vehicle, equipment, and/or the like displayed in the model to view documentation on the component. However, this capability is typically the extent of the interactive functionality provided in the IETM. Therefore, if the user needs to perform additional tasks with respect to the component such as, for example, ordering the component, then the user is required to sign into a different system (e.g., procurement system) to perform such tasks. Such requirements not only lead to inefficiencies with respect to resources such as the user's time and effort jumping back and forth between different systems, but also lead to inefficiencies with respect to resources such as the systems, storage, networking, and/or equipment required to perform such tasks.

In addition, requiring users to use multiple systems to view technical documentation on an apparatus, machine, vehicle, equipment, and/or the like and perform various tasks with respect to the apparatus, machine, vehicle, equipment, and/or the like can present many technical challenges. For instance, requiring users who are viewing technical documentation through an IETM to use other systems to perform tasks outside of viewing the documentation necessitates separate security measures to be implemented within the multiple systems. Managing these separate security measures within each of the systems can lead to multiple challenges in providing secure environments, as well as to further inefficiencies for users, systems, storage, networking, and/or equipment.

Further, users oftentimes wish to view and interact with a large volume of technical documentation at any given time while viewing and interacting with such documentation via an IETM. For instance, this large volume of documentation may involve viewing and interacting with textual documentation and/or media content (e.g., illustrations) on several different topics. For example, a user may be performing maintenance on a component and may wish to view technical documentation via the IETM on the component, on a maintenance procedure the user is performing on the component, as well as on a part being used in performing the maintenance procedure. Here, the user may need to view the technical documentation for the different topics by interchangeably moving back-and-forth between the technical documentation for the different topics. However, a technical challenge often encountered in conventional IETMs is facilitating the user's ability to move back-and-forth between technical documentation for different topics. Especially, when the technical documentation involves a large volume of information.

Thus, various embodiments of the present disclosure address the above-mentioned technical problems and challenges encountered with many conventional IETMs. Specifically, various embodiments of the present disclosure provide functionality beyond simply presenting an interactive environment to view technical documentation on items found in conventional IETMs. In addition, various embodiments of the present disclosure provide such functionality within a secure environment that is more easily administered and maintained over conventional configurations involving a user having to use multiple systems to perform such functionality. Furthermore, various embodiments of the present disclosure facilitate the display of and interaction with technical documentation within an IETM environment by presenting such technical documentation though the use of displaying, positioning, and/or organizing of the technical documentation in a more optimal manner over conventional IETMs through the user of unique and novel configurations of display windows, view panes, and/or the like.

Therefore, the disclosed solution provided herein is more effective, efficient, timely, accurate, faster, and provides more functionality than found in conventional IETMs. In addition, the incorporation of such functionality into an IETM enables users to use such functionality in a more secure environment. Further, the disclosed solution provided herein enables presentation of technical documentation in a more optimal manner over conventional IETMs to facilitate the use of such documentation. Incorporating such functionality and presentation of technical documentation provides the advantage of allowing user to carry out many tasks in a shorter timeframe than under conventional IETMs. Finally, the disclosed solution can result in reduced network traffic, require fewer computational resources, allow for less memory usage, and/or the like. Thus, various embodiments of the present disclosure make significant technical contributions to improving the efficiency, reliability, and functionality in providing technical documentation within an IETM environment.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

Figure 1:
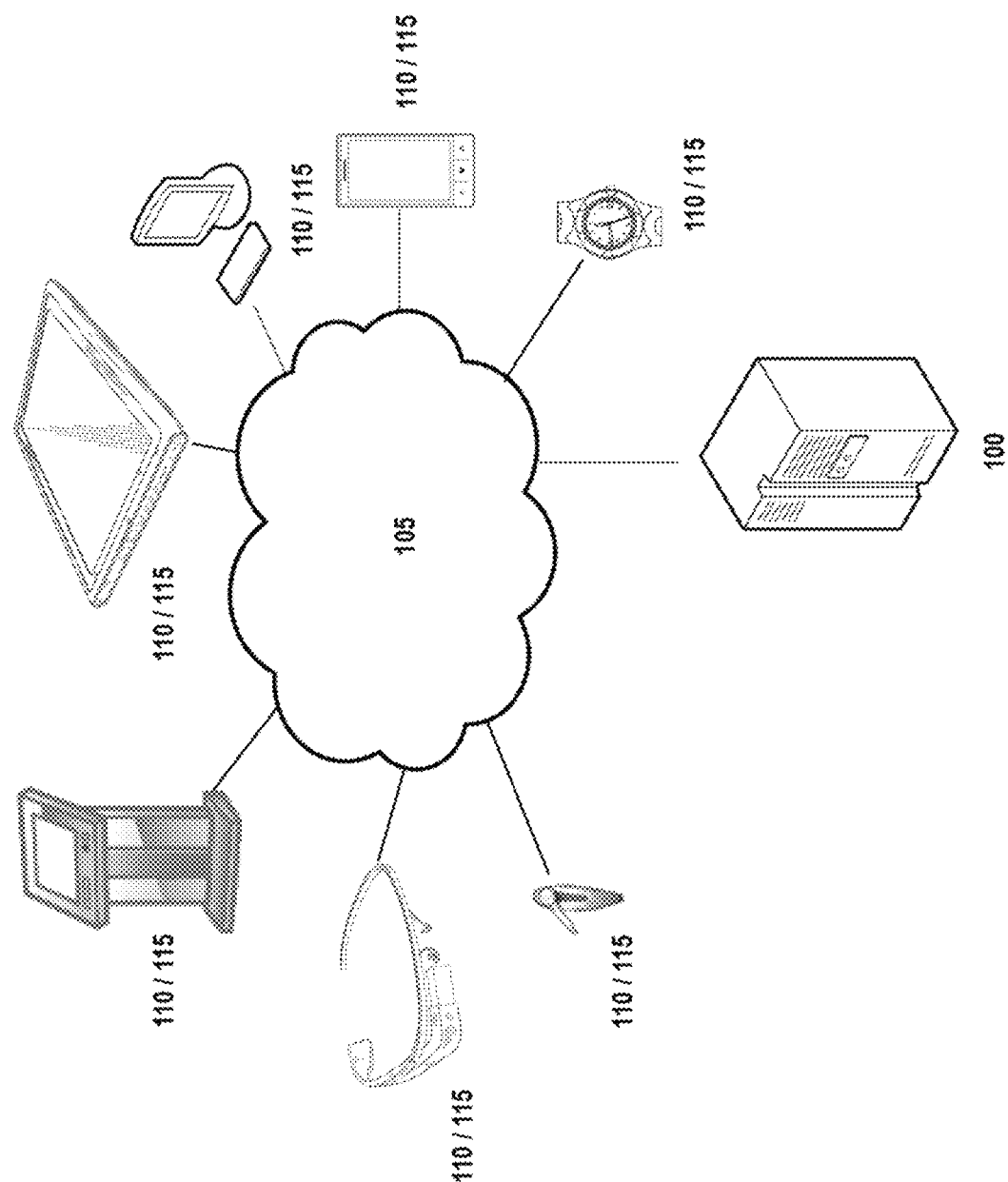
FIG. 1 is a diagram of a system architecture that can be used in conjunction with various embodiments of the present disclosure.

FIG. 1 provides an illustration of an exemplary system architecture that may be used in accordance with various embodiments of the present disclosure. As shown in FIG. 1, the architecture may include one or more management computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Exemplary Management Computing Entity

Figure 2:
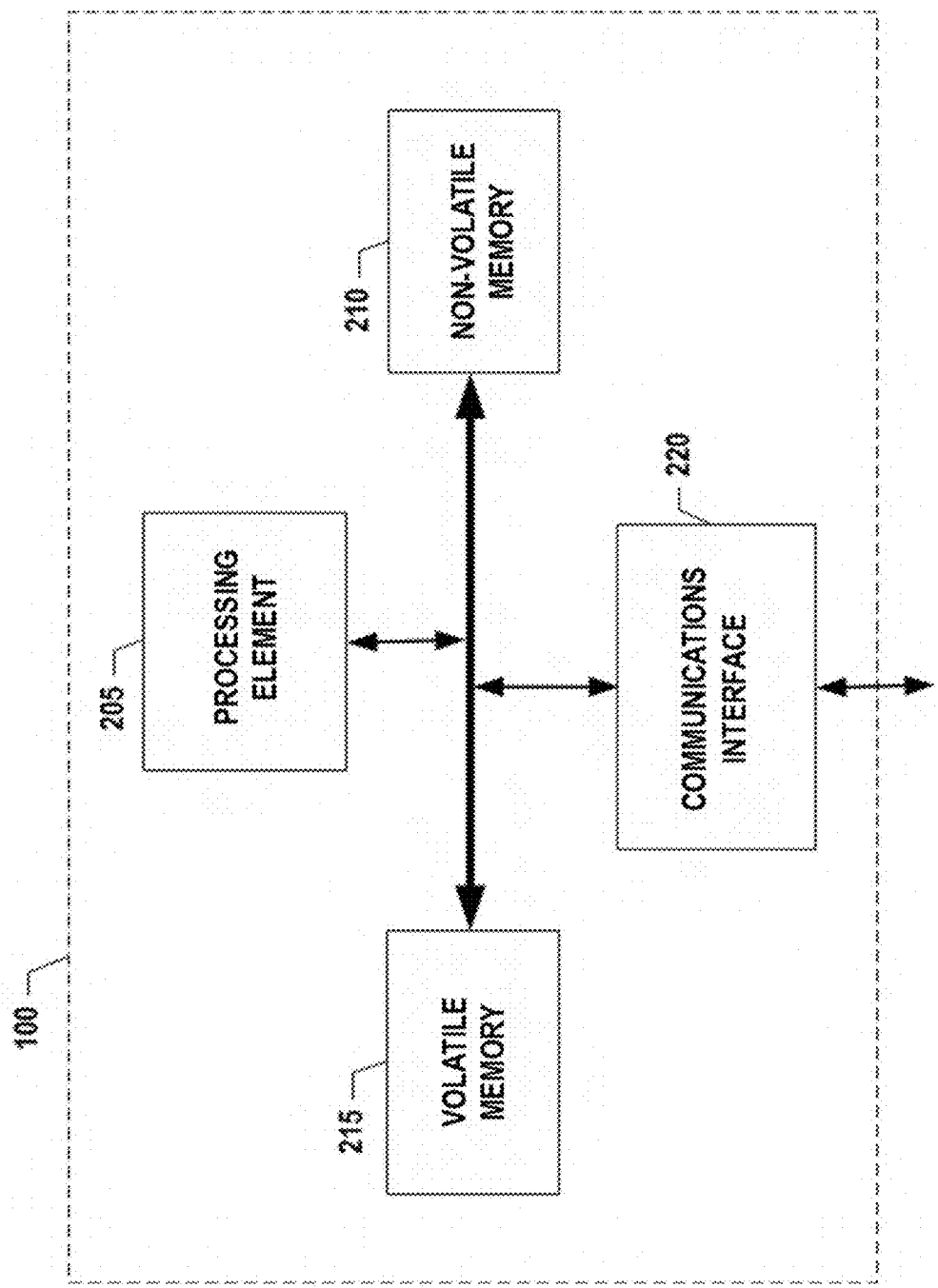
FIG. 2 is a schematic of a management computing entity that may be used in conjunction with various embodiments of the present disclosure.

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user computing entities 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

Exemplary User Computing Entity

Figure 3:
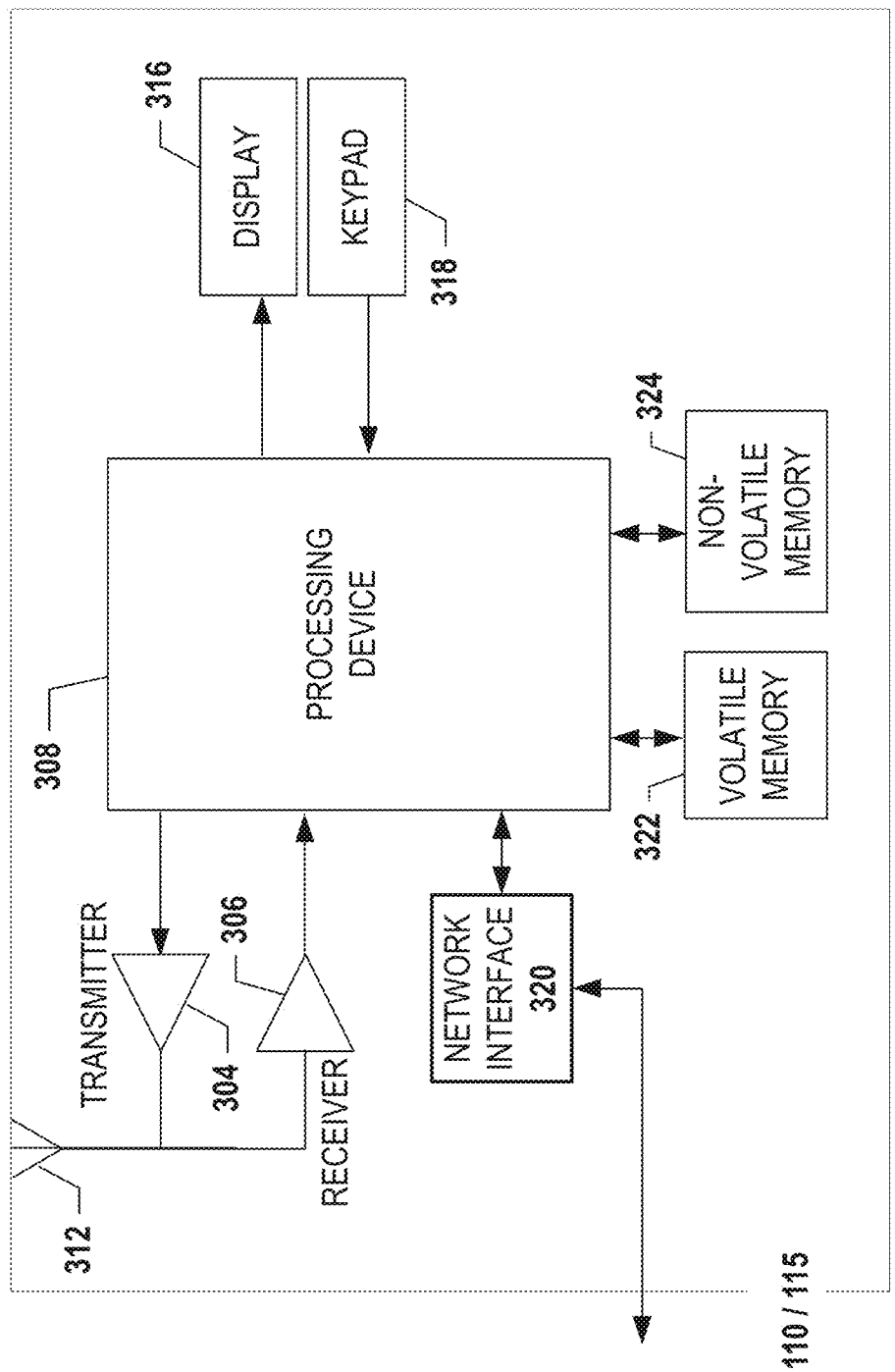
FIG. 3 is a schematic of a user computing entity that may be used in conjunction with various embodiments of the present disclosure.

A user may be an individual, a family, a company, an organization, an entity, a department within an organization, a representative of an organization and/or person, and/or the like. To do so, a user may operate a user computing entity 110 that includes one or more components that are functionally similar to those of the management computing entity 100. FIG. 3 provides an illustrative schematic representative of a user computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise an IETM viewer (that can include a display 316 coupled to a processing element 308) and/or a viewer (coupled to a processing element 308). For example, the IETM viewer may be a user application, browser, user interface, graphical user interface, and/or similar words used herein interchangeably executing on and/or accessible via the user computing entity 110 to interact with and/or cause display of information from the management computing entity 100, as described herein. The term "viewer" is used generically and is not limited to "viewing." Rather, the viewer is a multi-purpose digital data viewer capable and/or receiving input and providing output. The viewer can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the viewer can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other IETM viewer for communicating with the management computing entity 100 and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

As described above, the management computing entity 100 and/or user computing entity 110 may be configured for storing technical documentation (e.g., data) in an IETM, providing access to the technical documentation to a user via the IETM, and/or providing functionality to the user accessing the technical documentation via the IETM. In general, the technical documentation is typically made up of volumes of text along with other media objects. In many instances, the technical documentation is arranged to provide the text and/or the media objects on an item. For instance, the item may be a product, machinery, equipment, a system, and/or the like such as, for example, a bicycle or an aircraft.

Accordingly, the technical documentation may provide textual information along with non-textual information (e.g., one or more visual representations) of the item and/or components of the item. Textual information generally includes alphanumeric information and may also include different element types such as graphical features, controls, and/or the like. Non-textual information generally includes media content such as illustrations (e.g., 2D and 3D graphics), video, audio, and/or the like. Although the non-textual information may also include alphanumeric information.

The technical documentation may be provided as digital media in any of a variety of formats, such as JPEG, JFIF, JPEG2000, EXIF, TIFF, RAW, DIV, GIF, BMP, PNG, PPM, MOV, AVI, MP4, MKV, and/or the like. In addition, the technical documentation may be provided in any of a variety of formats, such as DOCX, HTMLS, TXT, PDF, XML, SGML, JSON and/or the like. As noted, the technical documentation may provide textual and non-textual information of various components of the item. For example, various information may be provided with respect to assemblies, sub-assemblies, sub-sub-assemblies, systems, subsystems, sub-subsystems, individual parts, and/or the like associated with the item.

In various embodiments, the technical documentation for the item may be stored and/or provided in accordance with S1000D standards and/or a variety of other standards. According to various embodiments, the management computing entity 100 and/or user computing entity 110 provides functionality in the access and use of the technical documentation provided via the IETM in accordance with user instructions and/or input received from the user via an IETM viewer (e.g., a browser, a window, an application, a graphical user interface, and/or the like).

Accordingly, in particular embodiments, the IETM viewer is accessible from a user computing entity 110 that may or may not be in communication with the management computing entity 100. For example, a user may sign into the management computing entity 100 from the user computing entity 110 or solely into the user computing entity 110 to access technical documentation via the IETM and the management computing entity 100 and/or user computing entity 110 may be configured to recognize any such sign in request, verify the user has permission to access the technical documentation (e.g., by verifying the user's credentials), and present/provide the user with various displays of content for the technical documentation via the IETM viewer (e.g., displayed on display 316).

Further detail is now provided with respect to various functionality provided by embodiments of the present disclosure. As one of ordinary skill in the art will understand in light of this disclosure. The modules now discussed and configured for carrying out various functionality may be invoked, executed, and/or the like by the management computing entity 100, the user computing entity 110, and/or a combination thereof depending on the embodiment.

Sign-In Module

A user may be required to sign-in on a device (e.g., a user computing entity 110) to gain access to the technical documentation for an item through an IETM. Accordingly, depending on the circumstances, the user's device (e.g., user computing entity 110) and/or a management computing entity 100 may be configured for facilitating the user's access to the technical documentation. For example, the technical documentation may be stored locally on the user's computing entity 110 and therefore, the user's computing entity 110 is configured to facilitate the user's access to the documentation without cooperation of the management computing entity 100. In other instances, the user's computing entity 110 and the management computing entity 100 may be communication and work in concert to provide access to the technical documentation to the user.

Figure 4:
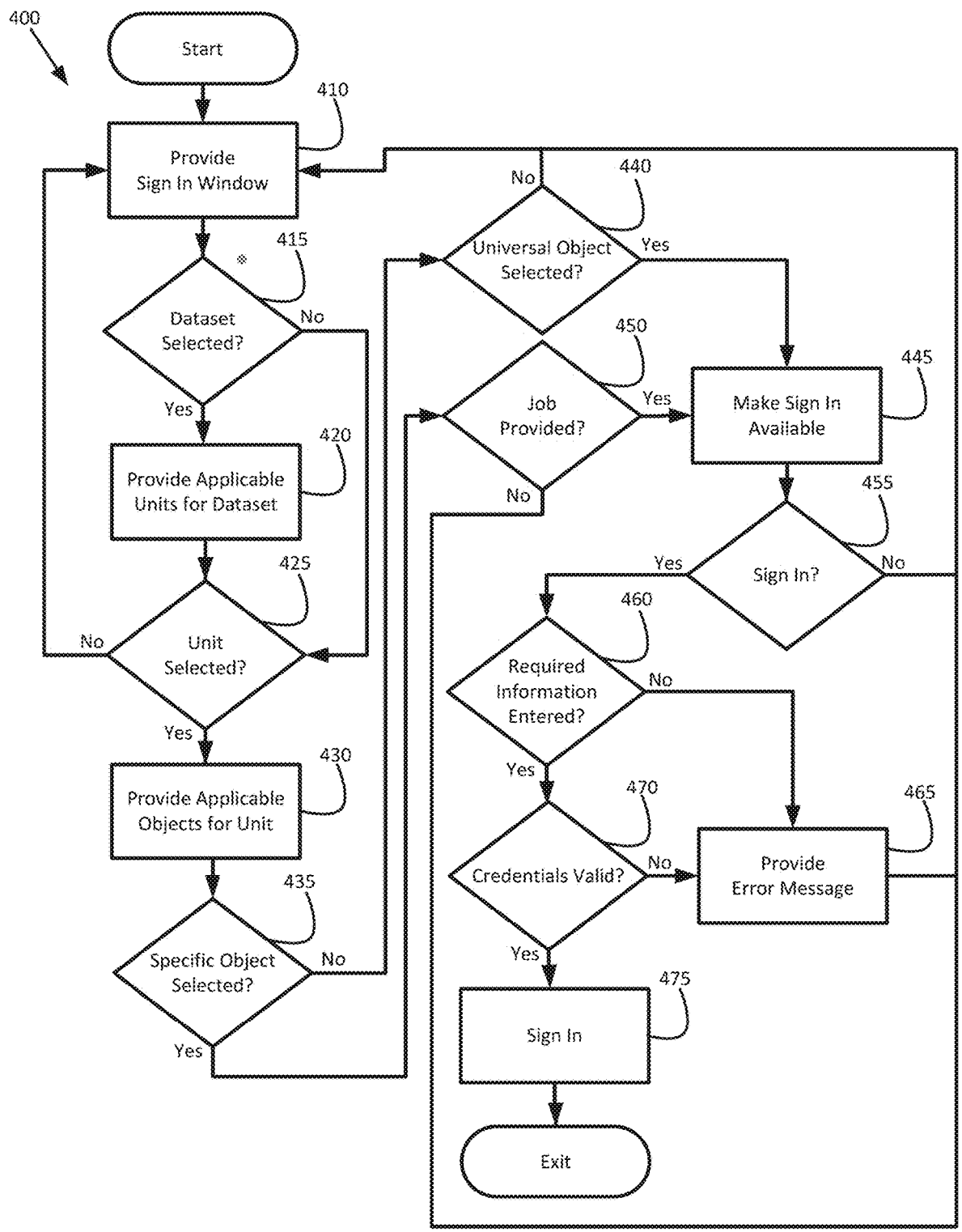
FIG. 4 is a process flow for signing in a user to an IETM in accordance with various embodiments of the present disclosure.

Turning now to FIG. 4, additional details are provided regarding a process flow for signing a user into the IETM according to various embodiments. FIG. 4 is a flow diagram showing a sign-in module for performing such functionality according to various embodiments of the disclosure. Here, the user may open the IETM residing on his or her user computing entity 110 to gain access to technical documentation for a particular item. While in other instances, the user may open an IETM viewer (e.g., browser) to gain access to the technical documentation residing remotely on the management computing entity 100. For example, the IETM may be provided as a software-as-a-service over some type of network. Similarly, depending on the embodiment, the technical documentation may be stored locally on the user's computing entity 110 or remotely on the management computing entity 100 that the user computing entity 110 communicates with to access the documentation.

Therefore, the process flow 400 begins in various embodiments with the sign-in module providing a sign-in page (e.g., webpage), screen, window, graphical user interface, and/or the like viewable by the user via an IETM viewer in Operation 410. For convenience, the term "window" is used throughout the remainder of the application, although those of ordinary skill in the art understand this term may include other forms of displaying content. The sign-in window may provide a number of fields such as a selectable dataset field, a selectable unit field, and a selectable object field. In particular embodiments, the selectable dataset field provides one or more datasets in which each dataset represents a publication of the technical documentation available for a particular item. For example, technical documentation accessible through the IETM may be for an airline. Here, the airline may have a number of different aircraft types/models in its fleet such as different jet models, propeller models, rotor models, and/or the like. Therefore, the IETM may provide a dataset for each model and the selectable dataset field may be a mechanism such as a dropdown field listing all of the datasets for the different aircraft models that allows for the user to select a particular dataset.

The sign-in module determines whether input has been received indicating the user has selected a dataset for a particular item in Operation 415. If so, then the sign-in module provides one or more applicable units for the dataset for display in Operation 420. An applicable unit may represent the user's relationship with respect to the technical documentation and the associated item. For instance, in particular embodiments, the user may be an employee of an airline and the unit may represent the position, job, role, and/or the like that the user holds with the airline. For example, the user may be a salesperson, design engineer, mechanical, and/or the like for the airline. In other embodiments, the unit may represent a larger entity within the organization such as, for example, research and development department, marketing department, engineering design department, and/or the like. In addition, in particular embodiments, the applicable units displayed may be dependent on the dataset selected by the user. For example, an applicable unit that may be provided is jet mechanic as a result of the user selecting the model of a jet dataset. Accordingly, the units may be displayed in the selectable unit field. For example, the selectable unit field may be a dropdown field listing all of the applicable units for the user to select from.

Therefore, the sign-in module determines whether input has been received indicating the user has selected a unit in Operation 425. If so, then the sign-in module in particular embodiments provides one or more applicable objects in the selectable object field in Operation 430. Here, an object represents a specific instance of the item associated with the technical documentation. For example, the user may be a mechanic for the airline and he or she may be signing into the IETM to gain access to technical documentation for a particular model of aircraft. Here, the particular model of aircraft may have multiple configurations in which a first configuration uses air brakes and thrust reversers and a second configuration uses disc brakes and thrust reversers. Therefore, the objects may represent the two different configurations of the model of aircraft. In another example, the user may instead be a mechanic for the airline and he or she may be signing into the IETM to gain access to technical documentation for a particular aircraft. Therefore, in this instance, the one or more applicable objects may be the specific aircraft found in the airline's fleet for the model of aircraft. For example, the user may be planning to perform maintenance on one of the particular aircraft and selects the aircraft from the applicable objects listed in the selectable object field.

Again, the selectable object field may be configured as a control such as a dropdown listing the applicable objects to allow the user to select a desired object. In addition, the applicable objects may be dependent on the unit selected by the user. For example, the user may have selected mechanic for crew C as the unit and only the aircraft for the particular type of aircraft authorized to be worked on by crew C may be displayed on the sign-in window.

Accordingly, in particular embodiments, selection of a particular object may allow for the technical documentation for the item to be filtered down to a smaller dataset. For instance, returning to the example involving the different configurations for the model of aircraft, the technical documentation for this particular model of aircraft may be filtered to only provide documentation on the air brake configuration or the disc brake configuration based at least in part on the user's selection. In addition, in particular embodiments, a selection of a particular object may allow for recordation of technical documentation accessed and/or processes, tasks, and/or the like performed for a particular object of an item. For instance, the performance of maintenance on a specific aircraft found in the airline's fleet may be recorded/tracked in the IETM. Therefore, the IETM may be used to maintain a maintenance record for the specific aircraft. In some embodiments, a universal object may be provided along with the applicable objects that allows for the user to view all the technical documentation for a particular item. For example, a universal object may be provided to allow the user to view the technical documentation on both the air brake configuration and the disc brake configuration of the model of aircraft.

Therefore, in particular embodiments, the sign-in module determines whether input has been received indicating the user has selected a specific object in Operation 435. If not, then the sign-in module determines whether input has been received indicating the user has selected a universal object in Operation 440. If the user has selected the universal object, then the sign-in module causes a sign-in mechanism to be made available on the sign-in window to the user in Operation 445. Accordingly, the sign-in mechanism may be any one of different types of controls depending on the embodiment such as, for example, a button, a toggle, checkbox, and/or the like.

If instead the user has selected a specific object, then the sign-in module in particular embodiments determines whether input has been received indicating a job has been identified in Operation 450. A job may represent an instance of a specific procedure, task, operation, and/or the like to be performed on the specific object. For instance, returning to the example involving the user selecting a specific aircraft for airline, the job may represent a specific maintenance task the user is to perform on the specific aircraft such as repairing the air braking system. Accordingly, the sign-in window may provide a field for the user to enter an identifier for the job. In some embodiments, the sign-in module causes the job field to be accessible in response to the user selecting a specific object.

Again, the identification of a job may allow the technical documentation to be filtered to enable the user to find the documentation needed for the job more easily. In addition, the identification of a job may allow for the tracking on the jobs performed on the specific object. Further, the identification of a job may provide security in that access to only certain technical documentation may be provided based at least in part on the job. If a job has been identified by the user, then the sign-in module causes the sign-in mechanism to be made available in Operation 445.

At this point, the user may select the sign-in mechanism to gain access to the IETM and desired technical documentation. Therefore, the sign-in module determines whether input has been received indicating the user has selected the sign-in mechanism in Operation 455 and if so, has provided the required information in Operation 460. For example, in particular embodiments, the sign-in window may also display one or more fields for the user to enter a username and/or password. Therefore, in these instances, the sign-in module may determine whether the user has provided such information. If the user has not, then the sign-in module may provide an error message to display informing the user to provide the needed information in Operation 465.

If all the required information has been provided by the user, then the sign-in module determines whether the user's credentials are valid in Operation 470. Here, in particular embodiments, the IETM and/or a supporting system in communication with the IETM may store information on the user's credentials and the information entered by the user on the sign-in window may be compared with the stored credential information. If the user's credentials are invalid, then the sign-in module may provide an error message to display informing the user of such in Operation 465. However, if the user's credentials are valid, then the sign-in module signs the user into the IETM in Operation 475. At this point, the user may begin accessing and interacting with the technical documentation for the item via the IETM.

Turning now to FIG. 5A, an example of a sign-in window 500 is provided that may be used according to various embodiments. In this particular example, a username field 510 is provided as a text field that allows for the user to enter his or her username. In addition, a selectable dataset field 515 is provided to allow the user to select the technical documentation (e.g., dataset) for a desired item. Here, the selectable dataset field 515 is provided as a dropdown menu control that lists the available technical documentation from which the user can select. Likewise, a selectable unit field 520 is provided that allows for the user to select a unit. Again, in this particular example, the selectable unit field 520 is provided as a dropdown menu control listing the applicable units for the dataset. Further, a selectable object field 525 is provided that allows for the user to select a specific object for the item. In this particular example, the objects are specific aircraft identified by their tail numbers. Therefore, the user selects the tail number of the desired aircraft. In addition, a universal object 530 is provided in the list of objects in this particular example that allows for the user to gain access to all of the technical documentation for the model of aircraft (item). Here, the universal object 530 is provided so that it may be used when the user is engaging in research and/or training on the model of aircraft and not necessarily performing a procedure, task, operation, and/or the like on a specific aircraft.

Turning to FIG. 5B, a job field 535 is provided to allow the user to enter a job (e.g., job identifier) with respect to the specific object. In addition, a sign-in mechanism (e.g., a button) 540 is provided that the user may select to sign into the IETM and view the technical documentation for the specific object. As further discussed herein, the user may now be provided with access to the technical documentation and a number of different functionality with respect to the technical documentation in various embodiments.

Accordingly, the sign-in functionality provided in various embodiments may allow for tracking and reporting of activities within the IETM. For instance, any activity engaged in by the user once he or she is signed into the IETM may be recorded and viewable via the IETM. For example, the content (e.g., the technical documentation) accessed and viewed by the user may be recorded so that the user's access and use of such content can be monitored. In addition, the user's completion of activities such as procedures, tasks, operations, and the like may be recorded and monitored.

For example, FIG. 5C provides a history report 545 the user may view via the IETM on the user's history of accessing and viewing different content (e.g., data modules) in the technical documentation. The history report 545 may be configured in some embodiments to allow the user to select particular content (e.g., a particular data module) from the report 545 to view the content in a separate view pane 550. Depending on the embodiment, the history report 545 may only be provided to the user or may be provided to other personal such as the user's supervisor so that the supervisor can monitor the user's activities. Other types of reports may be made available to the user such as a daily report 555 shown in FIG. 5D. Again, depending on the embodiment, the daily report 555 may only be provided to the user or may be provided to other personal such as the user's supervisor. Thus, the availability of certain functionality within the IETM may be provided to the user and others based at least in part on their credentials used to sign-into the IETM.

Table of Contents Module

In various embodiments, the user may be provided with an initial window upon signing into the IETM to view the technical documentation for an item. Accordingly, in particular embodiments, a table of contents may be displayed on the initial window for the technical documentation associated with the item and various functionality. In some embodiments, the initial window may include multiple view panes. For instance, in some embodiments, the window may include a first view pane and a second view pane that are displayed on non-overlapping portions of the window, although more than two view panes may be displayed and/or the panes may be displayed on overlapping portions of the window in some instances.

In some embodiments, the table of contents may be displayed on a first view pane and may provide a list of topics configured to be selectable to view information on a selected topic. For example, each of the topics may be provided as a hyperlink and/or provided with one or more selection mechanisms such as buttons that a user may select to view additional information on the topic. Depending of the embodiment, the additional information may then be provided for displaying on another view pane on the window (e.g., on the second view pane) and/or via a separate window. In some embodiments, the separate window displaying the additional information may be superimposed over a portion of the first window displaying the table of contents.

As described further herein, other windows provided for display in various embodiments may be configured in the same or similar fashion. Depending on the configuration, these windows may include any number of panes. For instances, the panes may be provided side-by-side on non-overlapping portions of the window or may be provided as overlapping (e.g., superimposed over one another) on the window. In addition, the panes may be displayed in various sizes and dimensions with respect to the window. Further, the panes may be display statically and/or dynamically such as pop-up panes.

In addition, any number of separate windows may be displayed at virtually the same time side-by-side or with one window superimposed over a portion of or an entire second window. Here, the window(s) may be displayed in various sizes and dimensions. In addition, in some embodiments, multiple windows may be displayed as superimposed over one another (or portion thereof) in a cascading fashion. Further, such windows may be displayed statically or dynamically such as pop-up windows. Furthermore, a window may be provided in particular embodiments for display in any number of different formats such as, for example, a dialog box, tooltip, infotip, tear-off window, and/or the like.

Thus, turning now to FIG. 6, additional details are provided regarding a process flow for facilitating the user's viewing and interacting with the table of contents according to various embodiments. FIG. 6 is a flow diagram showing a table of contents (TOC) module for performing such functionality according to various embodiments of the disclosure.

The process flow 600 begins in various embodiments with the TOC module providing a window for display comprising the table of contents in Operation 610. As previously discussed, the table of contents may provide a list of topics on content found within the technical documentation for the item. Accordingly, each of the topics may be selectable (e.g., may be configured as a hyperlink or configured with some type of selection mechanism such as a button) to access content found in the technical documentation for the item.

For example, topics may include procedures, tasks, operations, services, checklists, planning, and/or the like performed with respect to the item. For instance, topics may include maintenance procedures and/or tasks performed on the item. Therefore, the maintenance procedure (e.g., an identifier of the maintenance procedure such as a title of the maintenance procedure) may be selected by the user directly from the table of contents to access content found in the technical documentation for the maintenance procedure.

In addition, topics may include different components that make up the item. For example, a component of an aircraft is the front landing wheel. Accordingly, components may identify functional and/or physical structures of the item and may be broken down into assembly, sub-assembly, sub-sub-assembly, system, sub-system, sub-sub-system, subject, unit, part, and/or the like.

Further, the table of contents may be displayed in a hierarchical structure in which topics are grouped accordingly with some topics nested within other topics within the hierarchical structure based at least in part on relationships between the different topics. For example, a topic on the front landing wheel of an aircraft may be nested under a topic on the front landing gear assembly for the aircraft in the hierarchical structure of the table of contents. Lastly, the table of contents may provide various lists on other types of information in particular embodiments such as lists of effective data modules, illustrations, tables, parts, orders for parts, annotations, directions, publications, and/or the like.

The user may select a topic to preview in particular embodiments. For example, the user may use a mouse to click on, right click on, or hover over a topic in the table of contents or use a stylus or finger to select a topic in the table of contents to generate a preview for the topic. Therefore, the TOC module may determine whether input has been received indicating the user has selected a topic to preview in Operation 615. If so, then the TOC module generates the topic preview in Operation 620 and provides the topic preview for display for the user to view in Operation 625.

For instance, in particular embodiments, the topic preview may be provided as a separate window for display. Accordingly, the topic preview may provide the user with information/data, tables, instructions, illustrations, other media content, links to additional and/or related information, and/or the like associated with the selected topic. In some embodiments, the topic preview is configured to provide only a preview of some of the content found in the technical documentation on the topic. For example, the topic preview may be configured in particular embodiments to provide the first five to fifty lines of textual information that the user would be provided with if the user were to select the topic to view the entire content for the topic. In addition, the preview may be superimposed over a portion of the window displaying the table of contents.

In some embodiments, the user may be provided with functionality to filter the table of contents. For instance, the content for each of the topics may be associated with metadata. Indeed, the content may be organized based at least in part on S1000D standards. S1000D standards requires the content to be configured into data modules representing small, reusable pieces of technical information/data. Accordingly, each data module includes a header section configured to provide identification information and status information for the data module that includes metadata for managing the data module (e.g., source information, security classification, applicability, change history, reason for change, verification status, and/or the like). Here, the header section may include an information code that provides a description on the type of information found in the content of the data module.

Therefore, in particular embodiments, functionality is provided to allow the user to filter the table of contents using the information codes for the different topics (e.g., data modules for the topics). Thus, in these particular embodiments, the TOC module determines whether input has been received indicating the user would like to filter the table of content based at least in part on an information code (InfoCode) in Operation 630. If so, then the TOC module filters the table of contents and provides of the table for display in Operation 635.

In addition, in particular embodiments, functionality is provided to allow the user to view the table of contents in a source format as opposed to a format adhering to S1000D standards. In many instances, the source format may be preferable for a user because the source format may include labeling of the content that is better suited for searching than the formatting of the content under S1000D standards. For example, S1000D standards requires the figures (e.g., illustrations) found in a data module to be numbered always beginning with one. Therefore, if content from a source is partitioned into multiple data modules, the original labeling of figures may be lost. As a result, the content may end up being displayed having multiple figures labeled the same (e.g., may end of having multiple figures labeled as one). The same can happened with respect to other labels found in the source content such as chapters, headings, sub-headings, sections, sub-sections, and/or the like. Therefore, the TOC module determines whether input has been received indicating the user would like to view the table of contents showing the source content formatting in Operation 640. If so, then the TOC module generates and provides the table of contents with the source content formatting for display in Operation 645.

Further, in particular embodiments, functionality (e.g., a search mechanism displayed on the window) is provided that allows the user to search the table of contents. As discussed further herein, the search functionality may allow the user to provide criteria (e.g., one or more search terms) that can then be used to identify topics based at least in part on the criteria. In some embodiments, a search window is provided on which the user can enter search terms and to display the search results. Therefore, in these embodiments, the TOC module determines whether input has been received indicating the search functionality has been selected by the user in Operation 650. If so, then the TOC module enables such functionality in Operation 655.

Furthermore, in particular embodiments, functionality is provided to allow for the user to copy the data module code (DMC) for a topic. The data module code is part of the metadata (e.g., header section) of a data module that holds the content for a topic. The DMC includes several characters identifying information about the data module such as the item to which the content applies, the functional or physical breakdown of the item associated with the content, the specific type of information found in the content, and/or the like. Therefore, in these particular embodiments, the TOC nodule determines whether input has been received indicating the user would like to copy the DMC for a particular topic (e.g., particular data module) in Operation 660. For example, the user may select a topic in the table of contents using shift click to copy the DMC for the topic. If so, then the TOC module copies the DMC in Operation 665. For instance, the TOC module may copy the DMC from a URL displayed via the IETM viewer (e.g., for the corresponding data module). In some embodiments, the user may then send the URL in some type of communication (e.g., in an email) to another individual. For example, the user may wish to send a message to an individual who is managing the content of the data module asking the individual to make a change to the data module. Therefore, the user may wish to include the DMC for the date module to identify which data module the user is talking about.

Finally, the TOC module is configured in various embodiments to determine whether input has been received indicating the user has selected a particular topic to view in Operation 670. For instance, in particular embodiments, the TOC module may be configured to determine the user using a first type of selection mechanism (e.g., hover over a topic in the table of contents) to generate and provide a topic preview of the content for the topic and determine the user using a second, different type of selection mechanism (e.g., a mouse click on the topic in the table of contents) to generate and provide the content found in the technical documentation for the topic. Again, the selection mechanism may involve the user using some type of control such as a mouse to click on, right click on, or hover over the topic in the table of contents or use a stylus or finger to select a topic in the table of contents. Therefore, if the TOC module determines the user has selected a topic to view in the IETM then the TOC module provides the topic to display in Operation 675.

Accordingly, depending on the embodiment, the content for the topic may be displayed on the same or a different window. For instance, in particular embodiments, the content for the topic may be displayed in a separate view pane (e.g., second view pane) on the window. In other embodiments, the content may be displayed on a different window while the window displaying the table of contents may still be available for viewing. For example, the window displaying the table of contents may be available for immediate viewing in response to the user selecting a mechanism such as a button displayed on a toolbar and/or a view tab via the IETM viewer.

Turning briefly to FIG. 7, an example of a table of contents displayed according to various embodiments is shown. Here, the table of contents includes a preface 700 of different lists along with a list of various topics. In this example, the user has selected a particular topic 715 to generate a preview for the topic that is being displayed on a separate window 720. In addition, the window provides a selectable field 725 (e.g., a dropdown menu control) to allow the user to filter the table of contents based at least in part on information codes. Further, the preview window 720 in this example provides a selection mechanism (e.g., a button) 730 to add a bookmark for the preview. Bookmarking the preview may allow the user to recall the preview and/or content for the associated topic at a later time to view. Accordingly, such a bookmark may be recorded and saved in the IETM for the user.

Further detail is now provided with respect to functionality available in various embodiments for the table of contents. Specifically, different modules are discussed that may be invoked in various embodiments by the TOC module to facilitate such functionality.

Filtering Module

Turning now to FIG. 8, additional details are provided regarding a process flow for filtering the table of contents based at least in part on an information code according to various embodiments. FIG. 8 is a flow diagram showing a filtering module for performing such functionality according to various embodiments of the disclosure. In particular embodiments, the filtering module may be invoked by another module to filter the table of contents such as, for example, the TOC module previously described. However, with that said, the filtering module may not necessarily be invoked by another module and may execute as a stand-alone module in other embodiments.

Accordingly, the filtering module may be invoked in some embodiments as a result of the user identifying a particular information code to use in filtering the table of contents. Here, the technical documentation may include publication data (e.g., a publication module). In these particular embodiments, the publication data may provide a list of technical data (e.g., every data module) found in the publication of the technical documentation for the item in the order in which the publication delivers the data to the IETM. Therefore, the publication data may provide a navigation structure for the IETM in constructing the table of contents.

Therefore, the process flow 800 may begin with the filtering module referencing the publication data in Operation 810. The filtering module then select specific data (e.g., a data module) found in the publication data in Operation 815. In addition to identifying the technical data found in the publication of the technical documentation, the publication data may also include metadata (e.g., the DMC) for the technical data (e.g., for each of the data modules). Therefore, the filtering module reads the information code for the selected data in Operation 820. The filtering module then determines whether the information code for the selected data matches the information code selected by the user to filter the table of contents in Operation 825. If so, then the filtering module marks the technical data for displaying as a topic in the filtered table of contents in Operation 830.

At this point, the filtering module determines whether the publication module contains additional technical data (e.g., another data module) in the list of technical data in Operation 835. If so, then the filtering module returns to Operation 815, selects the next technical data found in the list (e.g., the next data module), and repeats the operations just described for the newly selected technical data. Once all of the technical data have been processed in the list, the filtering module then generates and provides the results for display to the user in Operations 840 and 845.

Turning now to FIG. 9, an example of the results of filtering the table of contents based at least in part on an information code is provided. In this example, the table of contents has been filtered based at least in part on the information code for troubleshooting 900. As the reader can see, only those topics 910 dealing with troubleshooting are shown under the topic heading fuel and topic sub-headings distribution and general. Thus, the filter function provided in various embodiments allows for the user to filter down the topics found in the technical documentation in a faster, more efficient manner so that the user can more easily and quickly identify needed content in the technical documentation.

Source Format Tagging Module

As previously described, functionality may be provided in some embodiments to allow the user to view the table of contents in a source format as opposed to a format adhering to S1000D standards. As noted, the source format may be preferable for a user because the source format may include labeling of the content that is better suited for searching than the formatting of the content under S1000D standards.

Turning now to FIG. 10, additional details are provided regarding a process flow for tagging content with the formatting found in the source of the content according to various embodiments. FIG. 10 is a flow diagram showing a source format tagging module for performing such functionality according to various embodiments of the disclosure. Accordingly, the source format tagging module may be executed in particular embodiments by an entity such as the management computing entity 100 and/or a user computing entity 110 engaged in importing a publication of technical documentation for an item into the IETM. In this instance, the publication may include content from a source in a format such as portable document format (PDF), a standards generalized markup language (SGML) format, and/or the like. The source may include formatting for the content such as identifiers (e.g., numbering and/or textual descriptions) for chapters, headings, sub-headings, sections, tables, figures, and/or the like.

Therefore, the process flow 1000 begins with the source format tagging module reading the information from such a source in Operation 1010. The source format tagging module then selects the format structure from the information in Operation 1015 and tags the appropriate portion of the content with the information in Operation 1020. For instance, in particular embodiments, the source format tagging module may record metadata along with the content from the source in the IETM that includes the source formatting and information to format the content appropriately. For example, the content may include a reference to a figure and the source format tagging module may record the format (e.g., the label) for the figure in metadata along with the content in the IETM. While in another example, the content found in the source may include a chapter title. Therefore, the source format tagging module may record the title of the chapter in the metadata along with the content in the IETM.

At this point, the format tagging module determines whether additional format structure is found in the content in Operation 1025. If so, then the source format tagging module returns to Operation 1015, selects the next format structure found in the content, and tags the content with the format structure accordingly. As a result, the content can be displayed in various embodiments in its original format structure from the source of the content.

Source Formatting Module

Turning now to FIG. 11, additional details are provided regarding a process flow for formatting content based at least in part on a format structure found in the source of the content according to various embodiments. FIG. 11 is a flow diagram showing a source formatting module for performing such functionality according to various embodiments of the disclosure. In this instance, the user may wish to view the table of contents with the topics shown with the format structure found in the source of the topics. Therefore, in particular embodiments, the source formatting module may be invoked by another module to display the content with the format structure from the source such as, for example, the TOC module previously described. However, with that said, the source formatting module may not necessarily be invoked by another module and may execute as a stand-alone module in other embodiments.

The process flow 1100 begins with the source formatting module reading a format tag for the content in Operation 1110. As previously discussed, the content may be tagged in particular embodiments by including metadata (e.g., tags) long with the content identifying various parts of the format structure found in the source of the content. For example, the metadata may include one or more tags providing identifiers (e.g., numbering and/or textual descriptions) for chapters, headings, sub-headings, sections, tables, figures, and/or the like found in the source of the content.

The source formatting module then formats the content based at least in part on the format structure found in the tag in Operation 1115. For example, the format structure may identify a subject matter heading for the content. Therefore, the source formatting module may format the content with the subject matter heading. Accordingly, in particular instances, the content may then be found in the table of contents as a topic having the subject matter heading as a title. While in other instances, the content itself may be displayed on a window with the subject matter heading.

At this point, the source formatting module determines whether another tag exists for the content in Operation 1120. If so, then the source formatting module returns to Operation 1110, reads the next tag for the content, and formats the content based at least in part on the format structure found in the tag.

Turning to FIG. 12A, an example is provided of a table of contents 1200 formatted according to S1000D standards. As shown in the figure, all of the topics found under the heading flight manual are provided in a generic format with only a title for each topic. However, in FIG. 12B, the table of contents 1210 is now formatted using the format structure found in the source for the flight manual. As the reader can see, each of the topics is now listed with a section heading as found in the source for the flight manual. Such section headings may allow for the user to more easily distinguish between the different content provided by the source.

Another example is shown in FIG. 12C. In this example, content from a source, in this instance a PDF file, is being displayed on a window with source formatting according to various embodiments. Here, the format structure of the content shown on the window matches the format structure of the content found in the source PDF file. Specifically, the title designator for the content 1215 has been included along with the title of the content 1220 shown on the window. In addition, the heading 1225 and sub-headings 1235, 1245 from the source PDF file are shown as a heading 1230 and sub-headings 1240, 1250 in the content on the window. Here, in the example, the user may be able to better navigate and understand the content as a result of viewing the content in the format structure found in the source PDF file.

Search Module

As previously noted, the user may conduct a search of the elements (e.g., topics and/or lists) found in the table of contents based at least in part on criteria (e.g., one or more search terms). Turning now to FIG. 13, additional details are provided regarding a process flow for searching the table of contents according to various embodiments. FIG. 13 is a flow diagram showing a search module for performing such functionality according to various embodiments of the disclosure. In particular embodiment, the search module may be invoked by another module to search the table of contents such as, for example, the TOC module previously described. For instance, a user may select a mechanism (e.g., button) provided on a window displaying the table of contents and as a result, the TOC module may invoke the search module. However, with that said, the search module may not necessarily be invoked by another module and may execute as a stand-alone module in other embodiments.

The process flow 1300 begins with the search module providing a search window for display to the user in Operation 1310. Accordingly, the search window may be configured in a similar fashion as the window displaying the table of contents. For instance, in some embodiments, the search window may include one or more view panes for displaying search results according to different criteria (e.g., different features of the elements found in the table of contents). In particular embodiments, the search window provides a freeform field that allows the user to type in one or more search terms to use in searching the table of contents. In some embodiments, the search module may be configured to provide predictions of search terms to the user based at least in part on the characters typed into the freeform field.

Therefore, in these embodiments, the search module determines whether input has been received indicating the user has typed one or more characters into the freeform field in Operation 1315. If so, then the search module provides one or more predictions of search terms (e.g., autocomplete) to the user in Operation 1320. As discussed further herein, the predictions may be based at least in part on different grounds depending on the embodiment. For example, the search module may be configured to provide the first five predictions identified for the entered characters alphabetically, based at least in part on frequency of use, based at least in part on recent trends, and/or the like.

The search module then determines whether input has been received indicating the user has initiated a search based at least in part on the entered search term(s) in Operation 1325. For instance, the search window may include a selection mechanism (e.g., a button) that the user can select to initiate the search. Therefore, the search module determines whether input has been received indicating the user has selected the selection mechanism. If the user has initiated the search, then the search module generates search results based at least in part on the entered search term(s) in Operation 1330. In addition, in some embodiments, the user may indicate other criteria for conducting the search.

For example, the search window may include a field that allows the user to identify applicability requirements for the search results. Applicability generally pertains to the context for which the results (e.g., information found in topics) are valid. The context can be associated with a physical configuration of the item, but can also include other aspects such as support equipment availability and/or environmental conditions. In addition, the search window may include a field that allows the user to identify the type of content required for the search results. The content generally pertains to the technical information provided by the search result. For example, different types of content may include procedural, process, wiring, maintenance, learning, parts, checklists, and/or the like. Further, the search window may include other mechanisms that allow the user to identify criteria for filtering the search results such as information code.

Accordingly, in various embodiments, the search module is configured to search different features of the elements found in the table of contents to identify the search results. For instance, in particular embodiments, the search window is configured to provide the search results with respect to table of contents, data module, and part name and/or number. Here, the search module searches the table of contents to identify those topics with the search term(s) in the title of the topic. In addition, the search module searches the various data (e.g., data modules) that make up the technical documentation to identify data in which the search term(s) are found in the textual information for the data. Further, the search module searches the part names and/or numbers of the parts used in the item to identify those parts with the search term(s) in the part names and/or numbers.

Accordingly, in these particular embodiments, the search module may format the search results with respect to table of contents, data modules, and parts (e.g., part names and/or numbers) in Operation 1335, The search module may then provide the search results for displaying in Operation 1340. Here, the search window may be configured to show the search results with respect to the three different basis: table of contents, data modules and parts. For example, the search window may provide a view pane with a tab for each basis that the user may select to view the search results for the basis.

At this point, the search module determines whether input has been received indicating the user wishes to exit the search window in Operation 1345. For example, the user may select one of the search results (e.g., a topic) to view or the user may simply select a mechanism to exit the search window. If so, then the search module exits.

It is noted that in some embodiments, the search results are not necessarily lost (e.g., closed) as a result of the user exiting the search window. Instead, the results may be maintained while the user is still actively signed into the IETM. Such functionality allows for the user to later return to his or her search results to further view and use accordingly. For example, the user may initially view a data module listed in the search results and then later decided to view the search results again because the data module did not have the information the user was looking for. Therefore, the search results may be maintained so that the user can later return to them if desired. In some instances, the IETM may be configured to save the search results even past the user's current sign-in to the IETM.

Predictions Module

Turning now to FIG. 14, additional details are provided regarding a process flow for providing predictions based at least in part on search term(s) entered by a user according to various embodiments. FIG. 14 is a flow diagram showing a predictions module for performing such functionality according to various embodiments of the disclosure. In particular embodiments, the predictions module may be invoked by another module to provide predictions such as, for example, the search module previously described. However, with that said, the predictions module may not necessarily be invoked by another module and may execute as a stand-alone module in other embodiments.

The process flow 1400 begins with the predictions module reading (e.g., receive input of) the character(s) typed in by the user on the search window in Operation 1410. In various embodiments, a search index is maintained in the IETM that is constructed from the dataset for the technical documentation of the item. Here, the search index provides a mapping of characters (e.g., alphanumeric) to various terms found in the technical documentation for the item. Therefore, in these embodiments, the predictions module searches the index to identify predictions based at least in part on the entered character(s) in Operation 1415.

The predictions module then orders the predictions based at least in part on certain grounds in Operation 1420. As previously discussed, the grounds for ordering the predictions may differ depending on the embodiments. For example, the predictions module may order the predictions based at least in part on alphabetically, frequency of use, recent trends, and/or the like. The predictions module provides of the top predictions in operation 1425. For instance, the predictions module may be configured to provide the top five, ten, and/or the like predictions that are selectable by the user to automatically complete the search terms in the freeform field provided on the search window.

At this point, the predictions module determines whether input has been received indicating the user has selected a prediction in Operation 1430. If not, then the predictions module returns to Operation 1410 to read any further characters entered by the user in the freeform field and to make further predictions accordingly. Once the user selects one of the predictions or finishes typing in characters in the freeform field, then the predictions module exits.

FIG. 15A provides an example of a search window 1500 displaying search results according to various embodiments. In this example, the search results are being displayed on a view pane 1510 with respect to data modules that have content containing the search term "assembly" 1515. Note that view panes 1520, 1525 are also provided for the table of contents and part numbers that are hidden on the window 1500 behind the data module view pane 1515. Turning now to FIG. 15B, the search results are now shown as filtered based information code 1530. Here, the user has selected a mechanism 1535 provided on the search window 1500 indicating to filter the results based on information code. In addition, a separate tab 1540, 1545, 1550 is provided for each of table of contents pane 1520, data modules pane 1510, and parts pane 1525, respectively, to provide the user with access to the search results for the three different basis.

Generate List of Parts Module

A list of parts for an item may be provided in the IETM in various embodiments. In these particular embodiments, this list of parts may be generated based at least in part on information/data provided in a publication of the technical documentation of the item. Specifically, the list of parts may be generated based at least in part on the illustrated parts breakdown (IPB) found in the publication. Thus, in various embodiments, a list of parts used by the item may be generated without the need to gather such a list from the suppliers of the parts or any other third-party source outside the publication of the technical documentation for the item.

Turning now to FIG. 16, additional details are provided regarding a process flow for generating a list of parts for the item according to various embodiments. FIG. 16 is a flow diagram showing a generate list of parts module for performing such functionality according to various embodiments of the disclosure. Accordingly, the generate list of parts module may be executed in particular embodiments by an entity such as the management computing entity 100 and/or a user computing entity 110 engaged in importing a publication of the technical documentation for an item.

The process flow 1600 begins with the generate list of parts module reading the IPB provided with the publication in Operation 1610. Here, the IPB identifies the parts found in the technical documentation for which one or more illustrations (e.g., graphics and/or other media objects) are included in the technical documentation. For example, a data module for a particular maintenance task may be found in the publication for the technical documentation that references a particular part used in a repair that is detailed in the maintenance task. Accordingly, one or more illustrations of installing the part may be included along with the data module that can be displayed to a user as the user views the maintenance task via the IETM. Therefore, a reference to the one or more illustrations may be provided in the IPB.

Thus, the generate list of parts module identifies the parts (e.g., part names and/or numbers) found in the IPB in Operation 1615 and generates the list of parts based at least in part on the parts found in the IPB in Operation 1620. Accordingly, as detailed further herein, the generated lists of parts may then be viewed by a user via the IETM.

List of Parts Module

Accordingly, a user may request to view the list of parts for an item via the IETM. For example, a selection mechanism may be provided such as a button provided on a toolbar to allow the user to request to view the list of parts for the item. As a result, a window may be provided for displaying the list of parts. Accordingly, in particular embodiments, the window may be configured similar to the other windows mentioned herein.

For instance, in some embodiments, the window may be configured to have a first view pane displaying the list of parts and a second view pane that is used to display various information on a part found in the lists of parts. The window may be configured to display the view panes on non-overlapping portions of the window. In addition, each part displayed in the list of parts may be selectable (e.g., may be displayed as a hyperlink and/or displayed with one or more selections mechanisms such as buttons) to provided information on the part. In some embodiments, such information may be displayed on a view pane (e.g., the second view pane) and/or may be displayed on a separate window. As now further detailed, the window may provide the user with various functionality that may be used with respect to the list of parts.

Turning now to FIG. 17, additional details are provided regarding a process flow for providing functionality for the list of parts according to various embodiments. FIG. 17 is a flow diagram showing a list of parts module for performing such functionality according to various embodiments of the disclosure. Accordingly, the list of parts module may be executed in particular embodiments as a result of a user who is viewing the list of parts via the IETM invoking various functionality.

The process flow 1700 begins with the list of parts module determining whether input has been received indicating a selection of a part by the user in Operation 1710. As noted, in particular embodiments, each part in the list of parts may be selectable. For example, each part in the list of parts may be displayed as a hyperlink and/or along with some type of selection mechanism (e.g., a button) to allow the user to select the part from the list. Accordingly, in response to determining the user has selected a part, the list of parts module provides media content for the part in Operation 1715.

As previously noted, the media content may be made up of one or more illustrations that may include 2D and/or 3D graphics, as well as other media objects such as images and/or videos that may be provided in the technical documentation for the item. Therefore, in particular embodiments, the list of parts module may be configured to retrieve the media content and provide the list of parts for display on a first view pane of the window and the media content for the selected part on a second view pane of the window. As noted, the window may be configured so that the first and second view panes are displayed on non-overlapping portions of the window. In addition, in particular embodiments, the part may be highlighted in the media content so that the user can easily identify it in the content.

Further, the selected part may be displayed in the list of parts using a format to demonstrate the part has been selected such as, for example, the selected part may be highlighted, shown in a particular color, shown with a border, and/or the like. Furthermore, functionality may be provided for the selected part such as, for example, a selection mechanism that provides functionality to allow the user to order the part from the IETM.

If the user has not selected a part in the list of parts, then the list of parts module determines whether input has been received indicating the user has identified one or more level indicators for relisting the list of parts in Operation 1720. As previously noted, each of the parts may be associated with one or more components of the item for which the technical documentation is being viewed by the user via the IETM. In various embodiments, each of these components may be identified with a functional and/or physical structure of the item such as assembly, sub-assembly, sub-sub-assembly, system, sub-system, sub-sub-system, subject, unit, part, and/or the like. Therefore, the user may be interested in viewing the parts in the list of parts broken down into these levels of functional and/or physical structure. If that is the case, then the list of parts module relists the list of parts based at least in part on the levels identified (e.g., selected) by the user and provides the relisted list of parts for display on the window in Operation 1725.

Accordingly, each of the parts in the list of parts may display various information for the part that may be selectable to retrieve and view search results on additional information found in the technical documentation for the part. For instance, each of the parts may display a part name and/or number for the part that is selectable (e.g., that is displayed as a hyperlink and/or along with a selection mechanism such as a button) that when selected by the user, a preview is generated and displayed providing results on textual information and/or media content (e.g., illustrations and/or other media objects) found in the technical documentation for the selected part.

For example, the user may use a mouse to click on, right click on, or hover over a part in the list of parts or use a stylus or finger to select a part in the list of parts to generate a preview for the part. Therefore, the list of parts module determines whether input has been received indicating the user has selected a part name and/or number for a part to generate a preview in Operation 1730. If so, then the list of parts module generates a preview of results based at least in part on information on the part found in the technical documentation for the item in Operation 1735 and provides the preview for display in Operation 1740.

In particular embodiments, the part preview may be provided as a separate window. For instance, in some embodiments, the preview window may be superposed over a portion of the window displaying the list of parts. Accordingly, the part preview may provide the user with information/data, tables, instructions, illustrations, other media content, links to additional and/or related information, and/or the like associated with the selected part. In some embodiments, the part preview is configured to provide only a preview of some of the content found in the technical documentation on the part. In addition, various components of the results may be selectable to access further information.

Although not specifically shown in FIG. 17, other information may be retrieved and displayed in a preview for the part in some embodiments. Specifically, each of the parts in the list of parts may be associated with one or more commercial and government entity (CAGE) codes and/or one or more source, maintenance, and recovery (SMR) codes. In general, these codes identifier a supplier for the part, although other types of supplier identifiers may be used. In particular embodiments, these codes may be displayed along with each part in the list of parts on the window. In addition, each of these codes may be selectable on the window (e.g., displayed as a hyperlink and/or associated with a selection mechanism) to allow the user to view a preview displaying information on the particular supplier associated with the code. For example, the user may use a mouse to click on, right click on, or hover over a code for a part or use a stylus or finger to select a code for a part to generate a preview. Therefore, the list of parts module may determine whether input has been received indicating the user has selected a CAGE or SMR code for a part. If so, then the list of parts module generates a preview for the supplier associated with the selected CAGE or SMR code and provides the preview for the user to view.

Similar to the part preview, the supplier preview may be provided as a separate window. For instance, in some embodiments, the preview window may be superposed over a portion of the window displaying the list of parts. Accordingly, the supplier preview may provide the user with information/data, tables, instructions, illustrations, other media content, links to additional and/or related information, and/or the like associated with the supplier. In some embodiments, the supplier preview is configured to provide only a preview of some of the content found in the technical documentation on the supplier. In addition, various components display on the preview may be selectable to access further information.

Similarly, related maintenance procedures and/or tasks that mention the part may be provided for each part in the lists of parts that are selectable. For example, the user may use a mouse to click on, right click on, or hover over a maintenance procedure and/or task for a part or use a stylus or finger to select a maintenance procedure and/or task for a part to generate a preview. Therefore, the list of parts module may determine whether input has been received indicating the user has selected a maintenance procedure and/or task related a part. If so, then the list of parts module generates a preview for the related maintenance procedure and/or tasks and provides the preview for the user to view.

Again, similar to the part and supplier previews, the maintenance procedure and/or task preview may be provided as a separate window. For instance, in some embodiments, the preview window may be superposed over a portion of the window displaying the list of parts. Accordingly, the maintenance procedure and/or task preview may provide the user with information/data, tables, instructions, illustrations, other media content links to additional and/or related information, and/or the like associated with the maintenance procedure and/or task. In some embodiments, the preview is configured to provide only a preview of some of the content found in the technical documentation on the maintenance procedure and/or task. In addition, various components display on the preview may be selectable to access further information.

Further, as previously noted, functionality may be provided in some embodiments that allows the user to order a selected part from the IETM. As discussed further herein, this functionality provides an order form that can then be populated and submitted by the user to order the part. Therefore, in these particular embodiments, the list of parts module determines whether input has been received indicating the user would like to order a selected part in Operation 1745. If so, then the list of parts module enables the order part functionality in Operation 1750.

Finally, in particular embodiments, the list of parts module may provide functionality to allow the user to view other items besides the item the user is currently viewing the technical documentation for that also use a selected part in the list of parts. Here, a mechanism may be displayed along with the selected part that can be used to display a list of other items that also use the part. For example, a selectable plus sign may be provide that the user may use a mouse to click on, right click on, hover over, and/or the like to display the list of other items that also use the part.

Therefore, in these particular embodiments, the list of parts module determines whether input has been received indicating the user would like to view the list of other items that use a selected part in Operation 1755, If so, then the list of parts module generates a preview displaying the list of other items that use the selected part in Operation 1760 and provides the preview for the user to view in Operation 1765.

Again, the preview may be provided as a separate window. For instance, in some embodiments, the preview window may be superposed over a portion of the window displaying the list of parts. Accordingly, the preview may provide the user with information/data, tables, instructions, illustrations, other media content, links to additional and/or related information, and/or the like associated with the list of other items. In some embodiments, the preview is configured to provide only a preview of some of the content found in the technical documentation on the list of other items. In addition, various components display on the preview may be selectable to access further information.

Accordingly, such a list of items may be quite helpful to the user under certain circumstances. For example, the user may be maintenance personnel who is tasked with performing certain maintenance on an object such as an aircraft. Therefore, the user may have signed into the IETM to view the technical information for the type of aircraft. Specifically, the user may have signed into the IETM to view documentation on the maintenance task he or she is to perform on the aircraft. The documentation on the maintenance task may identify a particular part needed in performing the task. However, the user may determine that the particular part is not currently in stock. Therefore, in this instance, the user may view the list of parts, select the particular part in the list, and generate and display the preview showing other types of aircraft that also use the particular part. As a result, the user may be able to obtain the part from inventory for another type of aircraft and/or may be able to use the part from another aircraft to perform the maintenance task instead of waiting for the part to be ordered and received.

FIG. 18A provides an example of a window 1800 displaying a list of parts according to various embodiments. In this example, the window 1800 provides a first view pane 1810 displaying the list of parts for a particular item (e.g., platform 1810) in which a particular part 1815 found on the list has been selected. As a result, the window 1800 in this example provides a second view pane 1820 displaying an illustration with the selected part 1825 highlighted in the it lustration. Further, a mechanism is provided for displaying a window 1830 providing functionality to perform with respect to the selected part 1825 such as ordering the part 1825.

Turning now to FIG. 18B, an example of a mechanism 1835 that can be used by a user in various embodiments in selecting identifiers for levels for relisting the list of parts is demonstrated. Here, the mechanism 1835 is provided as a dropdown menu control that allows the user to relist the list of parts according to part associated with an end item, component, major assembly, assembly, and/or subassembly. For instance, in this example, the user has indicated to relist the list of parts according to assembly 1840, but not according to subassembly 1845.

Finally, FIG. 18C provides an example of a preview 1850 displaying the information for a supplier as a result of the user selecting a CAGE code associated with a part in the list of parts according to various embodiments. Likewise, FIG. 18D provides an example of a preview 1850 displaying a list of other items that use a selected part according to various embodiments.

Order Part Module

As previously noted, various embodiments provide functionality to allow a user to order a part from the IETM. Turning now to FIG. 19, additional details are provided regarding a process flow for ordering a part from the IETM according to various embodiments. FIG. 19 is a flow diagram showing an order part module for performing such functionality according to various embodiments of the disclosure. In particular embodiments, the order part module may be invoked by another module to order a part from the IETM such as, for example, the list of parts module previously described. For instance, a user may select a mechanism (e.g., button) provided for a selected part on a window displaying the list of parts and as a result, the list of parts module may invoke the order part module. However, with that said, the order part module may not necessarily be invoked by another module and may execute as a stand-alone module in other embodiments.

The process flow 1900 begins with the order part module reading the part number for the part in Operation 1910. Here, for example, the part number may be provided to the order part module from another module such as the list of parts module. While in other instances, the order part module may read the part number (e.g., provided as input) from some type of window being displayed. The part number serves as an identifier for the part. Therefore, depending on the embodiment, the part number may be in various forms such as, for example, an alphanumeric, and may include characters such as dashes, underscore, ampersand, commercial at sign, and/or the like. Those of ordinary skill in the art can envision other characters and/or symbols that may be used in a part number in light of this disclosure.

The order part module then identifies a system for the item for which the part will be used in Operation 1915. Accordingly, the item is generally the item related to the technical documentation currently being viewed by the user through the IETM. However, in some embodiments, the user may identify a specific item that is not necessarily the item associated with the technical documentation currently active for the IETM.

Regardless, many of the items may be associated with a backend system that is used in managing the item. For example, the item may involve a type of aircraft used by the military. Here, the military's backend system used in managing the individual aircraft for the type of aircraft may normally be used in ordering parts for the aircraft. This backend system may have a specific electronic form that is used in ordering parts for the aircraft. Accordingly, forms for the different systems may be available in the IETM and the order part module selects the appropriate form based at least in part on the system associated with the item in Operation 1920.

The order part number then queries a stock number for the part in Operation 1925. The stock number is often used in identifying the physical location where a particular part is stored in a warehouse and/or inventory. Similar to a part number, the stock number serves as an identifier and may be in various forms such as, for example, an alphanumeric, and may include characters such as dashes, underscore, ampersand, commercial at sign, and/or the like. Those of ordinary skill in the art can envision other characters and/or symbols that may be used in a stock number in light of this disclosure. In particular embodiments, the order part module may be configured to identify a stock number for a particular supplier of the part based at least in part on the part number. For example, the supplier may be identified based at least in part on a CAGE and/or SMR code associated with the part found in the technical documentation for the item, although other identifiers may be used for the supplier. Accordingly, in particular embodiments, the order part module determines whether a stock number can be found for the part in Operation 1930. If not, then the order part module may provide an error message to the user in Operation 1935 informing the user that a valid stock number cannot be located for the part.

If a valid stock number is located for the part, then the order part module queries data (e.g., information) for the part in Operation 1940. In particular embodiments, the IETM may be in communication with the supplier's system over some type of network so that the data on the part can be queried directly from the supplier. In other embodiments, the IETM may store the data internally and the order part module queries the data accordingly.

Once the order part module has queried the data for the part, the module auto-populates one or more of the fields on the electronic order form based at least in part on the queried data in Operation 1945. At this point, the order part module provides the electronic order form for display for the user to view in Operation 1950. Here, in particular embodiments, the form may be displayed on a separate window than the window displaying the list of parts. The user may then provide any additional data (e.g., information) that may be needed on the electronic form such as, for example, a quantity of the part that is to be ordered. Once the user has completed filling out the electronic form, the user may submit the electronic form. For example, the electronic order form may provide a selection mechanism (e.g., a button) that the user can select to submit the order for the part. Accordingly, the form may be submitted directly to the supplier to fulfill the order for the part or the form may be placed in a queue and submitted indirectly depending on the embodiment. Other options may be provided to the user in some embodiments as discussed further herein.

Finally, the order part module determines whether input has been received indicating to exit in Operation 1955. If not, then the order part module continues to display the electronic order form. Otherwise once the user has completed submitting the order for the part, or wishes to simply exit the form and indicated such, the order part module exits.

Submit Order for Part Module

Turning now to FIG. 20, additional details are provided regarding a process flow for submitting an order for a part from the IETM according to various embodiments. FIG. 20 is a flow diagram showing a submit order for part module for performing such functionality according to various embodiments of the disclosure. In particular embodiments, the submit order for part module may be invoked by another module to submit the order for the part from the IETM such as, for example, the order part module previously described. For instance, a user may select a mechanism (e.g., button) provided on an electronic order form and as a result, the order part module may invoke the submit order for part module. However, with that said, the submit order for part module may not necessarily be invoked by another module and may execute as a stand-alone module in other embodiments.

As previously noted, the user may be provided various options for submitting the order for the part depending on the embodiment. Some of these options may be contingent on whether or not the user's computer entity 110 is currently in communication with another system. For example, the user may be working out in the field using the IETM to perform maintenance where a connectively (e.g., a wireless network) is not available. As a result, the user may need to order a replacement for a part that was used during the maintenance repair. However, the user cannot submit the order for the part directly to the supplier since the user's computing entity 110 is unable to communicate with the supplier's system. While in other instances, the computing entity 110 may not be in communication with any other system for security reasons.

Therefore, the process flow 2000 begins with the submit order for part module reading (e.g., receiving input) the user's selection for submitting the order for the part in Operation 2010. As noted, the options available to the user may be dictated based at least in part on whether or not the user's computing entity 110 is currently in communication with any other systems. Here, the different options may be made available to the user on the electronic order form as one or more selection mechanisms (e.g., one or more buttons). Further, the selection mechanisms may be made available on the electronic order form based at least in part on the options currently available to the user.

One such option that may be used in various embodiments is to submit the order for the part directly to the supplier. Depending on the embodiment, this option may involve the user's computing entity 110 submitting the order for the part directly to the supplier's system or may involve sending the order for the part initially to some intermediary who then submits the order to the supplier. Therefore, the submit order for part module determines whether input has been received indicating the user has selected the submit order option in Operation 2015. If the submit order for part module determines the user has selected this option, then the submit order for part module submits the order to a remote system in Operation 2020. Accordingly, the remote system may be associated with the supplier of the part or to an intermediary. For example, the submit order for part module may be configured to submit the order to a procurement system for an airline in instances in which the user is a maintenance employee of the airline who is ordering a replacement part for an aircraft. In turn, the procurement system may process the order for the part and then submit it to the supplier to fulfill.

In addition, the submit order for part module may submit the order to the remote system using different procedures depending on the embodiment. For example, in one embodiment, the order may be submitted via electronic data interchange (EDI) between the user's computing entity 110 and the supplier's or intermediary's system. In another embodiment, the order may be submitted via a message such as an email, instant messaging, text messaging, and/or the like. Those of ordinary skill in the art can envision other procedures that may be used in submitting the order to the remote system in light of this disclosure.

Another option that may be used in various embodiments is to place the order in a queue (e.g., a shopping cart) and submit the order at a later time. This option may be used when the user's computing entity 110 is not currently in communication with another system. Therefore, the submit order for part module may determine whether input has been received indicating the user has selected to add the order to a shopping cart option in Operation 2025. If so, then the submit order for part module places the order in the shopping cart in Operation 2030. Once the order has been placed in the shopping cart, the order may then be submitted at a later time when the user's computing device 110 is in communication with another system. Accordingly, depending on the embodiment, the order for the part may be submitted to the supplier directly or initially to an intermediary using any number of different procedures at the later time.

Finally, another option that may be used in various embodiments is to send the order through another channel of communication. In these particular embodiments, the submit order for part module generates a graphical code with the order information and provides the code for display for the user to scan using his or her mobile device. Here, the graphical code may be provided in various forms such as a barcode, a quick response (QR) code, a one-dimensional code, a universal product code, a data matrix code, and/or the like. As a result, the order can be submitted using the mobile device's cellular network as a channel of communication, although the mobile device may be connected to other types of networks such as WIFI. Depending on the embodiments, the user may use a generic code reader application on his or her mobile device or an application specifically designed to submit the order. Using a specific application designed to submit the order may also allow for the order to be submitted in a secure manner. For example, the user may be required to enter security information into the application to open the application to scan the graphical code.

Therefore, the submit order for part module determines whether input has been received indicating the user has selected the graphical code option in Operation 2035. If so, then the submit order for part module generates the graphical code in Operation 2040 and provides the code in Operation 2045. For example, in particular embodiments, the graphical code may be displayed on a separate window. At this point, the submit order for part module in some embodiments records the submission of the order in Operation 2050. Therefore, in these particular embodiments, the IETM can be used a recordkeeper for ordered parts. It noted that recordation of the submission of orders placed in the shopping cart may not be performed in some embodiments until the orders have actually been submitted.

FIG. 21A provides an example of a part 2100 that has been selected in which the option to order the part (e.g., button) 2110 has been provided to the user via a window according to various embodiments. FIG. 21B provides an example of an electronic order form 2115 that has provided on a window as a result of the user exercising the option to order the part 2110 according to various embodiments. Here, the user has been provided the option to directly submit the order for the part (e.g., button) 2120 and the option to place the order in the shopping cart (e.g., button) 2125. Finally, FIG. 21C provides an example of a graphical code in the form of a QR code 2130 generated according to various embodiments that can be scanned by the user to submit an order for a part.

Display Topic Module

Turning now to FIG. 22, additional details are provided regarding a process flow for displaying content for a topic found in the technical documentation for an item via an IETM according to various embodiments. FIG. 22 is a flow diagram showing a display topic module for performing such functionality according to various embodiments of the disclosure. In particular embodiments, the display topic module may be invoked by another module to provide a topic for display such as, for example, the TOC module previously described. For instance, a user may select a topic found in a table of content displayed on a window and as a result, the TOC module may invoke the display topic module. However, with that said, the display topic module may not necessarily be invoked by another module and may execute as a stand-alone module in other embodiments.

As previously noted, topics found in the technical documentation for an item may include procedures, tasks, operations, services, checklists, planning, and/or the like performed with respect to the item. For instance, topics may include maintenance procedures and/or tasks performed on the item. In addition, topics may include different components that make up the item.

For example, a user may be viewing the table of contents for the technical documentation of the item and may select a maintenance procedure listed in the table of contents directly from the table to view the content in the technical documentation on conducting the maintenance procedure. Likewise, the user may be viewing an illustration (e.g., a 2D graphic) of the front braking assembly of an aircraft and may select the front wheel directly from the illustration to view the content on the technical documentation for the front wheel.

In particular embodiments, the technical documentation may be formatted according to S1000D standards and therefore, the documentation for a particular topic may be found in a data module. A data module primarily includes two parts, metadata and content. The metadata is made up of an identification section and a status section. These two sections are used to control a module's retrieval. The content is what a user views on the topic. The content typically is made up of textual information, as well as references (e.g., links) to any media content (e.g., illustrations such as 2D and/or 3D graphics, images, audio, videos, and/or the like) and other data pertaining to the topic. The content of the data module is usually specific to the type of the data module, which is written in accordance with that type's schema. The types of content found in a data module may include, for example: procedural used for tasks and steps information; fault used for troubleshooting; illustrated parts data used for parts lists and other illustrated parts data; process used for sequencing other data modules and/or steps; learning used for training-related material; maintenance checklists used for preventive maintenance, services, and inspections; and/or the like.

Accordingly, the process flow 2200 begins with the display topic module retrieving the textual information for the topic in Operation 2210. In some embodiments, the display topic module creates selectable parts found in the textual information in Operation 2215. As discussed further herein, the parts (e.g., the part names and/or numbers) mentioned in the textual information are recognized and made selectable by displaying them as a hyperlink and/or with some other type of selection mechanism such as a button. As a result, in these particular embodiments, a user viewing the textual information is able to access specific information via the IETM on the part directly from the textual information, as well as perform other functionality with respect to the part such as order the part from the IETM.

In addition to creating selectable parts, the display topic module creates selectable applicability found in the textual information in Operation 2220 in some embodiments. Similar to parts, as a result, a user viewing the textual information is able to access specific information on applicability mentioned in the textual information directly from the textual information.

Further, the display topic module may lock data found in the textual information in Operation 2225. This particular operation may be performed in some embodiments when the topic selected by the user provides alerts in the content such as warnings, cautions, notes, and/or the like. As discussed further herein, the content found after an alert may be locked (e.g., not able to view and/or not able to scroll through) until the user viewing the content has acknowledged the alert. This functionality helps to ensure the user is giving the alerts found in the content proper attention.

Furthermore, the display topic module may create a security classification for the textual information in Operation 2230. Accordingly, the textual information may be configured so that those users with a certain level of security should be able to view the content found in the textual information. Therefore, in particular embodiments, the display topic module may set up a security classification for the content based at least in part on the user's credentials who is requesting to view the content. For example, this operation may involve marking the content with a particular level of security (e.g., top secret) and making the content unviewable to the user.

At this point, the display topic module determines whether the data module references any non-textual content in Operation 2235. Here, non-textual content may involve illustrations such as 2D and/or 3D graphics and/or other media objects such as images, videos, audios, and/or the like. If so, then the display topic module retrieves one of the non-textual contents in Operation 2240. Accordingly, the reference to the non-textual content found in the data module may provide a link (e.g., html) and/or other information such as an information control number (ICN) to retrieve the non-textual content. In particular embodiments, the display topic module may then create a security classification for the non-textual content, similar to the textual information, in Operation 2245.

The display topic module then determines whether the data for the topic (e.g., the data module for the topic) references other non-textual content (e.g., another illustration or media object) in Operation 2250. If so, then the display topic module returns to Operation 2240, retrieves the next non-textual content referenced in the data module, and creates a security classification for the retrieved non-textual content.

Once the display topic module has retrieved all of the non-textual content for the topic, the display topic module provides the content for the topic for display via a window in Operation 2255. As discussed further herein, the content may be displayed using a number of different configurations depending on the embodiment. For example, the display topic module may be configured to display the content on multiple view panes so that multiple aspects of the content (e.g., textual information and illustrations) can be viewed by the user at the same time. Accordingly, in particular embodiments, the window displaying the content may be configured so that the view panes are displayed on non-overlapping portions of the window.

In various embodiments, the display topic module may invoke various modules to perform some of the operations just described. Accordingly, a discussion of these various modules is now provided.

Selectable Parts Module

Turning now to FIG. 23, additional details are provided regarding a process flow for causing parts found in textual information to be displayed as selectable according to various embodiments. FIG. 23 is a flow diagram showing a selectable parts module for performing such functionality according to various embodiments of the disclosure. In particular embodiments, the selectable parts module may be invoked by another module to cause the parts to be displayed as selectable such as, for example, the display topic module previously described. However, with that said, the selectable parts module may not necessarily be invoked by another module and may execute as a stand-alone module in other embodiments.

The process flow 2300 begins with the selectable parts module selecting a part from the list of parts in Operation 2310. As previously discussed, a list of parts may be generated in various embodiments from the illustrated parts breakdown found in a publication of the technical documentation for the item during a time when the publication is being imported into the IETM. Accordingly, this list of parts may identify the information associated with each part found in the list such as, for example, illustrations of components of the item displaying the part and processes, procedures, maintenance, and/or the like that make use of the part.

The selectable parts module then searches the textual information for a topic (e.g., the data module for a topic) to identify occurrences of the part in the textual information in Operation 2315. Here, for instance, the part may be identified in the textual information by a name and/or part number. Therefore, in particular embodiments, the selectable parts module may be configured to perform some type of character recognition to identify occurrences of the part in the textual information.

Accordingly, the selectable parts module determines whether an occurrences of the part have been found in the textual information in Operation 2320. If so, then the selectable parts module configures each of the occurrences in the text information as selectable in Operation 2325. Depending on the embodiments, the selectable parts module may make the part selectable in the textual information using a number of different mechanisms. For instance, the selectable parts module may display the part (e.g., the part name and/or number) in the textual information as a hyperlink. In other instances, the selectable parts module may display the part along with a selection mechanism in the textual information such as a button.

Further, the selectable parts module may configure the part so that multiple types of selection may be used by a user in some embodiments. For example, the selectable parts module may configure the part so that a user can hover his or her mouse over the part (e.g., the part name and/or number) to view a preview providing preview information on the part and click on the part to display content (e.g., textual information, as well as media content such as illustrations) for the part on a window. Furthermore, various functionality may be provided as a result of a user selecting the part in the textual information such as, for example, functionality to enable the user to order the part from the IETM and/or functionality to allow the user to view other items that use the part. Those of ordinary skill in the art can envision other mechanisms, configurations, and functionality that may be implemented for the parts in light of this disclosure.

At this point, the selectable parts module determines whether another part is found on the list of parts in Operation 2330. If so, then the selectable parts module returns to Operation 2310, selects the next part found on the list of parts, and repeats the operations just described for the newly selected part. Once the selectable parts module has processed all the parts found on the list of parts, the module exits.

Selectable Applicability Module

Turning now to FIG. 24, additional details are provided regarding a process flow for causing applicability found in textual information to be displayed as selectable according to various embodiments. FIG. 24 is a flow diagram showing a selectable applicability module for performing such functionality according to various embodiments of the disclosure. In particular embodiments, the selectable applicability module may be invoked by another module to cause applicability to be displayed as selectable such as, for example, the display topic module previously described. However, with that said, the selectable applicability module may not necessarily be invoked by another module and may execute as a stand-alone module in other embodiments.

As previously noted, applicability generally pertains to the context for which the information for a topic is valid. The context can be associated with a physical configuration of an item, but can also include other aspects such as support equipment availability and/or environmental conditions. For example, a user may be viewing information on the first wheel assembly for an aircraft. Accordingly, the information may provide information for both an air brake configuration of the assembly and a disc brake configuration of the assembly. However, the user may be specifically working on an aircraft at the time with disc brakes. Therefore, the information being viewed in on the front wheel assembly pertaining to disc brakes is applicable while the information pertaining to air brakes is not.

Also previously noted, the IETM may be configured in various embodiments to allow the user to sign into the IETM to view the technical documentation for an item with respect to a specific object (e.g., a specific aircraft in an airline's fleet or a specific aircraft configuration) or a universal object. For example, a user may be conducting training on performing maintenance on a specific model of aircraft and therefore signs into the IETM using a universal object so that he or she can view technical documentation on the model of aircraft using either an air brake configuration or a disc brake configuration.

Therefore, in particular embodiments, the process flow 2400 begins with the selectable applicability module determining whether the user is signed into the IETM with respect to a specific object or a universal object for the item in Operation 2410. The reason for making such a determination in these embodiments is the selectable applicability module may be configured to only make those occurrences of applicability found in the textual information selectable that are actually applicable to the current instance of the user signed into the IETM. Therefore, returning to the example, if the user is signed into the IETM to view technical documentation on a specific model of aircraft and the user has signed in identifying a specific object with an air brake configuration, then the selectable applicability module does not make any of the occurrences of applicability involving disc brakes selectable in the textual information.

Thus, if the user is signed into the IETM with respect to a specific object of the item, then the selectable applicability module generates only those occurrences of applicability related to the specific object found in the textual information as selectable in Operation 2415. However, if the user is signed into the IETM with respect to a universal object of the item, then the selectable applicability module generates all of the occurrences of applicability found in the textual information as selectable in Operation 2420.

Similar to the selectable parts module, the selectable applicability module may be configured in particular embodiments to perform some type of character recognition to identify occurrences of applicability in the textual information. In addition, the selectable applicability module may make an occurrence of applicability selectable in the textual information using a number of different mechanisms. Further, the selectable applicability module may configure an occurrence of applicability so that multiple types of selection may be used by a user in some embodiments. Furthermore, the selectable applicability module may provide various functionality for an occurrence of applicability as a result of a user selecting the occurrence in the textual information. Those of ordinary skill in the art can envision various mechanisms, configurations, and functionality that may be implemented for applicability in light of this disclosure.

Lock Content Module

Turning now to FIG. 25, additional details are provided regarding a process flow for locking content for a topic according to various embodiments. FIG. 25 is a flow diagram showing a lock content module for performing such functionality according to various embodiments of the disclosure. In particular embodiments, the lock content module may be invoked by another module to lock content for a topic such as, for example, the display topic module previously described. However, with that said, the lock content module may not necessarily be invoked by another module and may execute as a stand-alone module in other embodiments.

As previously discussed, the textual information for a topic may include element types providing various alerts. For example, the textual information may provide a warning alerting a user of possible hazards associated with a material, a process, a procedure, and/or the like. In addition, the textual information may provide a caution alerting the user that damage to a material is possible if instructions in an operational and/or procedural task are not followed precisely. In particular embodiments, such alerts are tagged in the textual information of the data (e.g., data module) for the topic found in the technical documentation.

Thus, the process flow 2500 begins with the lock content module reading the textual information for the topic in Operation 2510. Accordingly, the lock content module determines whether a tag for an alert has been encountered in the textual information in Operation 2515. If so, then the lock content module records a marker for the tag in Operation 2520. Here, the marker identifies where in the textual information the tag is found. As discussed herein, the marker enables the lock content module to lock the portion of the content found in the textual information associated with the alert. The lock content module then determines whether additional textual information remains after the occurrence of the alert in Operation 2525. If so, then the lock content module returns to Operation 2510 and continues reading the textual information to identify further occurrences of tags for alerts in the information.

Once the lock content module has read the entire textual information for the topic and has recorded markers for all of the tags for alerts, the lock content module selects a marker for a tag in Operation 2530. The lock content module then identifies the preceding marker for a tag in Operation 2535. It is noted that the lock content module may be configured in particular embodiments to skip the first marker of a tag found in the textual information since this marker/tag would not have a preceding marker/tag found in the textual information. At this point, the lock content module locks the portion of the content found between the tags for the two markers in the textual information in Operation 2540.

Depending on the embodiment, the lock content module may be configured to lock the portion of the content using a number of different approaches and/or any combination thereof. For instance, the lock content module may obscure a user's ability to view the portion of the content in some embodiments. For example, the lock content module may grey out the portion of the content so that it cannot be read. In some embodiments, the lock content module may disable any interactive functionality found within the portion of the content. For example, the portion of the content may contain an occurrence of a selectable part. Here, the lock content module may disable the selectable functionality of the selectable part. In some embodiments, the lock content module may lock the user's ability to scroll through the portion of the content displayed on the window. Those of ordinary skill in the art can envision other approaches that may be used in locking the portion of the content in light of this disclosure.

Once the lock content module has locked the portion of the content, the module determines whether a marker for another tag exists in Operation 2545. If so, then the lock content module returns to Operation 2530, selects the next marker, and preforms the operations just discussed to lock the portion of the content in the textual information accordingly. Once the lock content module has processed all the markers, the module exits.

Security Classification Module

Turning now to FIG. 26, additional details are provided regarding a process flow for setting a security classification for specific content of a topic according to various embodiments. FIG. 26 is a flow diagram showing a security classification module for performing such functionality according to various embodiments of the disclosure. In particular embodiments, the security classification module may be invoked by another module to set the security classification for content such as, for example, the display topic module previously described. However, with that said, the security classification module may not necessarily be invoked by another module and may execute as a standalone module in other embodiments.

In various embodiments, the metadata for a topic (e.g., the data module for the topic) may include a security classification tag (e.g., a code) that identifies a level of security with respect to the content for the topic. This may also be true with respect media content for the topic such as illustrations, videos, audio, and/or other data associated with the topic. Therefore, when displaying the various components of content for the topic on a window, the security classification tag found in the metadata for a particular component of content can be used to set formatting and properties for the content.

Thus, the process flow 2600 begins with the security classification module reading the security classification tag for a textual or a non-textual component of content for the topic in Operation 2610. The security classification module then reads the credentials for the user in Operation 2615. Accordingly, in particular embodiments, the formatting and/or properties associated with the content may be contingent based on the user's level of security. For example, if the user has a high level of security (e.g., a top secret clearance), then the user may be able to view content that may not normally be available for viewing by many other users. Here, the credentials used by the user in signing into the IETM may be used to identify the user's level of security.

Next, the security classification module in some embodiments formats a border for the content based at least in part on the security classification of the content in Operation 2620. For instance, the security classification that may be set for the content may include unclassified, classified, secret, top secret, and/or the like. Here, the security classification module may format a border placed around the content as it is displayed on a window based at least in part on the security classification set for the content. For example, the content may be displayed on the window in a view pane. Therefore, in this example, the security classification module may format a border placed around the view pane by including a title in the border identifying the security classification for the content and displaying the border in a particular color. Such formatting may help the user to quickly identify the security classification associated with the different components of content being displayed for the topic on the window.

In addition, the security classification module in some embodiments sets the accessibility of the content based at least in part on the security classification of the content and the user's credentials in Operation 2625. Specifically, the security classification module sets the accessibility of the content as it is displayed on the window based at least in part on the level of security identified in the security classification tag for the content and the level of security identified in the user's credentials used to sign into the IETM. For example, if the level of security identified in the security classification tag for the content is top secret and the level of security identified in the user's credential is unclassified, then the security classification module may set the content so that it is not accessible on the window. In this instance, the security classification module may make the content unviewable on the window to the user. The security classification module may also disable functionality for the content such as, for example, disabling the user's ability to print the content, copy the content, email the content, and/or the like.

In particular embodiments, the security classification module may be configured to also set the accessibility for various interactive functionality found in the content. For example, the content may include a part (e.g., a part number and/or name) that is normally selectable to access information on the part. In this example, the security classification module may have set the accessibility for the content to allow the user to view the content on the window. Specifically, the security classification module may have determined the level of security for the content is unclassified and the user's level of security is classified and as a result, set the accessibility for the content to allow the user to view the content.

In some embodiments, the security classification module may also read a classification tag for the selectable part in Operation 2630. Here, the security classification module may read the classification tag found in the metadata for data (e.g., the data module) found in the technical documentation for the part. In this example, the classification tag may identify the level of security set for the part is top secret. Therefore, as a result, the security classification module may disable the user's ability to select the part in the content in Operation 2635. The security classification module may then determine whether any further interactive functionality is found in the content in Operation 2640. If so, then the security classification module may perform the operations just described for the additional functionality.

It is noted that the security classification module may be configured in particular embodiments to set the formatting and/or functionality of content of various topics with respect to other features and/or displays that are provided via the IETM. For instance, the security classification module may also be configured to set the accessibility of topics found in a table of contents for the technical documentation for an item based at least in part on the security classification set for the topics. Those of ordinary skill in the art can envision other applications of setting security classification formatting and/or functionality of content in light of this disclosure.

FIG. 27 provides an example of security classification formatting and functionality set for the display of a topic according to various embodiments. In this example, a border 2700 has been placed around a view pane displaying content for the topic on a window. Here, the border 2700 includes a title indicating the content (e.g., textual information) for the topic is secret. In addition, the steps found in the textual information 2710 have been removed from being able to be viewed by the user. However, an illustration is also displayed in a view pane on the window that is viewable to the user. The border for the illustration 2715 indicates the illustration is unclassified and therefore the user is able to view it. Thus, the example demonstrates how the formatting and functionality of various sections of content for a topic may be set differently based at least in part on the security classifications identified for the various sections of content.

Topic Module

Turning now to FIGS. 28A and 28B, additional details are provided regarding a process flow for invoking functionality for a topic displayed on a window according to various embodiments. FIGS. 28A and 28B are a flow diagram showing a topic module for performing such functionality according to various embodiments of the disclosure. Accordingly, the topic module may be executed by an entity such as the management computing entity 100 and/or the user computing entity 110 previously discussed. In various embodiments, the topic module is executed once a user has selected a topic to view and the topic is displayed to the user on a window. As previously noted, the window may be displaying using a various of configurations depending the embodiment. For example, the window may display multiple pane that provide various content for the topic. Once displayed, the user may decide to invoke different interactive functionality provided for the topic.

Therefore, turning first to FIG. 28A, the process flow 2800 begins with the topic module determining whether input has been received indicating the user has selected a selectable part displayed on the window to view related information on the part in Operation 2810. For example, as previously discussed, parts (e.g., part names and/or numbers) found in the textual information on the topic may be displayed as selectable on the window in various embodiments. If the user has selected a part (e.g., uses a mouse to hover over the part, click on the part, alt-click on the part, and/or the like), then the topic module generates and provides a preview to display information on the part to the user in Operation 2815. Here, the preview may be provided in a similar manner as the other previews described herein. For example, the preview may be provided on separate window than the window displaying the topic. As discussed further herein, different functionality may be provided on the preview in some embodiments. For example, the preview may provide functionality to allow the user to search for other occurrences of the part in the technical documentation for the item.

In various embodiments, the topic module also determines whether input has been received indicating the user has selected a selectable applicability displayed on the window to view information on the applicability in Operation 2820. As previously noted, applicability generally pertains to the context for which the information provided for a topic is valid. Therefore, if the user selects an applicability found in the content displayed for the topic (e.g., hovers over the applicability, click on the applicability, alt-clicks on the applicability, and/or the topic module generates and provides a preview for display providing information on the meaning of the applicability in Operation 2825. Again, the preview may be provided in a similar manner as the other previews described herein. For example, the preview may be provided on separate window than the window displaying the topic.

In various embodiments, the topic module also determines whether input has been received indicating the user would like to view the source data for the topic in Operation 2830. Here, the source data may represent the source of the content found in the technical documentation for the topic. For example, the source data may involve data from a file such as a PDF and/or a SGML file. Therefore, if the user has indicated he or she would like to view the source data for the topic, then the topic module provides the source data for display in Operation 2835. Here, in particular embodiments, the source data may be displayed on a separate window than the window displaying the topic.

As discussed in further detail herein, this particular functionality may be configured to perform differently based at least in part on the users selection of this functionality. Specifically, in particular embodiments, the user is provided with the corresponding section of the source data as that currently displayed on the window for the topic in response to the user exercising a first type of selection (e.g., single click). While the user is provided with the entire source data for the topic in response to the user exercising a second, different type of selection (e.g., alt-click).

In various embodiments, the topic module also determines whether input has been received indicating the user has selected an option to generate an annotation for the topic in Operation 2840. In various embodiments, annotations may be generated for different content for the topic. For instance, the user may generate an annotation with respect to certain text found in the textual information for a topic and/or the user may generate an annotation with respect to other content for the topic such as an illustration (e.g., 2D and/or 3D graphic). If the user has selected the option to generate an annotation for the topic, then the topic module does so in Operation 2845. In particular embodiments, the annotation can be recorded and stored within the IETM and can only be viewed by the user. While in other instances, others may be able to view and comment on the annotation.

In particular embodiments, the topic module may provide further functionality based at least in part on the content of the topic involving sequential information. For instance, the topic may involve a process, procedure, tasks, checklist, and/or the like that involves various operations and/or steps to be performed. For example, the user may be viewing a maintenance task involving steps the user is to perform for the task. Therefore, in these particular embodiments, the topic module may determine whether the data for the topic (e.g., the data module for the topic) involves sequential information in Operation 2850. In some embodiments, the topic module may make such a determination based at least in part on the type of content found in the data for the topic as indicated in the data's metadata (e.g., in the data module's information code). If the content does involve sequential information, then the topic module provides further functionality for the content in Operation 2855.

The additional functionality is now discussed with respect to FIG. 28B. Therefore, turning now to FIG. 28B, the topic module determines whether input has been received indicating the user has acknowledged a step (operation) in a sequence such as a checklist sequence in Operation 2860. Typically, the steps found in sequential information (e.g., the steps found in a checklist) are designed to be performed in the sequential order as listed. Therefore, in particular embodiments, any steps that are skipped over in the sequence and not acknowledged are highlighted to bring them to the user's attention. Therefore, as result of the user acknowledging a step, the topic module checks the step sequence in Operation 2865.

In addition, in various embodiments, the topic module determines whether input has been received indicating the user has acknowledged an alert in Operation 2870. As previously discussed, in certain embodiments, content is locked based at least in part on alerts provided in the content. For example, the content may provide warnings and/or cautions for the user. Therefore, if the user has acknowledged an alert, the topic module unlocks the corresponding content for the alert in Operation 2875.

As discussed further herein, the user may be provided functionality (e.g. an option) in particular embodiments to transfer a job (e.g., process, procedure, task, checklist, and/or the like) he or she is currently performing to another user. For example, the user's work shift may be ending and therefore, he or she may wish to transfer the current job he or she is performing to another user who is working the following shift. Therefore, in these embodiments, the topic module may determine whether input has been received indicating the user has selected the option to transfer a job in Operation 2880. If so, then the topic module may enable functionality to allow the user to transfer the job in Operation 2885.

Further, in various embodiments, functionality may be implemented that updates media content provided on the window as the user scrolls through sequential information. For example, the user may be viewing the steps for a maintenance task displayed on a first view pane shown on the window. At the same time, illustrations for the maintenance may be displayed on a second view pane shown on the window. For instance, a step in the maintenance task may involve a particular component and an illustration of the component may be provided to aid the user in locating the component on the actual item. Therefore, as the user scrolls through the various steps of the maintenance task, the illustrations provided on the second view pane may change automatically in particular embodiments as the user moves from step-to-step and different illustrations are referenced in the steps.

Accordingly, if this is the case, then the topic module determines whether input has been received indicating the user is scrolling through the sequential information in Operation 2886. If the user is scrolling through the sequential information, then the topic module updates the media content displayed on the window accordingly in Operation 2387.

Finally, components are often mentioned in the sequence information. For example, the instructions for performing a maintenance task may reference a particular part that is to be replaced during the task. Many times, some type of media may also be provided such as an illustration to assist the user in actually replacing the part. For instance, the instructions may be displayed on a first view pane and the illustration may be displayed on a second view pane. Here, in particular embodiments, the part may be provided in the first and/or second view panes as selectable. As a result, the user's selection of the part in either the first or the second view pane may cause the part to be highlighted in the other view pane. For example, if the user selects the part in the sequential information, then the part is automatically highlighted in the illustration to assist the user in locating the part in the illustration. Likewise, if the user selects the part in the illustration, then the part is automatically highlighted in the sequential information to assist the user in determining which instructions in the maintenance task the part is involved.

Therefore, if such functionality is provided, then the topic module determines whether input has been received indicating the user has selected a component in Operation 2888. If the user has selected a component, then the topic module highlights the component on the window accordingly in Operation 2889.

Returning to 28A, in particular embodiments, the topic module may be configured to provide the user with certain functionality at the end of a topic (e.g., at the end of a data module). In some embodiments, some type of selection mechanism (e.g., button) may be provided for the topic on the window to invoke the functionality when the end of the content for the topic has been detected. For example, when the topic module detects the user has scrolled to the end of the textual information provided for a topic. If such functionality is being provided, then the topic module determines whether input has been received indicating the end of the topic has been reached in Operation 2890. If so, then the topic module enables the end of topic functionality in Operation 2891.

As previously noted, various types of content may be provided in different topics. For example, different content types may involve procedural, fault, parts, process, learning, maintenance, wiring, crew/operator, and/or the like. Thus, in addition to sequential information, various embodiments may provide certain functionality based at least in part on the topic involving a particular type of content. Therefore, in particular embodiments, the topic module may determine whether the content for the topic currently being displayed involves wiring data in Operation 2892. If so, then the topic module enables wiring functionality in Operation 2893. Likewise, in particular embodiments, the topic module may determine whether the content for the topic involves media providing a chart in Operation 2894. If so, then the topic module enables crosshairs functionality in Operation 2895. Finally, in particular embodiments, the topic module may determine whether the content for the topic involves 3D graphics in Operation 2896. If so, then the topic module enables 3D graphic functionality in Operation 2897.

At this point, the topic module determines whether input has been received indicating the user wishes to exist viewing the content for the topic in Operation 2898. For example, the user may have simply selected a mechanism (e.g., a button) to exit the topic. If that is the case, then the topic module exits. Otherwise, the topic module continues to monitor the user's interactions.

Similar to the display topic module, the topic module in various embodiments may invoke various modules to perform some of the operations just described. Accordingly, a discussion of these various modules is now provided.

Display Content for Part Module

Turning now to FIG. 29, additional details are provided regarding a process flow for displaying content for a part according to various embodiments. FIG. 29 is a flow diagram showing a display content for part module for performing such functionality according to various embodiments of the disclosure. In particular embodiments, the display content for part module may be invoked by another module to display the content such as, for example, the topic module previously described. However, with that said, the display content for part module may not necessarily be invoked by another module and may execute as a stand-alone module in other embodiments.

The process flow 2900 begins with the display content for part module retrieving the content for the part select by the user in Operation 2910. As previously discussed, parts (e.g., part names and/or numbers) found within the textual information of the topic (or other areas of the technical documentation) may be displayed as selectable in some embodiments. Therefore, the user may select one of the parts in the textual information (e.g., use a mouse to hover over the part, click on the part, alt-clicks on the part, and/or the like). As a result, the display content for part module retrieves related information for the part to display. For example, the display content for part module may retrieve metadata from the data (e.g., the data module) found in the technical documentation for the part, as well as the topics found in the table of content in which the part is mentioned.

Once retrieved, the display content for part module provides the content for display in Operation 2915. For example, the content may be displayed as a preview as previously discussed. Accordingly, the preview may be displayed on a separate window that is superimposed over a portion of the window displaying the topic. Here, the displayed content may provide information on the part such as, for example, the part name and number. In addition, the content may provide various functionality the user may invoke with respect to the part. For example, a selection mechanism (e.g., a hyperlink and/or button) may be provided to allow the user to search the technical documentation for the item to identify other instances where the part is mentioned/used (e.g., maintenance tasks). A selection mechanism may also be provided that enables the user to order the part from the IETM.

Therefore, in particular embodiments, the display content for part module determines whether input has been received indicating the user has selected the functionality to order the part in Operation 2920. If so, then the display content for part module generates and provides the order form for ordering the part in Operation 2925. For example, the display content for part module invokes the order part module previously discussed (FIG. 19) in some embodiments.

In addition, in particular embodiments, the display content for part module determines whether input has been received indicating the user has selected the functionality to search the technical documentation to identify other instances of the part in Operation 2930. If so, then the display content for part module queries the technical documentation for the item in Operation 2935. Here, the display content for part module may query various items found in the technical documentation such as the table of contents, data modules, media objects, and/or the like to identify instances in which the part name and/or number is found. The display content for part module then provides the results of the search for display in Operation 2940.

For example, the display content for part module may be configured in some embodiments to specifically query and identify the maintenance procedures/tasks found in the technical documentation in which the part is used and/or involved. Therefore, in these embodiments, the display content for part module provides a list of the maintenance procedures/tasks for display for the user to view. The display content for part module may be configured to display a set number of the procedures/tasks such as, for example, five of the procedures/tasks. The display content for part module may use a number of criteria to identify which of procedures/tasks to display such as, for example, alphabetically, more frequently viewed, and/or the like. In addition, a selection mechanism (e.g., a button) may be provided to allow the user to view additional maintenance procedures/tasks for the part.

Further, the display content for part module may provide the list so that each of the maintenance procedures/tasks displayed is selectable (e.g., displayed as a hyperlink and/or displayed with a selection mechanism such as a button) so that the user may view a particular maintenance procedure/task if desired. Therefore, in these particular embodiments, the display content for part module determines whether input has been received indicating the user has selected a particular maintenance procedure/tasks to view in Operation 2945. If so, then the display content for part module retrieves the maintenance procedure/tasks and provides the procedure/task for display to the user in Operation 2950.

At this point, the display content for part module determines whether input has been received indicating the user would like to exit the display of the content in Operation 2955. If so, then then the display content for part module causes the display of the content be closed and exists. Otherwise, the display content for part module continues monitor the user's interactions.

FIG. 30 provides an example of a window 3000 providing content for a part 3010 selected by a user according to various embodiments. As one can see, the window 3000 displaying the content has been superimposed over a portion of the window for the topic in this example. In this example, the display of the content provides the user with a selection mechanism (e.g., a button) 3015 to enable the user to order the part from the IETM. In addition, the display of the content lists related maintenance procedures/tasks 3020 in which the part is used and/or mentioned. Further, the display of the content provides a selection mechanism (e.g., a button) 3025 to view additional maintenance procedures/tasks in which the part is used and/or mentioned.

Display Content for Applicability Module

Turning now to FIG. 31, additional details are provided regarding a process flow for displaying content for applicability according to various embodiments. FIG. 31 is a flow diagram showing a display content for applicability module for performing such functionality according to various embodiments of the disclosure. In particular embodiments, the display content for applicability module may be invoked by another module to display the content such as, for example, the topic module previously described. However, with that said, the display content for applicability module may not necessarily be invoked by another module and may execute as a stand-alone module in other embodiments.

The process flow 3100 begins with the display content for applicability module retrieving the content for the applicability select by the user in Operation 3110. As previously discussed, applicability found within the textual information of the topic (or other areas of the technical documentation) may be displayed as selectable in some embodiments. Therefore, the user may select one of the occurrences of applicability in the textual information (e.g., use his or her mouse to hover over the occurrence, click on the occurrence, alt-click on the occurrence, and/or the like). As a result, the display content for applicability module retrieves related information for the applicability to display. For example, the display content for applicability module may retrieve information on the meaning of the applicability as it pertains to the item.

Once retrieved, the display content for applicability module provides the content for display for the user to view in Operation 3115. For example, the content may be displayed as a preview as previously discussed. Accordingly, the preview of the content may be displayed on a separate window that is superimposed over a portion of the window for the topic.

FIG. 32 provides an example of a window 3200 displaying content provided for an occurrence of applicability 3210 selected by a user according to various embodiments. As one can see, the window 3200 display the content has been superimposed over a portion of the window for the topic in this example. Here, the content provides the user with a rule 3215 for a list of components (e.g., engines) in which the applicability applies.

Display Source for Topic Module

Turning now to FIG. 33, additional details are provided regarding a process flow for displaying the source for a topic according to various embodiments. FIG. 33 is a flow diagram showing a display source for topic module for performing such functionality according to various embodiments of the disclosure. In particular embodiments, the display source for topic module may be invoked by another module to display the source such as, for example, the topic module previously described. However, with that said, the display source for topic module may not necessarily be invoked by another module and may execute as a stand-alone module in other embodiments.

As previously mentioned, the user may indicate he or she would like to view the source data for a topic. The source data may represent the source of the content found in the technical documentation for the topic. For example, the source data may involve data from a file such as a PDF and/or a SGML file. Therefore, if the user has indicated he or she would like to view the source data for the topic, then the process flow 3300 begins with the display source for topic module determining whether input has been received indicating the user would like to view a section from the source or the entire source in Operation 3310.

Also previously discussed, the user may be provided with multiple actions to select the selection mechanism in particular embodiments to indicate what from the source he or she would like to view. Specifically, in particular embodiments, the user is provided with the corresponding section of the source data as that is currently displayed on the window for the topic in response to the user exercising a first type of selection (e.g., single click). While the user is provided with the entire source data for the topic in response to the user exercising a second, different type of selection (e.g., alt-click).

Therefore, if the display source for topic module determines the user has exercised the first type of selection, then the display source for topic module retrieves the corresponding section (e.g., pages) of the source in Operation 3315 and provides the section of the source for display in Operation 3320. For example, the section of the source may be displayed on a window that is superimposed over a portion of the window display the topic in some embodiments. While in other embodiments, the section of the source may be displayed on a separate view pane on the window.

However, if the display source for topic module determines the user has exercised the second type of selection, then the display source for topic module retrieves the entire source in Operation 3325 and provides the entire source for display in Operation 3330. Again, the entire source may be displayed on a window that is superimposed over a portion of the window display the topic in some embodiments. While in other embodiments, the entire source may be displayed on a separate view pane on the window.

FIG. 34A provides an example of displaying a section of a source for a topic according to various embodiments. Here, a selection mechanism 3400 is displayed on a window that is configured so that the user is provided with multiple actions to select the mechanism 3400. Accordingly, if the user exercises a first type of selection (e.g., click) of the mechanism 3400, then a separate window 3410 is displayed that provides a section from the source (in this example, a pdf) as shown as in this example as page five of the source 3415. However, if the user exercises a second, different type of selection (e.g., alt-click) of the mechanism 3400, then a separate window is displayed that provides the entire source as shown as all five pages 3420 in FIG. 34B.

Generate Annotation Module

Turning now to FIG. 35, additional details are provided regarding a process flow for generating an annotation according to various embodiments. FIG. 35 is a flow diagram showing a generate annotation module for performing such functionality according to various embodiments of the disclosure. In particular embodiments, the generate annotation module may be invoked by another module to generate an annotation such as, for example, the topic module previously described. However, with that said, the generate annotation module may not necessarily be invoked by another module and may execute as a stand-alone module in other embodiments.

As previously noted, a user may add an annotation to various content displayed for a topic such as in the textual information and/or media content such as an illustration. Therefore, the process flow 3500 begins with the generate annotation module receiving where (e.g., receiving input identifying where) in the content for the topic the annotation is to be placed in Operation 3510. Note that in particular embodiments, an annotation may not necessarily be placed in the content of a topic but may be place at other locations in the technical documentation of an item such as, for example, in the table of contents.

The generate annotation module then provides the annotation in Operation 3515. Specifically, in particular embodiments, the generate annotation module may generate and provide the annotation to display on a separate window than the window displaying the topic. Accordingly, the window may display initial information for the annotation such as, for example, the date and time the annotation was generated. In addition, the user may be provided with different types of annotations that may be added to the content such as a personal note, a question, a warning and/or missing information, a problem, and/or the like. Therefore, the initial information may also indicate the type of annotation.

Depending on the embodiment, the generate annotation module may provide various functionality with respect to the annotation. Therefore, in particular embodiments, the generate annotation module determines whether input has been received indicating the user would like to add an attachment to the annotation in Operation 3520. For example, the user may wish to attach a text document, image, and/or screenshot of the window (e.g., image of the window) and the user selects a selection mechanism (e.g., a button) provided on the window for the annotation. In response, the generate annotation module provides a capability for the user to identify the file to attach to the annotation. For example, the generate annotation module may cause display of a window that allows the user to navigate to a location where the file is locate and attach the file to the annotation. Accordingly, the generate annotation module is configured in various embodiments to enable the attachment of a file in a variety of formats such as JPEG, JFIF, JPEG2000, EXIF, TIFF, RAW, DIV, GIF, BMP, PNG, PPM, MOV, AVI, MP4, MKV, DOCX, HTML5, TXT, PDF, XML, SGML, MON and/or the like. Therefore, if the user has indicated he or she would like to attach a file to the annotation, then the generate annotation module attaches the file in Operation 3525.

In addition, the generate annotation module may determine whether input has been received indicating the user would like to share the annotation with other users in Operation 3530. In some embodiments, an annotation may normally only be available to view to the user who generated the annotation. However, there may be instances in which the user may want to share his or her annotation with other users and ask for comments. For example, the user may identify an error he or she believes is in the technical documentation for a topic. Therefore, the user may decide to place an annotation in the topic on the error and ask other users whether they also agree on the error in the documentation. Accordingly, such functionality can allow for crowd sourcing to address issues in the technical documentation and/or to assist a user in using the documentation. Therefore, if the user has indicated he or she would like to share the annotation, then the generate annotation module sets the annotation to share in Operation 3535.

Further, the generate annotation module may determine whether input has been received indicating the user may want to submit a change request based at least in part on the annotation in Operation 3540. In particular embodiments, a formal procedure may be put in place to allow users of the IETM to submit change requests to have content changed in the technical documentation for an item. For example, a user may be viewing the textual information on a topic and may decide to generate an annotation for a section of the textual information the user does not believe is quite clear and should be further explained in the information. Therefore, the user may wish to submit a change request based at least in part on his or her annotation. If that is the case, then the generate annotation module may provide a change request form to display for the user in Operation 3545.

In some embodiments, the generate annotation module may auto-populate some of the fields provided on the form based at least in part on the information found in the annotation in Operation 3550. For example, the generate annotation module may auto-populate the fields in which the user provides his or her name, a date, an identifier for the topic (e.g., a DMC), and/or any comments for the request that have been provided in the annotation. The user may then fill any additional information needed on the form and select a mechanism provided on the form to submit the request for change.

Therefore, the generate annotation module determines whether input has been received indicating the user has submitted the change request form in Operation 3555. If the user has submitted the form, then the generate annotation module submits the change request form in Operation 3560. As a result, the change request form may be sent to personnel who are responsible for maintaining the technical information for the item. Accordingly, such personnel may include those individuals who are responsible for maintaining the IETM and/or the publication of the technical documentation currently uploaded to the IETM for the item and/or those individuals who are responsible for maintaining the source technical documentation used in producing the publication that has been uploaded into the IETM.

Finally, the generate annotation module may determine whether input has been received indicating the user would like to capture a screenshot (e.g., an image) of the window and the content currently being displayed on the window in Operation 3565. In many instances, the user may wish to attach a screenshot of the window to the annotation to provide more explanation for the annotation. Therefore, if the user would like to capture a screenshot of the window, the generate annotation module generates the screenshot in Operation 3570.

At this point, the generate annotation module determines whether input has been received indicating the user would like to exit the window displaying the annotation in Operation 3575. It is noted that in particular embodiments, the annotation is automatically generated and recorded in the IETM at the time the user selects the option (e.g., the selection mechanism) on the window for the topic. Therefore, in these particular embodiments, any additional information provided by the user on the annotation is recorded for the annotation when the user exists the window displaying the annotation. However, in other embodiments, the user may be required to take some action such as select a mechanism (e.g., a button) provided on the window displaying the annotation and/or the topic to record the annotation. Furthermore, different selection mechanisms (e.g., buttons) may be provided on the window displaying the annotation and/or on the topic to invoke the functionality described above.

Finally, the various functionality provided by the generate annotation module described above may also be made available to users once the annotations have been recorded in the IETM. For example, a user may be able to sign into the IETM and view an annotation he or she had previously added to the technical documentation of an item. At this time, in particular embodiments, the functionality such as attaching a file and/or submitting a change request may be made available to the user.

FIG. 36A provides an example of an annotation window 3600 displayed according to various embodiments. In this example, the user has identified an area 3610 in an illustration displayed for a topic and added a note of "bad region." The annotation window 3600 provides a first selection mechanism 3615 to allow the user to attach a file 3620 to the annotation such as a screenshot of the window displaying the topic. Accordingly, the annotation window 3600 provides a second selection mechanism 3625 that enables the user to take the screenshot of the window displaying the topic. In addition, the annotation window 3600 in the example provides a third selection mechanism 3630 that allows the user to share the annotation with other users. Finally, the annotation window 3600 provides a fourth selection mechanism 3635 that facilitates the user submitting a change request based at least in part on the annotation. Accordingly, a change request form 3640 that may be provided in some embodiments in shown in FIG. 36B.

FIG. 36C provides an example of a selection mechanism 3645 that may be provided in particular embodiments to enable a user to generate an annotation. Here, the selection mechanism 3645 is a dropdown menu control provided in a toolbar displayed along the top of a window that provides the user with options for generating different types of annotations. In particular embodiments, the IETM may provide the user with a report 3650 on the change requests that have been submitted by the user as shown in FIG. 36D. Finally, in particular embodiments, the IETM may provide the user with a list of all the annotations 3655 that have been generated by the user as shown in FIG. 36E. In some embodiments, this list 3655 may also display annotations that have been shared by other users.

Sequence Skip Module

Turning now to FIG. 37, additional details are provided regarding a process flow for checking the steps (operations) found in a sequence according to various embodiments. FIG. 37 is a flow diagram showing a sequence skip module for performing such functionality according to various embodiments of the disclosure. In particular embodiments, the sequence skip module may be invoked by another module to check the steps preformed in a sequence such as, for example, the topic module previously described. However, with that said, the sequence skip module may not necessarily be invoked by another module and may execute as a stand-alone module in other embodiments.

As previously noted, additional functionality may be provided in various embodiments for content involving sequential information. One such functionality involves highlighting any steps skipped in a sequence such as a checklist upon the user acknowledging performing a step in the sequence. Typically, the steps found in sequential information (e.g., the steps found in a checklist) are designed to be performed in the sequential order in which they are listed. Therefore, in particular embodiments, any steps that are skipped over in the sequence and not acknowledged are highlighted to bring them to the user's attention.

Therefore, the process flow 3700 begins with the sequence skip module determining whether a step acknowledged by the user is the next step in the sequence to be performed by the user in Operation 3710. For example, in particular embodiments, the user may be provided a field (e.g., a checkbox) in the sequential information that the user is able to check as he or she completes steps in the sequence. Therefore, in these embodiments, the sequence skip module receives input on the fields and determines which of the fields have been checked by the user. Accordingly, if the sequence skip module determines the step acknowledged by the user is not the next sequential step to be performed, then the sequence skip module causes the steps in the sequence that have been skipped by the user to be displayed as highlighted in the sequential information displayed on the window in Operation 3715.

An example of a window displaying sequence information in Which steps have been skipped 3800 are highlighted in accordance with various embodiments is shown in FIG. 38, In this example, the user has acknowledged a step 3810 that is not the next step to perform in the sequence based at least in part on the steps already acknowledged by the user. Therefore, as a result, the prior steps 3800 that have not been acknowledged by the user are highlighted to bring them to the user's attention.

Unlock Content Module

Turning now to FIG. 39, additional details are provided regarding a process flow for unlocking content as a result of a user acknowledging an alert according to various embodiments. FIG. 39 is a flow diagram showing an unlock content module for performing such functionality according to various embodiments of the disclosure. In particular embodiments, the unlock content module may be invoked by another module to unlock content such as, for example, the topic module previously described. However, with that said, the unlock content module may not necessarily be invoked by another module and may execute as a stand-alone module in other embodiments.

In various embodiments, a portion of the content provided for a topic may be locked to require a user to acknowledge an alert associated with the portion of the content. For example, the content may provide a warning and/or caution for the user. Accordingly, the user may acknowledge the alert. For example, some type of mechanism such as a button may be provided that the user selects to acknowledge the alert and as a result, the unlock content module is invoked.

Therefore, the process flow 3900 begins with the unlock content module identifying the alert that has been acknowledged in Operation 3910. Here, in particular embodiments, the unlock content module may receive and/or read a tag associated with the alert that is provided in the textual information for a topic. Accordingly, the tag identifies the alert and its location with respect to the other content found in the textual information.

Next, the unlock content module identifies the next alert in the content in Operation 3915. Again, in particular embodiments, the unlock content module may identify the next tag found in the textual information for an alert. In some instances, the alert acknowledged by the user may be the last alert provided in the content. If that is the case, then the unlock content module may identify the end of the content.

Finally, the unlock content module unlocks the portion of the content between the two alerts in Operation 3920. As previously discussed, the content may be locked using a number of different approaches and/or any combination thereof. For instance, the user's ability to view the portion of the content may be obscured. For example, the portion of the content may be greyed out so that it cannot be read. In addition, any interactive functionality found within the portion of the content may be disabled. For example, the portion of the content may contain an occurrence of a selectable part. Here, the selectable functionality of the part may be disabled. In some instances, the user's ability to scroll through the portion of the content may be disabled. However the portion of the content has been locked, the unlock content module performs the necessary operations to unlock the content.

It is noted that in various embodiments not all of the content that has been locked is unlock as a result of the user acknowledging the alert. Generally speaking, only the portion of the content that is available between the acknowledged alert and the next alert found in the content is unlock. Such a configuration can be used to ensure that the user views and acknowledges each and every alert provided in the content as the user moves through the content. However, with that said, other configurations may be used in unlocking the content based at least in part on the user acknowledging alerts. For example, some embodiments may require the user to acknowledge multiple alerts before unlocking content. Those of ordinary skill in the art can envision other configurations that may be used in other embodiments in light of this disclosure.

FIG. 40A provides an example of a portion of content 4000 that has been locked according to various embodiments. Specifically, the portion of the content 4000 has been greyed out to obscure the user's ability to view the portion of the content 4000. An alert is displayed that provides an acknowledgment mechanism (e.g., a button) 4010 that can be selected by the user to acknowledge the alert and unlock the portion of the content 4000. As a result of the user acknowledging the alert, that is as a result of the user selecting the acknowledgment mechanism 4010, the portion of the content 4015 is unlock as shown in FIG. 40B. Here, the portion of the content 4015 is unlock to the next alert found in the content. At this point, the user can select the acknowledgment mechanism 4020 for the next alert to unlock additional content.

Transfer Job Module

Turning now to FIG. 41, additional details are provided regarding a process flow for facilitating a user transferring a job according to various embodiments. FIG. 41 is a flow diagram showing a transfer job module for performing such functionality according to various embodiments of the disclosure. In particular embodiments, the transfer job module may be invoked by another module to transfer a job such as, for example, the topic module previously described. However, with that said, the transfer job module may not necessarily be invoked by another module and may execute as a stand-alone module in other embodiments.

As previously discussed, a user may wish to transfer a job (e.g., a particular instance of a process, procedure, task, checklist, and/or the like) he or she is currently performing to another user. For example, the user's work shift may be ending and therefore, he or she may wish to transfer the current job he or she is performing to another user who is working the following shift. Therefore, in these embodiments, the user may select an option (e.g., a button) to transfer a job and as a result, the transfer job module is invoked.

The process flow 4100 begins with the transfer job module causing display of an indication (e.g., a divider) at a point in the content being displayed on a window where the user is suspending performing the job in Operation 4110. For instance, if the user is performing a job involving a maintenance procedure/task that includes several steps, then the transfer job module causes the indicator to be displayed between the two steps of the procedure/task where the user is stopping. Accordingly, depending on the embodiment, the indication may be displayed in a number of different formats such as a line, arrow, bullet point, and/or the like.

The transfer job module then generates a job transfer window based at least in part on the job in Operation 4115 and provides the window for display in Operation 4120. Here, the transfer job window may be superimposed over a portion of the window displaying the procedure/task. The job transfer window may provide information such as the title of the procedure/task being performed for the job (e.g., the DMC for the related data module), the user's name, a data and time the job is suspended, a job control number, comments provided by the user, and/or the like. The transfer job module then records the job transfer in the IETM in Operation 4125. This operation in particular embodiments involves the transfer job module recording a marker identifying where the job was suspended. Accordingly, this marker can then be used at a later time in identifying where the job needs to be resumed.

As a result, the job transfer may now be posted in the IETM so that another user may resume the job. Depending on the embodiment, the job transfer may be viewed by every user who signs into the IETM for the item and/or specific object for the item or the job transfer may only be viewed by those users who can resume the job. That is to say, in particular embodiments, the job transfers available to a user to view and/or resume may be dependent on the credentials used by the user in signing into the IETM.

Resume Job Module

Turning now to FIG. 42, additional details are provided regarding a process flow for resuming a suspended job according to various embodiments. FIG. 42 is a flow diagram showing a resume job module for performing such functionality according to various embodiments of the disclosure. In particular embodiments, the resume job module may be invoked as a result of a user signing into the IETM and selecting an option to view the jobs that have been suspended.

The process flow 4200 begins with the resume job module receiving input indicating a selection from a user to view the jobs that have been suspended in Operation 4210. For instance, in particular embodiments, the user may be provided with a mechanism such as a button on a toolbar to view the jobs that have been suspended. In response to the user selecting the mechanism, the resume job module may provide the suspended jobs to display on a window to the user in Operation 4215. Here, the window may be configured to allow the user to select a particular job from the suspended jobs.

Therefore, the resume job module determines whether input has been received indicating the user has selected a job displayed on the window to resume in Operation 4220. If so, then the resume job module retrieves the stop position for the job in Operation 4225. As previously noted, a marker may be recorded when the job was transferred that identifies the position where the job was suspended. Once the marker has been retrieved, the resume job module provides the procedure/tasks associated with the suspended job for display on a window to the user along with an indication (e.g., a divider) based at least in part on the marker in Operation 4230. In addition, the resume job module provides a resume job window for display in Operation 4235. Here, the resume job window may be superimposed over a portion of the window displaying the procedure/task and may provide a mechanism (e.g., a button) that the user can select to resume the job.

Thus, the resume job module determines whether input has been received indicating the user will resume the job in Operation 4240. If the user has decided to resume the job, then the resume job module causes the resume job window to close and causes the indication to be removed in Operation 4245. Accordingly, the job that has been resumed may be removed from the suspended jobs. Otherwise, the resume job module determines whether input has been received indicating the user would like to exit viewing the suspended jobs in Operation 4250. If the user does want to exit, then the resume job module causes the display of the suspended jobs to be closes and exits.

FIG. 43A provides an example of a mechanism 4300 that is provided in particular embodiments to enable a user to transfer or resume a job. In this example, the mechanism 4300 is a dropdown menu control provided in a toolbar displayed along the top of a window. Here, the dropdown menu provides the user with the option to create a job transfer 4310 and the option to open the jobs that have been transferred (suspended) 4315. FIG. 43B provides an example of a job transfer window 4320 according to various embodiments. As noted above, such a window 4320 may be provided in particular embodiments when a user selects an option to transfer a job the user is currently performing. FIG. 43C provides an example of a procedure/task that has been suspended that a user has identified to resume. Accordingly, an indication 4325 is shown in the display of the procedure/task at a position where the procedure/task was suspended. In addition, a resume job window is provided along with a mechanism (e.g., a button) 4330 to allow the user to resume the job. Finally, FIG. 43D displays the procedure/task for the job with the indication 4335 removed. At this point, the user can resume the job and finish the remaining steps for the procedure/task.

Update Media Module

Turning now to FIG. 44, additional details are provided regarding a process flow for updating the media content displayed based at least in part on a user scrolling through textual information according to various embodiments. FIG. 44 is a flow diagram showing an update media module for performing such functionality according to various embodiments of the disclosure. In particular embodiments, the update media module may be invoked by another module to update the media content displayed such as, for example, the topic module previously described. However, with that said, the update media module may not necessarily be invoked by another module and may execute as a stand-alone module in other embodiments.

For example, a user may be viewing the steps for a maintenance task displayed on a first view pane on a window. At the same time, illustrations for the maintenance may be provided on a second view pane. For instance, a step in the maintenance task may involve a particular component and an illustration of the component may be provided to aid the user in locating the component on the actual item. Accordingly, in particular embodiments, the window may be configured to display the two panes on non-overlapping portions of the window.

Therefore, as the user scrolls through the various steps of the maintenance task, the process flow 4400 begins with the update media module identifying the first occurrence of media content mentioned in the textual information displayed on the window in Operation 4410. In various embodiments, the first occurrence is determined from the top of the window. Therefore, the update media module searches the textual information starting at the top of the window until the module finds a reference to media content in the text. For example, the first reference to media content may be a reference to a figure, a video, an image, a sound recording, and/or the like.

The update media module then retrieves the media content associated with the reference in Operation 4415. In particular embodiments, the reference to the media may include a hyperlink that the user may select to retrieve the media content if desired. Therefore, the update media module may obtain the storage location of the media content in the IETM from the hyperlink and retrieve the media content from the storage location. In other embodiments, the update media module may obtain the storage location from the data (e.g., data module) for the textual information being viewed. In other embodiments, the update media module may use other processes for retrieving the media content as those of ordinary skill in the art can envision in light of this disclosure. Once retrieved, the update media module updates the view pane used for displaying media by causing the retrieved media content to be displayed in the view pane in Operation 4420.

FIG. 45 provides an example of media content being updated as a user scrolls through the textual information for a topic according to various embodiments. As shown in this example, the first occurrence of media content mentioned in the textual information shown in the view pane displayed on the left side of a window is FIG. 2, Sheet 2 4500. As a result, the corresponding illustration for FIG. 2, Sheet 2 4510 is shown in the view pane displayed on the right side of the window. Once the user has scroll down the textual information so that the reference to FIG. 2, Sheet 2 can no longer be seen in the view pane, then the media content displayed in the view pane on the right is updated to reflect the media content that is now the first to be referenced in the textual information. It is noted that in particular embodiments multiple view panes may be used to display the media content so that multiple occurrences of media content mentioned in the textual information may be shown on a window at the same time.

Highlight Unit Module

Turning now to FIG. 46, additional details are provided regarding a process flow for highlighting a unit displayed in media content such as an illustration (e.g., 2D or 3D graphic) or mentioned in text based at least in part on a user selecting the unit according to various embodiments. FIG. 46 is a flow diagram showing a highlight unit module for performing such functionality according to various embodiments of the disclosure. In particular embodiments, the highlight unit module may be invoked by another module to highlight a unit such as, for example, the topic module previously described. However, with that said, the highlight unit module may not necessarily be invoked by another module and may execute as a stand-alone module in other embodiments.

The term "unit" may refer to a component of an item, equipment, a tool, and/or the like. Accordingly, a unit may be referenced in the textual information for a topic, as well as displayed in media content such as an illustration. For example, a user may be being viewing the instructions for performing a maintenance task and the instructions may reference a particular part that is to be replaced during the task. Many times, some type of media may also be provided such as an illustration to assist the user in actually replacing the part. For instance, the instructions may be displayed on a first view pane of a window and the illustration may be displayed on a second view pane of a window. Here, in particular embodiments, the part may be provided in the first and/or second view panes as selectable. Although the part may not necessarily be selectable. Therefore, in response to the user selecting one or more units in one of the view panes, the highlight unit module may be invoked.

The process flow 4600 begins with the highlight unit module determining whether input has been received indication a selection of text referencing one or more units in Operation 4610. For example, the user may be viewing the steps for a maintenance procedure/task and may select a particular step for the procedure/task in the textual information displayed on a window. Accordingly, the step may refer to one or more units (e.g., one or more components). The highlight unit module may be configured to identify the reference(s) to the unit(s) based at least in part on the unit(s) (e.g., unit name and/or number) being selectable within the textual information. In other embodiments, the highlight unit module may be configured to identify the reference(s) to the units(s) by searching the selected text and comparing terms within the text to a list of units(s) (e.g., component names, part names and/or numbers, and/or the like).

The highlight unit module then causes the unit(s) to be displayed as highlighted in the media content being displayed on the window in Operation 4615. Accordingly, the highlight unit module may highlight the unit(s) using different formatting depending on the embodiment. For instance, the highlight unit module may highlight the unit(s) in the media content by displaying the unit(s) in bold, in a particular color, with a marker, with a border, in a different font, any combination thereof, and/or the like. As a result, the user is then able to identify the unit(s) referenced in the selected text in the media content more easily.

The highlight unit module is configured in various embodiments to perform similar functionality in respect to the user selecting one or more units displayed in the media content. Therefore, if the highlight unit module determines it has not received a selection of text containing one or more units, then the module determines whether it has received a selection of one or more units in the media content currently being displayed on the window in Operation 4620. The unit(s) displayed in the media content may be selectable and therefore, the user may have selected one or more of the units displayed in the media content. For example, the user may select a unit by clicking on the unit in the media content. In particular instances, the user may be able to select multiple units by holding down a key while clicking on the units such as, for example, the ctrl key or the alt key. Those of ordinary skill in the art can contemplate other approaches that may be used to select the unit(s) in the media content in light of this disclosure.

Similar to the user selecting text referencing one or more units, the highlight unit module then causes the unit(s) to be displayed as highlighted in the textual information being displayed on the window in Operation 4625. Again, the highlight unit module may highlight the unit(s) using different formatting depending on the embodiment.

FIG. 47A provides an example of a window displaying a first view pane on the right side of the window providing the textual information for a topic and a second view pane on the left side of the window providing an illustration or the topic. In this example, the user has selected a particular step 4700 of a procedure/task referencing parts 4710, 4715, 4720 displayed in the illustration and a result, the parts 4725, 4730, 4735 have been automatically highlighted in the illustration according to various embodiments. FIG. 47B provides an example in which the user has selected a part 4740 in the illustration in the view pane displayed on the right side of the window and the references to the part 4745, 4750 are automatically highlighted in the textual information in the view pane displayed on the left side of the window according to various embodiments.

End of Topic Module

Turning now to FIG. 48, additional details are provided regarding a process flow for providing functionality when a user has reached the end of a topic according to various embodiments. FIG. 48 is a flow diagram showing an end of topic module for performing such functionality according to various embodiments of the disclosure. In particular embodiments, the end of topic module may be invoked by another module to invoke functionality such as, for example, the topic module previously described. However, with that said, the end of topic module may not necessarily be invoked by another module and may execute as a stand-alone module in other embodiments.

As previously mentioned, various embodiments provide the user with certain functionality when the end of the content for a topic has been detected. For example, the topic module may invoke the end of topic module in response to detecting the user has scrolled to the end of the textual information provided for a topic. As previously noted, the content for a topic may be formatted in various embodiments according to S1000D standards. Therefore, the content for a topic may be stored in the IETM with respect to data modules and the end of the topic may refer to the end of content found in a particular data module for the topic (e.g., the end of the data module).

Further, the functionality may only be provided at the end of the topic in particular embodiments to ensure the user has viewed and/or processed/used all of the content for a topic. For example, the user may be viewing a topic involving a task with many steps that are to be performed by the user. Therefore, end of topic functionality may only be provided upon detecting the user has reached the end of the content, that is reached the end of the steps for the task, to ensure the user has performed all of the steps. In some embodiments, other criteria may also be associated with providing end of topic functionality. For instance, returning to the example, the user may also need to acknowledge he or she has performed all of the steps in the tasks by checking off the steps before the end of topic functionality is provided.

Accordingly, the process flow 4800 begins with the end of topic module providing of an end of topic mechanism (e.g., a button) for the content displayed for the topic on a window in Operation 4810. In addition, the end of topic module in particular embodiments provides a previous topic mechanism (e.g., a button) and a next topic mechanism (e.g., a button) for the content displayed for the topic on the window in Operations 4815, 4820.

At this point, the end of topic module determines whether input has been received indicating the user has selected the previous topic mechanism in Operation 4825. If so, then the end of topic module generates a preview for the previous topic found just before the current topic being viewed by the user in the table of contents for the technical documentation in Operation 4830 and provides the preview for display in Operation 4835.

For instance, in particular embodiments, the previous topic preview may be provided as a separate window than the window displaying the topic. In some embodiments, the preview window may be superimposed over a portion of the window displaying the topic. Accordingly, the previous topic preview may provide the user with information/data, tables, instructions, illustrations, other media content, links to additional and/or related information, and/or the like associated with the previous topic. In some embodiments, the preview is configured to provide only a preview of some of the content found in the technical documentation on the previous topic. For example, the preview may be configured in particular embodiments to provide the first five to fifty lines of textual information that the user would be provided with if the user were to select the previous topic to view the entire content for the topic.

If the user has not selected the previous topic mechanism, then the end of topic module determines whether input has been received indicating the user has selected the next topic mechanism in Operation 4840. If so, then the end of topic module generates a preview of the next topic found just after the current topic being viewed by the user in the table of contents for the technical documentation in Operation 4845 and provides the preview for display in Operation 4850. Accordingly, the preview for the next topic may be configured in the same manner as the preview for the previous topic.

However, if the user has not selected the next topic mechanism, then the end of topic module determines whether input has been received indicating the user has selected the end of topic mechanism in Operation 4855. If so, then the end of topic module executes the functionality associated with the end of topic mechanism in Operation 4860. The functionality may perform different operations depending on the embodiment. For instance, in some embodiments, the functionality may open the table of contents for the technical documentation at the place in the table of contents where the current topic being viewed by the user is located and may highlight the current topic in the table of contents. Here, the table of contents may be provided in a separate window and/or a view pane displayed on the window displaying the topic. Such functionality may allow the user to then view other topics in the vicinity of the current topic to help the user navigate to a new topic. In other embodiments, the functionality may take the user back to the top of the content for the topic (e.g., back to the top of the data nodule).

In other embodiments, the functionality may allow the user to view other objects for the item. For example, the user may be performing maintenance on a particular aircraft of a type of aircraft found in an airline's fleet and may be viewing a maintenance task. Accordingly, the user may be signed into the IETM using credentials identifying the particular aircraft so that the maintenance work (e.g., job) being performed on the aircraft is tracked and recorded. However, the user may be assigned to perform the same maintenance on another aircraft of the same type found in the airline's fleet. Therefore, the end of the topic functionality may allow the user to view the other aircraft of the same type in the airline's fleet and then enable the user to move easily to the other aircraft in the IETM (e.g., sign-into the other aircraft in the IETM) while maintaining the same maintenance task the same topic). Those of ordinary skin in the art can envision other functionality may be invoked in other embodiments in light of this disclosure. It is noted that although not shown in the process flow 4800 provided in FIG. 48, the end of topic module is configured in some embodiments to cause the end of topic mechanism, the previous topic mechanism, and/or the next topic mechanism to be removed from display if the user scrolls to the position in the content for the topic that is no longer at the end of the content.

FIG. 49A provides an example of an end of topic mechanism (e.g., a button) 4900 provided at the end of the content for a topic according to various embodiments. FIG. 49B provides an example in which the functionality performed as a result of the user selecting the end of topic mechanism 4900 is displaying a window with the table contents at a position 4910 in the table of contents highlighting the current topic being viewed by the user.

Wiring Module

Turning now to FIG. 50, additional details are provided regarding a process flow for providing functionality for wiring data according to various embodiments. FIG. 50 is a flow diagram showing a wiring module for performing such functionality according to various embodiments of the disclosure. In particular embodiments, the wiring module may be invoked by another module to invoke functionality such as, for example, the topic module previously described. However, with that said, the wiring module may not necessarily be invoked by another module and may execute as a stand-alone module in other embodiments.

As previously noted, various types of content may be provided in different topics. One such type of content is wiring data. For instance, content involving wiring data may provide one or more illustrations of an electrical schematic of a wiring configuration used for the item. The electrical schematic may include a layout of a plurality of wires and a plurality of other components that make up the configuration. The other components may include articles such as harnesses, electrical equipment, connectors (e.g., plugs), track assemblies, and/or the like. Therefore, in particular embodiments, the topic module may determine whether the content for the topic currently being displayed involves wiring data and if so, the topic module invokes the wiring module.

Therefore, the process flow 5000 begins with the wiring module determining whether input has been received indicating the user who is viewing wiring data has select a particular wire in the electrical schematic being displayed on a window in Operation 5010. As noted, the wiring data may entail one or more illustrations of the electrical schematic. Here, the individual wiring and/or components shown in the illustration(s) may be configured as selectable to invoke different functionality depending on the type of selection mechanism used by the user.

For instance, in some embodiments, the individual wiring may be configured so that if the user uses his or her mouse to hover over a particular wire shown in the schematic, then tracing of the wire in the schematic is displayed on the window. Here, the tracing may be shown by highlighting the wire in the schematic by, for example, bolding the wire, displaying the wire in a particular color, displaying the wire using a unique pattern, using a combination thereof, and/or the like.

However, if the user selects the particular wire using a second, different selection mechanism (e.g., clicking on the wire), then the wiring module generates a preview for the wire and provides the preview for display in Operations 5011 and 5012. Similar to other previews, the wire preview may be provided as a separate window than the window displaying wiring data. In some embodiments, the preview window may be superimposed over a portion of the window displaying the wiring data. Accordingly, the wire preview may provide the user with information/data, tables, instructions, illustrations, other media content, links to additional and/or related information, and/or the like associated with the wire. In some embodiments, the preview is configured to provide only a preview of some of the content found in the technical documentation on the wire.

However, if the wiring module instead determines input has been received indicating the user has selected the particular wire using a third, different selection mechanism (e.g., alt-clicking on the wire) in Operation 5013, then the wiring module enables live wire for the particular wire in Operation 5014. As discussed further herein, live wire provides a window displaying a diagram with all of the terminal ends for the selected wire. Accordingly, the window is configured in particular embodiments so that the user can select portions of the wire between terminal ends within the diagram to view information on the portion of wire and terminal ends.

If the user has not selected a wire in the electrical schematic, then the wiring nodule determines whether input has been received indicating the user has selected a component (other than a wire) displayed in the schematic in Operation 5020. If so, then the wiring module generates a preview for the component and provides the preview for display in Operations 5021 and 5022. Accordingly, the preview for the component may be configured in the same manner as the preview for the wire.

For example, the component selected by the user may be a connector displayed in the electrical schematic of the wiring configuration used for the item. Accordingly, in particular embodiments, the preview for the connector may display an illustration of the connector and a plurality of pins found on the connector. Here, each of the pins may be selectable by the user to generate a preview for the pin. Therefore, in this example, the wiring module may determine whether input has been received indicating the user has selected a particular pin displayed in the illustration for the connector in Operation 5023. If the user has selected a particular pin, then the wiring module generates and provides a preview for the pin for display in Operations 5024 and 5025. Again, the preview for the pin may be configured in the same manner as the preview for the wire and/or component. In addition, the pin may be highlighted in the illustration of the connector to help the user to better identify where the pin is located within the connector. This may be quite useful to an individual who is working in the field on the particular connector.

In some embodiments, the user may also be provided with a selection mechanism (e.g., a button) to generate a list of the components found in the electrical schematic of the wiring configuration displayed on the window. Each of the components may be identified by a reference designator (e.g., ResDef). Therefore, in these particular embodiments, the wiring module determines whether input has been received indicating the user has selected this selection mechanism in Operation 5030. If so, then the wiring module retrieves and provides the list of components for display in Operations 5031 and 5032. For example, in particular embodiments, the wiring module may cause the list of components to be displayed in a first view pane on the window while continuing to display the illustration of the electrical schematic in a second view pane on the window.

In addition, the components provided in the list may be selectable (e.g., may be displayed as a hyperlink and/or displayed with a selection mechanism such as a button) to allow the user to view information for the component. For example, in particular embodiments, the information may be displayed on a separate window and may provide a list of other electrical schematics found in the wiring data for the technical documentation on the item in which the component is shown. Therefore, upon displaying the list of components, the wiring module may determine whether input has been received indicating the user has selected a particular component found in the list in Operation 5033. If the user has selected a component found in the list, then the wiring module retrieves and provides the information providing the other electrical schematics in which the component is shown in Operations 5034 and 5035. In particular instances, the electrical schematics displayed in the list may also be selectable to allow the user to retrieve and view the schematic.

FIG. 51A provides an example of a window displaying an electrical schematic of a Wiling configuration used for an item. Here, the user has selected a particular wire 5100 shown in the schematic to generate and display a preview window 5110 for the wire superimposed over the window displaying the electrical schematic according to various embodiments. In addition, the tracing of the wire has been highlighted in the electrical schematic.

FIG. 51B provides an example of a preview window 5115 for a connector according to various embodiments as a result of the user selecting the connector 5120 in the electrical schematic. In this example, the preview window 5115 is superimposed over the window displaying the electrical schematic and provides an illustration of the connector (e.g., plug) displaying a plurality of pins found in the connector. Accordingly, the user has selected a particular pin 5125 and as a result, a preview window 5130 for the pin has been generated and displayed. In addition, the pin 5125 has been highlighted in the illustration of the connector.

FIG. 51C provides an example of a list of components found in the electrical schematic that has been generated and provided in a first view pane 5135 displayed on a window according to various embodiments. In this particular example, the electrical schematic continues to be provided in a second view pane 5140 displayed on the window. Finally, FIG. 51D provides an example of a list of other electrical schematics 5145 in which a selected component is shown that has been generated and displayed according to various embodiments. In this example, each of the schematics (and accompanying data modules) have been made selectable to allow the user to retrieve and view a schematic if desired.

Live Wire Module

Turning now to FIG. 52, additional details are provided regarding a process flow for providing live wire for a selected wire according to various embodiments. FIG. 52 is a flow diagram showing a live wire module for performing such functionality according to various embodiments of the disclosure. In particular embodiments, the live wire module may be invoked by another module to provide live wire such as, for example, the wiring module previously described. However, with that said, the live wire module may not necessarily be invoked by another module and may execute as a stand-alone module in other embodiments.

As previously discussed, a user may select a particular wire in an electrical schematic being displayed on a window using a particular selection mechanism (e.g., alt-clicking on the wire) and as a result, the wiring module may invoke the live wire module. Accordingly, the process flow 5200 begins with the live wire module generating a wire diagram displaying all of the terminal ends for the selected wire and providing the wire diagram for display in Operations 5210 and 5215. For instance, the live wire module may provide the diagram in a separate window or in a view pane displayed on an existing window.

Accordingly, in particular embodiments, each portion of the wire shown between two terminal ends is selectable (e.g., displayed as a hyperlink and/or displayed with a selection mechanism such as a button) in the wire diagram. Therefore, in these embodiments, the live wire module determines whether input has been received indicating the user has selected a portion of the wire in the diagram in Operation 5220. If so, then the live wire module provides information on the portion of the wire and the two terminal ends for display in Operations 5225. Here, depending on the embodiment, the information on the portion of the wire may be provided on a view pane displayed on the window displaying the wire diagram (with the wire diagram displayed on a separate view pane) or on a separate window.

Here, the information displayed on the portion of the wire may include such information as the material used for the wiring, properties for the portion of wire, the parts (e.g., part names and/or numbers) that are associated with the wire and/or terminals ends, location identifiers for the terminal ends, and/or the like. Accordingly, some of the information displayed for the portion of the wire may be selectable (e.g., displayed as a hyperlink and/or displayed with a selection mechanism such as a button) to allow further information to be displayed. For example, in some embodiments, the parts (e.g., the part names and/or numbers) are selectable, as well as the location identifiers for the terminals ends.

Therefore, in these particular embodiments, the live wire module determines whether input has been received indicating the user has selected one of the parts in Operation 5230. If so, then the live wire module generates and provides a preview for the part for display in Operations 5235 and 5240. Similar to other previews, the part preview may be provided as a separate window than the window displaying wiling diagram. In some embodiments, the preview window may be superimposed over a portion of the window displaying the wiring diagram. Here, the live wire module may retrieve the information displayed for the preview from the parts data (e.g., parts data modules) found in the technical documentation on the item. In addition, the preview may provide interactive functionality such as a selection mechanism to enable the user to order the part from the IETM (as previously discussed).

Likewise, the live wire module determines whether input has been received indicating the user has selected one of the location identifiers for a terminal end displayed on the wire window in Operation 5245. If so, then the live wire module generates and provides a preview for the location for display in Operations 5250 and 5255. Similar to other previews, the location preview may be provided as a separate window than the window displaying wiring diagram. In some embodiments, the preview window may be superimposed over a portion of the window displaying the wiring diagram. Accordingly, the preview may provide information on the location of the terminal end. The live wire module may retrieve such information from the wiring data (e.g., wire data modules) found in the terminal documentation of the item.

At this point, the live wire module may determine whether input has been received indicating the user would like to exist from viewing the wire diagram in Operation 5265. If not, then the live wire module continues to monitor the user's interactions. Otherwise, the live wire module exits.

FIG. 53 provides an example of a wire diagram generated and displayed for a selected wire according to various embodiments. In this example, the user who is viewing the diagram has selection a portion of the wire 5300 between two terminal ends 5310, 5315 that is highlighted and as a result, information of the portion of the wire is displayed that provides information of the portion of the wire 5300 and the two terminal ends 5310, 5315. Here, the parts (e.g., part numbers) and location identifiers (e.g. zones) are displayed as selectable (e.g., hyperlinks) to enable the user to select a part or a location identifier for a terminal end to generate previews providing information on the part or the location for the terminal end.

Crosshairs Module

In particular instances, a user may be viewing an illustration for a topic displayed on a window that provides a graph. Turning now to FIG. 54, additional details are provided regarding a process flow for placing crosshairs on the graph according to various embodiments. FIG. 54 is a flow diagram showing a crosshairs module for performing such functionality according to various embodiments of the disclosure. In this particular instance, the crosshairs module may be invoked as a result of a user who is viewing the graph invoking a mechanism (e.g., alt-click) to place crosshairs on the graph.

Therefore, the process flow 5400 begins with the crosshairs module determining whether input has been received identifying a location to place the crosshairs on the graph in Operation 5410. Accordingly, in various embodiments, the user moves a cursor over the graph displayed on the window to a position on the graph that he or she would like to place the crosshairs and then invokes the appropriate mechanism. Such action identifies the location where the crosshairs module is to place the crosshairs. If the user has appropriately identified a location, then the crosshairs module causes the crosshairs to be placed on the graph at the location in Operation 5415. FIG. 55 provides an example of crosshairs 5500 placed on a graph displayed on a window according to various embodiments. The user may use this functionality to help the user better identify the values associated with a particular location (e.g., the values associated with a particular location on a line) on the graph.

3D Graphics Module

Turning now to FIG. 56, additional details are provided regarding a process flow for providing functionality for media content involving 3D graphics according to various embodiments. FIG. 56 is a flow diagram showing a 3D graphics module for performing such functionality according to various embodiments of the disclosure. In particular embodiments, the graphics module may be invoked by another module to provide functionality for 3D graphics such as, for example, the topic module previously described. However, with that said, the 3D graphics module may not necessarily be invoked by another module and may execute as a stand-alone module in other embodiments.

As previously noted, the content displayed for a particular topic may include media content. In some instances, the media content may involve 3D graphics. Here, for example, the topic may involve displaying the illustrated parts data for a component of an item. Accordingly, a table of the parts used for the component may be provided in a first view pane displayed on a window and media content for the component may be provided in a second view pane displayed on the window. Accordingly, in particular embodiments, the window may be configured to display the first and second view panes on non-overlapping portions of the window. The parts listed in the table may be selectable in the first view pane and the media content displayed in the second view pane may be a 3D graphic of the component. Therefore, in particular embodiments, the topic module may determine the media content for the topic currently being displayed. Is a 3D graphic and as a result, the topic module invokes the 3D graphics module.

Thus, the process flow 5600 begins with the 3D graphics module determining whether input has been received indicating the user has selected a part in the 3D graphic using a first selection mechanism (e.g., using his or her mouse to hover over the part in the graphic) in Operation 5610. If the user has selected the part using the first selection mechanism, then the 3D graphics module causes the selected part to be displayed as highlighted in both the graphic displayed in the second view pane and the table displayed in the first view pane in a first format in Operations 5611 and 5612. Accordingly, the part may be highlighted in the 3D graphic and the table using different formatting depending on the embodiment. For example, highlighting the part may be accomplished by formatting the part in bold, in a particular color, with a border, in a different font, any combination thereof, and/or the like. Therefore, the first format may involve displaying the part in a first color (e.g., green) in the 3D graphic and displaying the part in a separate color (e.g., blue) in the table.

If the user has not selected the part using the first selection mechanism, then the 3D graphics module may determine whether input has been received indicating the user has instead selected the part in the 3D graphic using a second, different selection mechanism (e.g., clicking on the part in the graphic) in Operation 5620. If the user has selected a part using the second selection mechanism, then the 3D graphics module causes the selected part to be displayed as highlighted in both the graphic displayed in the second view pane and the table displayed in the first view pane in a second format in Operations 5621 and 5622. For example, the second format may involve displaying the part in a second color (e.g., blue) in the 3D graphic and displaying the part in the separate color (e.g., blue) along with a border in the table.

In various embodiments, the first selection mechanism (e.g., hovering over the part in the 3D graphic using a cursor) is to provide the user with a quick way in identifying the part in the table of parts. Such functionality may allow the user to move freely from part to part in the 3D graphic and identify the part he or she is specifically looking for by viewing what corresponding part is highlighted in the table. Therefore, as the user moves from part to part using the first selection mechanism, the corresponding part highlighted in the table also moves. While the previous part selected using the first selection mechanism is no longer highlighted in particular embodiments.

The second selection mechanism (e.g., clicking on the part in the 3d graphic) is to provide the user with a way to select a part in the table that stays selected. For example, the user may want to view more information on a part that is available through the table and/or order the part using a mechanism (e.g., a button) provided along with the part in the table. Therefore, in this example, the user uses the second selection mechanism (e.g., clicking on the part in the 3D graphic) to select the corresponding part in the table. Here, the part stays selected even after the user moves his or her cursor off the part in the 3D graphic. In some embodiments, the user can select multiple parts by using the second selection mechanism.

In some instances, the user may wish to remove a part from being viewed in the 3D graphic so that he or she can view the remaining parts of the component better in the graphic. Therefore, in particular embodiments, the 3D graphics module determines whether input has been received indicating the user has selected a part to delete (e.g., using a selection mechanism such as right clicking on the part and selecting delete) in Operation 5623. If so, the 3D graphics module causes the part to be removed from being displayed in the 3D graphic in Operation 5624. Accordingly, a deleted part can be added back to the 3D graphic in some embodiments. Therefore, the 3D graphics module determines whether input has been received indicating the user wants to un-delete a part that has been removed from display in the 3D graphic in Operation 5625. If so, then the 3D graphics module causes the part to be displayed again in the 3D graphic in Operation 5626.

The 3D graphics module may be configured in various embodiments to allow for similar functionality based at least in part on the user selecting a part in the table. Therefore, the 3D graphics module may determine whether input has been received indicating the user has selected a part in the table in Operation 5630. If so, then the 3D graphics module causes the part to be displayed as highlighted in the 3D graphic in Operation 5631. In addition, in particular embodiments, the 3D graphics module causes the part to be zoomed in on and rotated in the 3D graphic in Operation 5632. In these particular embodiments, the 3D graphics module may be configured to cause the part to be zoomed in on in the 3D graphic with respect to the size of the part. The smaller the part, the more the part is zoomed in on in the 3D graphic. Likewise, the 3D graphics module may be configured to cause the part to be rotated to a better angle for viewing.

Although not shown in FIG. 56, in some embodiments multiple selection mechanisms can be used in a similar fashion to select a part in the table as selecting a part in the 3D graphic. That is to say some embodiments may be configured to allow a user to use a first selection mechanism (e.g. hover over a part in the table) to highlight the part in a first format and use a second, different mechanism (e.g., click on the part in the table) to highlight the part in a second format.

In addition to removing parts from being displaying in the 3D graphic, parts may also be solely displayed in the 3D graphic in some embodiments. Therefore, the 3D graphics module may determine whether input has been received indicating the user has selected a party to display by itself in the 3D graphic (e.g., using a selection mechanism such as alt-clicking on the part) in Operation 5640. If so, then the 3D graphics module causes all the other parts of the component to be removed from being displayed in the 3D graphic in Operation 5641.

Finally, in particular embodiments, the user may be provided functionality to display an axis or axes in the 3D graphic to assist the user in rotating the graphic to obtain a better view of a part. Therefore, in these particular embodiments, the 3D graphics module determines whether input has been received indicating the user has selected to display the axis or axes in the 3D graphic (e.g., has selected an add axis/axes mechanism) in Operation 5650. If so, then the 3D graphics module causes display of the axis or axes in Operation 5651.

FIG. 57A provides an example of a window displaying a table of parts for a component in a first view pane and a 3D graphic of the component in a second view pane. In this example, a user has selected a particular part 5700 in the 3D graphic using a first selection mechanism (e.g., by using his or her mouse to hover over the part) and a result, the part is 5700 is highlighted in the 3D graphic and the corresponding part 5710 is highlighted in the table according to various embodiments. Here, both are highlighted using a first format involving showing the parts 5700, 5710 in color.

FIG. 57B again provides the window displaying the table of parts for the component in the first view pane and the 3D graphic of the component in the second view pane. However, the user has now selected the particular part 5700 in the 3D graphic using a second selection mechanism (e.g., by clicking on the part) and as a result, the part 5700 is highlighted in the 3D graphic and the corresponding part 5710 is highlighted in the table using a second format involving showing the parts 5700, 5710 in color and placing a border around the part 5710 in the table according to various embodiments. As previously explained, the first selection mechanism can allow the user to quickly identify where a part displayed in the 3D graphic is found in the table, while the second selection mechanism can allow the user to actually select a part in both the 3D graphic and the table so that he or she may view further information on the part and/or perform some type of functionality with respect to the part.

FIG. 57C again provides the window displaying the table of parts for the component in the first view pane and the 3D graphic of the component in the second view pane. In this example, the user is interested in a part 5715 listed in the table that is also shown in the 3D graphic 5720 and selects the part 5715 (e.g., clicks on the part 5715) in the table. As a result, the part 5715 is highlighted in the table and is highlighted in the 3D graphic 5720 according to various embodiments as shown in FIG. 57D. In addition, the part 5720 shown in the 3D graphic is zoomed in on and rotated so that the user can get a better view of the part 5720.

FIG. 57E provides an example of a 3D graphic where the user is interested in viewing a specific part 5725 that the user has selected but would like to do so without the other part 5730 hindering the view. Therefore, in this example, the user selects the other part 5730 and provides an indication to remove the part from view in the 3D graphic according to various embodiments. As a result, the other part 5730 is removed from the 3D graphic so that only the part of the user is interested in viewing 5725 is provided in the 3D graphic as shown in FIG. 57F.

FIG. 57G provides an example of a 3D graphic where the user is again interested in viewing a specific part 5735 but would like to do so without the other parts shown in the graphic hindering the view. In this example, the user selects the specific part 5735 and indicates to solely show the part 5735 in the 3D graphic according to various embodiments. As a result, the specific part 5735 is shown in the 3D graphic by itself without the other parts of the component being displayed as shown in FIG. 57H.

Finally, FIG. 57I provides an example where the user has indicated to display axes 5740 in the 3D graphic according to various embodiments. As previously mentioned, the user may display the axes 5740 to assist him or her in rotating the graphic to obtain a better view of a part.

Hierarchy Module

Turning now to FIG. 58, additional details are provided regarding a process flow for displaying components in media content as identified in a hierarchy according to various embodiments. FIG. 58 is a flow diagram showing a hierarchy module for performing such functionality according to various embodiments of the disclosure. In particular embodiments, the hierarchy module may be invoked as a result of a user indicating to view the hierarchy associated with the components shown in media content currently being displayed. Here, the hierarchy refers to the relationships between the components of an item with respect to functional and/or physical breakdown of the components (e.g., breakdown into assembly, sub-assembly, sub-sub-assembly, system, sub-system, sub-sub-system, subject, unit, part, and/or the like).

Therefore, the process flow 5800 begins with the hierarchy module providing the hierarchy for the components shown in the media content currently being displayed in Operation 5810. Here, in particular embodiments, the hierarchy may be provided in a first view pane displayed on a window and the media content (e.g., illustration) may be provided on a second view pane displayed on the window. Accordingly, in particular embodiments, the window may be configured to display the first and second view panes on non-overlapping portions of the window. In addition, each of the components provided in the hierarchy may be associated with a selection mechanism (e.g., a checkbox control) to allow the user to identify which of the components to display in the media content and which of the components not to display.

Thus, the hierarchy module determines whether input has been received indicating a selection of a component to display in the media content in Operation 5815. If so, then the hierarchy module causes display of the component in the media content in Operation 5820. Likewise, the hierarchy module determines whether input has been received indicating a selection of a component not to display in the media content in Operation 5825. If so, then the hierarchy module causes the component to be removed from being displayed in the media content in Operation 5830.

In particular embodiments, a report may also be provided on those components illustrated (shown) in the media content but not listed (e.g., not found in the hierarchy). In these particular embodiments, some type of selection mechanism (e.g., a button) may be provided that the user can select to view the report. For example, the report may be provided on a window that is displayed as a result of the user indicating he or she would like to view the report. Therefore, the hierarchy module may determine whether input has been received indicating the user would like to view the report in Operation 5835. If so, then the hierarchy module provides the report for display in Operation 5840. Such a report may be useful in identifying content in the technical documentation (e.g., illustrated parts data and/or breakdown) for the item that is deficient with respect to certain components.

The hierarchy module then determines whether input has been received indicating the user would like to exit in Operation 5845. If so, then the hierarchy module causes the window to close and exits. Otherwise, the hierarchy module continues to monitor the user's interactions.

FIG. 59A provides an example of a window in which a hierarchy of components 5900 is displayed in a first view pane for the components shown in media content, in this instance a 3D graphic 5910, displayed in a second view pane. In this example, each of the components listed in the hierarchy is provided with a checkbox control 5915 to allow the user to identify which of the components to display in the content media and which of the components not to display in the content media. FIG. 59B provides an example of a report 5920 of components illustrated in the media content but not listed in the hierarchy.

Communication Session Module

Various embodiments of the IETM provide functionality to allow users to conduct communication sessions between one another within the IETM environment. For instance, a communication session may be a voice call, a video call, a chat session, a text session, and/or the like. Such functionality allows for users to converse and interactive with each other while in a secure environment facilitated by the IETM in many instances. For example, a user may be performing a maintenance task and may have a question as to a particular step in the task. Here, the communication session functionality provided in various embodiments enables the user to conduct a communication session (e.g., a voice call) and converse with another user who is actively signed into the IETM to discuss the step of the maintenance task. Because both users are signed into the IETM and the IETM is facilitating the session, the conversation between the users is secure.

Turning now to FIG. 60, additional details are provided regarding a process flow for providing communication session functionality in an IETM according to various embodiments. FIG. 60 is a flow diagram showing a communication session module for performing such functionality according to various embodiments of the disclosure. In particular embodiments, the communications session module may be invoked as a result of a user who is signed into the IETM indicating he or she would like to initiate a communication session with another user who is actively signed into the IETM.

The process flow 6000 begins with the communication session module identifying the users who are actively signed into the IETM in Operation 6010. In some embodiments, the users who are identified as active may be based at least in part on the credentials of the user who wants to initiate the communication session. For example, the user may be signed into a particular object (e.g., a particular aircraft) of an item (e.g., a type of aircraft) and therefore, the active users who are identified may be those users who are currently signed into the same object (e.g., the same aircraft). Further, in particular embodiments, other users (e.g., special users) may be identified as well such as the user's supervisor, quality assurance, engineering, and/or the like. Once identified, the communication session module provides the active users (e.g., identifiers for the active users) for display on a window in Operation 6015.

At this point, the user may select one or more of the active users and/or special users on the window to initiate a communication session to. Here, the window may provide some type of selection mechanism for each user such as a button so that the user is selectable. Therefore, the communication session module determines whether input has been received indicating the user has selected a particular user in Operation 6020. In addition, the user may identify the type of session he or she would like to initiate to the user (e.g., voice call). Therefore, the communication session module may determine the type of communication session from the input as well. If the user has identified a particular user (and the type of session), then the communication session module initiates the communication session to the particular user in Operation 6025.

In particular embodiments, the communication session is conducted over an IP-based network that the user's computing entity 110 is in communication with to ensure the session is conducted over a secure network. Accordingly, the particular user may accept the communication session within the IETM. Here, the particular user may receive some type of notification in the IETM about the incoming communication session and may be provided with some type of selection mechanism to accept the session.

Therefore, the communication session module determines whether input has been received indicating the communication session has been accepted in Operation 6030. If the session has not been timely accepted, then the user who initiated the communication session may decide to drop the session. Therefore, if the session has not been accepted, then the communication session module determines whether input has been received indicating the user who initiated the session has decided to drop the session in Operation 6035. If not, then the communication session module maintains the session and waits for an acceptance.

Once the communication session has been accepted, the communication session module determines whether input has been received indicating the user may want to initiate a session with an additional user in Operation 6040. In other words, the communication session module determines whether the user may want to conduct a conference session involving multiple users. If so, then the communication session module returns to Operation 6015 and provides the available users so that the user can select another user to include in the session. Accordingly, the communication session module performs the same operations to initiate a communication session to the newly selected user and bridges the session onto the session with the first selected user when accepted.

Once all of the users who have agreed to be a part of the session have accepted, the communication session module facilities the communication session within the IETM environment and provides a session window for display in Operation 6045. Depending on the embodiment, the session window may provide video if a communication session supporting such is being conducted between the users. In addition, the session window may provide the user with functionality such as ability to share the user's screen with the other users, enable a webcam, mute and/or unmute a microphone, end the session, record, and/or the like. Therefore, the user may then converse and interact with the other users on the communication session via the session window.

While the user is conversing and interacting with the other users, the communication session module may determine whether input has been received indicating the user has selected any of the provided functionality. For instance, the communication session module may determine whether the user has decided to share his or her computing entity's screen display in Operation 6050. If so, then the communication session module shares the user's screen with the other users in Operation 6055. Accordingly, the communication session module may determine whether the user wants to use other functionality that is available and if so, invokes such functionality.

Finally, the communication session module determines whether input has been received indicating the user wants to end the communication session (e.g., hang up the call) in Operation 6060. If so, then the communication session module ends the communication session in Operation 6065. The communication session module then determines whether input has been received indicating the user wants to close the communication session functionality in Operation 6070. If so, then the communication session module causes the session window to close and exits. It is noted that in some embodiments upon completion of the communication session, the communication session module may save a record of the session in a log within the IETM for reporting and/or tracking purposes.

FIG. 61A provides an example of a window that provides a selection mechanism (e.g., a button) 6100 to enable a user to access the communication session functionality according to various embodiments. FIG. 61B provides an example of a window 6110 according to various embodiments that is opened as a result of the user selecting the mechanism 6100. In this example, the window 6110 provides a list of active users 6115 and a list of special users 6120 along with a selection mechanism to allow the user to initiate a communication session (e.g., "call") with one of the active users 6115 and/or special users 6120. In this instance, the selection mechanisms for the special users 6120 are unavailable indicating either the user who is initiating the session does not have the credentials to initiate a session any of the special users and/or each of the special users is not actively signed into the IETM.

FIG. 61C provides an example of a session window 6125 that is displayed once a communication session is activated according to various embodiments. As shown in FIG. 61C, the session window 6125 includes different functionality the user may invoke while engaged in the communication session. For example, the session window 6125 includes a selection mechanism (e.g., a button) 6130 that the user may select to share his or her screen with the other users on the session. In addition, the session window 6625 provides a selection mechanism (e.g., a button) 6135 to allow the user to end the communication session. Finally, FIG. 61D shows the session window 6125 once the user has shared his or her screen 6140 with the other users on the session.

Virtual Caution Panel Module

Various embodiments of the IETM provide a virtual caution panel that mimics a caution panel found on an item (e.g., a piece of equipment) such as, for example, an aircraft. Therefore, turning now to FIG. 62, additional details are provided regarding a process flow for addressing warnings and/or cautions provided by a caution panel found on an item according to various embodiments. FIG. 62 is a flow diagram showing a virtual caution panel module for performing such functionality according to various embodiments of the disclosure. In particular embodiments, the virtual caution panel module may be invoked as a result of a user who is signed into the IETM opening the virtual caution panel displayed on a window.

Caution panels are often used to warn and/or caution personnel of a problem with the item. Typically, personnel who are working on and/or using the item will reference some manual, often in paper form, that will provide instructions on how to handle the warning and/or caution. However, time may be essence when addressing such warnings and/or cautions. For instance, returning to the example of an aircraft, a caution panel is often provided in the cockpit of the aircraft to provide the pilot with warnings and/or cautions. When the panel provides a warning and/or caution, oftentimes the pilot may have a limited amount of time to address the problem before it becomes too late to fix while in flight. This can lead to lose of the aircraft and/or life. Furthermore, many problems can lead to multiple warnings and/or cautions being displayed. Therefore, the pilot may not only have to deal with resolving a warning and/or caution but a combination of warnings and/or cautions.

Accordingly, various embodiments provide a virtual caution panel that can be used by a user to assist the user in addressing warnings and/or cautions provided by such a caution panel found on an item. These embodiments can enable a user in addressing a warning and/or caution (or combination thereof) in a timely manner that is not typically possible using a conventional manual, even when the manual may be in a digital format. In particular embodiments, the virtual caution panel mimics the actual caution panel found on the item with the same warnings and/or cautions.

For example, the caution panel may include a plurality of indicators (e.g., warning lights) for the different warnings and/or cautions that light up. These indicators may provide different levels of warnings and/or cautions, such as different color lights, to represent degrees of urgency. Yellow may represent a caution with respect to the corresponding component, condition, process, and/or the like for an indicator and red may represent a warning that requires more urgency in addressing. Therefore, the user mimics the warnings and/or cautions shown on the actual panel by selecting the same warnings and/or cautions displayed on the virtual panel.

The process flow 6200 begins with the virtual caution panel module providing the virtual caution panel for display on a window in Operation 6210. The virtual caution panel module then determines whether input has been received indicating the user has selected any of the warnings and/or cautions displayed on the virtual panel in Operation 6215. Accordingly, in particular embodiments, the virtual caution panel may be configured to allow the user to select different levels (e.g., set different colors) for the individual indicators displayed on the panel as well as select combinations of warnings and/or cautions.

If the user has selected one or more warnings and/or cautions on the virtual caution panel, then the virtual caution panel module retrieves a corrective action (e.g., steps to perform to address the one or more cautions and/or warnings) in Operation 6220. Therefore, in various embodiments, the corrective actions to address the different warnings and/or cautions may be stored within the IETM and retrieved by the virtual caution panel module based at least in part on the warnings and/or cautions (and/or combination thereof) identified by the user on the panel. Such retrieval may be much quicker than if the user were to search for the corrective action him or herself in a physical and/or digital manual. Therefore, embodiments of the virtual caution panel can be very beneficial in addressing warnings and/or cautions in a timely manner when required.

Once the virtual caution panel module has retrieved the corrective action, the module provides the corrective action for display to the user in Operation 6225. Here, depending on the embodiment, the corrective action may be displayed on the same window as the virtual caution panel or displayed on a different window. The virtual caution panel module then determines whether input has been received indicating the user wishes to exit the virtual caution panel in Operation 6230. If so, then the virtual caution panel module causes the virtual caution panel to close and exits. Otherwise, the virtual caution panel module continues to provide the virtual caution panel and corrective action if appropriate.

FIG. 63A provides an example of a virtual caution panel 6300 according to various embodiments. In this example, an indicator 6310 has been selected on the virtual caution panel 6300 by the user to mimic a caution being displayed by the actual caution panel found on the item. A corrective action 6315 to address the caution may then be provided as shown in FIG. 63B.

Article Loading Module

Oftentimes entities have various items (e.g., objects for items) such as vehicles that periodically need to be loaded with different articles. For instance, many entities have both combat and non-combat vehicles that need to be routinely loaded with different equipment. Such vehicles may be used for air, land, and/or water and may include, for example, aircraft, boats, ships, armored fighting vehicles, reconnaissance vehicles, light utility vehicles, engineering vehicles, self-propelled weapons and defense systems, ambulances, and/or the like. Accordingly, when such vehicles are deployed for a mission, the vehicles are required to be carrying certain equipment expected to be used for the mission.

For example, aircraft such as fighters and bombers and armored fighting vehicles such as tanks and troop carriers are often required to be carrying certain munitions expected to be used for combat. The loading of these munitions is typically performed by military personnel who receive a list of munitions and then are required to physically load the munitions onto and/or into the vehicle. Many vehicles have multiple positions on the vehicle for holding such munitions. For instance, many aircraft have several positions (e.g., stations) on the body of the aircraft for holding munitions, whether they be types of weapons and/or ammunitions such as missiles, bombs, and/or the like. These positions are often configured so that only certain munitions can be placed at certain positions.

In addition, munitions may be required to be loaded/installed on the vehicle using a number of operations (e.g., steps) and in a certain sequence. Therefore, personnel who are responsible for loading the munitions are regularly required to initially put together a workflow that includes a number of different procedures in a sequential order that are to be performed to load the munitions onto the vehicle. The generation of this workflow can oftentimes be very time consuming in identifying which munitions are to be loaded at which positions, identifying the corresponding procedures for loading the munitions, and then generating the workflow of the procedures in the correct ordered needed to load the munitions.

Therefore, various embodiments provide functionality (e.g., article loading wizard) that assists personnel in loading different articles onto and/or into an object of an item. The example of loading munitions onto an aircraft is used in discussing this functionality. However, those of ordinary skill in the art can appreciated the functionality can be used in loading different articles for a number of different types of items. For example, other articles may be loaded other than equipment such as cargo, personnel, perishable goods, livestock, medications, and/or the like. In addition, other items besides vehicles may be loaded such as warehouses trailers, medical facilities, and/or the like.

Turning now to FIG. 64, additional details are provided regarding a process flow for generating a workflow for loading articles onto and/or into an object for an item according to various embodiments. FIG. 64 is a flow diagram showing an article loading module for performing such functionality according to various embodiments of the disclosure. Accordingly, a user may be signed into the IETM for a particular object for an item. For example, the user may be signed into the IETM for a particular aircraft (e.g., fighter T123) found in a military's fleet of aircraft (fleet of jet fighters). In addition, the user may be tasked with loading munitions onto the aircraft and therefore has also signed into the IETM identifying a specific job to be performed. Once signed in, the user may select a mechanism to invoke the article loading module.

Therefore, the process flow 6400 begins with the article loading module reading the item the user is currently signed into the IETM to view in Operation 6410. In this instance, the item is a type of jet fighter found in the military's fleet of aircraft. Thus, the article loading module provides media content (e.g., a digital model) of the item for display on a window in Operation 6415. In particular embodiments, the media content (e.g., the digital model) displays the different loading positions (e.g., stations) found on the item as selectable (e.g., associated with some type of selection mechanism). Therefore, the user selects a particular loading position by using some type of control such as a mouse to click on, right click on, or hover over the position or use a stylus or finger to select a position for the item.

In turn, the article loading module determines whether the user has selected a position in Operation 6420. If so, then the article loading module retrieves the articles that can be loaded at the position and provides the articles for display on the window in Operations 6425 and 6430. For example, the articles may be displayed as a list in a dropdown menu control that is configured to allow the user to select one or more of the articles for loading at the particular position. Note that in particular embodiments, only those articles that can be loaded at the particular position are retrieved and displayed to the user. Such a configuration can ensure that an article is not loaded by personnel at an inappropriate position.

Therefore, the article loading module determines whether input has been received indicating the user has selected one or more articles for the position in Operation 6435. If the user has selected one or more articles, then in particular embodiments, the article loading module provides media content (e.g., illustration(s) and/or image(s)) of the selected articles for display for the user to view in Operation 6440. Such an operation may be carried out in these embodiments so that the user can see what he or she has selected to load at the position. This may help the user with physically selecting and loading the correct articles in the field. Accordingly, the media content may be displayed on a separate window that is superimposed over a portion of the window displaying the media content (e.g., the digital model) of the item or the media content may be displayed on one or more view panes along with the media content of the item on a separate view pane. In addition, the article loading module records the article(s) that are to be loaded at the position in Operation 6445.

Returning to Operation 6420, if the user has not selected a particular position for the item, then the article loading module determines whether input has been received indicating the user's desire to generate a workflow for loading the object for the item in Operation 6450. The user may select some type of mechanism (e.g., a button) displayed on the window after the user has identified the article(s) to be loaded at each of the positions for the item. If the user has indicated to generate the workflow, then the article loading module generates the workflow for loading the selected article(s) onto and/or into the object for the item in Operation 6455.

As previously noted, the workflow may include one or more procedures to be performed by personnel in loading the article(s) onto and/or into the object for the item. Here, the workflow may identify the sequential order in which the procedures are to be performed. For instance, returning to the example, the loading of munitions onto the aircraft may be required to be carried out in a particular order to ensure the safety of the military personnel who are physically loading the munitions onto the aircraft. For example, certain ammunition may need to be loaded and tested before loading another ammunition to ensure the ammunition is properly loaded and stabilized so that it will not trigger other ammunition loaded onto the aircraft from going off Therefore, in particular embodiments, the article loading module is configured to dynamically generate the workflow based on the articles selected by the user to be loaded at each position. In some instances, a significant number of combinations of articles can be potentially loaded at the different positions. Thus, an advantage provided by the article loading module in some embodiments is the ability of the module to dynamically generate a workflow based on a significant number of potential combinations that places the loading of the articles in a correct sequence to ensure they are loaded safely.

Once the article loading module has generated the workflow, the module provides the workflow for display in Operation 6460. For instance, in particular embodiments, the article loading module may provide a digital workflow to be displayed in the form of a table of contents that lists the different procedures that make up the workflow in the order in which they are to be performed. Here, each of the different procedures may be selectable. Therefore, the user may then select the procedures, one-by-one, in the order in which they are found in the table of contents to view the operations that need to be performed for the procedures in loading the articles onto and/or into the object for the item. As discussed in further detail herein, various functionality may be implemented in embodiments to ensure the procedures are performed in the correct sequence as displayed in the digital workflow.

As this point, the article loading module may determine whether input has been received indicating the user would like to exit in Operation 6465. For example, the user may be generating a workflow for loading the object of the item at a later time and therefore, the user may not be ready to start the actual loading of the object. Here, the article loading module may be configured to save the workflow so that is may be used at the later time.

FIG. 65A provides an example of a window displaying a digital model of an aircraft 6500 to be loaded with articles according to various embodiments. In this example, the digital model of the aircraft 6500 displays the various positions (e.g., stations) at which articles can be loaded. Accordingly, the various stations are selectable (e.g., displayed as hyperlinks) so that the user may select each station, such as station 1 6510, to be provided a list (e.g., a dropdown menu control) of the different articles that may be loaded at the station. Once the user has selected the various articles to be loaded at the different stations, a digital workflow in the form of a table of contents 6515 may be generated with the different procedures to be performed in loading the aircraft in the order in which they are to be performed as shown in FIG. 65B. A discussion is now provided with respect to using the digital workflow at a time when the article(s) are actually being loaded onto and/or into the object for the item.

Loading Workflow Module

Turning now to FIG. 66, additional details are provided regarding a process flow for managing a workflow for loading articles onto and/or into an object for an item according to various embodiments. FIG. 66 is a flow diagram showing a loading workflow module for performing such functionality according to various embodiments of the disclosure. Here, a digital workflow may be displayed on a window in the form of a table of contents listing the procedures to be performed in loading the articles onto and/or into the object for the item. As noted, the procedures are provided in the table of contents in particular embodiments in the order in which they are to be performed in loading the object. Accordingly, each of the procedures found in the table of contents may be selectable so that the user selects the procedures one at a time in the sequence provided to view the operations to perform for the selected procedure to load the articles onto and/or into the object for the item.

Therefore, the process flow 6600 begins with the loading workflow module determining whether input has been received indicating the user has selected a procedure in the table of contents in Operation 6610. If so, then the loading workflow module determines whether the selected procedure is the next procedure to be performed for the workflow in Operation 6615. Therefore, in particular embodiments, that loading workflow module is configured to determine whether the procedure(s) found in the workflow listed before the selected procedure have been performed. As further discussed below, the loading workflow module marks the procedures that have been completed in some embodiments. Therefore, the loading workflow module is able to determine whether each of the procedures found in the workflow before the currently selected procedure has been completed.

If each of the procedures in the workflow before the currently selected procedure has not been completed, then the loading workflow module provide an error to the user in Operation 6620. For example, the loading workflow module may provide an error message for displaying on a window informing the user that the selected procedure is not the next procedure to be performed in the workflow. In addition, the loading workflow module may be configured in some embodiments so that the operations for the selected procedure cannot be displayed.

However, if the selected procedure is the next procedure in the sequence, then the loading workflow module provides the procedure for display to the user in Operation 6625. For instance, in particular embodiments, the loading workflow module may retrieve the data for the procedure from the technical documentation for the item and provide the data for the procedure to display on a new window for the user. Depending on the embodiment, the procedure may be displayed on a pane provided on the window with the workflow (with the workflow displayed on a second pane) or the procedure may be provided on a separate window from the window with the workflow. As a result, the user is then able to read the instructions (e.g., different operations) found in the procedure and perform the instructions accordingly.

For instance, in the example involving the loading of munitions onto the jet fighter, the different procedures found in the workflow may involve procedures that provide instructions for loading a particular munition at a particular station of the aircraft, as well as procedures for testing a munition once it has been loaded at a particular station. Therefore, the instructions for the different procedures may provide a sequence of operations (e.g., steps) to be performed by the military personnel who are loading munitions onto the jet fighter.

Accordingly, the loading workflow module may determine whether input has been received that the end of the procedure currently being displayed has been reached in Operation 6630, indicating the user has completed performing the procedure. Here, the loading workflow module may be configured to determine the end of the procedure has been reached by receiving input indicating the user has performed some action such as, for example, selecting a mechanism such as a button displayed on the window and/or scrolling to the bottom on the procedure displayed on the window.

If the end of the procedure has been reached, then the loading workflow module in various embodiments determines whether each of the operations found in the procedure has been acknowledged in Operation 6635. For instance, in some embodiments, each operation (e.g., step) found in the procedure may be associated with a selection mechanism such as a checkbox control that the user selects to acknowledge that he or she has completed the particular operation in the procedure. Therefore, the loading workflow module may determine whether input has been received that the selection mechanism for each operation has been selected by the user. In addition, in some embodiments, the loading workflow module may be configured to also determine whether the user has acknowledged each of the previous operations in the procedure whenever the user acknowledges a particular operation in the procedure to ensure the operations are performed in order.

If the user has not acknowledged all of the operations in the procedure, then the loading workflow module causes display an error to the user in Operation 6640. Again, the loading workflow module may provide an error message to display informing the user that all of the operations in the procedure have not been acknowledged as being performed. However, if all of the operations have been acknowledged, then the loading workflow module marks the procedure as completed in Operation 6645. At this point, the loading workflow module returns to the window displaying the table of contents for the workflow if need be in Operation 6650. Accordingly, as a result of the user completing the procedure, the loading workflow module may cause the procedure to be displayed as being completed in the digital workflow (e.g., the table of contents). For example, in particular embodiments, the procedure may now be displayed along with some type of indicator (e.g., in a particular font, in a particular color, with a symbol such as a plus sign, as no longer selectable, and/or the like) to demonstrate the procedure has been completed. The user may then select the next procedure found in the workflow.

Once the user has performed all of the procedures for the workflow, then the user may decide to exit the window displaying the table on contents and select a mechanism (e.g., a button) displayed on the window to do so. As a result, the loading workflow module may determine input has been received indicating the user would like to exit in Operation 6655. The loading workflow module then determines whether the workflow for loading the articles onto and/or into the object for the item has been completed in Operation 6660. That is to say, the loading workflow module determines whether each of the procedures found in the workflow has been completed.

Accordingly, if the workflow has not been completed, then the loading workflow module in particular embodiments provides an error (e.g., an error message for displaying on a window) to the user indicating the workflow has not been completed in Operation 6665. The loading workflow module may then determine whether input has been received indicating the user still wishes to exit the window displaying the digital workflow in Operation 6670. For example, the personnel who are loading the munitions onto the jet fighter may be taking a lunch break. Therefore, the user may wish to exit the window for security reasons while away from the loading area and eating lunch. He or she then plans to resume with the workflow once he or she has returned from lunch.

If this is the case, then the loading workflow module in particular embodiments records one or more images of the object in Operation 6675 to document the progress of loading the articles that has been completed to that point. For example, imaging devices may be installed at different locations in the loading area to allow images to be taken of the different loading stations. In addition, the loading workflow module records the progress of the workflow in a log in Operation 6680. Therefore, in the example, the user can retrieve the incomplete workflow upon returning from lunch and continue with the remainder of the workflow for loading the munitions onto the jet fighters. Once the user has completed the workflow, the loading workflow module again records image(s) of the object to document the loading of the articles and records the completion of the workflow in the log.

Recordation of the images and progress of the workflows in various embodiments can allow for tracking of the workflows being performed, as well as allow for quality control measures to be put into place to evaluate different personnel on performing loading tasks. For example, recordation of the images of the jet fighter loaded with the required munitions may allow for the pilot to view the images prior to takeoff to ensure the munitions have been properly loaded onto the aircraft. This can help to not only ensure success of the mission but can also ensure the safety of the pilot and any other flight crew member on the aircraft.

Remote Device Integration Module

As previously discussed, users are oftentimes working in environments where network connectivity (e.g., wireless network) for their computing entity 110 is unavailable. For instance, maintenance personnel may be working out in the field performing maintenance on an object (e.g., an aircraft) where network connectivity is unavailable. In these instances, the maintenance personnel may be making use of the IETM to view one or more maintenance procedures they are to perform on the object. However, one of the maintenance personnel may want to perform some type of functionality provided by embodiments of the IETM that may require connectivity. For example, the maintenance personnel may want to order a part to replace a part taken from inventory used in performing the maintenance on the object. As previously noted, various embodiments can facilitate the personnel's ordering of the part by generating a graphical code that can then be scanned by the personnel using a remote device such as his or her mobile device with some type of connectively such as cellular.

However, security is also often a concern with allowing such functionality since the functionality is being carried out over a network that is not within the IETM environment. Therefore, various embodiments allow for such functionality to be carried out over a network connected to a remote device while still maintaining a secure environment. Here, a remote device is a device that is not in communication with the user's computing entity 110 being used to access the IETM. For example, the remote device may be the user's mobile device (e.g., smartphone), tablet, and/or the like with connectivity to a network such as a cellular network, wireless network, and/or the like. Specifically, in particular embodiments, the user (e.g., maintenance personnel) who is signed into the IETM may have a software application (e.g., an app) installed on his or her remote device that is required to be used to enable the functionality to be performed in the IETM. This software application may be limited in its distribution so that it is only installed on devices belonging to valid users.

Turning now to FIG. 67, additional details are provided regarding a process flow for securely integrating the use of a network connected to a remote device with the IETM according to various embodiments. FIG. 67 is a flow diagram showing a remote device integration module for performing such functionality according to various embodiments of the disclosure. Here, the user may be signed into the IETM and decides to perform some functionality within the IETM that requires connectivity such as, for example, submitting a form filed out while signed into in the IETM to a backend system. Accordingly, a selection mechanism (e.g., a button) may be provided on the form that the user selects to submit the form and as a result, the remote device integration module is invoked in various embodiments.

Therefore, the process flow 6700 begins with the remote device integration module generating and providing a security graphical code for displaying in Operations 6710 and 6715. For instance, depending on the embodiment, the security graphical code may be a barcode, a quick response code, a one-dimensional code, a universal product code, a data matric code, and/or the like. In addition, in particular embodiments, the remote device integration module may generate the security graphical code to contain the user's credentials used in signing into the IETM. Accordingly, the security graphical code may be displayed on a window so that the user can scan the code using some type of code reader installed on the user's mobile device.

For example, the code reader may be any one of many commercially available graphical code readers and the reader may not necessarily include any type of security features. While in other instances, the software application may be configured so that the application can be used initially to scan the security graphical code. However, other functionality may not be available within the application. Such a configuration can provide security features within the software application with respect to allowing the user to perform certain functionality using the software application while not allowing the user to perform other functionality. In addition, the software application may be configured to require the user to provide credentials (e.g., a username and/or password) to open the application. Therefore, in particular embodiments, various functionality provided by the software application residing on the user's remote device may become available as a result of the user scanning the security graphical code displayed in the window.

The remote device integration module then determines whether input has been received indicating to generate a graphical code for the form the user wishes to submit in Operation 6720. For instance, the remote device integration module may determine that the security graphical code has been scanned by the user as a result of the user acknowledging he or she has scanned the code. For example, the window displaying the security graphical code may provide a selection mechanism such as a button that the user can select to close the window with the code. Accordingly, the remote device integration module may receive input indicating the window with the security graphical code has been closed and as a result, generate and provide the graphical code for the form for display in Operations 6725 and 6730.

Again, the remote device integration module may provide the graphical code for the form to display on a window so that the user can now use his or her mobile device to scan the code. Again, depending on the embodiment, the graphical code may be a quick response code, a one-dimensional graphical code, a universal product code, a data matric graphical code, and/or the like. The graphical code may include information provided by the user on the form such as the information required to order the part. In addition, the graphical code may include information such as the user's credentials, an identifier for the object and/or item, an identifier for a location for the user, and/or the like. Further, the graphical code may be configured so that it can only be read by the software application residing on the user's remote device.

At this point, the remote device integration module determines whether to exit in Operation 6735. For example, the user may have scanned the graphical code for the form and then selected a mechanism such as a button provided on the window displaying the code to close the window. As a result, the remote device integration module may receive input indicating the window has been closed. If that is the case, then the remote device integration module exits.

It is noted that in some embodiments the remote device integration module may be invoked at different times other than when specific functionality is to be carried out that requires connectivity. For instance, in particular embodiments, the user may invoke the remote device integration module upon signing into the IETM to establish that the software application residing on the user's remote device can then be used in facilitating any functionality requiring connectivity while the user is signed into the IETM. Therefore, in these particular embodiments, the user may not be required to scan a security graphical code each time he or she wishes to use functionality provided by the IETM that requires connectivity. Thus, the process flow 6700 shown in FIG. 67 may only involve providing the security graphical code without necessarily providing a graphical code to facilitate other functionality.

Virtual Network Module

Virtual private networks (VPNs) are often used to allow users to send and share data over networks that are not necessarily secure (e.g., public networks) as though they are connected to a secure private network. Accordingly, applications running over a VPN can often benefit from the functionality, security, and management provided in a private network. Therefore, various embodiments provide a virtual network in which users can operate within while signed into the IETM.

Turning now to FIG. 68, additional details are provided regarding a process flow for providing a virtual network within the IETM environment according to various embodiments. FIG. 68 is a flow diagram showing a virtual network module for performing such functionality according to various embodiments of the disclosure. Depending on the circumstances, a user may have already signed into the IETM and decides to join a virtual network provided through the IETM or the user may join a virtual network at the time when he or she signs into the IETM.

In particular embodiments, the user may have a software application installed on remote device such as his or her mobile device that provides a graphical code for the user to scan using his or her computing entity 110 (e.g., webcam on his or her computing entity 110) being employed to view the IETM. Here, the graphical code may be provided in various forms such as a barcode, a quick response (QR) code, a one-dimensional code, a universal product code, a data matric code, and/or the like. While in other embodiments, a graphical code may be provided on an object that is scanned by the user using his or her computing entity 110. For example, the user may be maintenance personal who is working on a particular aircraft found in an airline's fleet and the graphical code may be physically displayed on a component of the aircraft such as its landing gear.

Therefore, the user invokes the virtual network module to scan the graphical code and the process flow 6800 begins with the virtual network module scanning the graphical code in Operation 6810. The virtual network module then determines whether the graphical code that has been scanned is valid in Operation 6815. Accordingly, the virtual network module is configured in various embodiments to interrogate the information found in the code to determine whether the code is associated with a valid user and/or object.

For example, the graphical code that was scanned may have been provided by a software application installed on the user's mobile device. Here, the user may have signed into the application and generated the code using functionality provided by the application. Therefore, the information provided in the code may identify the user (e.g., provide credentials for the user) and the virtual network module may determine whether the credentials provided for the user in the graphical code are valid. While in another example, the graphical code that was scanned may have been provided on an object (e.g., aircraft) and the information provided in the code may identify the object. Therefore, the virtual network module may determine whether the object identified in the code is valid (e.g., is scheduled to have maintenance performed on the object).

If the virtual network module determines the graphical code is invalid, then the virtual network module causes display an error message to the user in Operation 6820. For instance, in particular embodiments, the virtual network module may provide an error message via a window informing the user that the graphical code is invalid. The virtual network module then determines whether input has been received indicating the user would like to exit or scan another graphical code in Operation 6825. For example, the window displaying the error message may provide a first selection mechanism (e.g., a first button) to exit and a second selection mechanism (e.g., a second button) to scan another code. If the user indicates he or she would like to scan another code, then the virtual network module returns to Operation 6810.

However, if the graphical code is valid, then the virtual network module in particular embodiments may provide one or more objects identifying the various virtual networks available to the user in Operation 6830. This particular operation may be carried out when the graphical code scanned by the user provides the user's credentials. Here, for example, the virtual network module may identify the objects the user is currently authorized to work on. For instance, the user may be maintenance personnel who is scheduled to perform maintenance on two particular aircraft found in an airline's fleet. Therefore, in this instance, the virtual network module may identify the two aircraft as available to the user.

Accordingly, in various embodiments, a virtual network is configured for each of the objects so that the user's selection of a particular object identifies which virtual network supported by the IETM the user is to join while signed into the IETM. In addition, the selection of an object may also identify an instance for the IETM. That is to say, the selection of the object (and corresponding virtual network) may identify what technical documentation to make available to the user while he or she is signed into the IETM, as well as identify any information found within the IETM for the particular object such as the maintenance jobs to be performed on the object.

Therefore, the virtual network module determines whether input has been received indicating the user has selected a particular object in Operation 6835. If so, then the virtual network module joins the virtual network for the object in Operation 6840. Accordingly, if the graphical code scanned by the user includes information that identifies the object, then the virtual network module may automatically join the corresponding virtual network without the user having to select the object. This may also be true if only a single object is associated with the user.

The user may then be provided with specific functionality as a result of joining the virtual network. In addition, the user may interact directly with other users who are signed into the IETM and are on the same virtual network. In some instances, specific functionality may be associated with the corresponding object.

For example, many entities establish a lockout program for maintenance. A lockout program often involves "locking out" certain operations, processes, functions, and/or the like for an object that may be unsafe to perform while certain maintenance is being carried out on the object. For instance, the power supply for a particular component may be shut off while maintenance is being performed on the component. Here, some type of warning (e.g., a lockout tag) may be placed on the component and/or the power supply indicating that it is unsafe to turn back on the power so that personnel who are not performing the maintenance on the component do not inadvertently restore power to the component while the maintenance is being performed.

Therefore, in various embodiments, the virtual network module may invoke lockout functionality for the object in Operation 6845 that broadcasts warnings to all the users who are on the virtual network for the object. In some instances, such functionality may require the users on the virtual network for the object to acknowledge the warnings, as well as track which users have or have not acknowledged the warnings. Those of ordinary skill in the art can envision other object-specific functionality may be invoked in light of disclosure.

In addition, some of the specific functionality may be associated with the user. For example, the user may be signed into the IETM and using the technical documentation to perform a specific role with respect to the object. For instance, the user may be maintenance personnel, engineering personnel, operations personnel, and/or the like. In many instances, the user may have one or more tasks (e.g., jobs) that the user is expected to perform with respect to the object while signed into the IETM. Therefore, the virtual network module in particular embodiments may identify and/or assign and/or allocate one or more tasks (e.g., jobs) to the user to perform with respect to the object in Operation 6850. Those of ordinary skill in the art can envision other user-specific functionality may be invoked in light of disclosure.

It is noted that the virtual network may be provided over a variety of different types of networks such as IP-based and/or cellular depending on the embodiment. In addition, in particular embodiments, the virtual network may be facilitated through the software application installed on the user's remote device. In these particular embodiments, the user may sign into the software application and/or the user may scan a graphical code displayed via the IETM or found on an object using the software application to display one or more available virtual networks for objects or to automatically connect to a virtual network for an object through the software application. Accordingly, the software application can identify the user and provide what virtual networks are available to the user. In turn, the user can select one of the available virtual networks and connect to the network on his or her mobile device. As a result, the same functionality (e.g., object-specific functionality and/or user-specific functionality) described above may be provided through the software application installed on the user's remote device. That is to say, the software application may be configured to perform similar operations to those performed by the virtual network module described above in various embodiments.

Import Module

The technical documentation associated with an item (e.g., the dataset that includes the textual information, corresponding media content, and other data that make up the technical documentation for the item) is typically stored and/or provided in accordance with S1000D standards. For example, data modules are normally provided that include header and/or preface data in accordance with S1000D standards. S1000D standards require a document to be broken down into individual data modules that are typically identified via XVI, and/or % MI, tags, labels, and/or metadata and that are organized into a hierarchical XML and/or SGML structure. In various embodiments, the XML and/or SGML, files and/or data stored therein may be converted to JSON formatted data and/or files. Accordingly, in these embodiments, the content found in the JSON formatted data and/or files provides the technical documentation for the item.

However, instances may occur in which an entity may have documentation in formats that are not in accordance with S1000D standards. For example, many entities have technical manuals, instructions, orders, and/or the like for various items in PDF files and/or SGML files that do not adhere to S1000D standards. Therefore, these entities are oftentimes required to use systems, software, applications, and/or the like other than an IETM to view such documentation since most conventional IETMs require the technical documentation to adhere to S1000D standards. This can lead to the entities having to maintain multiple components (e.g., systems, software, applications, and/or the like) to view all of the technical documentation associated with a particular item. In addition, users who are viewing/using the documentation are then required to have the multiple components available to them at any given time so that they have access to any of the documentation as needed.

Therefore, various embodiments are configured to allow the import of source data that does not adhere to S1000D standards into the IETM. Accordingly, such embodiments allow users to view technical documentation in the IETM from data sources other than those that adhere to S1000D standards. As a result, users can view and use the complete technical documentation for an item in many instances using a single instrument (the IETM). In addition, these embodiments eliminate the need to convert source data in many instances in accordance with S1000D standards to import into the IETM.

Turning now to FIG. 69, additional details are provided regarding a process flow for importing data for the technical documentation for an item into the IETM according to various embodiments. FIG. 69 is a flow diagram showing an import module for performing such functionality according to various embodiments of the disclosure. Depending on the circumstances, the data (e.g., dataset) may be provided in different formats and adhere to different standards. For instance, the data may be provided in XML and/or SGML files in accordance with S1000D standards. However, the data may also be provided in XML, SGML, PDF files and/or the like that are not in accordance with S1000D standards. In some instances, the data may include a combination of both types of files.

Therefore, the process flow 6900 begins with the import module receiving the data to import in Operation 6910. Here, the data may be received in any number of different formats. For example, the data may be a dataset for a publication of the technical documentation for an item according to S1000D standards. While in another instance, the data may be one or more files having content (e.g., manual) that make up the technical documentation for the item in a file format such as PDF and/or SGML.

The import module then determines whether the data is provided in accordance with S1000D standards in Operation 6915. For instance, in particular embodiments, the import module may make such a determination based on whether the data is provided as XML and/or SGML files that conform to data modules found in a dataset adhering to S1000D standards. If that is the case, then the import module selects one of the data modules in Operation 6920 and converts the data module to JSON format in Operation 6925. The import module may then store the converted data module for use with the IETM. At this point, the import module determines whether the data includes another data module in Operation 6930. If so, then the import module returns to operation 6920, select the next data module found in the data, and preforms the operations just described for the newly selected data module.

However, if the data is not provided in accordance with S1000D standards, then the import module selects a file found in the data in Operation 6935. As previously mentioned, the file may be provided in any number of different formats such as PDF, SGML, DOC, RTF, TXT, WPS, and/or the like. Therefore, the import module converts the file to JSON format and stores the converted file in Operation 6940. In some embodiments, the import module ma be configured to convert the file to JSON format in multiple steps. For example, in particular embodiments, if the original file is in TXT format, then the import module may first convert the file to SGML format and then convert the file to JSON format. At this point, the import module determines whether the data includes another file in Operation 6945. If so, then then the import module returns to operation 6935, select the next file found in the data, and preforms the operations just described for the newly selected file. Once the import module has processed all the files found in the data, the import module exists.

It should be noted that the data received to be imported into the IETM in some instances may include both content in accordance with S1000D standards (e.g., include data modules) and content not in accordance with S1000D standards (e.g., include files in PDF format). Therefore, in these particular instances, the process flow 6900 may involve looking at individual components of the data to determine how to process each of the individual components.

Accordingly, as a result of importing data from different sources both adhering and not adhering to S1000D standards and converting such data to a common format (e.g., JSON), the data from the different sources (e.g., technical documentation for the different sources) can be used interchangeably and/or simultaneously in the IETM in various embodiments. In addition, various embodiments are able to provide the same functionality, security, features, and performance for all of the technical documentation for an item in the IETM regard of the source of the technical documentation. Therefore, as a result, functionality that would not normally be available for some technical documentation can now be provided for the documentation in the IETM.

For instance, a technical manual may be sourced in one or more PDF files. Therefore, a user would typically make use of a PDF reader (e.g., application) to view the technical manual. A conventional PDF reader does not furnish the functionality implemented in various embodiments described herein. For example, a conventional PDF reader does not furnish the preview capabilities described herein provided by various embodiments. However, as a result of importing the PDF files for the technical manual as described herein, the preview capabilities may be implemented for the technical manual in various embodiments. That is to say, links may be provided in the content of the technical documentation originating from the PDF files that can be configured to generate and display previews. Such links cannot normally be placed in PDF files and provided in a PDF reader.

In addition, a PDF reader does not have the capability to allow a user to search a set of PDF files. Therefore, if the technical documentation involves multiple files, then the user who is using a PDF reader is required to open the files one at a time to search for a particular term and/or topic. However, various embodiments would allow the user to search the entire library (e.g., multiple PDF files) for the technical documentation in the IETM with a single search.

Further, the data structure and/or formatting (e.g., number of chapters, paragraphs, figures, tables, and/or the like) may be maintained by importing the data source that is not required to adhere to S1000D standards. This may be helpful to a user who needs to navigate the technical documentation since the structure and formatting mimic the structure and formatting found in the original data source. Finally, personnel who maintain the data source (e.g., maintain the technical manual provided in the PDF file(s)) are not required to convert the data source to another file format (e.g., XML and/or SGML) and/or to S1000D standards, or learn how to do so for that matter, for embodiments that allow source data that does not adhere to S1000D standards to be imported and used in the IETM.

Therefore, in various embodiments, when a data request is received within the IETM For example, a user may select a component, topic, request a preview, and/or the like while signed into the IETM. The data request may identify particular content that was imported as a data module and/or data file that can be provided in JSON format. Accordingly, in some embodiments, providing the content in JSON format may allow the content to be transmitted and/or processed more quickly than if the content were provided in another file format such as XML, SGML, and/or PDF format.

Conclusion

Many modifications and other embodiments of the disclosure set forth herein will come to mind to one skilled in the art to which these modifications and other embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

In addition, the functionality described herein involving parts may be applicable to other components in various embodiments. For instance, the functionality involving 3D graphics is described herein with respect to viewing different parts used for a component of an item in a. 3D graphic. Those of ordinary skill in the art will recognize that such functionality may be applicable in various embodiments with respect to viewing other components in addition to parts. As previously noted, components may identify functional and/or physical structures of an item and may be broken down into assembly, sub-assembly, sub-sub-assembly, system, sub-system, sub-sub-system, subject, unit, part, and/or the like. Therefore, a 3D graphic may not only be provided at the part level, but may be provided at other levels found within the structure of the item and therefore, the functionality described herein with respect to 3D graphics may be applicable to these other levels and corresponding components. The same can be said with respect to other functionality described herein involving parts such as generating a preview for a part. Therefore, it should be understood the functionality described herein involving parts is not to be limited to use with just parts and may be used with respect to other components of an item in various embodiments.

The invention claimed is:

1. A method for accessing a virtual private network associated with an aircraft and for accessing an interactive electronic technical manual system (IETM) configured to provide electronic and credentialed access via an IETM viewer to technical documentation for an item, the method comprising:

providing a first initial window for display, the first initial window comprising an electronic form via the IETM viewer executing on a first user computing entity being used by a first user signed into the IETM, wherein (a) the first user computing entity is not connected to a network, (b) the first user provides (i) input of a selection of a dataset corresponding to the technical documentation for one of the one or more items, (ii) input of a selection of a unit displayed for the selectable unit field, and (iii) input of a selection of an object displayed for the selectable object field, (c) a sign-in mechanism authenticates and signs the first user into the IETM based at least in part on a first user credential, the dataset, the selection of the unit displayed, and the selection of the object displayed, and (d) the window displays the content found in the technical documentation;

providing a second initial window for display, the second initial window comprising an electronic form via the IETM viewer executing on a second user computing entity being used by a second user signed into the IETM, wherein (a) the second user computing entity is not connected to the network, (b) the second user provides (i) input of a selection of a dataset corresponding to the technical documentation for one of the one or more items, (ii) input of a selection of a unit displayed for the selectable unit field, and (iii) input of a selection of an object displayed for the selectable object field, (c) a sign-in mechanism authenticates and signs the second user into the IETM based at least in part on a second user credential, the dataset, the selection of the unit displayed, and the selection of the object displayed, and (d) the window displays the content found in the technical documentation;

receiving input associated with the first user scanning a graphical code affixed to an aircraft;

responsive to receiving the input associated with the first user scanning the graphical code affixed to the aircraft, connecting the first user computing entity to the network, determining that the first user is allowed to access the virtual private network associated with the aircraft and providing the first user computing entity with access to the virtual private network associated with the aircraft;

receiving input associated with the second user scanning a graphical code affixed to the aircraft;

responsive to receiving the input associated with the second user scanning the graphical code affixed to the aircraft, connecting the second user computing entity to the network, determining that the second user is allowed to access the virtual private network associated with the aircraft and providing the second user computing entity with access to the virtual private network associated with the aircraft;

enabling the first user computing entity and the second user computing entity to communicate with one another via the virtual private network associated with the aircraft;

determining that the first user is assigned to perform a particular task for the aircraft; and responsive to determining that the first user is assigned to perform a particular task for the aircraft, broadcasting a warning notification to the second computing entity and another computing entity accessing the virtual private network associated with the aircraft.

2. The method of claim 1, wherein each of the graphical code comprises at least one of a quick response code, a one-dimensional graphical code, a universal product code, and a data matric graphical code.

3. The method of claim 1, wherein the network comprises at least one of an internet protocol based network and a cellular network.

4. The method of claim 1 further comprising:

querying a stock identifier based at least in part on a part identifier for a part;

retrieving the electronic form based at least in part on the item; and auto-populating the electronic form with the data for the part, wherein the informational data comprises the data for the part and the informational data is used in ordering the part.

5. An apparatus for accessing a virtual private network associated with an aircraft and for accessing an interactive electronic technical manual system (IETM) configured to provide electronic and credentialed access via an IETM viewer to technical documentation for an item, the apparatus comprising at least one processor and at least one memory including a computer program code, the at least one memory and the computer program code configured to, with the at least one processor, cause the apparatus to:
provide a first initial window for display, the first initial window comprising an electronic form via the IETM viewer executing on a first user computing entity being used by a first user signed into the IETM, wherein (a) the first user computing entity is not connected to a network, (b) the first user provides (i) input of a selection of a dataset corresponding to the technical documentation for one of the one or more items, (ii) input of a selection of a unit displayed for the selectable unit field, and (iii) input of a selection of an object displayed for the selectable object field, (c) a sign-in mechanism authenticates and signs the first user into the IETM based at least in part on a first user credential, the dataset, the selection of the unit displayed, and the selection of the object displayed, and (d) the window displays the content found in the technical documentation;
provide a second initial window for display, the second initial window comprising an electronic form via the IETM viewer executing on a second user computing entity being used by a second user signed into the IETM, wherein (a) the second user computing entity is not connected to the network, (b) the second user provides (i) input of a selection of a dataset corresponding to the technical documentation for one of the one or more items, (ii) input of a selection of a unit displayed for the selectable unit field, and (iii) input of a selection of an object displayed for the selectable object field, (c) a sign-in mechanism authenticates and signs the second user into the IETM based at least in part on a second user credential, the dataset, the selection of the unit displayed, and the selection of the object displayed, and (d) the window displays the content found in the technical documentation;
receive input associated with the first user scanning a graphical code affixed to an aircraft;
responsive to receiving the input associated with the first user scanning the graphical code affixed to the aircraft, connect the first user computing entity to the network, determine that the first user is allowed to access the virtual private network associated with the aircraft, and provide the first user computing entity with access to the virtual private network associated with the aircraft;
receive input associated with the second user scanning a graphical code affixed to an aircraft;
responsive to receiving the input associated with the second user scanning the graphical code affixed to the aircraft, connect the second user computing entity to the network, determine that the second user is allowed to access the virtual private network associated with the aircraft, and provide the second user computing entity with access to the virtual private network associated with the aircraft;
enable the first user computing entity and the second user computing entity to communicate with one another via the virtual private network associated with the aircraft;
determine that the first user is assigned to perform a particular task for the aircraft; and
responsive to determining that the first user is assigned to perform a particular task for the aircraft, broadcast a warning notification to the second computing entity and another computing entity accessing the virtual private network associated with the aircraft.

6. The apparatus of claim 5, wherein each of the graphical code comprises at least one of a quick response code, a one-dimensional graphical code, a universal product code, and a data matric graphical code.

7. The apparatus of claim 5, wherein the network comprises at least one of an internet protocol based network and a cellular network.

8. The apparatus of claim 5, wherein the at least one memory and the computer program code are configured to, with the at least one processor, cause the apparatus to:
query a stock identifier based at least in part on a part identifier for a part;
retrieve the electronic form based at least in part on the item; and
auto-populate the electronic form with the data for the part, wherein the informational data comprises the data for the part and the informational data is used in ordering the part.

9. A non-transitory computer storage medium comprising instructions for accessing a virtual private network associated with an aircraft and for accessing an interactive electronic technical manual system (IETM) configured to provide electronic and credentialed access via an IETM viewer to technical documentation for an item, the instructions being configured to cause one or more processors to at least perform operations configured to:
provide a first initial window for display, the first initial window comprising an electronic form via the IETM viewer executing on a first user computing entity being used by a first user signed into the IETM, wherein (a) the first user computing entity is not connected to a network, (b) the first user provides (i) input of a selection of a dataset corresponding to the technical documentation for one of the one or more items, (ii) input of a selection of a unit displayed for the selectable unit field, and (iii) input of a selection of an object displayed for the selectable object field, (c) a sign-in mechanism authenticates and signs the first user into the IETM based at least in part on a first user credential, the dataset, the selection of the unit displayed, and the selection of the object displayed, and (d) the window displays the content found in the technical documentation;
provide a second initial window for display, the second initial window comprising an electronic form via the IETM viewer executing on a second user computing entity being used by a second user signed into the IETM, wherein (a) the second user computing entity is not connected to the network, (b) the second user provides (i) input of a selection of a dataset corresponding to the technical documentation for one of the one or more items, (ii) input of a selection of a unit displayed for the selectable unit field, and (iii) input of a selection of an object displayed for the selectable object field, (c) a sign-in mechanism authenticates and signs the second user into the IETM based at least in part on a second user credential, the dataset, the selection of the unit displayed, and the selection of the object displayed, and (d) the window displays the content found in the technical documentation;

receive input associated with the first user scanning a graphical code affixed to an aircraft;

responsive to receiving the input associated with the first user scanning the graphical code affixed to the aircraft, connect the first user computing entity to the network, determine that the first user is allowed to access the virtual private network associated with the aircraft, and provide the first user computing entity with access to the virtual private network associated with the aircraft;

receive input associated with the second user scanning a graphical code affixed to an aircraft;

responsive to receiving the input associated with the second user scanning the graphical code affixed to the aircraft, connect the second user computing entity to the network, determine that the second user is allowed to access the virtual private network associated with the aircraft, and provide the second user computing entity with access to the virtual private network associated with the aircraft;

enable the first user computing entity and the second user computing entity to communicate with one another via the virtual private network associated with the aircraft;

determine that the first user is assigned to perform a particular task for the aircraft; and responsive to determining that the first user is assigned to perform a particular task for the aircraft, broadcast a warning notification to the second computing entity and another computing entity accessing the virtual private network associated with the aircraft.

10. The non-transitory computer storage medium of claim 9, wherein each of the graphical code comprises at least one of a quick response code, a one-dimensional graphical code, a universal product code, and a data matric graphical code.

11. The non-transitory computer storage medium of claim 9, wherein the network comprises at least one of an internet protocol based network and a cellular network.

12. The non-transitory computer storage medium of claim 9, wherein the instructions are configured to cause the one or more processors to at least perform operations configured to:

query a stock identifier based at least in part on a part identifier for a part;

retrieve the electronic form based at least in part on the item; and auto-populate the electronic form with the data for the part, wherein the informational data comprises the data for the part and the informational data is used in ordering the part.

\* \* \* \* \*